US012401962B2

(12) United States Patent
Thomas et al.

(10) Patent No.: US 12,401,962 B2
(45) Date of Patent: Aug. 26, 2025

(54) PERVASIVE ACOUSTIC MAPPING

(71) Applicants: Dolby Laboratories Licensing Corporation, San Francisco, CA (US); DOLBY INTERNATIONAL AB, Dublin (IE)

(72) Inventors: Mark R. P. Thomas, Walnut Creek, CA (US); Benjamin John Southwell, Gledswood Hills (AU); Avery Bruni, San Francisco, CA (US); Olha Michelle Townsend, San Francisco, CA (US); Daniel Arteaga, Barcelona (ES); Davide Scaini, Barcelona (ES); Christopher Graham Hines, Sydney Hills (AU); Alan J. Seefeldt, Alameda, CA (US); David Gunawan, Sydney (AU); C. Phillip Brown, Castro Valley, CA (US)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 18/254,597

(22) PCT Filed: Dec. 2, 2021

(86) PCT No.: PCT/IB2021/000788
§ 371 (c)(1),
(2) Date: May 25, 2023

(87) PCT Pub. No.: WO2022/118072
PCT Pub. Date: Jun. 9, 2022

(65) Prior Publication Data

US 2024/0381046 A1 Nov. 14, 2024

Related U.S. Application Data

(60) Provisional application No. 63/261,769, filed on Sep. 28, 2021, provisional application No. 63/260,954,
(Continued)

(30) Foreign Application Priority Data

| | | |
|---|---|---|
| Dec. 3, 2020 | (ES) | ES202031212 |
| May 20, 2021 | (ES) | ES202130458 |
| Jul. 26, 2021 | (ES) | ES202130724 |

(51) Int. Cl.
*H04S 7/00* (2006.01)
*H04R 5/04* (2006.01)

(52) U.S. Cl.
CPC ............... *H04S 7/301* (2013.01); *H04R 5/04* (2013.01)

(58) Field of Classification Search
None
See application file for complete search history.

(56) References Cited

U.S. PATENT DOCUMENTS 6,639,989 B1 10/2003 Zacharov
7,920,707 B2 4/2011 Tsutsui
(Continued)

FOREIGN PATENT DOCUMENTS

WO 2016118314 A1 7/2016
WO 201864410 W 4/2018
(Continued)

OTHER PUBLICATIONS

Amidror, Isaac, "Scattered data interpolation methods for electronic imaging systems: a survey," in Journal of Electronic Imaging vol. 11, No. 2, Apr. 2002, pp. 157-176.
(Continued)

*Primary Examiner* — Paul W Huber

(57) ABSTRACT

Some methods may involve receiving a first content stream that includes first audio signals, rendering the first audio
(Continued)

signals to produce first audio playback signals, generating first calibration signals, generating first modified audio playback signals by inserting the first calibration signals into the first audio playback signals, and causing a loudspeaker system to play back the first modified audio playback signals, to generate first audio device playback sound. The method(s) may involve receiving microphone signals corresponding to at least the first audio device playback sound and to second through Nth audio device playback sound corresponding to second through Nth modified audio playback signals (including second through Nth calibration signals) played back by second through Nth audio devices, extracting second through Nth calibration signals from the microphone signals and estimating at least one acoustic scene metric based, at least partly, on the second through Nth calibration signals.

25 Claims, 57 Drawing Sheets

Related U.S. Application Data filed on Sep. 7, 2021, provisional application No. 63/260,953, filed on Sep. 7, 2021, provisional application No. 63/260,528, filed on Aug. 24, 2021, provisional application No. 63/260,529, filed on Aug. 24, 2021, provisional application No. 63/224,778, filed on Jul. 22, 2021, provisional application No. 63/203,403, filed on Jul. 21, 2021, provisional application No. 63/201,561, filed on May 4, 2021, provisional application No. 63/155,369, filed on Mar. 2, 2021, provisional application No. 63/120,963, filed on Dec. 3, 2020, provisional application No. 63/121,085, filed on Dec. 3, 2020, provisional application No. 63/120,887, filed on Dec. 3, 2020, provisional application No. 63/121,007, filed on Dec. 3, 2020.

(56) References Cited

U.S. PATENT DOCUMENTS 8,472,632 B2 6/2013 Riedel
9,084,058 B2 7/2015 Reilly
9,106,192 B2 8/2015 Sheen
9,307,340 B2 * 4/2016 Seefeldt .................. H04S 7/301
9,398,392 B2 7/2016 Ridihalgh
9,538,305 B2 1/2017 Lehnert
9,648,422 B2 5/2017 Sheen
9,661,428 B2 5/2017 Holladay
9,693,165 B2 6/2017 Downing
9,743,207 B1 8/2017 Hartung
9,769,587 B2 9/2017 Schevciw
9,794,718 B2 10/2017 Crockett
9,860,670 B1 1/2018 Sheen
10,127,006 B2 11/2018 Sheen
10,149,088 B2 12/2018 Patil
10,277,990 B2 4/2019 Thomsen
10,284,983 B2 5/2019 Wilberding
10,459,684 B2 10/2019 Shih
10,511,906 B1 12/2019 Moore
10,585,639 B2 3/2020 Sheen
10,708,701 B2 7/2020 Skovenborg
10,734,965 B1 8/2020 McPherson
10,779,084 B2 9/2020 Arteaga
10,841,723 B2 11/2020 Sahay
10,945,089 B2 3/2021 Reilly
11,587,576 B2 2/2023 Hines
2012/0214515 A1 8/2012 Davis
2015/0139430 A1 5/2015 Miyata
2015/0341890 A1 11/2015 Corbellini
2020/0092647 A1 3/2020 Palmer
2021/0037326 A1 2/2021 Pihl
2023/0040846 A1 2/2023 Thomas

FOREIGN PATENT DOCUMENTS

WO 2020023856 A1 1/2020
WO 2021/021682 2/2021
WO 2021/021814 2/2021
WO 2021021707 A1 2/2021
WO 2021/127286 6/2021
WO 202212009 W 1/2022
WO 2022/119988 6/2022
WO 2022/119989 6/2022
WO 2022/119990 6/2022
WO 2022/120005 6/2022
WO 2022/120051 6/2022
WO 2022/120082 6/2022
WO 2022/120006 7/2022

OTHER PUBLICATIONS

D. Arteaga, “An Ambisonics Decoder for Irregular 3-D Loudspeaker Arrays,” Paper 8918, (May 2013).
Pulkki, Ville, “Virtual Sound Source Positioning Using Vector Base Amplitude Panning,” in J. Audio Eng. Soc. vol. 45, No. 6 (Jun. 1997).

* cited by examiner

2800

4800a

4800c

PERVASIVE ACOUSTIC MAPPING

CROSS-REFERENCE TO RELATED APPLICATIONS

This application is a U.S. National Stage application under U.S.C. 371 of International Application No. PCT/IB2021/000788, filed on Dec. 2, 2021, which claims the benefit of priority to Spanish Patent Application No. P202031212, filed Dec. 3, 2020; U.S. Provisional Patent Application No. 63/120,963, filed Dec. 3, 2020; U.S. Provisional Patent Application No. 63/120,887, filed Dec. 3, 2020; U.S. Provisional Patent Application No. 63/121,007, filed Dec. 3, 2020; U.S. Provisional Patent Application No. 63/121,085, filed Dec. 3, 2020; U.S. Provisional Patent Application No. 63/155,369, filed Mar. 2, 2021; U.S. Provisional Patent Application No. 63/201,561, filed May 4, 2021; Spanish Patent Application No. P202130458, filed May 20, 2021; U.S. Provisional Patent Application No. 63/203,403, filed Jul. 21, 2021; U.S. Provisional Patent Application No. 63/224,778, filed Jul. 22, 2021; Spanish Patent Application No. P202130724, filed Jul. 26, 2021; U.S. Provisional Patent Application No. 63/260,528, filed Aug. 24, 2021; U.S. Provisional Patent Application No. 63/260,529, filed Aug. 24, 2021; U.S. Provisional Patent Application No. 63/260,953, filed Sep. 7, 2021; U.S. Provisional Patent Application No. 63/260,954, filed Sep. 7, 2021; U.S. Provisional Patent Application No. 63/261,769, filed Sep. 28, 2021, all of which are incorporated herein by reference.

TECHNICAL FIELD

This disclosure pertains to audio processing systems and methods.

BACKGROUND

Audio devices and systems are widely deployed. Although existing systems and methods for estimating acoustic scene metrics (e.g., audio device audibility) are known, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or by multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modem TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some methods may involve causing, by a control system, a first audio device of an audio environment to generate first calibration signals and causing, by the control system, the first calibration signals to be inserted into first audio playback signals corresponding to a first content stream, to generate first modified audio playback signals for the first audio device. Some such methods may involve causing, by the control system, the first audio device to play back the first modified audio playback signals, to generate first audio device playback sound.

Some such methods may involve causing, by the control system, a second audio device of the audio environment to generate second calibration signals, causing, by the control system, the second calibration signals to be inserted into a second content stream to generate second modified audio playback signals for the second audio device and causing, by the control system, the second audio device to play back the second modified audio playback signals, to generate second audio device playback sound.

Some such methods may involve causing, by the control system, at least one microphone of the audio environment to detect at least the first audio device playback sound and the second audio device playback sound and to generate microphone signals corresponding to at least the first audio device playback sound and the second audio device playback sound. Some such methods may involve causing, by the control system, the first calibration signals and the second calibration signals to be extracted from the microphone signals. Some such methods may involve causing, by the control system, at least one acoustic scene metric to be estimated based, at least in part, on the first calibration signals and the second calibration signals.

In some implementations, the control system may be an orchestrating device control system.

In some examples, the first calibration signals may correspond to first sub-audible components of the first audio device playback sound and the second calibration signals may correspond to second sub-audible components of the second audio device playback sound. According to some examples, the first calibration signals may be, or may include, first DSSS signals and wherein the second calibration signals may be, or may include, second DSSS signals.

Some methods may involve causing, by the control system, a first gap to be inserted into a first frequency range of the first audio playback signals or the first modified audio playback signals during a first time interval of the first content stream. The first gap may be, or may include, an attenuation of the first audio playback signals in the first frequency range. In some such examples, the first modified audio playback signals and the first audio device playback sound may include the first gap.

Some methods may involve causing, by the control system, the first gap to be inserted into the first frequency range of the second audio playback signals or the second modified audio playback signals during the first time interval. In some such examples, the second modified audio playback signals and the second audio device playback sound may include the first gap.

Some methods may involve causing, by the control system, audio data from the microphone signals in at least the first frequency range to be extracted, to produce extracted audio data. Some such methods may involve causing, by the control system, at least one acoustic scene metric to be estimated based, at least in part, on the extracted audio data.

Some methods may involve controlling gap insertion and calibration signal generation such that calibration signals correspond with neither gap time intervals nor gap frequency ranges. Some methods may involve controlling gap insertion and calibration signal generation based, at least in part, on a time since noise was estimated in at least one frequency band. Some methods may involve controlling gap insertion and calibration signal generation based, at least in part, on a signal-to-noise ratio of a calibration signal of at least one audio device in at least one frequency band.

Some methods may involve causing a target audio device to play back unmodified audio playback signals of a target device content stream, to generate target audio device playback sound. Some such methods may involve causing, by the control system, target audio device audibility and/or a target audio device position to be estimated based, at least in part, on the extracted audio data. In some such examples, the unmodified audio playback signals do not include the first gap. According to some such examples, the microphone signals also may correspond to the target audio device playback sound. In some instances, the unmodified audio playback signals do not include a gap inserted into any frequency range.

In some examples, the at least one acoustic scene metric includes a time of flight, a time of arrival, a direction of arrival, a range, an audio device audibility, an audio device impulse response, an angle between audio devices, an audio device location, audio environment noise, a signal-to-noise ratio, or combinations thereof. According to some implementations, causing the at least one acoustic scene metric to be estimated may involve estimating at least one acoustic scene metric. In some implementations, causing the at least one acoustic scene metric to be estimated may involve or causing another device to estimate at least one acoustic scene metric. Some examples may involve controlling one or more aspects of audio device playback based, at least in part, on the at least one acoustic scene metric.

According to some implementations, a first content stream component of the first audio device playback sound may cause perceptual masking of a first calibration signal component of the first audio device playback sound. In some such implementations, a second content stream component of the second audio device playback sound may cause perceptual masking of a second calibration signal component of the second audio device playback sound.

Some examples may involve causing, by a control system, third through Nth audio devices of the audio environment to generate third through Nth calibration signals. Some such examples may involve causing, by the control system, the third through Nth calibration signals to be inserted into third through Nth content streams, to generate third through Nth modified audio playback signals for the third through Nth audio devices. Some such examples may involve causing, by the control system, the third through Nth audio devices to play back a corresponding instance of the third through Nth modified audio playback signals, to generate third through Nth instances of audio device playback sound.

Some such examples may involve causing, by the control system, at least one microphone of each of the first through Nth audio devices to detect first through Nth instances of audio device playback sound and to generate microphone signals corresponding to the first through Nth instances of audio device playback sound. In some instances, the first through Nth instances of audio device playback sound may include the first audio device playback sound, the second audio device playback sound and the third through Nth instances of audio device playback sound. Some such examples may involve causing, by the control system, the first through Nth calibration signals to be extracted from the microphone signals. In some implementations, the at least one acoustic scene metric may be estimated based, at least in part, on first through Nth calibration signals.

Some examples may involve determining one or more calibration signal parameters for a plurality of audio devices in the audio environment. In some instances, the one or more calibration signal parameters may be useable for generation of calibration signals. Some examples may involve providing the one or more calibration signal parameters to each audio device of the plurality of audio devices. In some such implementations, determining the one or more calibration signal parameters may involve scheduling a time slot for each audio device of the plurality of audio devices to play back modified audio playback signals. In some examples, a first time slot for a first audio device may be different from a second time slot for a second audio device.

In some examples, determining the one or more calibration signal parameters may involve determining a frequency band for each audio device of the plurality of audio devices to play back modified audio playback signals. In some such examples, a first frequency band for a first audio device may be different from a second frequency band for a second audio device.

According to some examples, determining the one or more calibration signal parameters may involve determining a DSSS spreading code for each audio device of the plurality of audio devices. In some instance, a first spreading code for a first audio device may be different from a second spreading code for a second audio device. Some examples may involve determining at least one spreading code length that is based, at least in part, on an audibility of a corresponding audio device.

In some examples, determining the one or more calibration signal parameters may involve applying an acoustic model that is based, at least in part, on mutual audibility of each of a plurality of audio devices in the audio environment.

Some methods may involve determining that calibration signal parameters for an audio device are at a level of maximum robustness. Some such methods may involve determining that calibration signal from the audio device cannot be successfully extracted from the microphone signals. Some such methods may involve causing all other audio devices to mute at least a portion of their corresponding audio device playback sound. In some examples the portion may be, or may include, a calibration signal component.

Some implementations may involve causing each of a plurality of audio devices in the audio environment to simultaneously play back modified audio playback signals.

According to some examples, at least a portion of the first audio playback signals, at least a portion of the second audio playback signals, or at least portions of each of the first audio playback signals and the second audio playback signals, correspond to silence.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus or a system. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
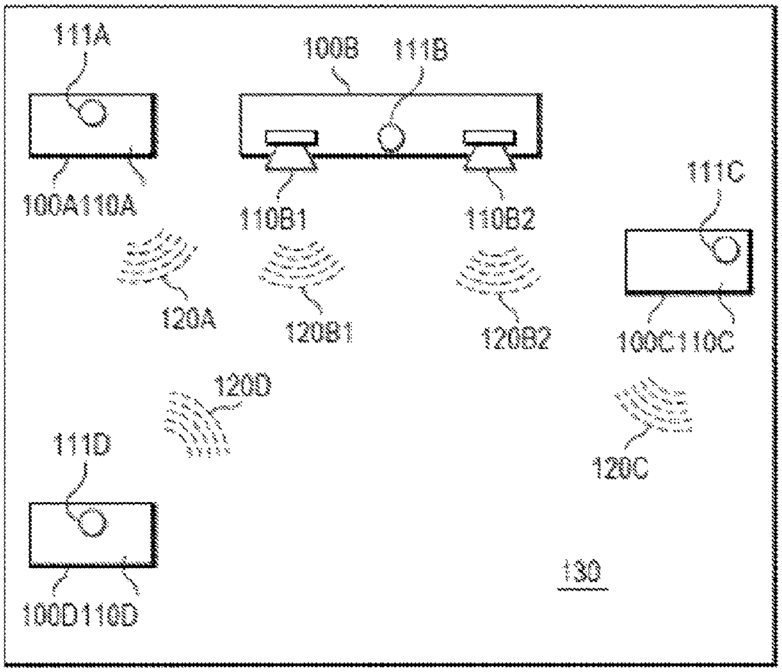
FIG. 1A shows an example of an audio environment.

To achieve compelling spatial playback of media and entertainment content the physical layout and relative capabilities of the available speakers should be evaluated and taken into account. Similarly, in order to provide high-quality voice-driven interactions (with both virtual assistants and remote talkers) users need both to be heard and to hear the conversation as reproduced via loudspeakers. It is anticipated that as more co-operative devices are added to an audio environment, the combined utility to the user will increase, as devices will be within convenient voice range more commonly. A larger number of speakers allows for greater immersion as the spatiality of the media presentation may be leveraged.

Sufficient co-ordination and co-operation between devices could potentially allow these opportunities and experiences to be realized. Acoustic information about each audio device is a key component of such co-ordination and co-operation. Such acoustic information may include the audibility of each loudspeakers from various positions in the audio environment, as well as the amount of noise in the audio environment.

Some previous methods of mapping and calibrating a constellation of smart audio devices require a dedicated calibration procedure, whereby known stimulus is played from the audio devices (often one audio device playing at a time) while one or more microphones records. Though this process can be made appealing to a select demographic of users through creative sound design, the need to repeatedly re-perform the process as devices are added, removed or even simply relocated presents a barrier to widespread adoption. Imposing such a procedure on users will interfere with the normal operation of the devices and may frustrate some users.

An even more rudimentary approach that is also popular is manual user intervention via a software application ("app") and/or a guided process in which users indicate the physical location of audio devices in an audio environment. Such approaches present further barriers to user adoption and may provide relatively less information to the system than a dedicated calibration procedure.

Calibration and mapping algorithms generally require some basic acoustic information for each audio device in an audio environment. Many such methods have been proposed, using a range of different basic acoustic measurements and acoustic properties being measured. Examples of acoustic properties (also referred to herein as "acoustic scene metrics") derived from microphone signals for use in such algorithms include:

- Estimates of physical distance between devices (acoustic ranging);
- Estimates of angle between devices (direction of arrival (DoA));
- Estimates of impulse responses between devices (e.g., through swept sine wave stimulus or other measurement signals); and
- Estimates of background noise.

However, existing calibration and mapping algorithms are not generally implemented so as to be responsive to changes in the acoustic scene of an audio environment, such as the movement of people within the audio environment, the repositioning of audio devices within the audio environment, etc.

An orchestrated system of smart audio devices, such as those disclosed herein, can provide the user with the flexibility to place devices at arbitrary locations in a listening environment (also referred to herein as an audio environment). In some implementations, the audio devices are configured to self-organize and calibrate automatically.

Calibration may be conceptually divided into two or more layers. One such layer involves what may be referred to herein as "geometric mapping." Geometric mapping may involve discovering the physical location and orientation of smart audio devices and one or more people in the audio environment. In some examples, geometric mapping may involve discovering the physical locations of noise sources and/or legacy audio devices such as televisions ("TVs") and soundbars. Geometric mapping is important for many reasons. For example, it is important that a flexible renderer be provided accurate geometric mapping information in order to render a sound scene correctly. Conversely, legacy systems employing canonical loudspeaker layouts, such as 5.1, have been designed under the assumption that the loudspeakers will be placed in predetermined positions and that the listener is sitting in a "sweet spot" facing the center loudspeaker and/or midway between the left and right front loudspeakers.

A second conceptual layer of calibration involves processing of audio data (e.g., audio leveling and equalization) to account for manufacturing variations in the loudspeakers, the effects of room placement and acoustics, etc. In the legacy case, in particular with soundbars and audio/video receivers (AVRs), a user may optionally apply manual gains and EQ curves or plug in a dedicated reference microphone at the listening location for automatic calibration. However, the proportion of the population willing to go to these lengths is known to be very small. An orchestrated system of smart audio devices therefore requires a methodology to automate audio processing (particularly level and EQ calibration) without requiring the use of reference microphones at a listener location, a process that may be referred to herein as "audibility mapping." Geometric mapping and audibility mapping form the two main components of what will be referred to herein as "acoustic mapping."

This disclosure describes multiple techniques that may be used in various combinations in order to provide automated acoustic mapping. The acoustic mapping may be pervasive and ongoing. Such acoustic mapping may sometimes be referred to as "continuous," in the sense that the acoustic mapping may be continued after an initial set-up process and may be responsive to changing conditions in the audio environment, such as changing noise sources and/or levels, loudspeaker relocation, the deployment of additional loudspeakers, the relocation and/or re-orientation of one or more listeners, etc.

Some disclosed methods involve generating calibration signals that are injected (e.g., mixed) into the audio content being rendered by audio devices in an audio environment. In some such examples, the calibration signals may be, or may include, acoustic direct sequence spread spectrum (DSSS) signals.

In other examples, the calibration signals may be, or may include, other types of acoustic calibration signals, such as swept sinusoidal acoustic signals, white noise, "colored noise," such as pink noise (a spectrum of frequencies that decreases in intensity at a rate of three decibels per octave), acoustic signals corresponding to music, etc. Such methods can enable the audio devices to produce observations after receiving calibration signals transmitted by other audio devices in an audio environment. In some implementations, each participating audio device in an audio environment may be configured to generate the acoustic calibration signals, to inject the acoustic calibration signals into rendered loudspeaker feed signals to produce modified audio playback signals, and to cause a loudspeaker system to play back the modified audio playback signals, to generate first audio device playback sound. In some implementations, each participating audio device in an audio environment may be configured to do the foregoing whilst also detecting audio device playback sound from other orchestrated audio devices in the audio environment and processing the audio device playback sound to extract the acoustic calibration signals. Accordingly, while detailed examples of using acoustic DSSS signals are provided herein, these should be viewed as particular examples within the broader category of acoustic calibration signals.

DSSS signals have previously been deployed in the context of telecommunications. When DSSS signals are used in the context of telecommunications, DSSS signals are used to spread out the transmitted data over a wider frequency range before it is sent over a channel to a receiver. Most or all of the disclosed implementations, by contrast, do not involve using DSSS signals to modify or transmit data. Instead, such disclosed implementations involve sending DSSS signals between audio devices of an audio environment. What happens to the transmitted DSSS signals between transmission and reception is, in itself, the transmitted information. That is one significant difference between how DSSS signals are used in the context of telecommunications and how DSSS signals are used in the disclosed implementations.

Moreover, the disclosed implementations involve sending and receiving acoustic DSSS signals, not sending and receiving electromagnetic DSSS signals. In many disclosed implementations, the acoustic DSSS signals are inserted into a content stream that has been rendered for playback, such that the acoustic DSSS signals are included in played-back audio. According to some such implementations, the acoustic DSSS signals are not audible to humans, so that a person in the audio environment would not perceive the acoustic DSSS signals, but would only detect the played-back audio content.

Another difference between the use of acoustic DSSS signals as disclosed herein and how DSSS signals are used in the context of telecommunications involves what may be referred to herein as the "near/far problem." In some instances, the acoustic DSSS signals disclosed herein may be transmitted by, and received by, many audio devices in an audio environment. The acoustic DSSS signals may potentially overlaps in time and frequency. Some disclosed implementations rely on how the DSSS spreading codes are generated to separate the acoustic DSSS signals. In some instances, the audio devices may be so close to one another that the signal levels may encroach on the acoustic DSSS signal separation, so it may be difficult to separate the signals. That is one manifestation of the near/far problem, some solutions for which are disclosed herein.

Some methods may involve receiving a first content stream that includes first audio signals, rendering the first audio signals to produce first audio playback signals, generating first calibration signals, generating first modified audio playback signals by inserting the first calibration signals into the first audio playback signals, and causing a loudspeaker system to play back the first modified audio playback signals, to generate first audio device playback sound. The method(s) may involve receiving microphone signals corresponding to at least the first audio device playback sound and to second through $N^{th}$ audio device playback sound corresponding to second through $N^{th}$ modified audio playback signals (including second through Nth calibration signals) played back by second through Nth audio devices, extracting second through Nth calibration signals from the microphone signals and estimating at least one acoustic scene metric based, at least partly, on the second through Nth calibration signals.

The acoustic scene metric(s) may be, or may include, an audio device audibility, an audio device impulse response, an angle between audio devices, an audio device location and/or audio environment noise. Some disclosed methods may involve controlling one or more aspects of audio device playback based, at least in part, on the acoustic scene metric(s).

Some disclosed methods may involve orchestrating a plurality of audio devices to perform methods involving calibration signals. Some such methods may involve causing, by a control system, a first audio device of an audio environment to generate first calibration signals, causing, by the control system, the first calibration signals to be inserted into first audio playback signals corresponding to a first content stream, to generate first modified audio playback signals for the first audio device and causing, by the control system, the first audio device to play back the first modified audio playback signals, to generate first audio device playback sound.

Some such methods may involve causing, by the control system, a second audio device of the audio environment to generate second calibration signals, causing, by the control system, the second calibration signals to be inserted into a second content stream to generate second modified audio playback signals for the second audio device and causing, by the control system, the second audio device to play back the second modified audio playback signals, to generate second audio device playback sound.

Some such implementations may involve causing, by the control system, at least one microphone of the audio environment to detect at least the first audio device playback sound and the second audio device playback sound and to generate microphone signals corresponding to at least the first audio device playback sound and the second audio device playback sound. Some such methods may involve causing, by the control system, at least the first calibration signals and the second calibration signals to be extracted from the microphone signals and causing, by the control system, at least one acoustic scene metric to be estimated based, at least in part, on the first calibration signals and the second calibration signals.

FIG. 1A shows an example of an audio environment. As with other figures provided herein, the types and numbers of elements shown in FIG. 1A are merely provided by way of example. Other implementations may include more, fewer and/or different types and numbers of elements.

According to this example, the audio environment 130 is a living space of a home. In the example shown FIG. 1A, audio devices 100A, 100B, 100C and 100D are located within the audio environment 130. In this example, In this example, each of the audio devices 100A-100D includes a corresponding one of the loudspeaker systems 110A, 110B, 110C and 110D. According to this example, loudspeaker system 110B of the audio device 100B includes at least a left loudspeaker 110B1 and a right loudspeaker 110B2. In this instance the audio devices 100A-100D include loudspeakers of various sizes and having various capabilities. At the time represented in FIG. 1A, the audio devices 100A-100D are producing corresponding instances of audio device playback sound 120A, 120B1, 120B2, 120C and 120D.

In this example, each of the audio devices 100A-100D includes a corresponding one of the microphone systems 111A, 111B, 111C and 111D. Each of the microphone systems 111A-111D includes one or more microphones. In some examples, the audio environment 130 may include at least one audio device lacking a loudspeaker system or at least one audio device lacking a microphone system.

In some instances, at least one acoustic event may be occurring in the audio environment 130. For example, one such acoustic event may be caused by a talking person, who in some instances may be uttering a voice command. In other instances, an acoustic event may be caused, at least in part, by a variable element such as a door or a window of the audio environment 130. For example, as a door opens, sounds from outside the audio environment 130 may be perceived more clearly inside the audio environment 130. Moreover, the changing angle of a door may changes some of the echo paths within the audio environment 130.

Figure 1B:
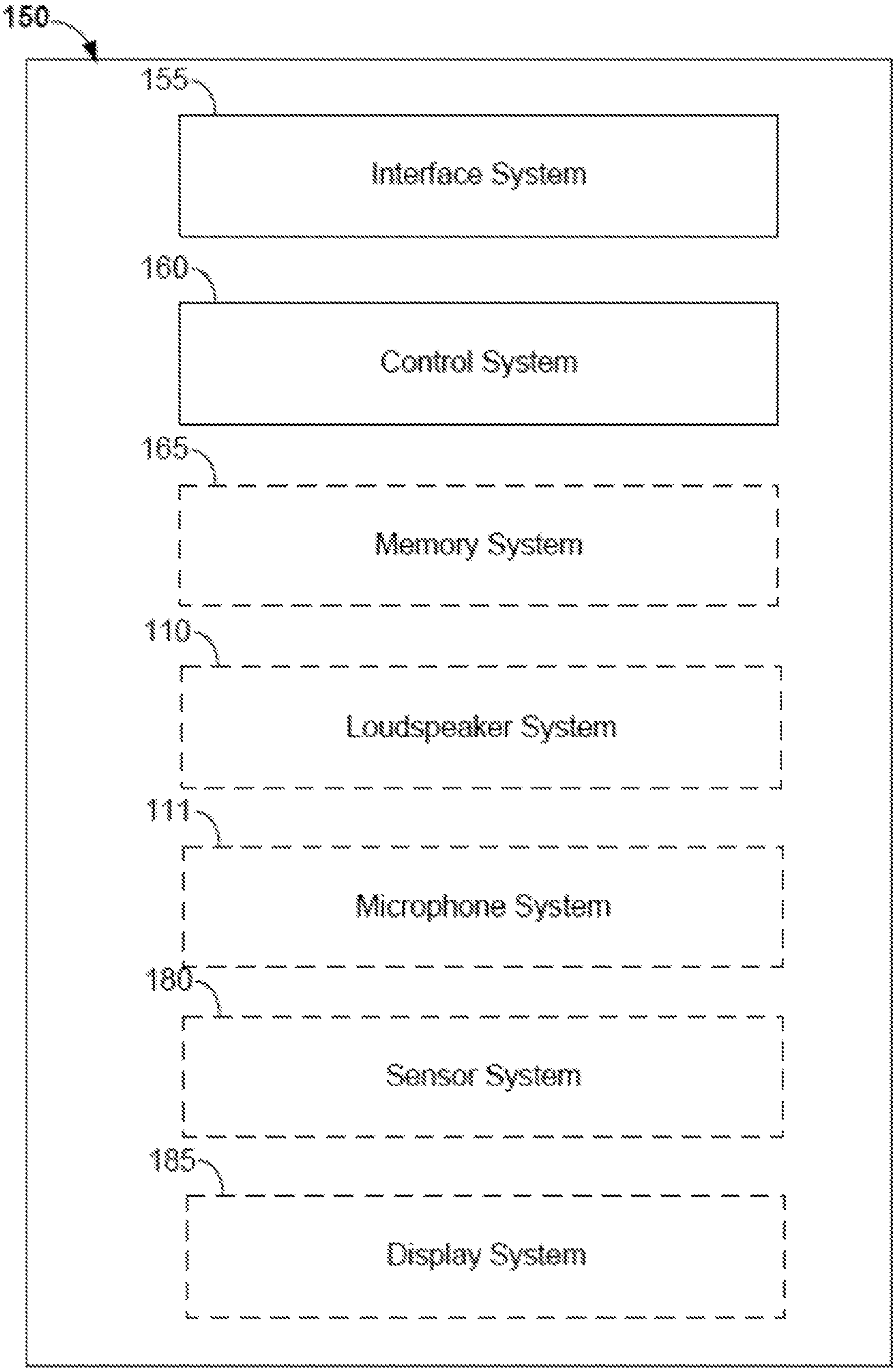
FIG. 1B is a block diagram that shows examples of components of an apparatus capable of implementing various aspects of this disclosure.

FIG. 1B is a block diagram that shows examples of components of an apparatus capable of implementing various aspects of this disclosure. As with other figures provided herein, the types and numbers of elements shown in FIG. 1B are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television or another type of device.

In the example shown in FIG. 1A, the audio devices 100A-100D are instances of the apparatus 150. According to some examples, the audio environment 100 of FIG. 1A may include an orchestrating device, such as what may be referred to herein as a smart home hub. The smart home hub (or other orchestrating device) may be an instance of the apparatus 150. In some implementations, one or more of the audio devices 100A-100D may be capable of functioning as an orchestrating device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, include a wired or wireless interface that is configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces, e.g., configured for Wi-Fi or Bluetooth™ communication.

The interface system 155 may, in some examples, include one or more devices for implementing a user interface, such as one or more microphones, one or more speakers, a display system, a touch sensor system and/or a gesture sensor system. In some examples, the interface system 155 may include one or more interfaces between the control system 160 and a memory system, such as the optional memory system 165 shown in FIG. 1B. However, the control system 160 may include a memory system in some instances. The interface system 155 may, in some implementations, be configured for receiving input from one or more microphones in an environment.

In some implementations, the control system 160 may be configured for performing, at least in part, the methods disclosed herein. The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1B.

In some examples, the apparatus 150 may include the optional microphone system 111 shown in FIG. 1B. The optional microphone system 111 may include one or more microphones. According to some examples, the optional microphone system 111 may include an array of microphones. The array of microphones may, in some instances, be configured for receive-side beamforming, e.g., according to instructions from the control system 160. In some examples, the array of microphones may be configured to determine direction of arrival (DOA) and/or time of arrival (TOA) information, e.g., according to instructions from the control system 160. Alternatively, or additionally, the control system 160 may be configured to determine direction of arrival (DOA) and/or time of arrival (TOA) information, e.g., according to microphone signals received from the microphone system 111.

In some implementations, one or more of the microphones may be part of, or associated with, another device, such as a speaker of the speaker system, a smart audio device, etc. In some examples, the apparatus 150 may not include a microphone system 111. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 110 shown in FIG. 1B. The optional loudspeaker system 110 may include one or more loudspeakers, which also may be referred to herein as "speakers" or, more generally, as "audio reproduction transducers." In some examples (e.g., cloud-based implementations), the apparatus 150 may not include a loudspeaker system 110.

In some implementations, the apparatus 150 may include the optional sensor system 180 shown in FIG. 1B. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may be a single purpose audio device or a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1B. The optional display system 185 may include one or more displays, such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device. In some such implementations the apparatus 150 may be, or may include, a wakeword detector. For example, the apparatus 150 may be, or may include, a virtual assistant.

Figure 2:
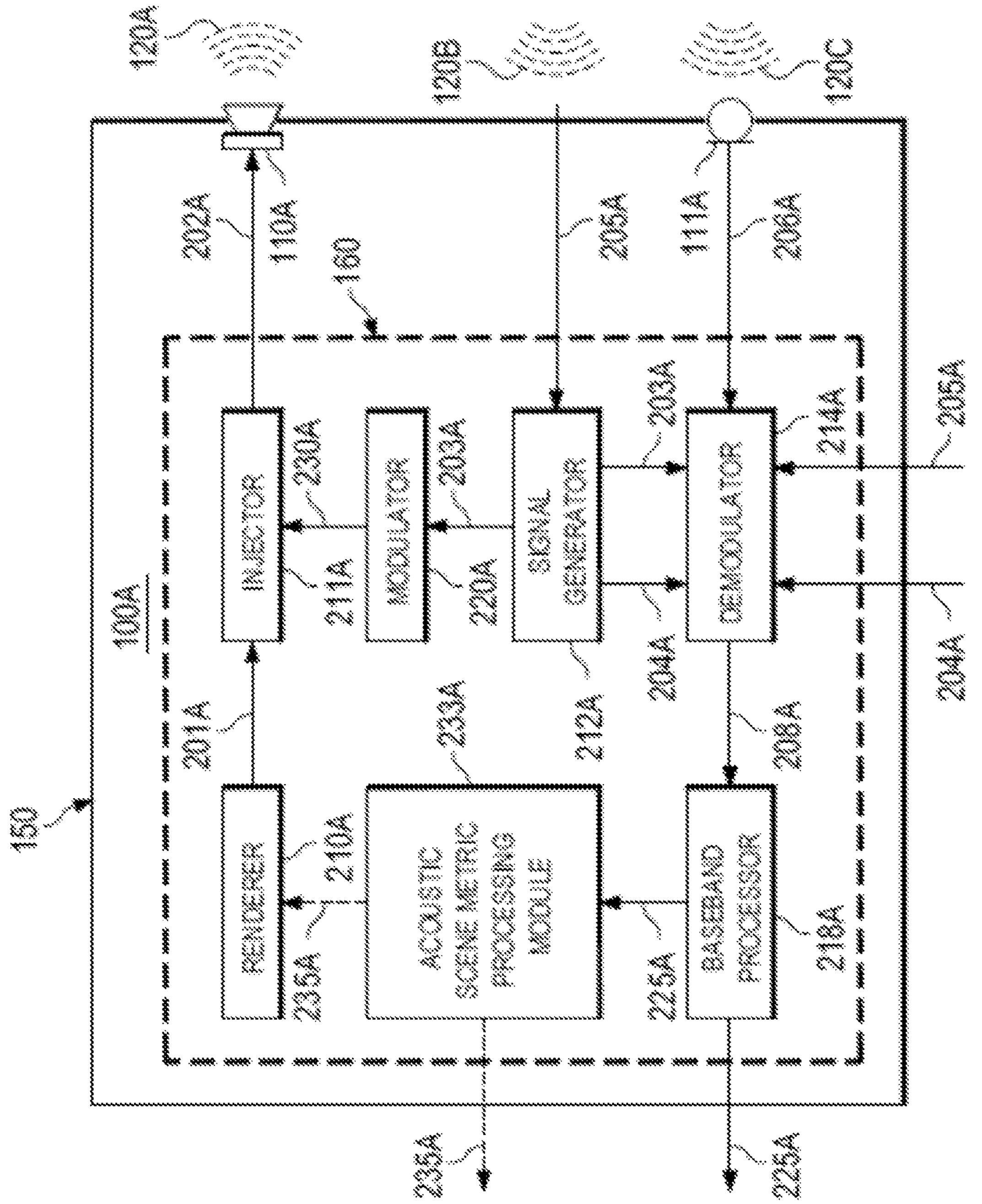
FIG. 2 is a block diagram that shows examples of audio device elements according to some disclosed implementations.

FIG. 2 is a block diagram that shows examples of audio device elements according to some disclosed implementations. As with other figures provided herein, the types and numbers of elements shown in FIG. 2 are merely provided by way of example. Other implementations may include more, fewer and/or different types and numbers of elements. In this example, the audio device 100A of FIG. 2 is an instance of the apparatus 150 that is described above with reference to FIG. 1B. In this example, the audio device 100A is one of a plurality of audio devices in an audio environment and may, in some instances, an example of the audio device 100A shown in FIG. 1A. In this example, the audio environment includes at least two other orchestrated audio devices, audio device 100B and audio device 100C.

According to this implementation, the audio device 100A includes the following elements:

- 110A: An instance of the loudspeaker system 110 of FIG. 1B, which includes one or more loudspeakers;
- 111A: An instance of the microphone system 111 of FIG. 1B, which includes one or more microphones;
- 120A, B, C: Audio device playback sounds corresponding to rendered content being played back by the audio devices 100A-100C in the same acoustic space;
- 201A: audio playback signals output by the rendering module 210A;
- 202A: modified audio playback signals output by the calibration signal injector 211A;
- 203A: calibration signals output by the calibration signal generator 212A;
- 204A: calibration signal replicas corresponding to calibration signals generated by other audio devices of the audio environment (in this example, at least audio devices 100B and 100C). In some examples, the calibration signal replicas 204A may be received (e.g., via a wireless communication protocol such as Wi-Fi or Bluetooth™) from an external source, such as an orchestrating device (which may be another audio device of the audio environment, another local device such as a smart home hub, etc.);
- 205A: calibration information pertaining to and/or used by one or more of the audio devices in the audio environment. The calibration information 205A may include parameters to be used by the control system 160 of the audio device 100A to generate calibration signals, to modulate calibration signals, to demodulate the calibration signals, etc. The calibration information 205A may, in some examples, include one or more DSSS spreading code parameters and one or more DSSS carrier wave parameters. The DSSS spreading code parameters may, for example, include DSSS spreading code length information, chipping rate information (or chip period information), etc. One chip period is the time it takes for one chip (bit) of the spreading code to be played back. The inverse of the chip period is the chipping rate. The bits in a DSSS spreading code may be referred to as "chips" to indicate that they do not contain data (as bits normally do). In some instances, the DSSS spreading code parameters may include a pseudo-random number sequence. The calibration information 205A may, in some examples, indicate which audio devices are producing acoustic calibration signals. In some examples, the calibration information 205A may be received (e.g., via wireless communication) from an external source, such as an orchestrating device;
- 206A: Microphone signals received by the microphone(s) 111A;
- 208A: Demodulated coherent baseband signals;
- 210A: A rendering module that is configured to render audio signals of a content stream such as music, audio data for movies and TV programs, etc., to produce audio playback signals;
- 211A: A calibration signal injector configured to insert calibration signals 230A modulated by the calibration signal modulator 220A into the audio playback signals produced by the rendering module 210A, to generate modified audio playback signals. The insertion process may, for example, be a mixing process wherein calibration signals 230A modulated by the calibration signal modulator 220A are mixed with the audio playback signals produced by the rendering module 210A, to generate the modified audio playback signals;
- 212A: A calibration signal generator configured to generate the calibration signals 203A and to provide the calibration signals 203A to the calibration signal modulator 220A and to the calibration signal demodulator 214A. In some examples, the calibration signal generator 212A may include a DSSS spreading code generator and a DSSS carrier wave generator. In this example, the calibration signal generator 212A provides the calibration signal replicas 204A to the calibration signal demodulator 214A;
- 214A: An optional calibration signal demodulator configured to demodulate microphone signals 206A received by the microphone(s) 111A. In this example the calibration signal demodulator 214A outputs the demodulated coherent baseband signals 208A. Demodulation of the microphone signals 206A may, for example, be performed using standard correlation techniques including integrate and dump style matched filtering correlator banks. Some detailed examples are provided below. In order to improve the performance of these demodulation techniques, in some implementations the microphone signals 206A may be filtered before demodulation in order to remove unwanted content/phenomena. According to some implementations, the demodulated coherent baseband signals 208A may be filtered before being provided to the baseband processor 218A. The signal-to-noise ratio (SNR) is generally improved as the integration time increases (as the length of the spreading code used increases). Not all types of calibration signals (e.g., white noise and acoustic signals corresponding to music) require modulation before being mixed with rendered audio data for playback. Accordingly, some implementations may not include a calibration signal demodulator;
- 218A: A baseband processor configured for baseband processing of the demodulated coherent baseband signals 208A. In some examples, the baseband processor 218A may be configured to implement techniques such as incoherent averaging in order to improve the SNR by reducing the variance of the squared waveform to produce the delay waveform. Some detailed examples are provided below. In this example, the baseband processor 218A is configured to output one or more estimated acoustic scene metrics 225A;
- 220A: An optional calibration signal modulator configured to modulate calibration signals 203A generated by the calibration signal generator, to produce the calibration signals 230A. As noted elsewhere herein, not all types of calibration signals require modulation before being mixed with rendered audio data for playback. Accordingly, some implementations may not include a calibration signal modulator;
- 225A: One or more observations derived from calibration signal(s), which are also referred to herein as acoustic scene metrics. The acoustic scene metric(s) 225A may include, or may be, data corresponding to a time of flight, a time of arrival, a range, an audio device audibility, an audio device impulse response, an angle between audio devices, an audio device location, audio environment noise and/or a signal-to-noise ratio;
- 233A: An acoustic scene metric processing module, which is configured to receive and apply the acoustic scene metrics 225A. In this example, the acoustic scene metric processing module 233A is configured to generate information 235A (and/or commands) based, at least in part, on at least one acoustic scene metric 225A and/or at least one audio device characteristic. The audio device characteristic(s) may correspond to the audio device 100A or to another audio device of the audio environment, depending on the particular implementation. The audio device characteristic(s) may, for example, be stored in a memory of, or accessible to, the control system 160; and

235A: Information for controlling one or more aspects of audio processing and/or audio device playback. The information 235A may, for example, include information (and/or commands) for controlling a rendering process, an audio environment mapping process (such as an audio device auto-location process), an audio device calibration process, a noise suppression process and/or an echo attenuation process.

Examples of Acoustic Scene Metrics

As noted above, in some implementations the baseband processor 218A (or another module of the control system 160) may be configured to determine one or more acoustic scene metrics 225A. Following are some examples of acoustic scene metrics 225A.

Ranging

The calibration signal received by an audio device from another contains information about the distance between the two devices in the form of the time-of-flight (ToF) of the signal. According to some examples, a control system may be configured to extract delay information from a demodulated calibration signal and convert the delay information to a pseudorange measurement, e.g., as follows:

$$\rho = \tau c$$

In the foregoing equation, r represents the delay information (also referred to herein as the ToF), ρ represents the pseudorange measurement and c represents the speed of sound. We refer to a "pseudorange" because the range itself is not measured directly and so the range between devices is being estimated according to a timing estimate. In distributed asynchronous system of audio devices, each audio device is running on its own clock and thus there exists a bias in the raw delay measurements. Given a sufficient set of delay measurements it is possible to resolve these biases and sometimes to estimate them. Detailed examples of extracting delay information, producing and using pseudorange measurements, and determining and resolving clock biases are provided below.

DoA

In a similar fashion to ranging, using the plurality of microphones available on the listening device, a control system may be configured to estimate a direction-of-arrival (DoA) by processing the demodulated acoustic calibration signals. In some such implementations, the resulting DoA information may be used as input to a DoA-based audio device auto-location method.

Audibility

The signal strength of the demodulated acoustic calibration signal is proportional to the audibility of the audio device being listened to in the band in which the audio device is transmitting the acoustic calibration signals. In some implementations, a control system may be configured to make multiple observations across a range of frequency bands to obtain a banded estimate of the entire frequency range. With knowledge of the transmitting audio device's digital signal level, a control system may, in some examples, be configured to estimate an absolute acoustic gain of the transmitting audio device.

Figure 3:
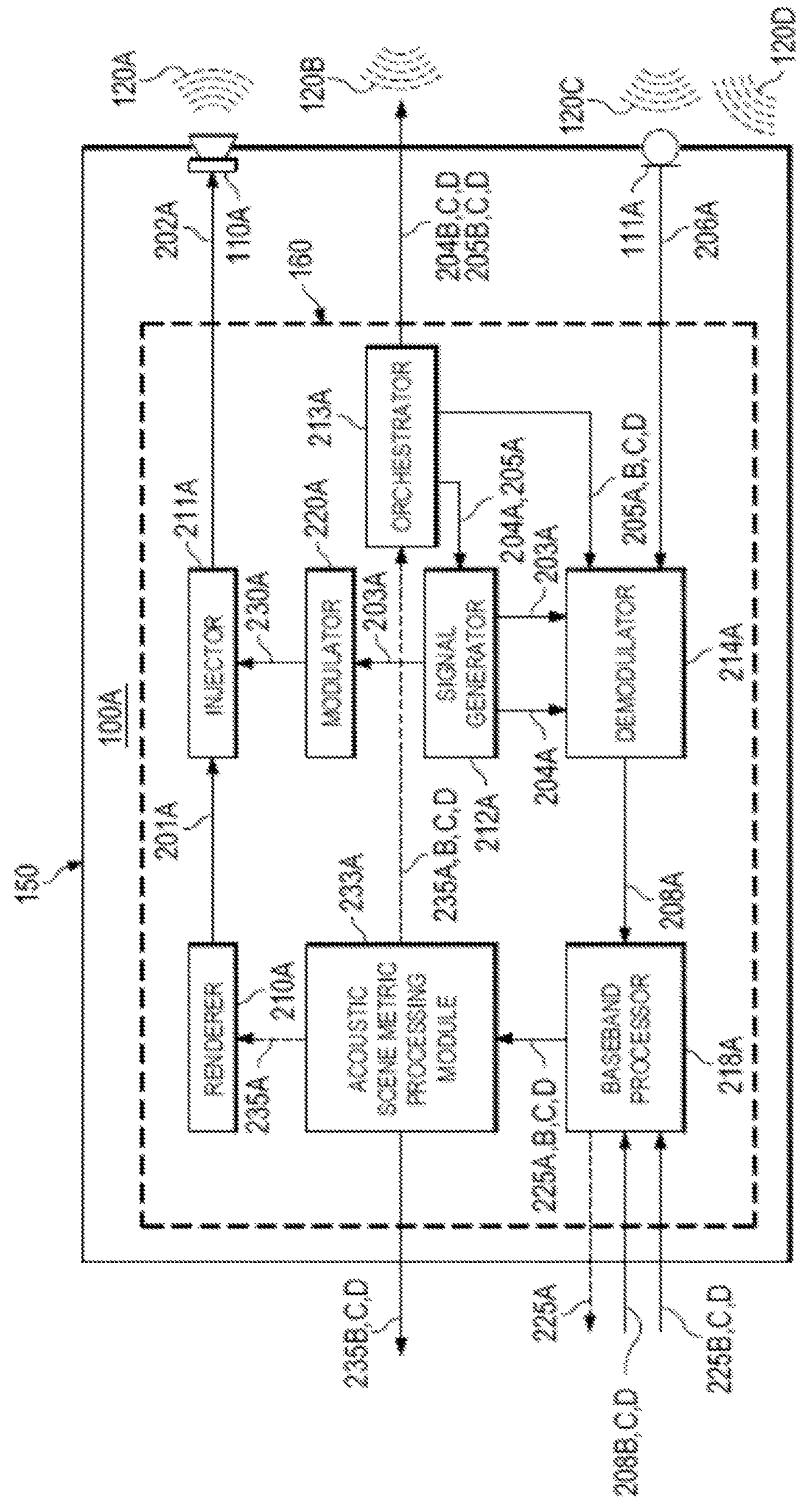
FIG. 3 is a block diagram that shows examples of audio device elements according to another disclosed implementation.

FIG. 3 is a block diagram that shows examples of audio device elements according to another disclosed implementation. As with other figures provided herein, the types and numbers of elements shown in FIG. 3 are merely provided by way of example. Other implementations may include more, fewer and/or different types and numbers of elements. In this example, the audio device 100A of FIG. 3 is an instance of the apparatus 150 that is described above with reference to FIGS. 1B and 2. However, according to this implementation, the audio device 100A is configured for orchestrating a plurality of audio devices in an audio environment, including at least audio devices 100B, 100C and 100D.

The implementation shown in of FIG. 3 includes all of the elements of FIG. 2, as well as some additional elements. The elements common to FIGS. 2 and 3 will not be described again here, except to the extent that their functionality may differ in the implementation of FIG. 3. According to this implementation, the audio device 100A includes the following elements and functionality:

120A, B, C, D: Audio device playback sounds corresponding to rendered content being played back by the audio devices 100A-100D in the same acoustic space;

204A, B, C, D: calibration signal replicas corresponding to calibration signals generated by other audio devices of the audio environment (in this example, at least audio devices 100B, 100C and 100D). In this example, the calibration signal replicas 204A-204D are provided by the orchestrating module 213A. Here, the orchestrating module 213A provides the calibration information 204B-204D to audio devices 100B-100D, e.g., via wireless communication;

205A, B, C, D: These elements correspond to calibration information pertaining to and/or used by each of the audio devices 100A-100D. The calibration information 205A may include parameters (such as one or more DSSS spreading code parameters and one or more DSSS carrier wave parameters) to be used by the control system 160 of the audio device 100A to generate calibration signals, to modulate calibration signals, to demodulate the calibration signals, etc. The calibration information 205B, 205C and 205D may include parameters (e.g., one or more DSSS spreading code parameters and one or more DSSS carrier wave parameters) to be used by the audio devices 100B, 100C and 100D, respectively to generate calibration signals, to modulate calibration signals, to demodulate the calibration signals, etc. The calibration information 205A-205D may, in some examples, indicate which audio devices are producing acoustic calibration signals;

213A: An orchestrating module. In this example, orchestrating module 213A generates the calibration information 205A-205D, provides the calibration information 205A to the calibration signal generator 212A, provides the calibration information 205A-205D to the calibration signal demodulator and provides the calibration information 205B-205D to audio devices 100B-100D, e.g., via wireless communication. In some examples, the orchestrating module 213A generates the calibration information 205A-205D based, at least in part, on the information 235A-235D and/or the acoustic scene metrics 225A-225D;

214A: A calibration signal demodulator configured to demodulate at least the microphone signals 206A received by the microphone(s) 111A. In this example, the calibration signal demodulator 214A outputs the demodulated coherent baseband signals 208A. In some alternative implementations, the calibration signal demodulator 214A may receive and demodulate microphone signals 206B-206D from the audio devices 100B-100D, and may output the demodulated coherent baseband signals 208B-208D;

218A: A baseband processor configured for baseband processing of at least the demodulated coherent baseband signals 208A, and in some examples the demodulated coherent baseband signals 208B-208D received from the audio devices 100B-100D. In this example, the baseband processor 218A is configured to output one or more estimated acoustic scene metrics 225A-225D. In some implementations, the baseband processor 218A is configured to determine the acoustic scene metrics 225B-225D based on the demodulated coherent baseband signals 208B-208D received from the audio devices 100B-100D. However, in some instances the baseband processor 218A (or the acoustic scene metric processing module 233A) may receive the acoustic scene metrics 225B-225D from the audio devices 100B-100D;

233A: An acoustic scene metric processing module, which is configured to receive and apply the acoustic scene metrics 225A-225D. In this example, the acoustic scene metric processing module 233A is configured to generate information 235A-235D based, at least in part, on the acoustic scene metrics 225A-225D and/or at least one audio device characteristic. The audio device characteristic(s) may correspond to the audio device 100A and/or to one or more of audio devices 100B-100D.

Figure 4:
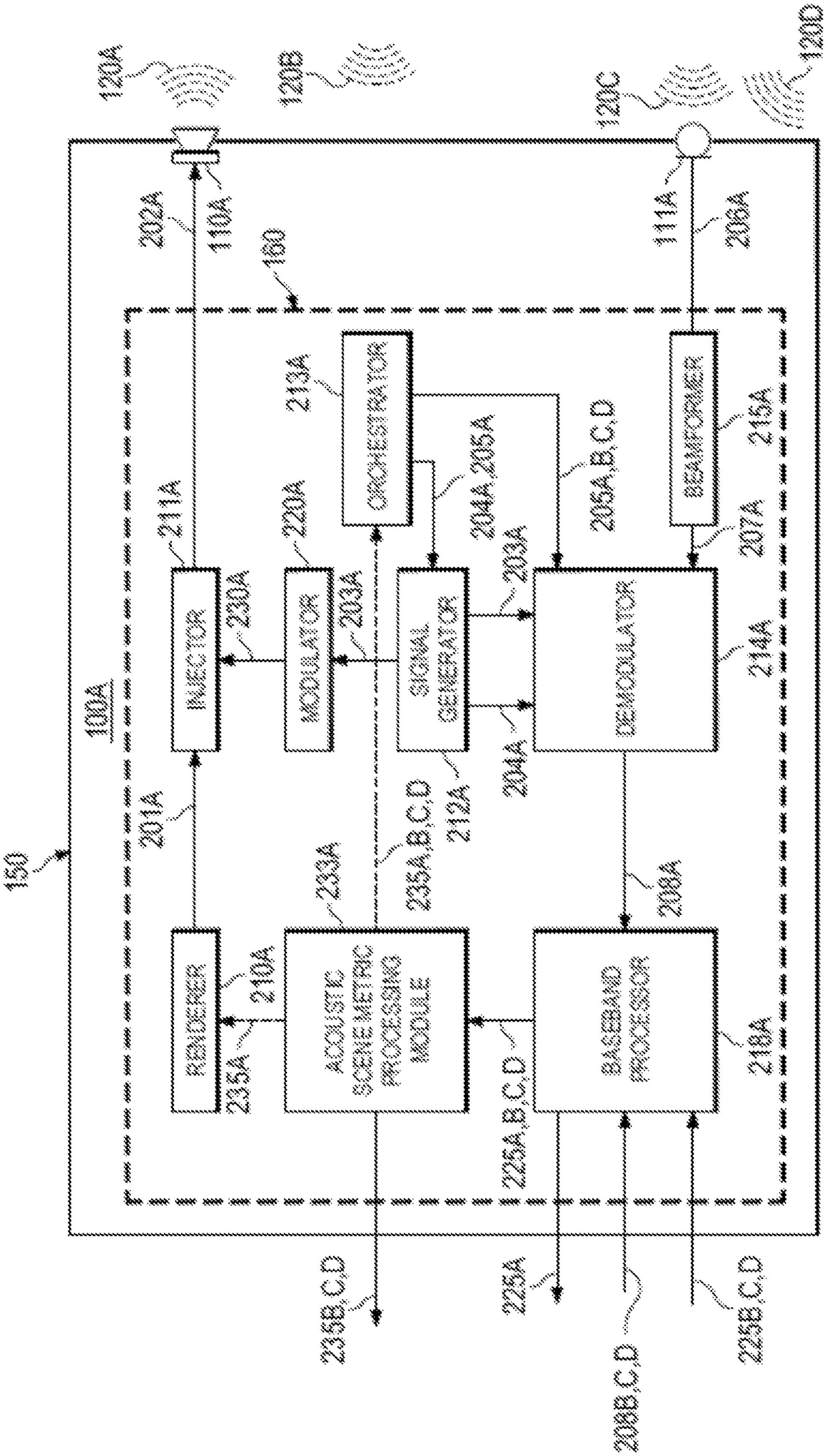
FIG. 4 is a block diagram that shows examples of audio device elements according to another disclosed implementation.

FIG. 4 is a block diagram that shows examples of audio device elements according to another disclosed implementation. As with other figures provided herein, the types and numbers of elements shown in FIG. 4 are merely provided by way of example. Other implementations may include more, fewer and/or different types and numbers of elements. In this example, the audio device 100A of FIG. 4 is an instance of the apparatus 150 that is described above with reference to FIGS. 1B, 2 and 3. The implementation shown in of FIG. 4 includes all of the elements of FIG. 3, as well as an additional element. The elements common to FIGS. 2 and 3 will not be described again here, except to the extent that their functionality may differ in the implementation of FIG. 4.

According to this implementation, the control system 160 is configured to process the received microphone signals 206A to produce preprocessed microphone signals 207A. In some implementations, processing the received microphone signals may involve applying a bandpass filter and/or echo cancellation. In this example, the control system 160 (and more specifically the calibration signal demodulator 214A) is configured to extract calibration signals from the preprocessed microphone signals 207A.

According to this example, the microphone system 111A includes an array of microphones, which may in some instances be, or include, one or more directional microphones. In this implementation, processing the received microphone signals involves receive-side beamforming, in this example via the beamformer 215A. In this example, the preprocessed microphone signals 207A output by the beamformer 215A are, or include, spatial microphone signals.

In this implementation, the calibration signal demodulator 214A processes spatial microphone signals, which can enhance the performance for audio systems in which the audio devices are spatially distributed around the audio environment. Receive-side beamforming is one way around the previously-mentioned "near/far problem": for example, the control system 160 may be configured to use beamforming in order to compensate for a closer and/or louder audio device so as to receive audio device playback sound from a more distant and/or less loud audio device.

The receive-side beamforming may, for example, involve delaying and multiplying the signal from each microphone in the array of microphones by different factors. The beamformer 215A may, in some examples, apply a Dolph-Chebyshev weighting pattern. However, in other implementations beamformer 215A may apply a different weighting pattern. According to some such examples, a main lobe may be produced, together with nulls and sidelobes. As well as controlling the main lobe width (beamwidth) and the sidelobe levels, the position of a null can be controlled in some examples.

Sub-Audible Signals

According to some implementations, a calibration signal component of audio device playback sound may not be audible to a person in the audio environment. In some such implementations, a content stream component of the audio device playback sound may cause perceptual masking of a calibration signal component of the audio device playback sound.

Figure 5:
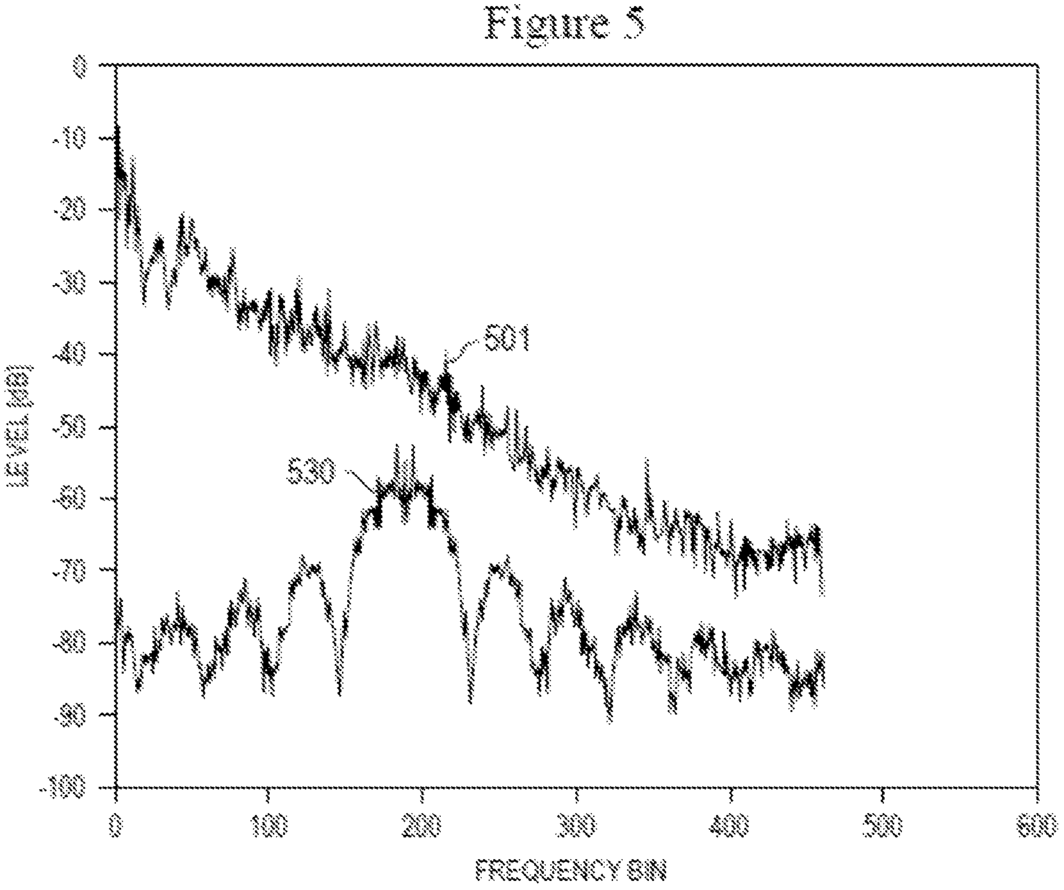
FIG. 5 is a graph that shows examples of the levels of a content stream component of the audio device playback sound and of a direct sequence spread spectrum (DSSS) signal component of the audio device playback sound over a range of frequencies.

FIG. 5 is a graph that shows examples of the levels of a content stream component of the audio device playback sound and of a DSSS signal component of the audio device playback sound over a range of frequencies. In this example, the curve 501 corresponds to levels of the content stream component and the curve 530 corresponds to levels of the DSSS signal component.

A DSSS signal typically includes data, a carrier signal and a spreading code. If we omit the need to transmit data over a channel, then we can express the modulated signal s(t) as follows:

$$s(t) = AC(t)\sin(2\pi f_0 t)$$

In the foregoing equation, A represents the amplitude of the DSSS signal, C(t) represents the spreading code, and Sin( ) represents a sinusoidal carrier wave at a carrier wave frequency of $f_0$ Hz. The curve 530 in FIG. 5 corresponds to an example of s(t) in the equation above.

One of the potential advantages of some disclosed implementations involving acoustic DSSS signals is that by spreading the signal one can reduce the perceivability of the DSSS signal component of audio device playback sound, because the amplitude of the DSSS signal component is reduced for a given amount of energy in the acoustic DSSS signal.

This allows us to place the DSSS signal component of audio device playback sound (e.g., as represented by the curve 530 of FIG. 5) at a level sufficiently below the levels of the content stream component of the audio device playback sound (e.g., as represented by the curve 501 of FIG. 5) such that the DSSS signal component is not perceivable to a listener.

Some disclosed implementations exploit the masking properties of the human auditory system to optimize the parameters of the calibration signal in a way that maximises the signal-to-noise ratio (SNR) of the derived calibration signal observations and/or reduces the probability of perception of the calibration signal component. Some disclosed examples involve applying a weight to the levels of the content stream component and/or applying a weight to the levels of the calibration signal component. Some such examples apply noise compensation methods, wherein the acoustic calibration signal component is treated as the signal and the content stream component is treated as noise. Some such examples involve applying one or more weights according to (e.g., proportionally to) a play/listen objective metric.

DSSS Spreading Codes

As noted elsewhere herein, in some examples the calibration information 205 provided by an orchestrating device (e.g., those provided by the orchestrating module 213A that is described above with reference to FIG. 3) may include one or more DSSS spreading code parameters.

The spreading codes used to spread the carrier wave in order to create the DSSS signal(s) can be important. The set of DSSS spreading codes is preferably selected so that the corresponding DSSS signals have the following properties:

1. A sharp main lobe in the autocorrelation waveform;
2. Low sidelobes at non-zero delays in the autocorrelation waveform;
3. Low cross-correlation between any two spreading codes within the set of spreading codes to be used if multiple devices are to access the medium simultaneously (e.g., to simultaneously play back modified audio playback signals that include a DSSS signal component); and
4. The DSSS signals are unbiased, (have zero DC component).

The family of spreading codes (e.g., Gold codes, which are commonly used in the GPS context) typically characterizes the above four points. If multiple audio devices are all playing back modified audio playback signals that include a DSSS signal component simultaneously and each audio device uses a different spreading code (with good cross-correlation properties, e.g., low cross-correlation), then a receiving audio device should be able to receive and process all of the acoustic DSSS signals simultaneously by using a code domain multiple access (CDMA) method. By using a CDMA method, multiple audio devices can send acoustic DSSS signals simultaneously, in some instances using a single frequency band. Spreading codes may be generated during run time and/or generated in advance and stored in a memory, e.g., in a data structure such as a lookup table.

To implement DSSS, in some examples binary phase shift keying (BPSK) modulation may be utilized. Furthermore, DSSS spreading codes may, in some examples, be placed in quadrature with one another (interplexed) to implement a quadrature phase shift keying (QPSK) system, e.g., as follows:

$$s(t) = A_I C_I(t)\cos(2\pi f_0 t) + A_Q C_Q(t)\sin(2\pi f_0 t)$$

In the foregoing equation, $A_1$ and $A_Q$ represent the amplitudes of the in-phase and quadrature signals, respectively, $C_1$ and $C_Q$ represent the code sequences of the in-phase and quadrature signals, respectively, and $f_0$ represents the centre frequency (8200) of the DSSS signal. The foregoing are examples of coefficients which parameterise the DSSS carrier and DSSS spreading codes according to some examples. These parameters are examples of the calibration signal information 205 that is described above. As noted above, the calibration signal information 205 may be provided by an orchestrating device, such as the orchestrating module 213A, and may be used, e.g., by the signal generator block 212 to generate DSSS signals.

Figure 6:
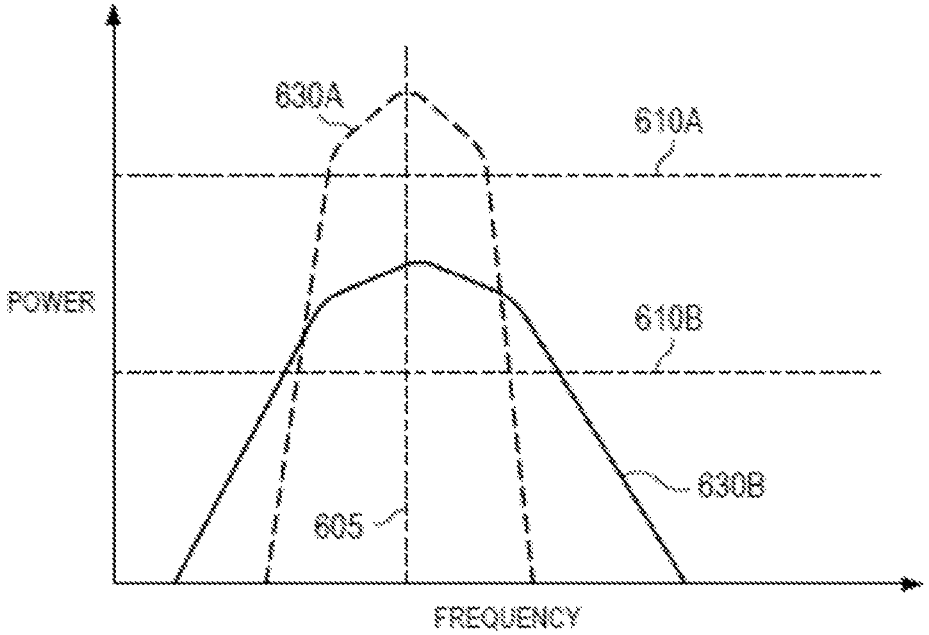
FIG. 6 is a graph that shows examples of the powers of two calibration signals with different bandwidths but located at the same central frequency.

FIG. 6 is a graph that shows examples of the powers of two calibration signals with different bandwidths but located at the same central frequency. In these examples, FIG. 6 shows the spectra of two calibration signals 630A and 630B that are both centered on the same center frequency 605. In some examples, the calibration signal 630A may be produced by one audio device of an audio environment (e.g., by the audio device 100A) and the calibration signal 630B may be produced by another audio device of the audio environment (e.g., by the audio device 100B).

According to this example, the calibration signal 630B is chipped at a higher rate (in other words, a greater number of bits per second are used in the spreading signal) than the calibration signal 630A, resulting in the bandwidth 610B of the calibration signal 630B being larger than the bandwidth 610A of the calibration signal 630A. For a given amount of energy for each calibration signal, the larger bandwidth of the calibration signal 630B results in the amplitude and perceivability of the calibration signal 630B being relatively lower than those of the calibration signal 630A. A higher-bandwidth calibration signal also results in higher delay-resolution of the baseband data products, leading to higher-resolution estimates of acoustic scene metrics that are based on the calibration signal (such as time of flight estimates, a time of arrival (ToA) estimates, range estimates, direction of arrival (DoA) estimates, etc.). However, a higher-bandwidth calibration signal also increases the noise-bandwidth of the receiver, thereby reducing the SNR of the extracted acoustic scene metrics. Moreover, if the bandwidth of a calibration signal is too large, coherence and fading issues associated with the calibration signal may become present.

The length of the spreading code used to generate a DSSS signal limits the amount of cross-correlation rejection. For example, a 10 bit Gold code has just −26 dB rejection of an adjacent code. This may give rise to an instance of the above-described near/far problem, in which a relatively low-amplitude signal may be obscured by the cross correlation noise of another louder signal. Similar issues can arise that involve other types of calibration signals. Some of the novelty of the systems and methods described in this disclosure involves orchestration schemes that are designed to mitigate or avoid such problems.

Orchestration Methods

Figure 7:
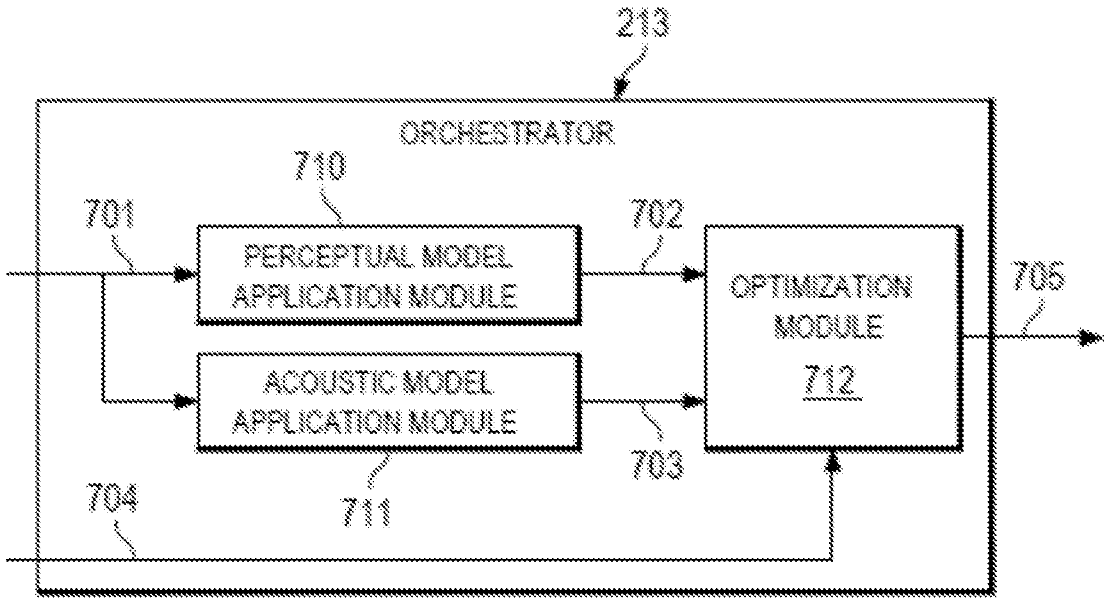
FIG. 7 shows elements of an orchestrating module according to one example.

FIG. 7 shows elements of an orchestrating module according to one example. As with other figures provided herein, the types and numbers of elements shown in FIG. 7 are merely provided by way of example. Other implementations may include more, fewer and/or different types and numbers of elements. According to some examples, the orchestrating module 213 may be implemented by an instance of the apparatus 150 that is described above with reference to FIG. 1B. In some such examples, the orchestrating module 213 may be implemented by an instance of the control system 160 In some examples, the orchestrating module 213 may be an instance of the orchestrating module that is described above with reference to FIG. 3.

According to this implementation, the orchestrating module 213 includes a perceptual model application module 710, an acoustic model application module 711 and an optimization module 712.

In this example, the perceptual model application module 710 is configured to apply a model of the human auditory system in order to make one or more perceptual impact estimates 702 of the perceptual impact of acoustic calibration signals on a listener in an acoustic space, based at least in part on the a priori information 701. The acoustic space may, for example, be an audio environment in which audio devices that the orchestrating module 213 will be orchestrating are located, a room of such an audio environment, etc. The estimate(s) 702 may change over time. The perceptual impact estimate(s) 702 may, in some examples, be an estimate of a listener's ability to perceive the acoustic calibration signals, e.g., based on a type and level of audio content (if any) currently being played back in the acoustic space. The perceptual model application module 710 may, for example, be configured to apply one or more models of auditory masking, such as masking as a function of frequency and loudness, spatial auditory masking, etc. The perceptual model application module 710 may, for example, be configured to apply one or more models of human loudness perception, e.g. human loudness perception as a function of frequency.

According to some examples, the a priori information 701 may be, or may include, information that is relevant to an acoustic space, information that is relevant to the transmission of acoustic calibration signals in the acoustic space and/or information that is relevant to a listener known to use the acoustic space. For example, the a priori information 701 may include information regarding the number of audio devices (e.g., of orchestrated audio devices) in the acoustic space, the locations of the audio devices, the loudspeaker system and/or microphone system capabilities of the audio devices, information relating to the impulse response of the audio environment, information regarding one or more doors and/or windows of the audio environment, information regarding audio content currently being played back in the acoustic space, etc. In some instances, the a priori information 701 may include information regarding the hearing abilities of one or more listeners.

In this implementation, the acoustic model application module 711 is configured to make one or more acoustic calibration signal performance estimates 703 for the acoustic calibration signals in the acoustic space, based at least in part on the a priori information 701. For example, the acoustic model application module 711 may be configured to estimate how well the microphone systems of each of the audio devices are able to detect the acoustic calibration signals from the other audio devices in the acoustic space, which may be referred to herein as one aspect of "mutual audibility" of the audio devices. Such mutual audibility may, in some instances, have been an acoustic scene metric that was previously estimated by a baseband processor, based at least in part on previously-received acoustic calibration signals. In some such implementations, the mutual audibility estimate may be part of the a priori information 701 and, in some such implementations, the orchestrating module 213 may not include the acoustic model application module 711. However, in some implementations the mutual audibility estimate may be made independently by the acoustic model application module 711.

In this example, the optimization module 712 is configured to determine calibration parameters 705 for all audio devices being orchestrated by the orchestrating module 213 based, at least in part, on the perceptual impact estimate(s) 702 and the acoustic calibration signal performance estimates 703 and the current play/listen objective information 704. The current play/listen objective information 704 may, for example, indicate the relative need for new acoustic scene metrics based on acoustic calibration signals.

For example, if one or more audio devices are being newly powered on in the acoustic space, there may be a high level of need for new acoustic scene metrics relating to audio device auto-location, audio device mutual audibility, etc. At least some of the new acoustic scene metrics may be based on acoustic calibration signals. Similarly, if an existing audio device has been moved within the acoustic space, there may be a high level of need for new acoustic scene metrics. Likewise, if a new noise source is in or near the acoustic space, there may be a high level of need for determining new acoustic scene metrics.

If the current play/listen objective information 704 indicates that there is a high level of need for determining new acoustic scene metrics, the optimization module 712 may be configured to determine calibration parameters 705 by placing a relatively higher weight on the acoustic calibration signal performance estimate(s) 703 than on the perceptual impact estimate(s) 702. For example, the optimization module 712 may be configured to determine calibration parameters 705 by emphasizing on the ability of the system to produce high SNR observations of acoustic calibration signals and de-emphasizing on the impact/perceivability of the acoustic calibration signals by the user. In some such examples, the calibration parameters 705 may correspond to audible acoustic calibration signals.

However, if there has been no detected recent change in or near the acoustic space and there has been at least initial estimate of one or more acoustic scene metrics, there may not be a high level of need for new acoustic scene metrics. If there has been no detected recent change in or near the acoustic space, there has been at least initial estimate of one or more acoustic scene metrics and audio content is currently being reproduced within the acoustic space, the relative importance of immediately estimating one or more new acoustic scene metrics may be further diminished.

If the current play/listen objective information 704 indicates that there is a low level of need for determining new acoustic scene metrics, the optimization module 712 may be configured to determine calibration parameters 705 by placing a relatively lower weight on the acoustic calibration signal performance estimate(s) 703 than on the perceptual impact estimate(s) 702. In such examples, the optimization module 712 may be configured to determine calibration parameters 705 by de-emphasizing on the ability of the system to produce high SNR observations of acoustic calibration signals and emphasizing the impact/perceivability of the acoustic calibration signals by the user. In some such examples, the calibration parameters 705 may correspond to sub-audible acoustic calibration signals.

As described later in this document (e.g., in other examples of audio device orchestration) the parameters of the acoustic calibration signals provide a rich diversity in the way that an orchestrating device can modify the acoustic calibration signals in order to enhance the performance of an audio system.

Figure 8:
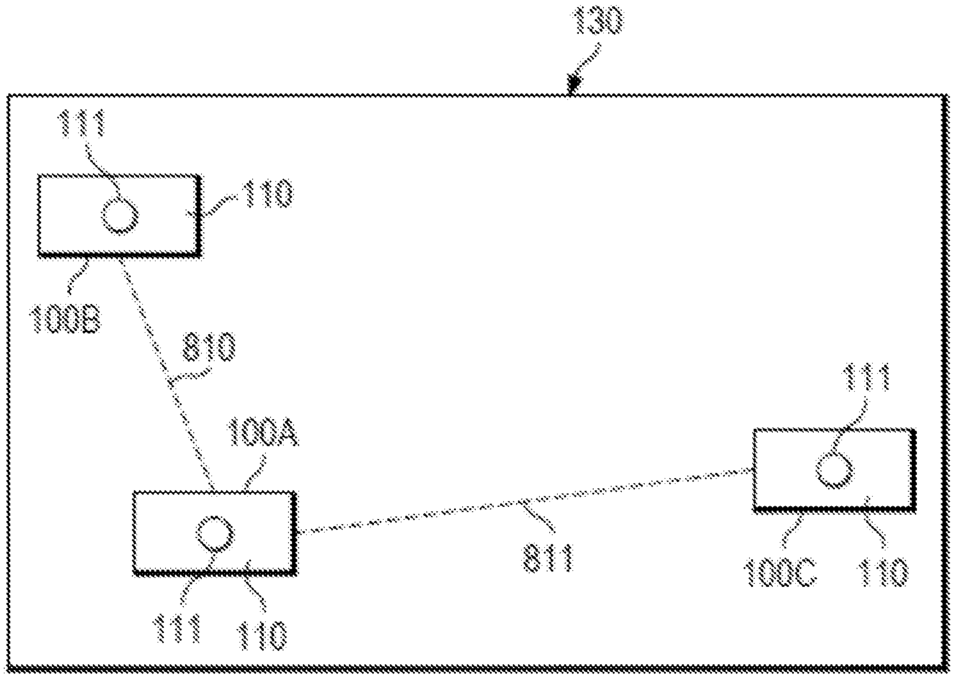
FIG. 8 shows another example of an audio environment.

FIG. 8 shows another example of an audio environment. In FIG. 8, audio devices 100B and 100C are separated from device 100A by distances 810 and 811, respectively. In this particular situation, distance 811 is larger than distance 810. Assuming that audio devices 100B and 100C are producing audio device playback sound at approximately the same levels, this means that audio device 100A receives the acoustic calibration signals from audio device 100C at a lower level than the acoustic calibration signals from audio device 100B, due to the additional acoustic loss caused by the longer distance 811. In some embodiments, audio devices 100B and 100C may be orchestrated in order to enhance the ability of the audio device 100A to extract acoustic calibration signals and to determine acoustic scene metrics based on the acoustic calibration signals.

Figure 9:
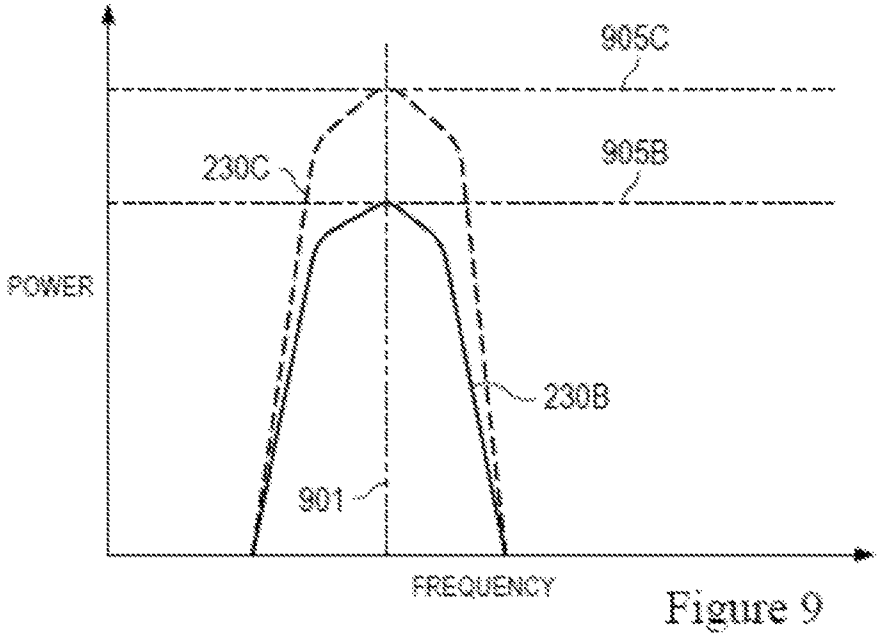
FIG. 9 shows examples of acoustic calibration signals produced by the audio devices 100B and 100C of FIG. 8.

FIG. 9 shows examples of the acoustic calibration signals produced by the audio devices 100B and 100C of FIG. 8. In this example, these acoustic calibration signals have the same bandwidth and are located at the same frequency, but have different amplitudes. Here, the acoustic calibration signal 230B is produced by the audio device 100B and the main lobe of the acoustic calibration signal 230C is produced by the audio device 100C. According to this example, the peak power of the acoustic calibration signal 230B is 905B and the peak power of the acoustic calibration signal 230C is 905C. Here, the acoustic calibration signal 230B the acoustic calibration signal 230C have the same central frequency 901.

In this example, an orchestrating device (which may in some examples include an instance of the orchestrating module 213 of FIG. 7 and which may in some instances be the audio device 100A of FIG. 8) has enhanced the ability of the audio device 100A to extract acoustic calibration signals by equalizing the digital level of the acoustic calibration signals produced by the audio devices 100B and 100C, such that the peak power of the acoustic calibration signal 230C is larger than the peak power of the acoustic calibration signal 230B by a factor that offsets the difference in the acoustic losses due to the difference in the distances 810 and 811. Therefore, according to this example, the audio device 100A receives the acoustic calibration signals 230B from audio device 100C at approximately the same level as the acoustic calibration signals received from audio device 100B, due to the additional acoustic loss caused by the longer distance 811.

The area of a surface around a point sound source increases with the square of the distance from the source. This means that the same sound energy from the source is distributed over a larger area and the energy intensity reduces with the square of the distance from the source, according to the Inverse Square Law. Setting distance 810 to b and distance 811 to c, the sound energy received by audio device 100A from audio device 100B is proportional to $1/b^2$ and the sound energy received by audio device 100A from audio device 100C is proportional to $1/c^2$. The difference in sound energies is proportional to $1/(c^2-b^2)$. Accordingly, in some implementations the orchestrating device may cause the energy produced by the audio device 100C to be multiplied $(c^2-b^2)$. This is an example of how the calibration parameters can be altered to enhance performance.

In some implementations, the optimization process may be more complex and may take into account more factors than the Inverse Square Law. In some examples, equalizations may be done via a full-band gain applied to the calibration signal or via an equalization (EQ) curve which enables the equalization of non-flat (frequency-dependent) responses of the microphone system 110A.

Figure 10:
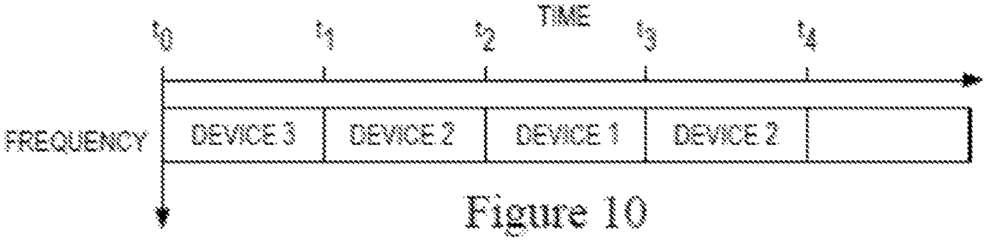
FIG. 10 is a graph that provides an example of a time domain multiple access (TDMA) method.

FIG. 10 is a graph that provides an example of a time domain multiple access (TDMA) method. One way to avoid the near/far problem is to orchestrate a plurality of audio devices that are transmitting and receiving acoustic calibration signals such that different time slots are scheduled for each audio device to play its acoustic calibration signal. This is known as a TDMA method. In the example shown in FIG. 10, an orchestrating device is causing audio devices 1, 2 and 3 to emit acoustic calibration signals according to a TDMA method. In this example, audio devices 1, 2 and 3 emit acoustic calibration signals in the same frequency band. According to this example, the orchestrating device causes audio device 3 to emit acoustic calibration signals from time t0 until time t1, after which the orchestrating device causes audio device 2 to emit acoustic calibration signals from time t1 until time t2, after which the orchestrating device causes audio device 1 to emit acoustic calibration signals from time t2 until time t3, and so on.

Accordingly, in this example, no two calibration signals are being transmitted or received at the same time. Therefore, the remaining calibration signal parameters such as amplitude, bandwidth and length (so long that each calibration signal remains within its allocated time slot) are not relevant for multiple access. However, such calibration signal parameters do remain relevant to the quality of the observations extracted from the calibration signals.

Figure 11:
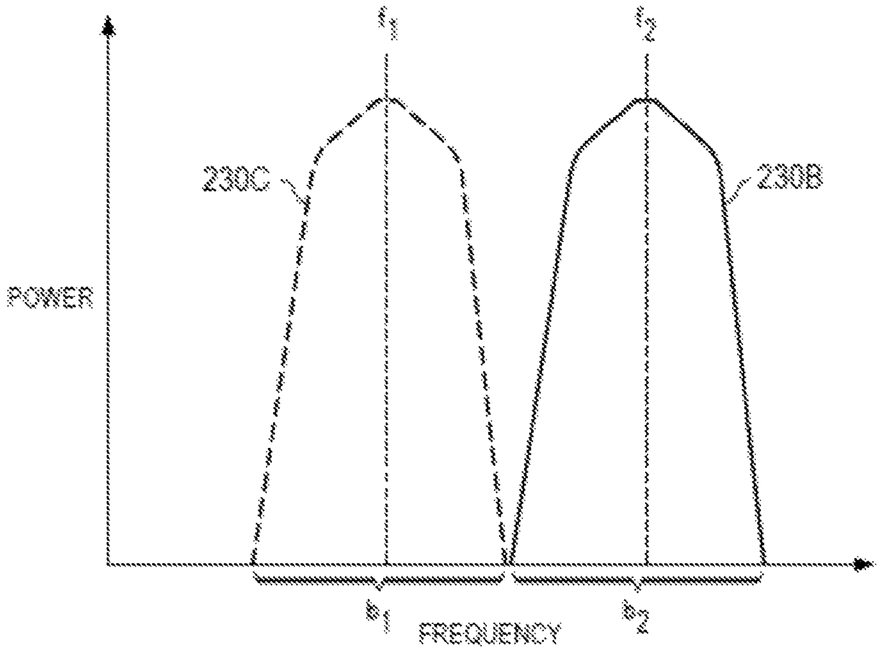
FIG. 11 is a graph that shows an example of a frequency domain multiple access (FDMA) method.

FIG. 11 is a graph that shows an example of a frequency domain multiple access (FDMA) method. In some implementations (e.g., due to the limited bandwidth of the calibration signals), an orchestrating device may be configured to cause an audio device to simultaneously receive acoustic calibration signals from two other audio devices in an audio environment. In some such examples, the acoustic calibration signals are significantly different in received power levels if each audio device transmitting the acoustic calibration signals plays its respective acoustic calibration signals in different frequency bands. This is an FDMA method. In the FDMA method example shown in FIG. 11, the calibration signals 230B and 230C are being transmitted by different audio devices at the same time, but with different center frequencies (f1 and f2) and in different frequency bands (b1 and b2). In this example, the frequency bands b1 and b2 of the main lobes do not overlap. Such FDMA methods may be advantageous for situations in which acoustic calibration signals have large differences in the acoustic losses associated with their paths.

In some implementations, an orchestrating device may be configured to vary an FDMA, TDMA or CDMA method in order to mitigate the near/far problem. In some DSSS examples, the length of the DSSS spreading codes may be altered in accordance with the relative audibility of the devices in the room. As noted above with reference to FIG. 6, given the same amount of energy in the acoustic DSSS signal, if a spreading code increases the bandwidth of an acoustic DSSS signal, the acoustic DSSS signal will have a relatively lower maximum power and will be relatively less audible. Alternatively, or additionally, in some implementations calibration signals may be placed in quadrature with one another. Some such implementations allow a system to simultaneously have DSSS signals with different spreading code lengths. Alternatively, or additionally, in some implementations the energy in each calibration signal may be modified in order to reduce the impact of the near/far problem (e.g., to boost the level of an acoustic calibration signal produced by a relatively less loud and/or more distant transmitting audio device) and/or obtain an optimal signal-to-noise ratio for a given operational objective.

Figure 12:
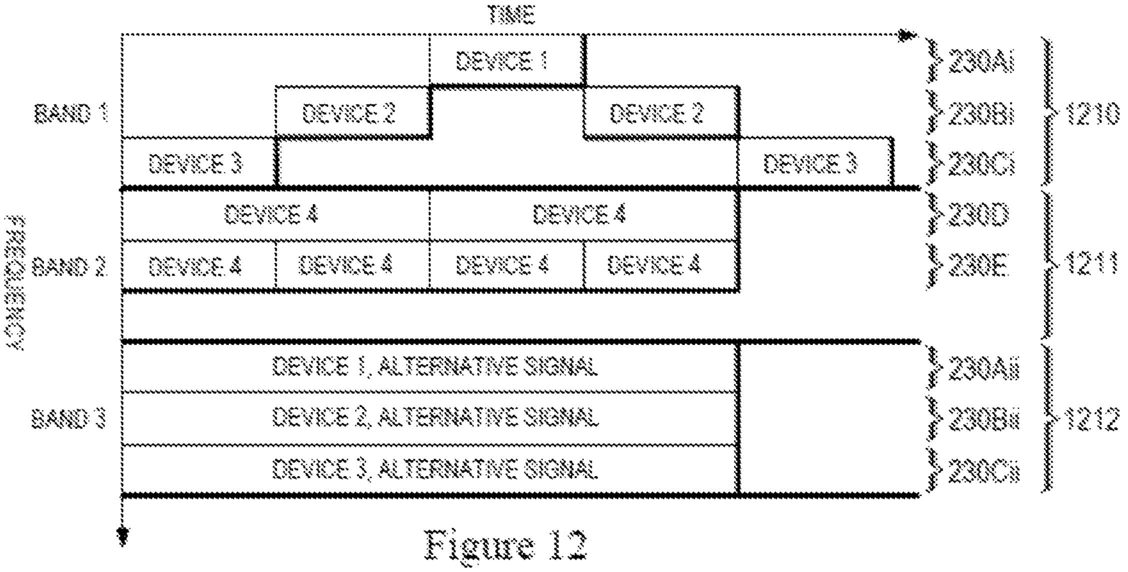
FIG. 12 is a graph that shows another example of an orchestration method.

FIG. 12 is a graph that shows another example of an orchestration method. The elements of FIG. 12 are as follows:

1210, 1211 and 1212: Frequency bands that do not overlap with one another;

230Ai, Bi and Ci: A plurality of acoustic calibration signals that are time-domain multiplexed within frequency band 1210. Although it may appear that audio devices 1, 2 and 3 are using different portions of frequency band 1210, in this example the acoustic calibration signals 230Ai, Bi and Ci extend across most or all of frequency band 1210;

230D and E: A plurality of acoustic calibration signals that are code-domain multiplexed within frequency band 1211. Although it may appear that audio devices 4 and 5 are using different portions of frequency band 1211, in this example the acoustic calibration signals 230D and 230E extend across most or all of frequency band 1211; and

230Aii, Bii and Cii: A plurality of acoustic calibration signals that are code-domain multiplexed within frequency band 1212. Although it may appear that audio devices 1, 2 and 3 are using different portions of frequency band 1210, in this example the acoustic calibration signals 230Aii, Bii and Cii extend across most or all of frequency band 1212.

FIG. 12 shows an example of how TDMA, FDMA and CDMA may be used together in certain implementations of the invention. In frequency band 1 (1210), TDMA is used to orchestrate acoustic calibration signals 230Ai, Bi and Ci transmitted by audio devices 1-3 respectively. Frequency band 1210 is a single frequency band wherein acoustic calibration signals 230Ai, Bi and Ci cannot fit within simultaneously without overlapping.

In frequency band 2 (1211), CDMA is used to orchestrate acoustic calibration signals 230D and E from audio devices 4 and 5 respectively. In this particular example, acoustic calibration signal 230D is temporally longer than the acoustic calibration signal 230E. A shorter calibration signal duration for audio device 5 could be useful if audio device 5 is louder than audio device 4, from the perspective of the receiving audio device if the shorter calibration signal duration corresponded with an increase in the bandwidth and a lower peak frequency of the calibration signal. The signal-to-noise ratio (SNR) also may be improved with the relatively longer duration of the acoustic calibration signal 230D.

In frequency band 3 (1212), CDMA is used to orchestrate acoustic calibration signals 230Aii, Bii and Cii transmitted by audio devices 1-3, respectively. These acoustic calibration signals correspond to alternative calibration signals used by audio devices 1-3, which are simultaneously transmitting TDMA-orchestrated acoustic calibration signals for the same audio devices in frequency band 1210. This is a form of FDMA in which longer calibration signals are placed within one frequency band (1212) and are transmitted simultaneously (no TDMA) while shorter calibration signals are placed within another frequency band (1210) in which TDMA is used.

Figure 13:
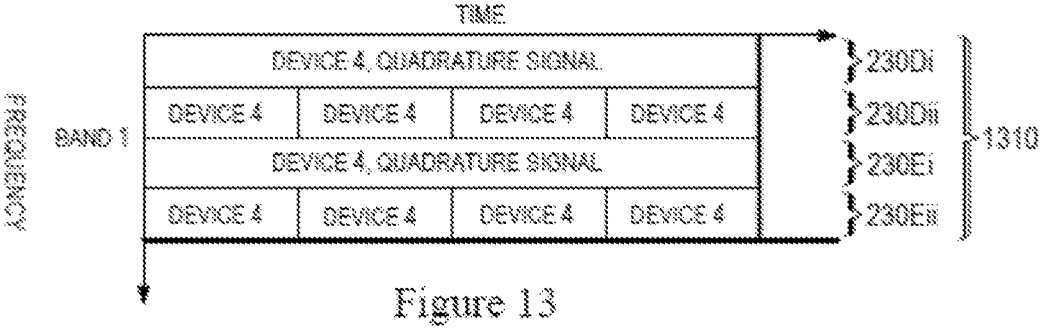
FIG. 13 is a graph that shows another example of an orchestration method.

FIG. 13 is a graph that shows another example of an orchestration method. According to this implementation, audio device 4 is transmitting acoustic calibration signals 230Di and 230Dii, which are in quadrature with one another, while audio device 5 is transmitting acoustic calibration signals 230Ei and 230Eii, which are also in quadrature with one another. According to this example, all acoustic calibration signals are transmitted within a single frequency band 1310 simultaneously. In this instance, the quadrature acoustic calibration signals 230Di and 230Ei are longer than the in-phase calibration signals 230Dii and 230Eii transmitted by the two audio devices. This results in each audio device having a faster and noisier set of observations derived from acoustic calibration signals 230Dii and 230Eii in addition to a higher SNR set of observations derived from acoustic calibration signals 230Di and 230Ei, albeit it at a lower update rate. This is an example of a CDMA-based orchestration method wherein the two audio devices are transmitting acoustic calibration signals which are designed for the acoustic space the two audio devices are sharing. In some instances, the orchestration method may also be based, at least in part, on a current listening objective.

Figure 14:
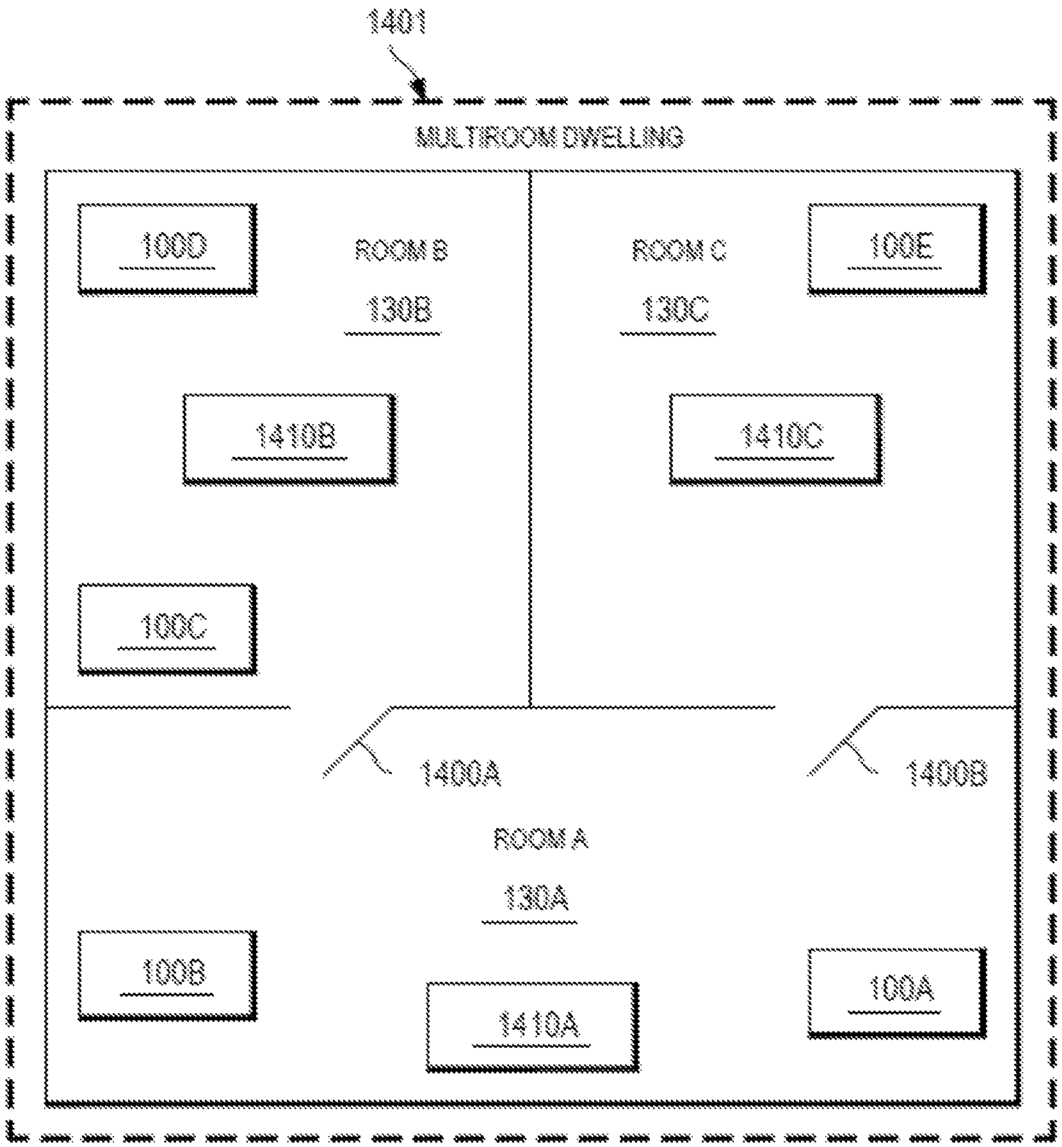
FIG. 14 shows elements of an audio environment according to another example.

FIG. 14 shows elements of an audio environment according to another example. In this example, the audio environment 1401 is a multi-room dwelling that includes acoustic spaces 130A, 130B and 130C. According to this example, doors 1400A and 1400B can change the coupling of each acoustic space. For example, if the door 1400A is open, acoustic spaces 130A and 130C are acoustically coupled, at least to some degree, whereas if the door 1400A is closed, acoustic spaces 130A and 130C are not acoustically coupled to any significant degree. In some implementations, an orchestrating device may be configured to detect a door being opened (or another acoustic obstruction being moved) according to the detection, or lack thereof, of audio device playback sound in an adjacent acoustic space.

In some examples, an orchestrating device may orchestrate all of the audio devices 100A-100E, in all of the acoustic spaces 130A, 130B and 130C. However, because of the significant level of acoustic isolation between the acoustic spaces 130A, 130B and 130C when the doors 1400A and 1400B are closed, the orchestrating device may, in some examples, can treat the acoustic spaces 130A, 130B and 130C as independent when the doors 1400A and 1400B are closed. In some examples, the orchestrating device may treat the acoustic spaces 130A, 130B and 130C as independent even when the doors 1400A and 1400B are open. However, in some instances the orchestrating device may manage audio devices that are located close to the doors 1400A and/or 1400B such that when the acoustic spaces are coupled due to a door opening, an audio device close to an open door is treated as being an audio device corresponding to the rooms on both sides of the door. For example, if the orchestrating device determines that the door 1400A is open, the orchestrating device may be configured to consider the audio device 100C to be an audio device of the acoustic space 130A and also to be an audio device of the acoustic space 130C.

Figure 15:
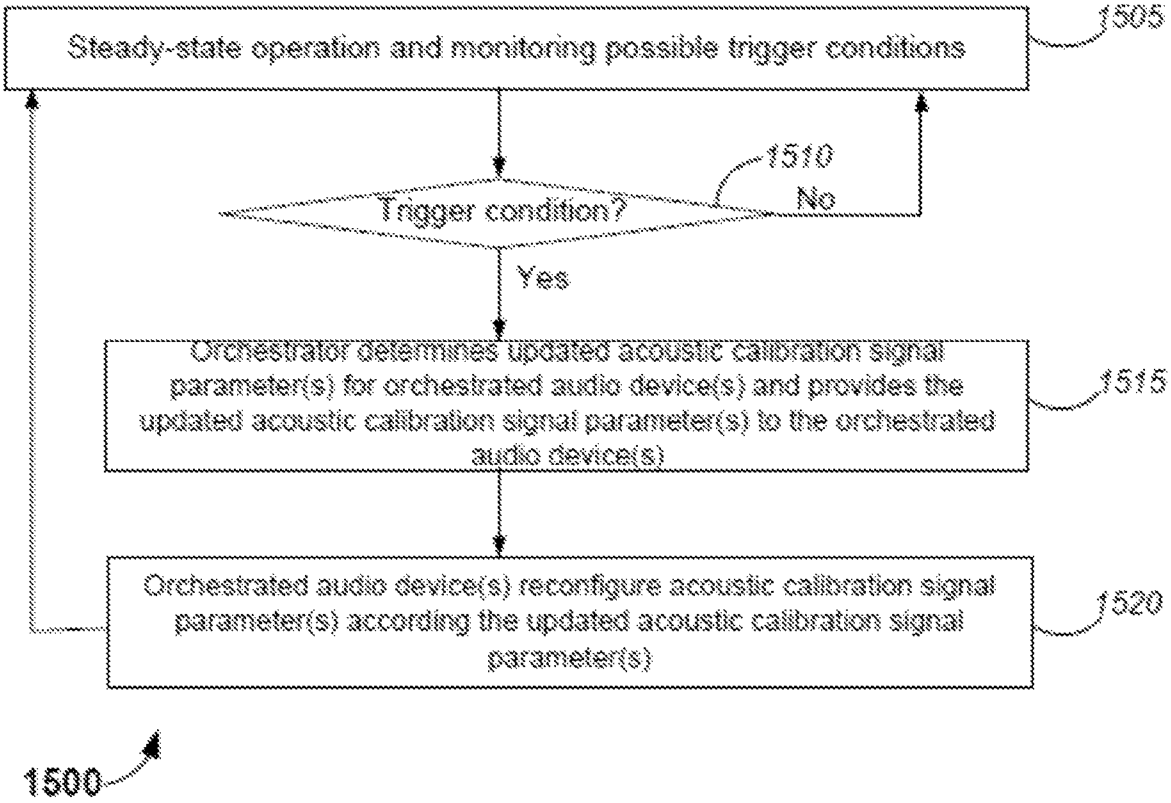
FIG. 15 is a flow diagram that outlines another example of a disclosed audio device orchestration method.

FIG. 15 is a flow diagram that outlines another example of a disclosed audio device orchestration method. The blocks of method 1500, like other methods described herein, are not necessarily performed in the order indicated. Moreover, such methods may include more or fewer blocks than shown and/or described. The method 1500 may be performed by a system that includes an orchestrating device and orchestrated audio devices. The system may include instances of the apparatus 150 that is shown in FIG. 1B and described above, one of which is configured as an orchestrating device. The orchestrating device may, in some examples, include an instance of the orchestration module 213 that is disclosed herein.

According to this example, block 1505 involves steady-state operation of all participating audio devices. In this context, "steady-state" operation means operation according to the set of calibration signal parameters that was most recently received from the orchestrating device. According to some implementations, the set of parameters may include one or more DSSS spreading code parameters and one or more DSSS carrier wave parameters.

In this example, block 1505 also involves one or more devices waiting for a trigger condition. The trigger condition may, for example, be an acoustic change in the audio environment in which the orchestrated audio devices are located. The acoustic change may be, or may include, noise from a noise source, a change corresponding to an opened or closed door or window (e.g., increased or decreased audibility of playback sound from one or more loudspeakers in an adjacent room), a detected movement of an audio device in the audio environment, a detected movement of a person in the audio environment, a detected utterance (e.g. of a wakeword) of a person in the audio environment, the beginning of audio content playback (e.g., the start of a movie, of a television program, of musical content, etc.), a change in audio content playback (e.g., a volume change equal to or greater than a threshold change in decibels), etc. In some instances, the acoustic change be detected via acoustic calibration signals, e.g., as disclosed herein (e.g., one or more acoustic scene metrics 225A estimated by a baseband processor 218 of an audio device in the audio environment).

In some instances, the trigger condition may be an indication that a new audio device has been powered on in the audio environment. In some such examples, the new audio device may be configured to produce one or more characteristic sounds, which may or may not be audible to a human being. According to some examples, the new audio device may be configured to play back an acoustic calibration signal that is reserved for new devices.

In this example, it is determined in block 1510 whether a trigger condition has been detected. If so, the process proceeds to block 1515. If not, the process reverts to block 1505. In some implementations, block 1505 may include block 1510.

According to this example, block 1515 involves determining, by the orchestrating device, one or more updated acoustic calibration signal parameters for one or more (in some instance, all) of the orchestrated audio devices and providing the updated acoustic calibration signal parameter(s) to the orchestrated audio device(s). In some examples, block 1515 may involve providing, by the orchestrating device, the calibration signal information 205 that is described elsewhere herein. The determination of the updated acoustic calibration signal parameter(s) may involve using existing knowledge and estimates of the acoustic space such as:

- Device positions;
- Device ranges;
- Device orientations and relative incidence angles;
- The relative clock biases and skews between devices;
- The relative audibility of the devices;
- A room noise estimate;
- The number of microphones and loudspeakers in each device;
- The directionality of each device's loudspeakers;
- The directionality of each device's microphones;
- The type of content being rendered into the acoustic space;
- The location of one or more listeners in the acoustic space; and/or
  - Knowledge of the acoustic space including specular reflections and occlusions.

Such factors may, in some examples, be combined with an operational objective to determine the new operating points. Note that many of these parameters used as existing knowledge in determining the updated calibration signal parameters can, in turn, be derived from acoustic calibration signals. Therefore, one may readily understand that an orchestrated system can, in some examples, iteratively improve its performance as the system obtains more information, more accurate information, etc.

In this example, block 1520 involves reconfiguring, by one or more orchestrated audio devices, one or more parameters used to generate acoustic calibration signals according to the updated acoustic calibration signal parameter(s) received from the orchestrating device. According to this implementation, after block 1520 is completed, the process reverts to block 1505. Although no end is shown to the flow diagram of FIG. 15, the method 1500 may end in various ways, e.g., when the audio devices are powered down.

Figure 16:
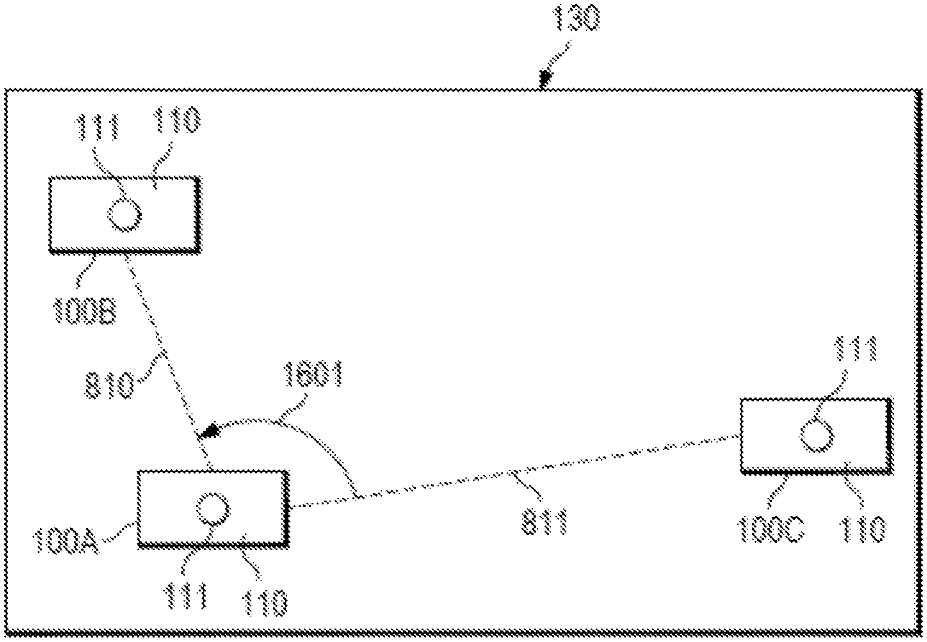
FIG. 16 shows another example of an audio environment.

FIG. 16 shows another example of an audio environment. The audio environment 130 that is shown in FIG. 16 is the same as that shown in FIG. 8, but also shows the angular separation of audio device 100B from that of audio device 100C, from the perspective of (relative to) the audio device 100A. In FIG. 16, audio devices 100B and 100C are separated from device 100A by distances 810 and 811, respectively. In this particular situation, distance 811 is larger than distance 810. Assuming that audio devices 100B and 100C are producing audio device playback sound at approximately the same levels, this means that audio device 100A receives the acoustic calibration signals from audio device 100C at a lower level than the acoustic calibration signals from audio device 100B, due to the additional acoustic loss caused by the longer distance 811.

In this example, we are focused on the orchestration of devices 100B and 100C to optimize the ability of device 100A to hear both of them. There are other factors to consider, as outlined above, but this example is focused on the angle of arrival diversity caused by the angular separation of audio device 100B from that of audio device 100C, relative to the audio device 100A. Due to the difference in distances 810 and 811, orchestration may result in the code lengths of audio devices 100B and 100C being set to be longer to mitigate the near-far problem by reducing the cross channel correlation. However, if a receive-side beamformer (215) were implemented by the audio device 100A, then the near/far problem is somewhat mitigated because the angular separation between audio devices 100B and 100C places the microphone signals corresponding to sound from audio devices 100B and 100C in different lobes and provides additional separation of the two received signals. Thus, this additional separation may allow the orchestrating device to reduce the acoustic calibration signal length and obtain observations at a faster rate.

This does not only apply to, e.g., the acoustic DSSS spreading code length. Any acoustic calibration parameter which can be altered to mitigate the near-far problem (e.g., even using FDMA or TDMA) may no longer be necessary when the spatial microphone feeds are used by audio device 100A (and/or audio devices 100B and 100C) instead of omnidirectional microphone feeds.

Orchestration according to spatial means (in this case angular diversity) depends upon estimates of these properties already being available. In one example, the calibration parameters may be optimized for omnidirectional microphone feeds (206) and then after DoA estimates are available, the acoustic calibration parameters may be optimized for spatial microphone feeds. This is one realization of a trigger condition that is described above with reference to FIG. 15.

Figure 17:
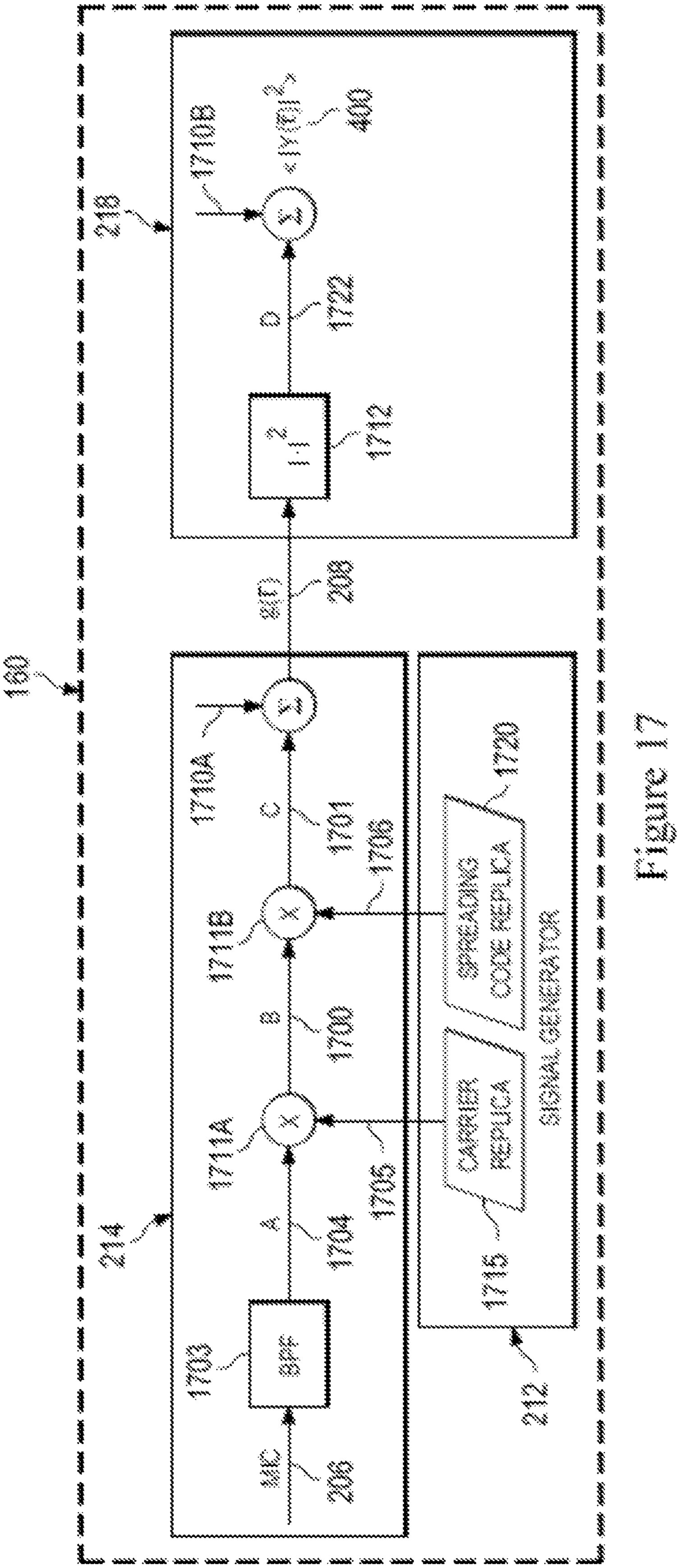
FIG. 17 is a block diagram that shows examples of calibration signal demodulator elements, baseband processor elements and calibration signal generator elements according to some disclosed implementations.

FIG. 17 is a block diagram that shows examples of calibration signal demodulator elements, baseband processor elements and calibration signal generator elements according to some disclosed implementations. As with other figures provided herein, the types and numbers of elements shown in FIG. 17 are merely provided by way of example. Other implementations may include more, fewer and/or different types and numbers of elements. Other examples may implement other methods, such as frequency domain correlation. In this example, the calibration signal demodulator 214, the baseband processor 218 and the calibration signal generator 212 are implemented by an instance of the control system 160 that is described above with reference to FIG. 1B.

According to some implementations, there is one instance of the calibration signal demodulator 214, the baseband processor 218 and the calibration signal generator 212 for each transmitted (played back) acoustic calibration signal, from each audio device for which acoustic calibration signals will be received. In other words, for the implementation shown in FIG. 16, the audio device 100A would implement one instance of the calibration signal demodulator 214, the baseband processor 218 and the calibration signal generator 212 corresponding to acoustic calibration signals received from the audio device 100B and one instance of the calibration signal demodulator 214, the baseband processor 218 and the calibration signal generator 212 corresponding to acoustic calibration signals received from the audio device 100C.

For the purpose of illustration, the following description of FIG. 17 will continue to use this example of audio device 100A of FIG. 16 as the local device and that is, in this example, implementing instances of the calibration signal demodulator 214, the baseband processor 218 and the calibration signal generator 212. More specifically, the following description of FIG. 17 will assume that the microphone signals 206 received by the calibration signal demodulator 214 include playback sound produced by loudspeakers of the audio device 100B that include acoustic calibration signals produced by the audio device 100B, and that the instances of the calibration signal demodulator 214, the baseband processor 218 and the calibration signal generator 212 shown in FIG. 17 correspond to the acoustic calibration signals played back by loudspeakers of the audio device 100B.

In this particular implementation, the calibration signals are DSSS signals. Therefore, according to this implementation, the calibration signal generator 212 includes an acoustic DSSS carrier wave module 1715 configured to provide the calibration signal demodulator 214 with a DSSS carrier wave replica 1705 of the DSSS carrier wave that is being used by the audio device 100B to produce its acoustic DSSS signals. In some alternative implementations, the acoustic DSSS carrier wave module 1715 may be configured to provide the calibration signal demodulator 214 with one or more DSSS carrier wave parameters being used by the audio device 100B to produce its acoustic DSSS signals. In some alternative examples, the calibration signals are other types of calibration signals that are produced by modulating carrier waves, such as maximum length sequences or other types of pseudorandom binary sequences.

In this implementation, the calibration signal generator 212 also includes an acoustic DSSS spreading code module 1720 configured to provide the calibration signal demodulator 214 with the DSSS spreading code 1706 being used by the audio device 100B to produce its acoustic DSSS signals. The DSSS spreading code 1706 corresponds to the spreading code C(t) in the equations disclosed herein. The DSSS spreading code 1706 may, for example, be a pseudo-random number (PRN) sequence.

According to this implementation, the calibration signal demodulator 214 includes a bandpass filter 1703 that is configured to produce band pass filtered microphone signals 1704 from the received microphone signals 206. In some instances, the pass band of the bandpass filter 1703 may be centered at the center frequency of the acoustic DSSS signal from audio device 100B that is being processed by the calibration signal demodulator 214. The passband filter 1703 may, for example, pass the main lobe of the acoustic DSSS signal. In some examples, the pass band of the passband filter 1703 may be equal to the frequency band for transmission of the acoustic DSSS signal from audio device 100B.

In this example, the calibration signal demodulator 214 includes a multiplication block 1711A that is configured to convolve the band pass filtered microphone signals 1704 with the DSSS carrier wave replica 1705, to produce the baseband signals 1700. According to this implementation, the calibration signal demodulator 214 also includes a multiplication block 1711B that is configured to apply the DSSS spreading code 1706 to the baseband signals 1700, to produce the de-spread baseband signals 1701.

According to this example, the calibration signal demodulator 214 includes an accumulator 1710A and the baseband processor 218 includes an accumulator 1710B. The accumulators 1710A and 1710B also may be referred to herein as summation elements. The accumulator 1710A operates during a time, which may be referred to herein as the "coherent time," that corresponds with the code length for each acoustic calibration signal (in this example, the code length for the acoustic DSSS signal currently being played back by the audio device 100B). In this example, the accumulator 1710A implements an "integrate and dump" process; in other words, after summing the de-spread baseband signals 1701 for the coherent time, the accumulator 1710A outputs ("dumps") the demodulated coherent baseband signal 208 to the baseband processor 218. In some implementations, the demodulated coherent baseband signal 208 may be a single number.

In this example, the baseband processor 218 includes a square law module 1712, which in this example is configured to square the absolute value of the demodulated coherent baseband signal 208 and to output the power signal 1722 to the accumulator 1710B. After the absolute value and squaring processes, the power signal may be regarded as an incoherent signal. In this example, the accumulator 1710B operates over an "incoherent time." The incoherent time may, in some examples, be based on input from an orchestrating device. The incoherent time may, in some examples, be based on a desired SNR. According to this example, the accumulator 1710B outputs a delay waveform 400 at a plurality of delays (also referred to herein as "taus," or instances of tau (τ)).

One can express the stages from 1704 to 208 in FIG. 17 as follows:

$$Y(\bar{\tau}) = \sum_{n=0}^{N_i-1} d[n]CA[\bar{\tau} + n]e^{-j2\pi n f_o/f_s}$$

In the foregoing equation, Y(tau) represents the coherent demodulator output (208), d[n] represents the bandpass filtered signal (1704 or A), CA represents a local copy of spreading the code used to modulate the calibration signal (in this example, the DSSS signal) by the far-device in the room (in this example, audio device 100B) and the final term is a carrier signal. In some examples, all of these signal parameters are orchestrated between audio devices in the audio environment (e.g., may be determined and provided by an orchestrating device).

The signal chain in FIG. 17 from Y(tau) (208) to <Y(tau)>(400) is incoherent integration, wherein the coherent demodulator output is squared and averaged. The number of averages (the number of times that the incoherent accumulator 1710B runs) is a parameter that may, in some examples, be determined and provided by an orchestrating device, e.g., based on a determination that sufficient SNR has been achieved. In some instances, an audio device that is implementing the baseband processor 218 may determine the number of averages, e.g., based on a determination that sufficient SNR has been achieved.

Incoherent integration can be mathematically expressed as follows:

$$\langle |Y(\overline{\tau}, \overline{f}_D)|^2 \rangle \approx \frac{1}{N} \sum_{k=0}^{N-1} |Y(t_k, \overline{\tau}, \overline{f}_D)|^2$$

The foregoing equation involves simply averaging the squared coherent delay waveform over a period of time defined by N, where N represents the number of blocks used in incoherent integration.

Figure 18:
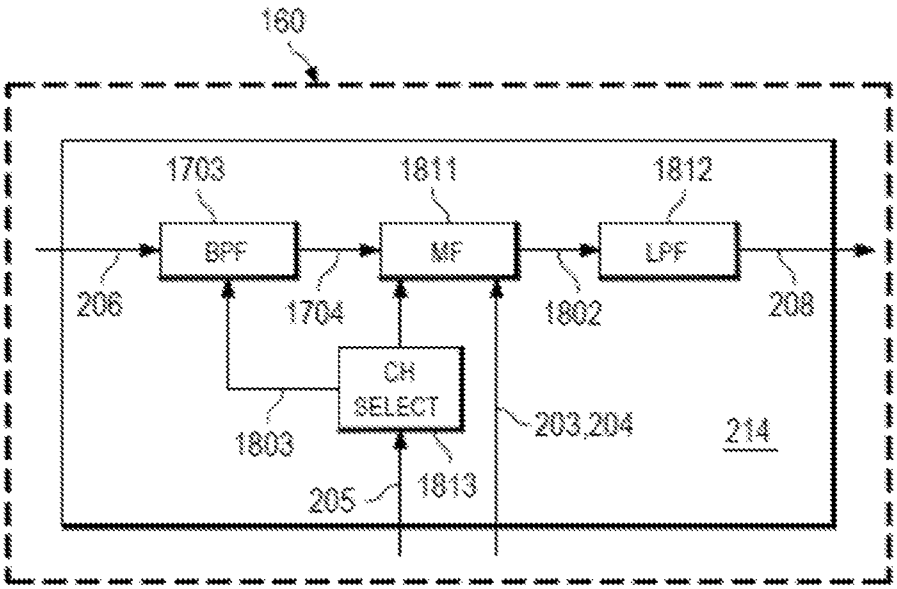
FIG. 18 shows elements of a calibration signal demodulator according to another example.

FIG. 18 shows elements of a calibration signal demodulator according to another example. According to this example, the calibration signal demodulator 214 is configured to produce delay estimates, DoA estimates and audibility estimates. In this example, the calibration signal demodulator 214 is configured to perform coherent demodulation and then incoherent integration is performed on the full delay waveform. As in the example describe above with reference to FIG. 17, in this example we will assume that the calibration signal demodulator 214 is being implemented by the audio device 100A and is configured to demodulate acoustic DSSS signals played back by the audio device 100B.

In this example, the calibration signal demodulator 214 includes a bandpass filter 1703 that is configured to remove unwanted energy from other audio signals, such as some of the audio content that is being rendered for a listener's experience and acoustic DSSS signals that have been placed in other frequency bands in order to avoid the near/far problem. For example, the bandpass filter 1703 may be configured to pass energy from one of the frequency bands shown in FIGS. 12 and 13.

The matched filter 1811 is configured to compute a delay waveform 1802 by correlating the bandpass filtered signal 1704 with a local replica of the acoustic calibration signal of interest: in this example, the local replica is an instance of the DSSS signal replicas 204 corresponding to DSSS signals generated by the audio device 100B. The matched filter output 1802 is then low-pass filtered by the low-pass filter 712, to produce the coherently demodulated complex delay waveform 208. In some alternative implementations, the low-pass filter 712 may be placed after the squaring operation in a baseband processor 218 that produces an incoherently averaged delay waveform, such as in the example described above with reference to FIG. 17.

In this example, the channel selector 1813 is configured to control the bandpass filter 1703 (e.g., the pass band of the bandpass filter 1703) and the matched filter 1811 according to the calibration signal information 205. As noted above, the calibration signal information 205 may include parameters to be used by the control system 160 to demodulate the calibration signals, etc. The calibration signal information 205 may, in some examples, indicate which audio devices are producing acoustic calibration signals. In some examples, the calibration signal information 205 may be received (e.g., via wireless communication) from an external source, such as an orchestrating device.

Figure 19:
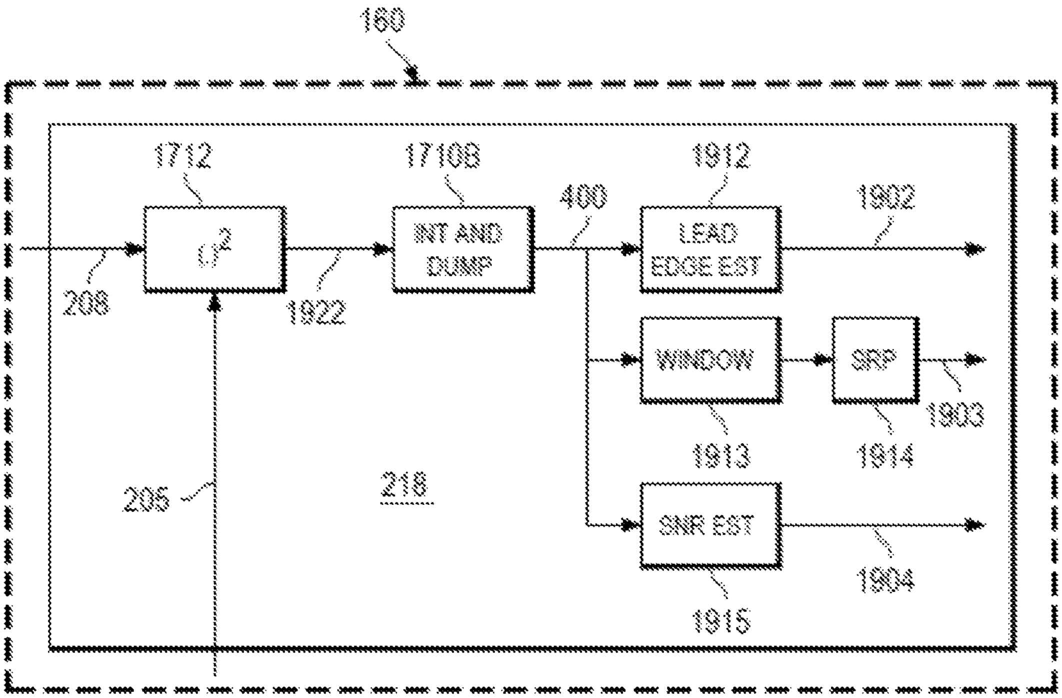
FIG. 19 is a block diagram that shows examples of baseband processor elements according to some disclosed implementations.

FIG. 19 is a block diagram that shows examples of baseband processor elements according to some disclosed implementations. As with other figures provided herein, the types and numbers of elements shown in FIG. 19 are merely provided by way of example. Other implementations may include more, fewer and/or different types and numbers of elements. In this example, the baseband processor 218 is implemented by an instance of the control system 160 that is described above with reference to FIG. 1B.

In this particular implementation, no coherent techniques are applied. Thus, the first operation performed is taking the power of the complex delay waveform 208 via a square law module 1712, to produce an incoherent delay waveform 1922. The incoherent delay waveform 1922 is integrated by the accumulator 1710B for a period of time (which in this example is specified in the calibration signal information 205 received from an orchestrating device, but which may be determined locally in some examples), to produce an incoherently averaged delay waveform 400. According to this example, the delay waveform 400 is then processed in multiple ways, as follows:

1. A leading edge estimator 1912 is configured to make a delay estimate 1902, which is the estimated time delay of the received signal. In some examples, the delay estimate 1902 may be based at least in part on an estimation of the location of the leading edge of the delay waveform 400. According to some such examples, the delay estimate 1902 may be determined according to the number of time samples of the signal portion (e.g., the positive portion) of the delay waveform up to and including the time sample corresponding to the location of the leading edge of the delay waveform 400, or the time sample that is less than one chip period (inversely proportional to signal bandwidth) after the location of the leading edge of the delay waveform 400. In the latter case, according to some examples this delay may be used to compensate for the width of the autocorrelation of a DSSS code. As the chipping rate increases, the width of the peak of the autocorrelation narrows until it is minimal when the chipping rate equals the sampling rate. This condition (the chipping rate equaling the sampling rate) yields a delay waveform 400 that is the closest approximation to a true impulse response for the audio environment for a given DSSS code. As the chipping rate increases, spectral overlaps (aliasing) may occur following the calibration signal modulator 220A. In some examples, the calibration signal modulator 220A may be bypassed or omitted if the chipping rate equals the sampling rate. A chipping rate that approaches that of the sampling rate (for example, a chipping rate that is 80% of the sampling rate, 90% of the sampling rate, etc.) may provide a delay waveform 400 that is a satisfactory approximation of the actual impulse response for some purposes. In some such examples, the delay estimate 1902 may be based in part on information regarding the calibration signal characteristics (e.g., on DSSS signal characteristics). In some examples, the leading edge estimator 1912 may be configured to estimate the location of the leading edge of the delay waveform 400 according to the first instance of a value greater than a threshold during a time window. Some examples will be described below with reference to FIG. 20. In other examples, the leading edge estimator 1912 may be configured to estimate the location of the leading edge of the delay waveform 400 according to the location of a maximum value (e.g., a local maximum value within a time window), which is an example of "peak-picking." Note that many other techniques could be used to estimate the delay (e.g. peak picking).

2. In this example, the baseband processor 218 is configured to make a DoA estimate 1903 by windowing (with windowing block 1913) the delay waveform 400 before using a delay-sum DoA estimator 1914. The delay-sum DoA estimator 1914 may make a DoA estimate based, at least in part, on a determination of the steered response power (SRP) of the delay waveform 400. Accordingly, the delay-sum DoA estimator 1914 may also be referred to herein as an SRP module or as a delay-sum beamformer. Windowing is helpful to isolate an a time interval around the leading edge, so that the resulting DoA estimate is based more on signal than on noise. In some examples, the window size may be in the range of tens or hundreds of milliseconds, e.g., in the range of 10 to 200 milliseconds. In some instances, the window size may be selected based upon knowledge of typical room decay times, or on knowledge of decay times of the audio environment in question. In some instances, the window size may be adaptively updated over time. For example, some implementations may involve determining a window size that results in at least some portion of the window being occupied by the signal portion of the delay waveform 400. Some such implementations may involve estimating the noise power according to time samples that occur before the leading edge. Some such implementations may involve selecting a window size that would result in at least a threshold percentage of the window being occupied by a portion of the delay waveform that corresponds to at least a threshold signal level, e.g., at least 6 dB larger than the estimated noise power, at least 8 dB larger than the estimated noise power, at least 10 dB larger than the estimated noise power, etc.
3. According to this example, the baseband processor 218 is configured to make an audibility estimate 1904 by estimating the signal to noise power using SNR estimation block 1915. In this example, the SNR estimation block 1915 is configured to extract the signal power estimate 402 and the noise power estimate 401 from the delay waveform 400. According to some such examples, the SNR estimation block 1915 may be configured to determine the signal portions and the noise portions of the delay waveform 400 as described below with reference to FIG. 20. In some such examples, the SNR estimation block 1915 may be configured to determine the signal power estimate 402 and the noise power estimate 401 by averaging signal portions and noise portions over selected time windows. In some such examples, the SNR estimation block 1915 may be configured to make the SNR estimate according to the ratio of the signal power estimate 402 to the noise power estimate 401. In some instances, the baseband processor 218 may be configured to make the audibility estimate 1904 according to the SNR estimation. For a given amount of noise power, the SNR is proportional to the audibility of an audio device. Thus, in some implementations the SNR may be used directly as a proxy (e.g., a value that is proportional to) for an estimate of the actual audio device audibility. Some implementations that include calibrated microphone feeds may involve measuring the absolute audibility (e.g., in dBSPL) and converting the SNR into an absolute audibility estimate. In some such implementations, the method for determining the absolute audibility estimate will take into account the acoustic losses due to distance between audio devices and variability of noise in the room. In other implementations, other techniques for estimating signal power, noise power and/or relative audibility from the delay waveform.

Figure 20:
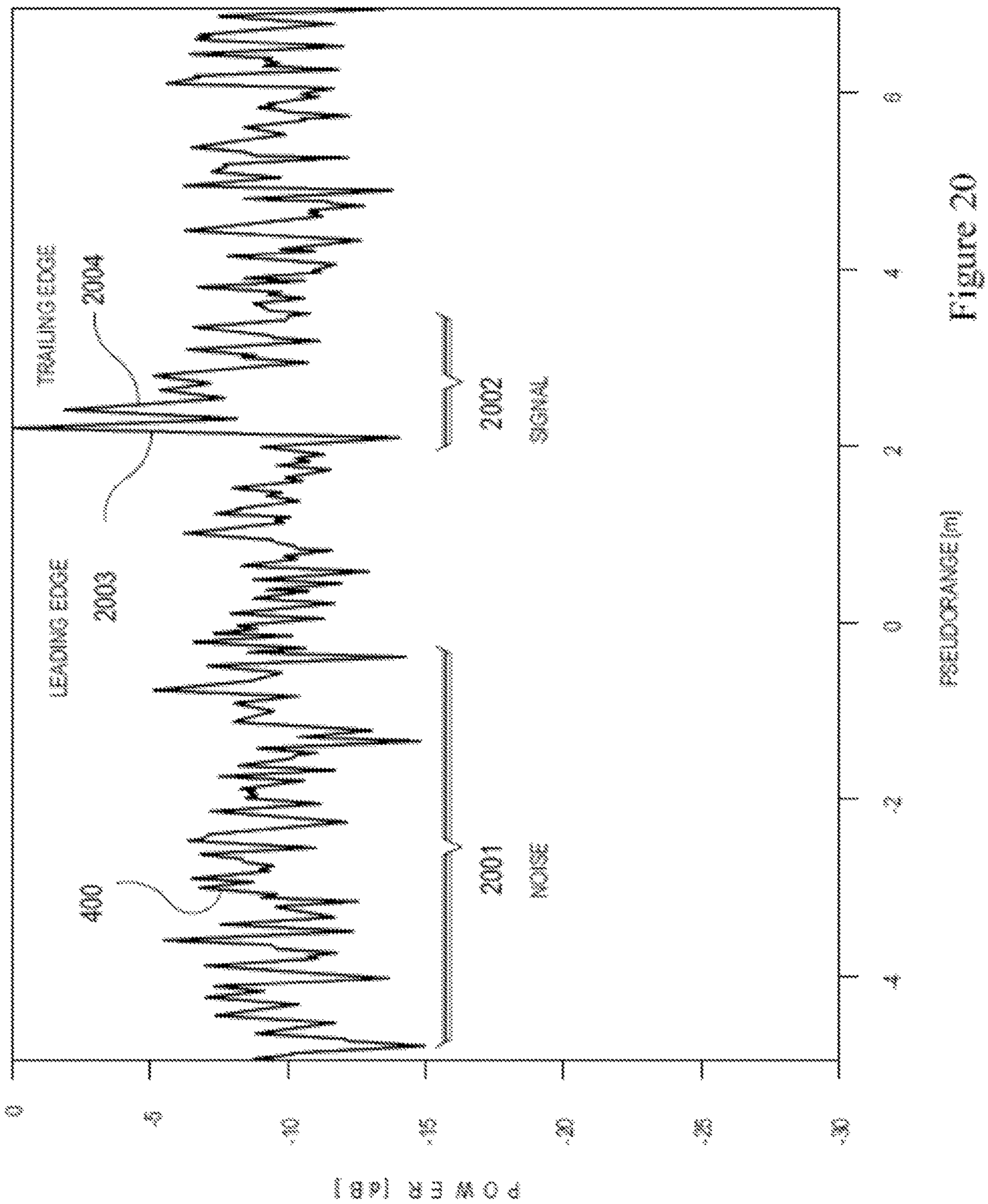
FIG. 20 shows an example of a delay waveform.

FIG. 20 shows an example of a delay waveform. In this example, the delay waveform 400 has been output by an instance of the baseband processor 218. According to this example, the vertical axis indicates power and the horizontal axis indicates the pseudorange, in meters. As noted above, the baseband processor 218 is configured to extract delay information, sometimes referred to herein as r, from a demodulated acoustic calibration signal. The values of r can be converted into a pseudorange measurement, sometimes referred to herein as ρ, as follows:

$$\rho = \tau c$$

In the foregoing expression, c represents the speed of sound. In FIG. 20, the delay waveform 400 includes a noise portion 2001 (which also may be referred to as a noise floor) and a signal portion 2002. Negative values in the pseudorange measurement (and the corresponding delay waveform) can be identified as noise: because negative ranges (distances) do not make physical sense, the power corresponding to a negative pseudorange is assumed to be noise.

In this example, the signal portion 2002 of the waveform 400 includes a leading edge 2003 and a trailing edge. The leading edge 2003 is a prominent feature of the delay waveform 400 if the power of the signal portion 2002 is relatively strong. In some examples, the leading edge estimator 1912 of FIG. 19 may be configured to estimate the location of the leading edge 2003 according to the first instance of a power value greater than a threshold during a time window. In some examples, the time window may start when τ (or ρ) is zero. In some instances, the window size may be in the range of tens or hundreds of milliseconds, e.g., in the range of 10 to 200 milliseconds. According to some implementations, the threshold may be a previously-selected value, e.g., −5 dB, −4 dB, −3 dB, −2 dB, etc. In some alternative examples, the threshold may be based on the power in at least a portion of the delay waveform 400, e.g., the average power of the noise portion.

However, as noted above, in other examples the leading edge estimator 1912 may be configured to estimate the location of the leading edge 2003 according to the location of a maximum value (e.g., a local maximum value within a time window). In some instances, the time window may be selected as noted above.

The SNR estimation block 1915 of FIG. 19 may, in some examples, be configured to determine an average noise value corresponding to at least part of the noise portion 2001 and an average or peak signal value corresponding to at least part of the signal portion 2002. The SNR estimation block 1915 of FIG. 19 may, in some such examples, be configured to estimate an SNR by dividing the average signal value by the average noise value.

Noise compensation (e.g., automatically levelling of speaker playback content) to compensate for environmental noise conditions is a well-known and desired feature, but has not previously been implemented in an optimal manner. Using a microphone to measure environmental noise conditions also measures the speaker playback content, presenting a major challenge for noise estimation (e.g., online noise estimation) needed to implement noise compensation.

Because people in an audio environment may commonly be outside the critical acoustic distance of any given room, echo introduced from other devices from a similar distance away may still represent a significant echo impact. Even if sophisticated multi-channel echo cancellation is available, and somehow achieves the performance required, the logistics of providing the canceller with remote echo references can have unacceptable bandwidth and complexity costs.

Some disclosed implementations provide methods of continuously calibrating a constellation of audio devices in an audio environment, via persistent (e.g., continuous or at least ongoing) characterization of the acoustic space including people, devices and audio conditions (such as noise and/or echoes). In some disclosed examples, such processes continue even whilst media is being played back via audio devices of the audio environment.

As used herein, a "gap" in a playback signal denotes a time (or time interval) of the playback signal at (or in) which playback content is missing (or has a level less than a predetermined threshold). For example, a "gap" (also referred to herein as "forced gap" or a "parameterized forced gap") may be an attenuation of playback content in a frequency range, during a time interval. In some disclosed implementations, gaps may be inserted in one or more frequency ranges of audio playback signals of a content stream to produce modified audio playback signals and the modified audio playback signals may be reproduced or "played back" in the audio environment. In some such implementations, N gaps may be inserted into N frequency ranges of the audio playback signals during N time intervals.

According to some such implementations, M audio devices may orchestrate their gaps in time and frequency, thereby allowing an accurate detection of the far-field (respective to each device) in the gap frequencies and time intervals. These "orchestrated gaps" are an important aspect of the present disclosure. In some examples, M may be a number corresponding to all audio devices of an audio environment. In some instances, M may be a number corresponding to all audio devices of the audio environment except a target audio device, which is an audio device whose played-back audio is sampled by one or more microphones of the M orchestrated devices of the audio environment (e.g., one or more microphones of the M orchestrated audio devices of the audio environment), e.g., to evaluate the relative audibility, position, non-linearities, and/or other characteristics of the target audio device. In some examples, a target audio device may reproduce unmodified audio playback signals that do not include a gap inserted into any frequency range. In other examples, M may be a number corresponding to a subset of the audio devices of an audio environment, e.g., multiple participating non-target audio devices.

It is desirable that the orchestrated gaps should have a low perceptual impact (e.g., a negligible perceptual impact) to listeners in the audio environment. Therefore, in some examples gap parameters may be selected to minimize perceptual impact.

In some examples, while the modified audio playback signals are being played back in the audio environment, a target device may reproduce unmodified audio playback signals that do not include a gap inserted into any frequency range. In such examples, the relative audibility and/or position of the target device may be estimated from the perspective of the M audio devices that are reproducing the modified audio playback signals.

Figure 21:
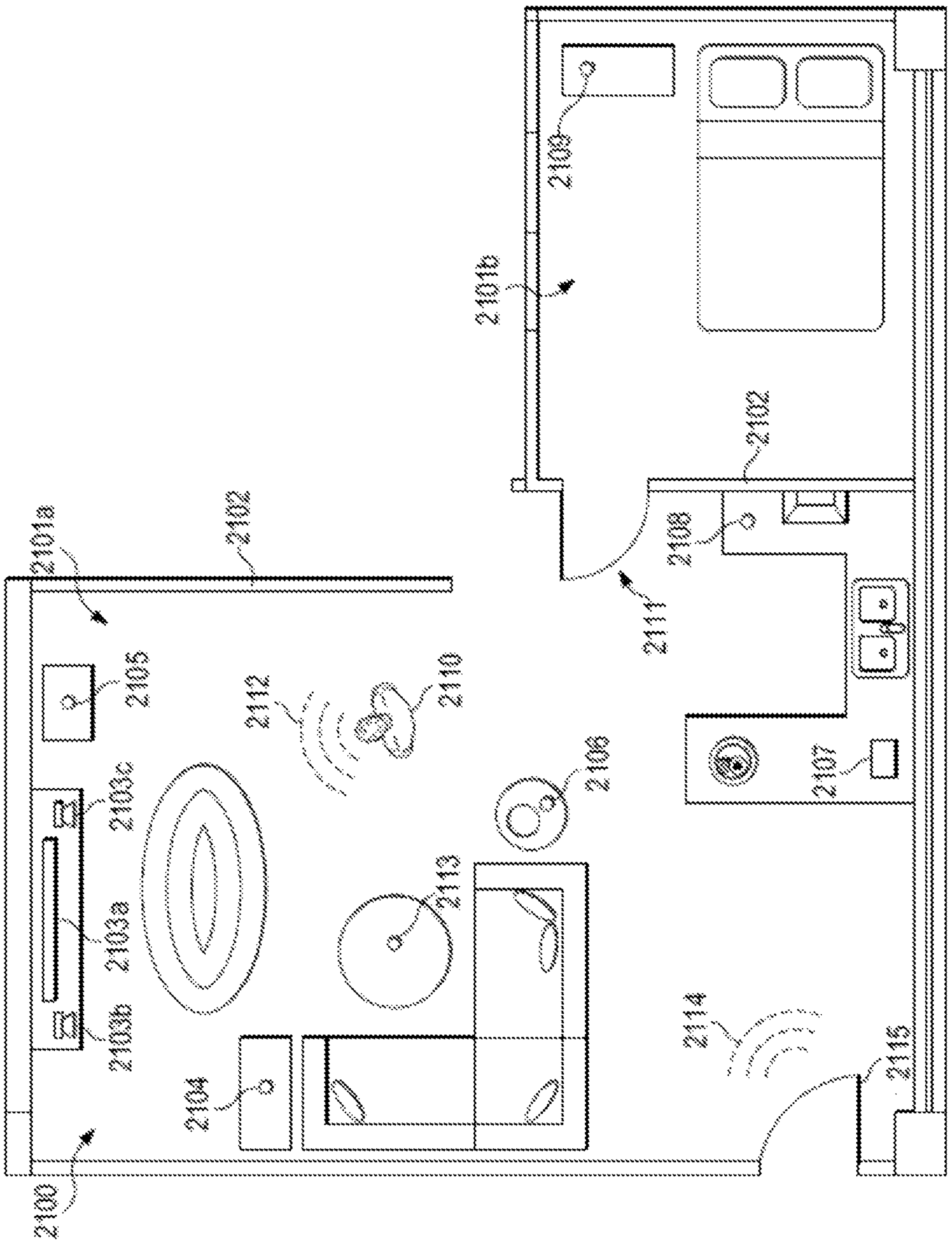
FIG. 21 shows another example of an audio environment.

FIG. 21 shows another example of an audio environment. As with other figures provided herein, the types and numbers of elements shown in FIG. 21 are merely provided by way of example. Other implementations may include more, fewer and/or different types and numbers of elements.

According to this example, the audio environment 2100 includes a main living space 2101*a* and a room 2101*b* that is adjacent to the main living space 2101*a*. Here, a wall 2102 and a door 2111 separates the main living space 2101*a* from the room 2101*b*. In this example, the amount of acoustic separation between the main living space 2101*a* and the room 2101*b* depends on whether the door 2111 is open or closed, and if open, the degree to which the door 2111 is open.

At the time corresponding to FIG. 21, a smart television (TV) 2103*a* is located within the audio environment 2100. According to this example, the smart TV 2103*a* includes a left loudspeaker 2103*b* and a right loudspeaker 2103*c*.

In this example, smart audio devices 2104, 2105, 2106, 2107, 2108, 2109 and 2113 are also located within the audio environment 2100 at the time corresponding to FIG. 21. According to this example, each of the smart audio devices 2104-2109 includes at least one microphone and at least one loudspeaker. However, in this instance the smart audio devices 2104-2109 and 2113 include loudspeakers of various sizes and having various capabilities.

According to this example, at least one acoustic event is occurring in the audio environment 2100. In this example, one acoustic event is caused by the talking person 2110, who is uttering a voice command 2112.

In this example, another acoustic event is caused, at least in part, by the variable element 2115. Here, the variable element 2115 is a door of the audio environment 2100. According to this example, as the door 2115 opens, sounds from outside the environment may be perceived more clearly inside the audio environment 2100. Moreover, the changing angle of the door 2115 changes some of the echo paths within the audio environment 2100. According to this example, element 2114 represents a variable element of the impulse response of the audio environment 2100 caused by varying positions of the door 2115.

Figure 22A:
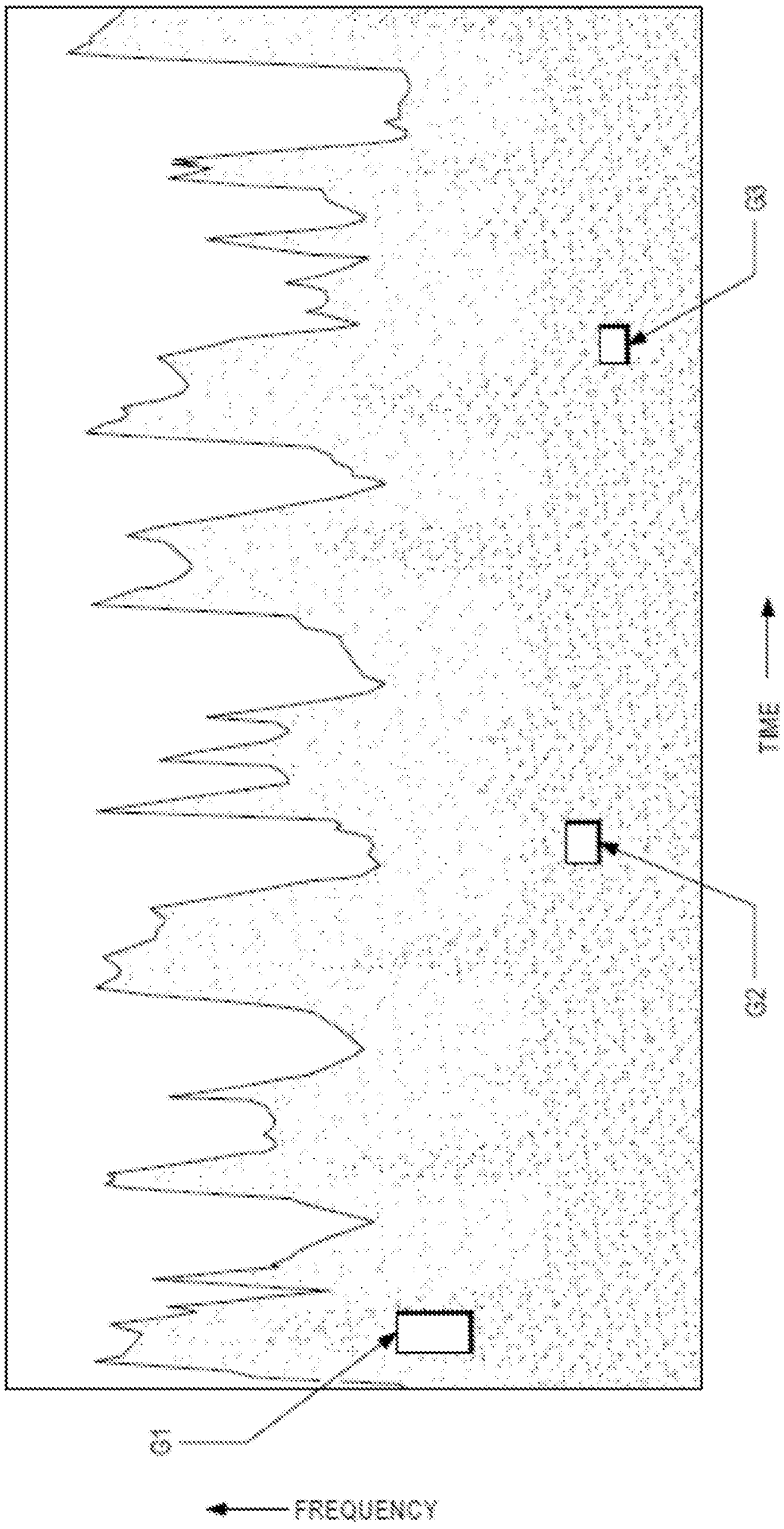
FIG. 22A is an example of a spectrogram of modified audio playback signal.

In some examples, a sequence of forced gaps is inserted in a playback signal, each forced gap in a different frequency band (or set of bands) of the playback signal, to allow a pervasive listener to monitor non-playback sound which occurs "in" each forced gap in the sense that it occurs during the time interval in which the gap occurs and in the frequency band(s) in which the gap is inserted. FIG. 22A is an example of a spectrogram of modified audio playback signal. In this example, the modified audio playback signal was created by inserting gaps into an audio playback signal according to one example. More specifically, to generate the spectrogram of FIG. 22A, a disclosed method was performed on an audio playback signal to introduce forced gaps (e.g., gaps G1, G2, and G3 shown in FIG. 22A) in frequency bands thereof, thereby generating the modified audio playback signal. In the spectrogram shown in FIG. 22A, position along the horizontal axis indicates time and position along the vertical axis indicates frequency of the content of the modified audio playback signal at an instant of time. The density of dots in each small region (each such region centered at a point having a vertical and horizontal coordinate in this example) indicates energy of the content of the modified audio playback signal at the corresponding frequency and instant of time: denser regions indicate content having greater energy and less dense regions indicate content having lower energy. Thus, the gap G1 occurs at a time (in other words, during a time interval) earlier than the time at which (in other words, during a time interval in which) gap G2 or G3 occurs, and gap G1 has been inserted in a higher frequency band than the frequency band in which gap G2 or G3 has been inserted.

Introduction of a forced gap into a playback signal in accordance some disclosed methods is distinct from simplex device operation in which a device pauses a playback stream of content (e.g., in order to better hear the user and the user's environment). Introduction of forced gaps into a playback signal in accordance with some disclosed methods may be optimized to significantly reduce (or eliminate) the perceptibility of artifacts resulting from the introduced gaps during playback, preferably so that the forced gaps have no or minimal perceptible impact for the user, but so that the output signal of a microphone in the playback environment is indicative of the forced gaps (e.g., so the gaps can be exploited to implement a pervasive listening method). By using forced gaps which have been introduced in accordance with some disclosed methods, a pervasive listening system may monitor non-playback sound (e.g., sound indicative of background activity and/or noise in the playback environment) even without the use of an acoustic echo canceller.

Figure 22B:
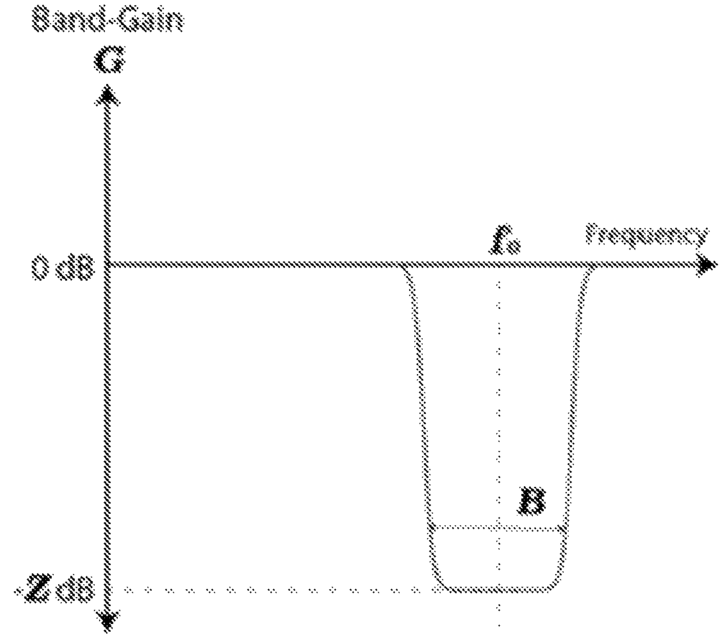
FIG. 22B is a graph that shows an example of a gap in the frequency domain.
Figure 22C:
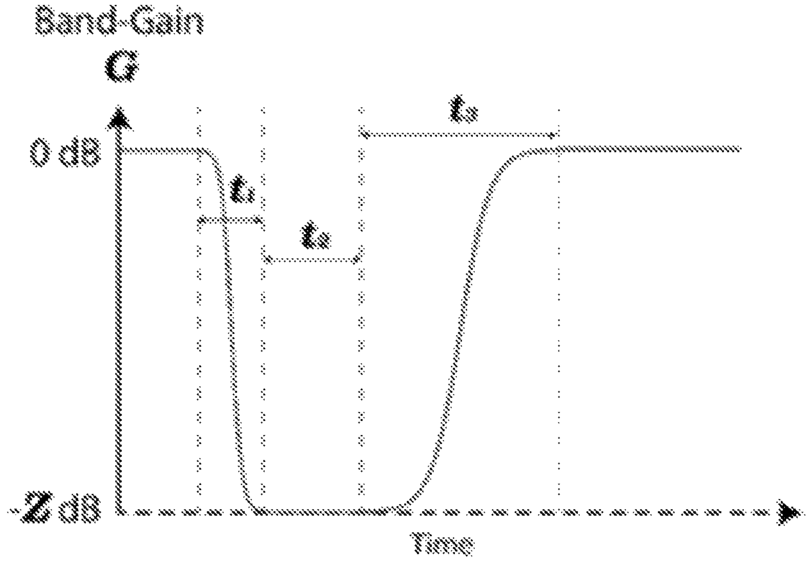
FIG. 22C is a graph that shows an example of a gap in the time domain.

With reference to FIGS. 22B and 22C, we next describe an example of a parameterized forced gap which may be inserted in a frequency band of an audio playback signal, and criteria for selection of the parameters of such a forced gap. FIG. 22B is a graph that shows an example of a gap in the frequency domain. FIG. 22C is a graph that shows an example of a gap in the time domain. In these examples, the parameterized forced gap is an attenuation of playback content using a band attenuation, G, whose profiles over both time and frequency resemble the profiles shown in FIGS. 22B and 22C. Here, the gap is forced by applying attenuation G to a playback signal over a range ("band") of frequencies defined by a center frequency $f_0$ (indicated in FIG. 22B) and bandwidth B (also indicated in FIG. 22B), with the attenuation varying as a function of time at each frequency in the frequency band (for example, in each frequency bin within the frequency band) with a profile resembling that shown in FIG. 22C. The maximum value of the attenuation G (as a function of frequency across the band) may be controlled to increase from 0 dB (at the lowest frequency of the band) to a maximum attenuation (suppression depth) Z at the center frequency $f_0$ (as indicated in FIG. 22B), and to decrease (with increasing frequency above the center frequency) to 0 dB (at the highest frequency of the band).

In this example, the graph of FIG. 22B indicates a profile of the band attenuation G, as a function of frequency (i.e., frequency bin), applied to frequency components of an audio signal to force a gap in audio content of the signal in the band. The audio signal may be a playback signal (e.g., a channel of a multi-channel playback signal), and the audio content may be playback content.

According to this example, the graph of FIG. 22C shows a profile of the band attenuation G, as a function of time, applied to the frequency component at center frequency $f_0$, to force the gap indicated in FIG. 22B in audio content of the signal in the band. For each other frequency component in the band, the band gain as a function of time may have a similar profile to that shown in FIG. 22C, but the suppression depth Z of FIG. 22C may be replaced by an interpolated suppression depth kZ, where k is a factor which ranges from 0 to 1 (as a function of frequency) in this example, so that kZ has the profile shown in FIG. 22B. In some examples, for each frequency component, the attenuation G may also be interpolated (e.g., as a function of time) from 0 dB to the suppression depth kZ (e.g., with k=1, as indicated in FIG. 22C, at the center frequency), e.g., to reduce musical artifacts resulting from introduction of the gap. Three regions (time intervals), t1, t2, and t3, of this latter interpolation are shown in FIG. 22C.

Thus, when a gap forcing operation occurs for a particular frequency band (e.g., the band centered at center frequency, $f_0$, shown in FIG. 22B), in this example the attenuation G applied to each frequency component in the band (e.g., to each bin within the band) follows a trajectory as shown in FIG. 22C. Starting at 0 dB, it drops to a depth −kZ dB in t1 seconds, remains there for t2 seconds, and finally rises back to 0 dB in t3 seconds. In some implementations, the total time t1+t2+t3 may be selected with consideration of the time-resolution of whatever frequency transform is being used to analyze the microphone feed, as well as a reasonable duration of time that is not too intrusive for the user. Some examples of t1, t2 and t3 for single-device implementations are shown in Table 1, below.

Some disclosed methods involve inserting forced gaps in accordance with a predetermined, fixed banding structure that covers the full frequency spectrum of the audio playback signal, and includes $B_{count}$ bands (where $B_{count}$ is a number, e.g., $B_{count}$=49). To force a gap in any of the bands, a band attenuation is applied in the band in such examples. Specifically, for the jth band, an attenuation, Gj, may be applied over the frequency region defined by the band.

Table 1, below, shows example values for parameters t1, t2, t3, the depth Z, for each band, and an example of the number of bands, $B_{count}$, for single-device implementations.

TABLE 1

| Parameter | Default | Minimum | Maximum | Units | Purpose |
|---|---|---|---|---|---|
| $B_{count}$ | 49 | 20 | 128 | — | Number of discrete groupings of frequency bins, referred to as "bands" |
| Z | −12 | −12 | −18 | dB | Maximum attenuation applied in the forced gap in a band. |

TABLE 1-continued

| Parameter | Default | Minimum | Maximum | Units | Purpose |
|---|---|---|---|---|---|
| t1 | 8 | 5 | 15 | Milliseconds | Time to ramp gain down to −Z dB at the center frequency of a band once a forced gap is triggered. |
| t2 | 80 | 40 | 120 | Milliseconds | Time to apply attenuation −Z dB after t1 seconds. |
| t3 | 8 | 5 | 15 | Milliseconds | Time to ramp gain up to 0 dB after t1 + t2 elapses. |

In determining the number of bands and the width of each band, a trade-off exists between perceptual impact and usefulness of the gaps: narrower bands with gaps are better in that they typically have less perceptual impact, whereas wider bands with gaps are better for implementing noise estimation (and other pervasive listening methods) and reducing the time ("convergence" time) required to converge to a new noise estimate (or other value monitored by pervasive listening), in all frequency bands of a full frequency spectrum, e.g., in response to a change in background noise or playback environment status). If only a limited number of gaps can be forced at once, it will take a longer time to force gaps sequentially in a large number of small bands than to force gaps sequentially in a smaller number of larger bands, resulting in a relatively longer convergence time. Larger bands (with gaps) provide a lot of information about the background noise (or other value monitored by pervasive listening) at once, but generally have a larger perceptual impact.

In early work by the present inventors, gaps were posed in a single-device context, where the echo impact is mainly (or entirely) nearfield. Nearfield echo is largely impacted by the direct path of audio from the speakers to the microphones. This property is true of almost all compact duplex audio devices, (such as smart audio devices) with the exceptions being devices with larger enclosures and significant acoustic decoupling. By introducing short, perceptually masked gaps in the playback, such as those shown in Table 1, an audio device may obtain glimpses of the acoustic space in which the audio device is deployed through the audio device's own echo.

However, when other audio devices are also playing content in the same audio environment, the present inventors have discovered that the gaps of a single audio device become less useful due to far-field echo corruption. Far-field echo corruption frequently lowers the performance of the local echo cancellation, significantly worsening the overall system performance. Far-field echo corruption is difficult to remove for various reasons. One reason is that obtaining a reference signal may require increased network bandwidth and added complexity for additional delay estimation. Moreover, estimating the far-field impulse response is more difficult as noise conditions are increased and the response is longer (more reverberant and spread out in time). In addition, far-field echo corruption is usually correlated with the near-field echo and other far-field echo sources, further challenging the far-field impulse response estimation.

The present inventors have discovered that if multiple audio devices in an audio environment orchestrate their gaps in time and frequency, a clearer perception of the far-field (relative to each audio device) may be obtained when the multiple audio devices reproduce the modified audio playback signals. The present inventors have also discovered that if a target audio device plays back unmodified audio playback signals when the multiple audio devices reproduce the modified audio playback signals, the relative audibility and position of the target device can be estimated from the perspective of each of the multiple audio devices, even whilst media content is being played.

Moreover, and perhaps counter-intuitively, the present inventors have discovered that breaking the guidelines that were formerly used for single-device implementations (e.g., keeping the gaps open for a longer period of time than indicated in Table 1) leads to implementations suitable for multiple devices making co-operative measurements via orchestrated gaps.

For example, in some orchestrated gap implementations, t2 may be longer than indicated in Table 1, in order to accommodate the various acoustic path lengths (acoustic delays) between multiple distributed devices in an audio environment, which may be on the order of meters (as opposed to a fixed microphone-speaker acoustic path length on a single device, which may be tens of centimeters apart at most). In some examples, the default t2 value may be, e.g., 25 milliseconds greater than the 80 millisecond value indicated in Table 1, in order to allow for up to 8 meters of separation between orchestrated audio devices. In some orchestrated gap implementations, the default t2 value may be longer than the 80 millisecond value indicated in Table 1 for another reason: in orchestrated gap implementations, t2 is preferably longer in order to accommodate timing misalignment of the orchestrated audio devices, in order to ensure that an adequate amount of time passes during which all orchestrated audio devices have reached the value of Z attenuation. In some examples, an additional 5 milliseconds may be added to the default value of t2 to accommodate timing mis-alignment. Therefore, in some orchestrated gap implementations, the default value of t2 may be 110 milliseconds, with a minimum value of 70 milliseconds and a maximum value of 150 milliseconds.

In some orchestrated gap implementations, t1 and/or t3 also may be different from the values indicated in Table 1. In some examples, t1 and/or t3 may be adjusted as a result of a listener not being able to perceive the different times that the devices go into or come out of their attenuation period due to timing issues and physical distance discrepancies. At least in part because of spatial masking (resulting from multiple devices playing back audio from different locations), the ability of a listener to perceive the different times at which orchestrated audio devices go into or come out of their attenuation period would tend to be less than in a single-device scenario. Therefore, in some orchestrated gap implementations the minimum values of t1 and t3 may be reduced and the maximum values of t1 and t3 may be increased, as compared to the single-device examples shown in Table 1. According to some such examples, the minimum values of t1 and t3 may be reduced to 2, 3 or 4 milliseconds and the maximum values of t1 and t3 may be increased to 20, 25 or 30 milliseconds.

Examples of Measurements Using Orchestrated Gaps

Figure 22D:
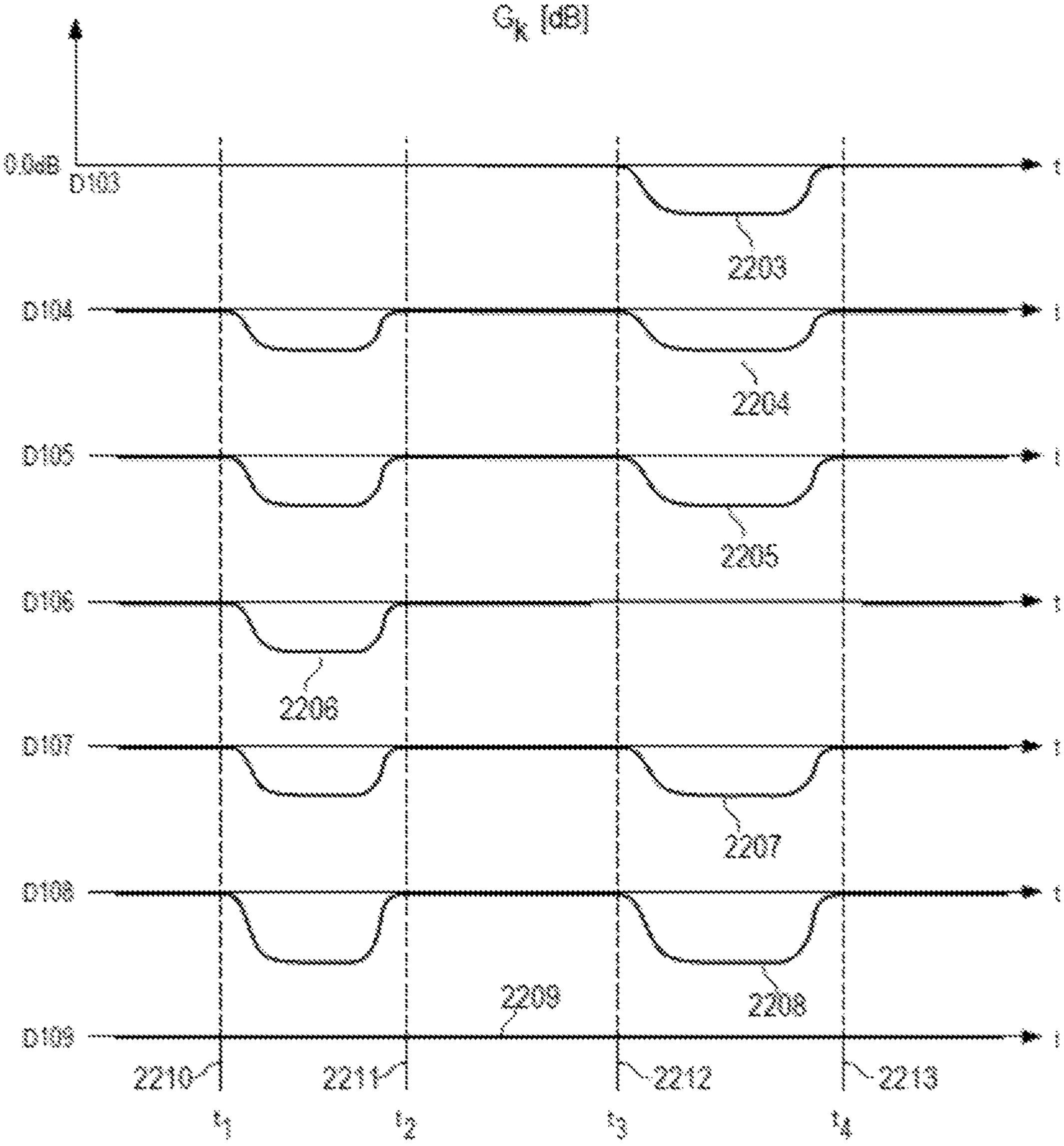
FIG. 22D shows an example of modified audio playback signals including orchestrated gaps for multiple audio devices of an audio environment.

FIG. 22D shows an example of modified audio playback signals including orchestrated gaps for multiple audio devices of an audio environment. In this implementation, multiple smart devices of an audio environment orchestrate gaps in order to estimate the relative audibility of one another. In this example, one measurement session corresponding to one gap is made during a time interval, and the measurement session includes only the devices in the main living space 2101*a* of FIG. 21. According to this example, previous audibility data has shown that smart audio device 2109, which is located in the room 2101*b*, has already been classified as barely audible to the other audio devices and has been placed in a separate zone.

In the examples shown in FIG. 22D, the orchestrated gaps are attenuations of playback content using a band attenuation $G_k$, wherein k represents a center frequency of a frequency band being measured. The elements shown in FIG. 22D are as follows:

Graph 2203 is a plot of Gk in dB for smart audio device 2113 of FIG. 21;

Graph 2204 is a plot of Gk in dB for smart audio device 2104 in FIG. 21;

Graph 2205 is a plot of Gk in dB for smart audio device 2105 in FIG. 21;

Graph 2206 is a plot of Gk in dB for smart audio device 2106 in FIG. 21;

Graph 2207 is a plot of Gk in dB for smart audio device 2107 in FIG. 21;

Graph 2208 is a plot of Gk in dB for smart audio device 2108 in FIG. 21; and Graph 2209 is a plot of $G_k$ in dB for smart audio device 2109 in FIG. 21.

As used herein, the term "session" (also referred to herein as a "measurement session") refers to a time period during which measurements of a frequency range are performed. During a measurement session, a set of frequencies with associated bandwidths, as well as a set of participating audio devices, may be specified.

One audio device may optionally be nominated as a "target" audio device for a measurement session. If a target audio device is involved in the measurement session, according to some examples the target audio device will be permitted to ignore the forced gaps and will play unmodified audio playback signals during the measurement session. According to some such examples, the other participating audio devices will listen to the target device playback sound, including the target device playback sound in the frequency range being measured.

As used herein, the term "audibility" refers to the degree to which a device can hear another device's speaker output. Some examples of audibility are provided below.

According to the example shown in FIG. 22D, at time t1, an orchestrating device initiates a measurement session with smart audio device 2113 being the target audio device, selecting one or more bin center frequencies to be measured, including a frequency k. The orchestrating device may, in some examples, be a smart audio device acting as the leader. In other examples, the orchestrating device may be another orchestrating device, such as a smart home hub. This measurement session runs from time t1 until time t2. The other participating smart audio devices, smart audio devices 2104-2108, will apply a gap in their output and will reproduce modified audio playback signals, whilst the smart audio device 2113 will play unmodified audio playback signals.

The subset of smart audio devices of the audio environment 2100 that are reproducing modified audio playback signals including orchestrated gaps (smart audio devices 2104-2108) is one example of what may be referred to as M audio devices. According to this example, the smart audio device 2109 will also play unmodified audio playback signals. Therefore, the smart audio device 2109 is not one of the M audio devices. However, because the smart audio device 2109 is not audible to the other the smart audio devices of the audio environment, the smart audio device 2109 is not a target audio device in this example, despite the fact that the smart audio device 2109 and the target audio device (the smart audio device 2113 in this example) will both play back unmodified audio playback signals.

It is desirable that the orchestrated gaps should have a low perceptual impact (e.g., a negligible perceptual impact) to listeners in the audio environment during the measurement session. Therefore, in some examples gap parameters may be selected to minimize perceptual impact. Some examples are described below with reference to FIGS. 22B-22E.

During this time (the measurement session from time t1 until time t2), the smart audio devices 2104-2108 will receive reference audio bins from the target audio device (the smart audio device 2113) for the time-frequency data for this measurement session. In this example, the reference audio bins correspond to playback signals that the smart audio device 2113 uses as a local reference for echo cancellation. The smart audio device 2113 has access to these reference audio bins for the purposes of audibility measurement as well as echo cancellation.

According to this example, at time t2 the first measurement session ends and the orchestrating device initiates a new measurement session, this time choosing one or more bin center frequencies that do not include frequency k. In the example shown in FIG. 22D, no gaps are applied for frequency k during the period t2 to t3, so the graphs show unity gain for all devices. In some such examples, the orchestrating device may cause a series of gaps to be inserted into each of a plurality of frequency ranges for a sequence of measurement sessions for bin center frequencies that do not include frequency k. For example, the orchestrating device may cause second through $N^{th}$ gaps to be inserted into second through $N^{th}$ frequency ranges of the audio playback signals during second through $N^{th}$ time intervals, for the purpose of second through $N^{th}$ subsequent measurement sessions while the smart audio device 2113 remains the target audio device.

In some such examples, the orchestrating device may then select another target audio device, e.g., the smart audio device 2104. The orchestrating device may instruct the smart audio device 2113 to be one of the M smart audio devices that are playing back modified audio playback signals with orchestrated gaps. The orchestrating device may instruct the new target audio device to reproduce unmodified audio playback signals. According to some such examples, after the orchestrating device has caused N measurement sessions to take place for the new target audio device, the orchestrating device may select another target audio device. In some such examples, the orchestrating device may continue to cause measurement sessions to take place until measurement sessions have been performed for each of the participating audio devices in an audio environment.

In the example shown in FIG. 22D, a different type of measurement session takes place between times t3 and t4. According to this example, at time t3, in response to user input (e.g., a voice command to a smart audio device that is acting as the orchestrating device), the orchestrating device initiates a new session in order to fully calibrate the loudspeaker setup of the audio environment 2100. In general, a user may be relatively more tolerant of orchestrated gaps that have a relatively higher perceptual impact during a "set-up" or "recalibration" measurement session such as takes place between times t3 and t4. Therefore, in this example a large contiguous set of frequencies are selected for measurement, including k. According to this example, the smart audio device 2106 is selected as the first target audio device during this measurement session. Accordingly, during the first phase of the measurement session from time t3 to t4, all of the smart audio devices aside from the smart audio device 2106 will apply gaps.

Gap Bandwidth

Figure 23A:
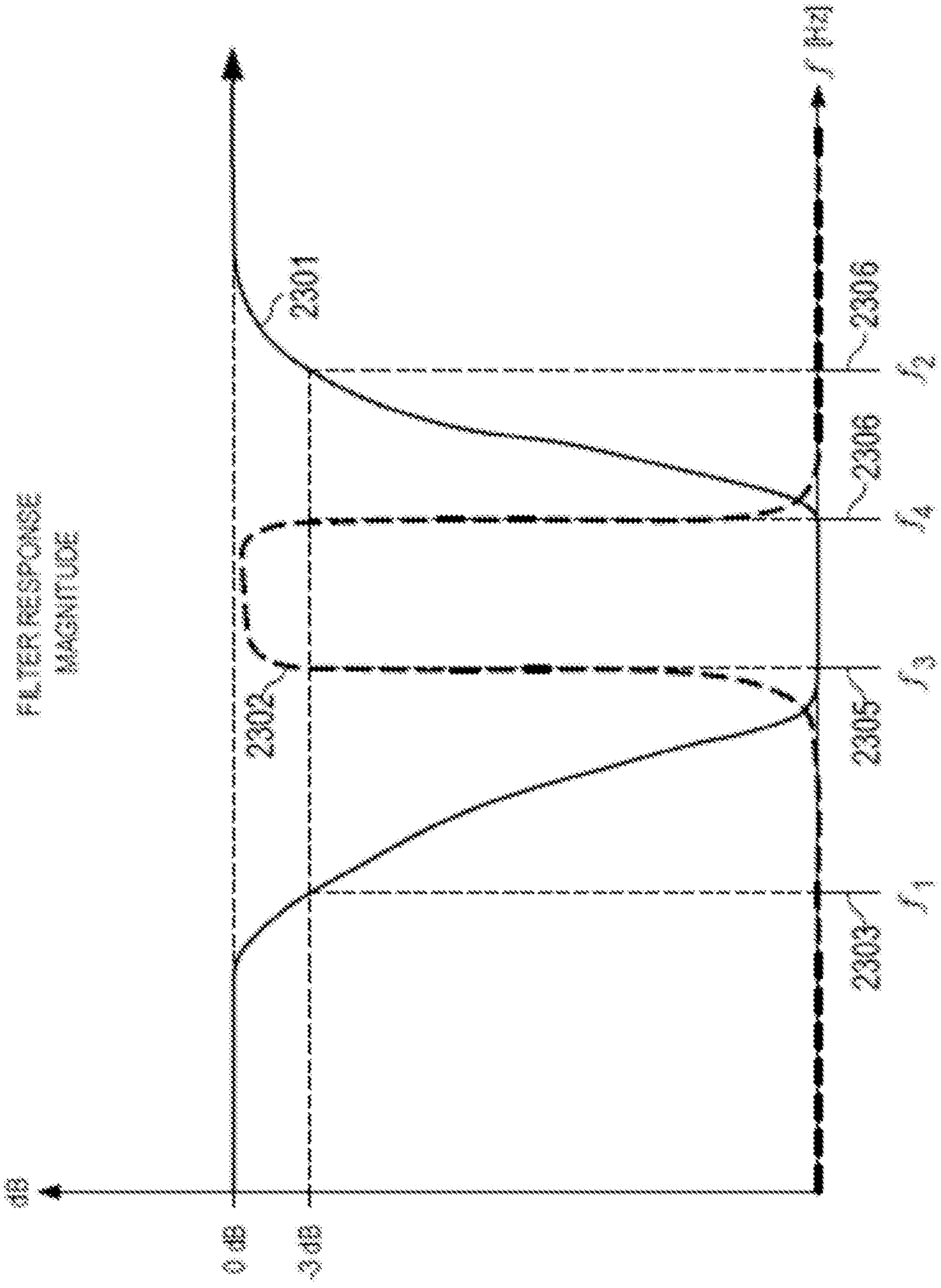
FIG. 23A is a graph that shows examples of a filter response used for creating a gap and a filter response used to measure a frequency region of a microphone signal used during a measurement session.

FIG. 23A is a graph that shows examples of a filter response used for creating a gap and a filter response used to measure a frequency region of a microphone signal used during a measurement session. According to this example, the elements of FIG. 23A are as follows:

- Element 2301 represents the magnitude response of the filter used to create the gap in the output signal;
- Element 2302 represents the magnitude response of the filter used to measure the frequency region corresponding to the gap caused by element 2301;
- Elements 2303 and 2304 represent the −3 dB points of 2301, at frequencies f1 and f2; and
- Elements 2305 and 2306 represent the −3 dB points of 2302, at frequencies f3 and f4.

The bandwidth of the gap response 2301 (BW_gap) may be found by taking the difference between the −3 dB points 2303 and 2304: BW_gap=f2−f1 and BW_measure (the bandwidth of the measurement response 2302)=f4−f3.

According to one example, the quality of the measurement may be expressed as follows:

$$\text{quality} = \frac{BW_{gap}}{BW_{measure}} = \frac{f_2 - f_1}{f_4 - f_3}$$

Because the bandwidth of the measurement response is usually fixed, one can adjust the quality of the measurement by increasing the bandwidth of the gap filter response (e.g., widen the bandwidth). However, the bandwidth of the introduced gap is proportional to its perceptibility. Therefore, the bandwidth of the gap filter response should generally be determined in view of both the quality of the measurement and the perceptibility of the gap. Some examples of quality values are shown in Table 2:

TABLE 2

| Parameter | Default | Minimum | Maximum | Units | Purpose |
|---|---|---|---|---|---|
| quality | 2 | 1.5 | 3 | — | Measures the confidence measurements made through forced gaps |

Although Table 2 indicates "minimum" and "maximum" values, those values are only for this example. Other implementations may involve lower quality values than 1.5 and/or higher quality values than 3.

Gap Allocation Strategies

Gaps may be defined by the following:

- An underlying division of the frequency spectrum, with center frequencies and measurement bandwidths;
- An aggregation of these smallest measurement bandwidths in a structure referred to as "banding";
- A duration in time, attenuation depth, and the inclusion of one or more contiguous frequencies that conform to the agreed upon division of the frequency spectrum; and
- Other temporal behavior such as ramping the attenuation depth at the beginning and end of a gap.

According to some implementations, gaps may be selected according to a strategy that will aim to measure and observe as much of the audible spectrum in as short as time as possible, whilst meeting the applicable perceptibility constraints.

FIGS. 23B, 23C, 23D and 23E are graphs that show examples of gap allocation strategies. In these examples, time is represented by distance along the horizontal axis and frequency is represented by distance along the vertical axis. These graphs provide examples to illustrate the patterns produced by various gap allocation strategies, and how long they take to measure the complete audio spectrum. In these examples, each orchestrated gap measurement session is 10 seconds in length. As with other disclosed implementations, these graphs are merely provided by way of example. Other implementations may include more, fewer and/or different types, numbers and/or sequences of elements. For example, in other implementations each orchestrated gap measurement session may be longer or shorter than 10 seconds. In these examples, unshaded regions 2310 of the time/frequency space represented in FIGS. 23B-23E (which may be referred to herein as "tiles") represent a gap at the indicated time-frequency period (of 10 seconds). Moderately-shaded regions 2315 represent frequency tiles that have been measured at least once. Lightly-shaded regions 2320 have yet to be measured.

Assuming the task at hand requires that the participating audio devices insert orchestrated gaps for "listening through to the room" (e.g., to evaluate the noise, echo, etc., in the audio environment), then the measurement session completion times will be as they are indicated in FIGS. 23B-23E. If the task requires that each audio device is made the target in turn, and listened to by the other audio devices, then the times need to be multiplied by the number of audio devices participating in the process. For example, if each audio device is made the target in turn, the three minutes and twenty seconds (3 m20 s) shown as the measurement session completion time in FIG. 23B would mean that a system of 7 audio devices would be completely mapped after 7*3 m20 s=23 m20 s. When cycling through frequencies/bands, and multiple gaps are forced at once, in these examples the gaps will be spaced as far apart in frequency as possible for efficiency when covering the spectrum.

Figure 23B:
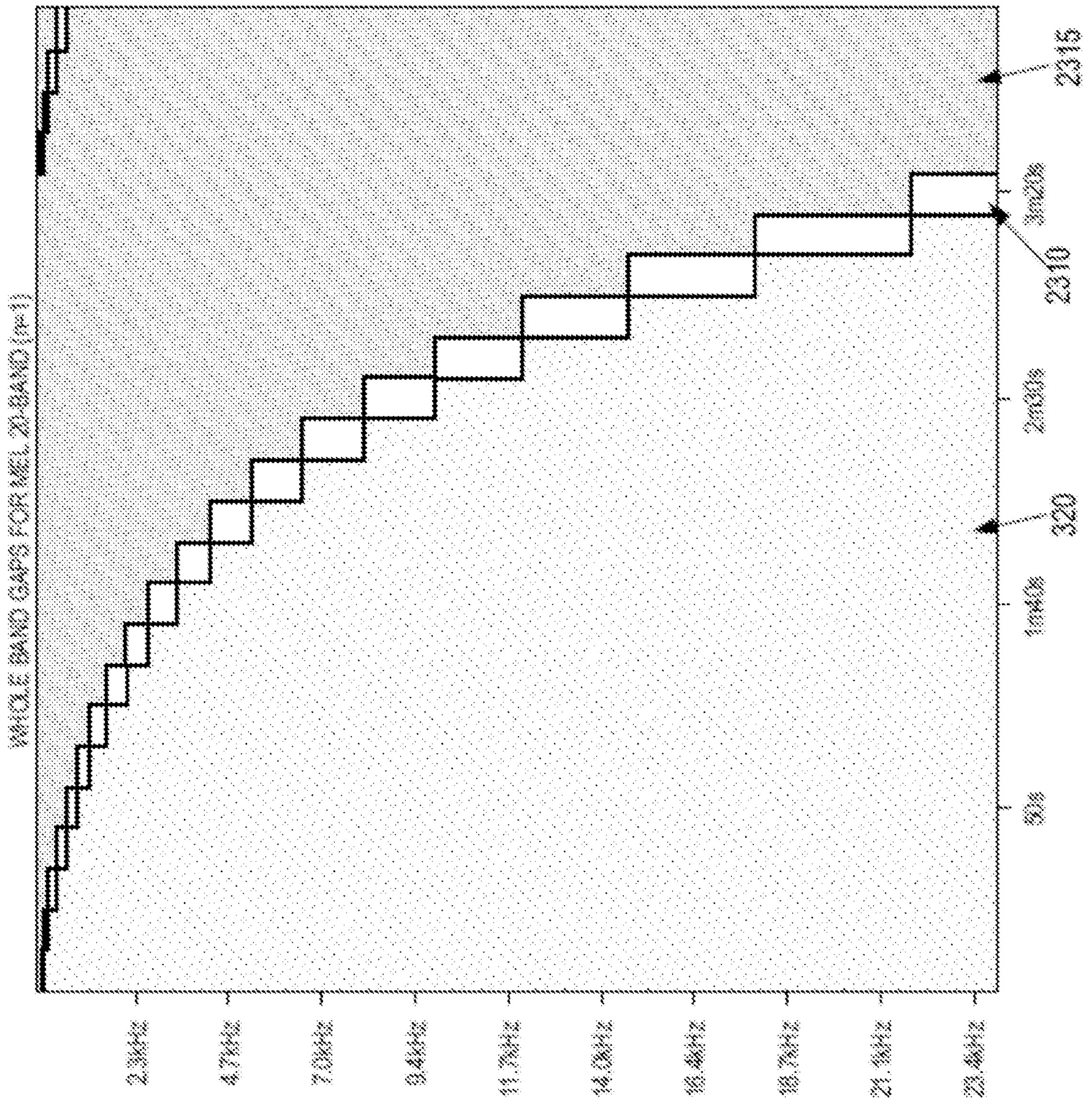
FIGS. 23B, 23C, 23D and 23E are graphs that show examples of gap allocation strategies.
Figure 23C:
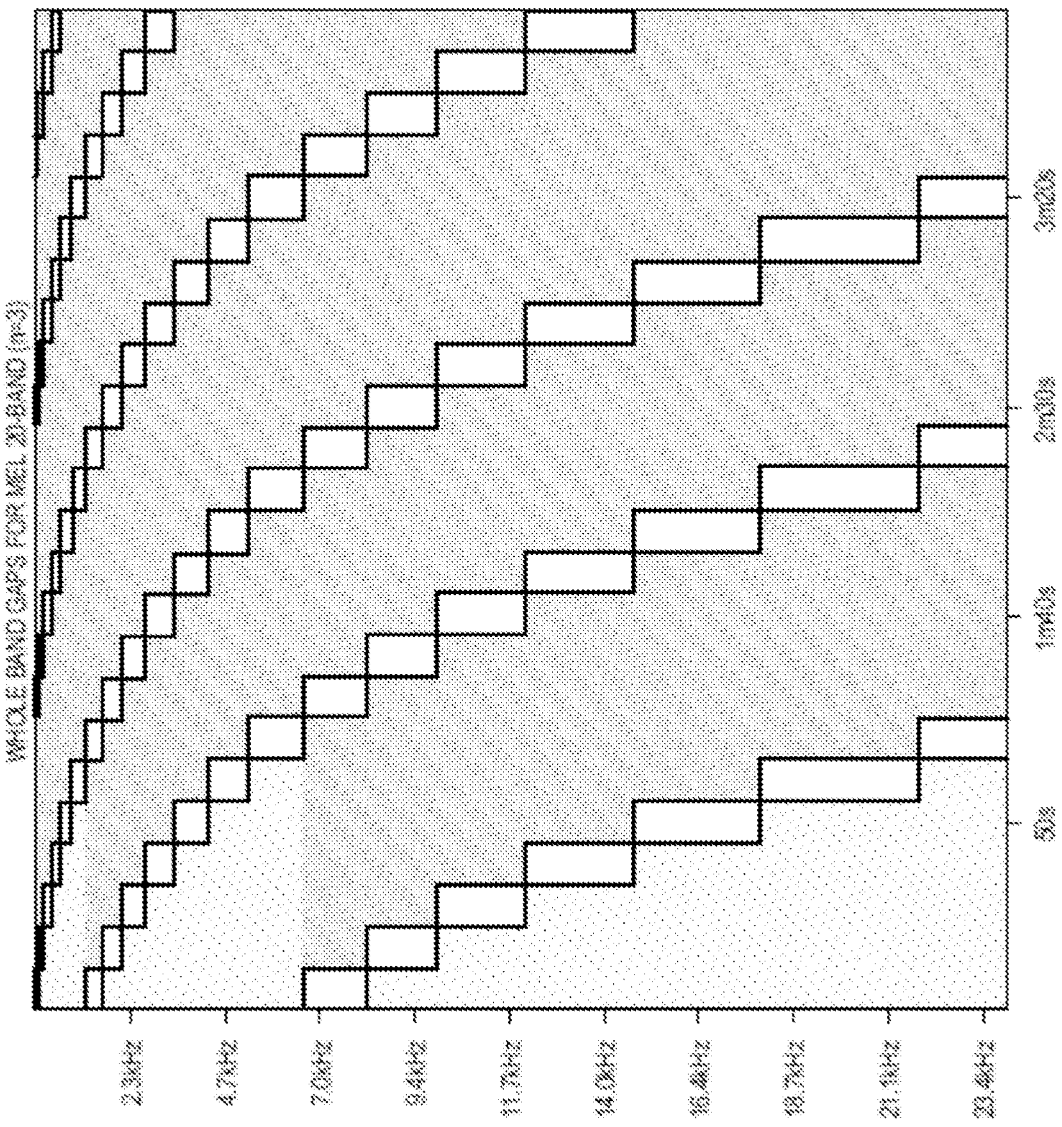

FIGS. 23B and 23C are graphs that show examples of sequences of orchestrated gaps according to one gap allocation strategy. In these examples, the gap allocation strategy involves gapping N entire frequency bands (each of the frequency bands including at least one frequency bin, and in most cases a plurality of frequency bins) at a time during each successive measurement session. In FIG. 23B N=1 and in FIG. 23C N=3, the latter of which means that example of FIG. 23C involves inserting three gaps during the same time interval. In these examples, the banding structure used is a 20-band Mel spaced arrangement. According to some such examples, after all 20 frequency bands have been measured, the sequence may restart. Although 3 m20 s is a reasonable time to reach a full measurement, the gaps being punched in the critical audio region of 300 Hz-8 kHz are very wide, and much time is devoted to measuring outside this region. Because of the relatively wide gaps in the frequency range of 300 Hz-8 kHz, this particular strategy will be very perceptible to users.

Figure 23D:
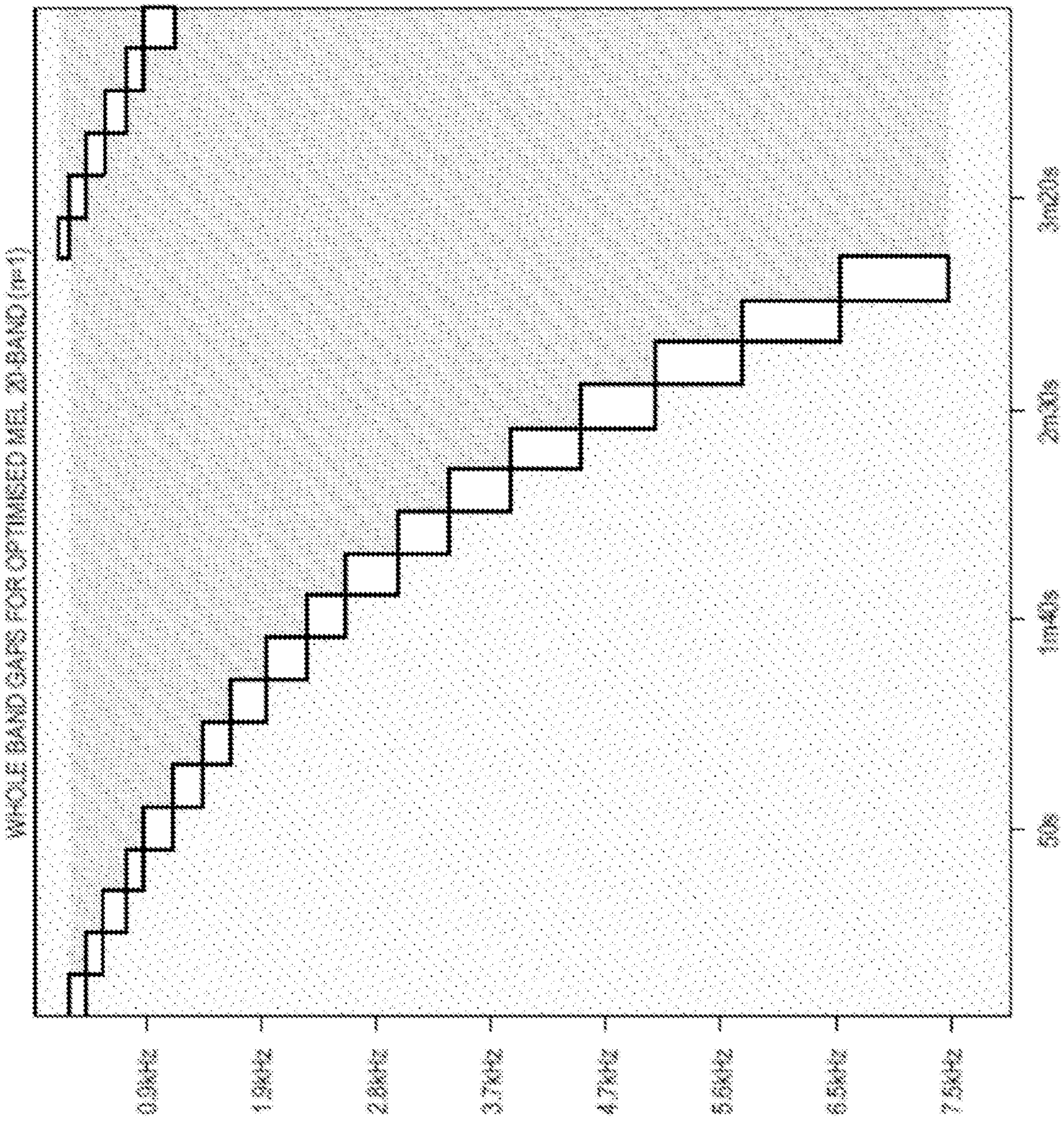
Figure 23E:
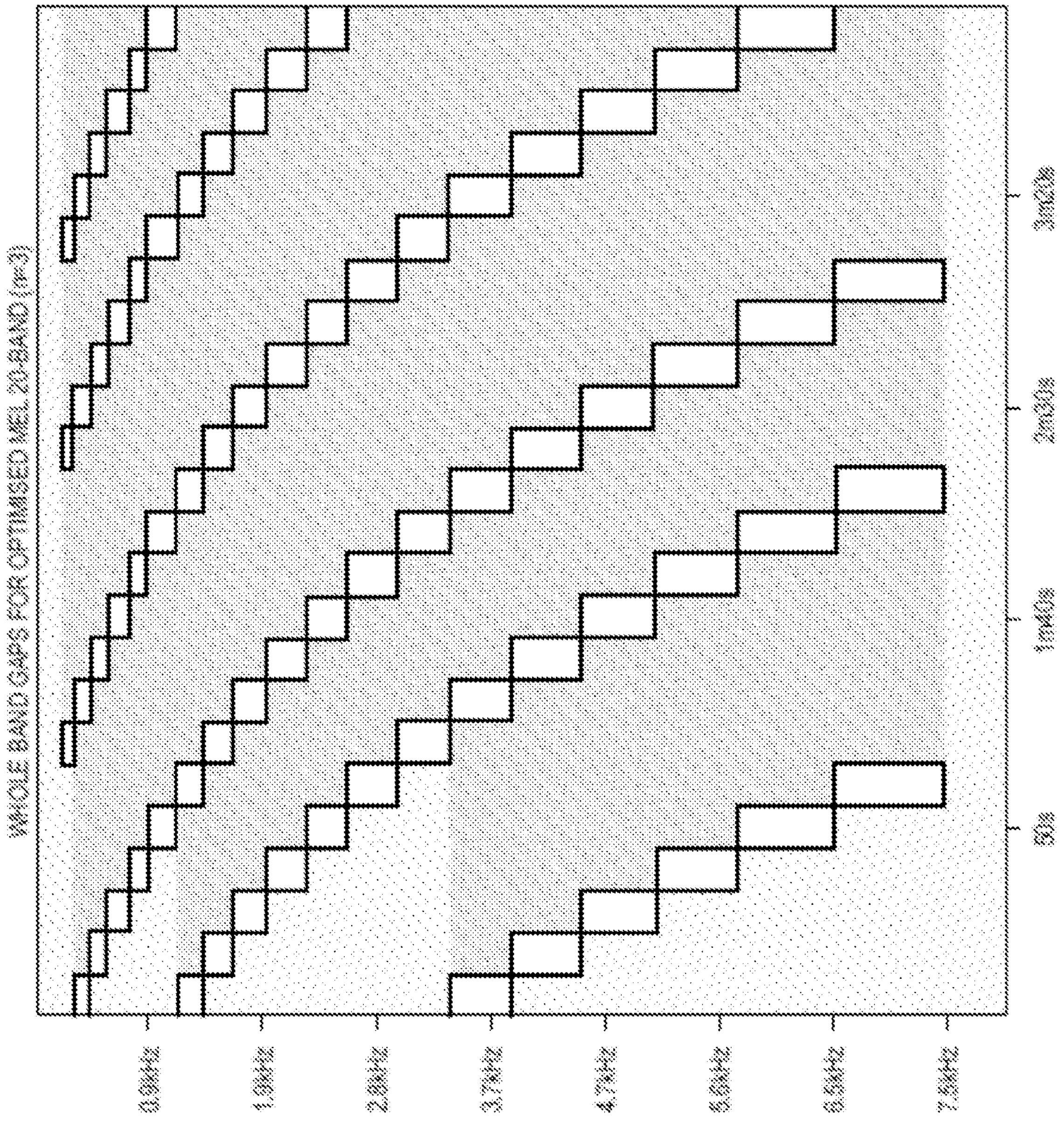

FIGS. 23D and 23E are graphs that show examples of sequences of orchestrated gaps according to another gap allocation strategy. In these examples, the gap allocation strategy involves modifying the banding structure shown in FIGS. 23B and 23C to map to the "optimized" frequency region of approximately 300 Hz to 8 kHz. The overall allocation strategy is otherwise unchanged from that represented by FIGS. 23B and 23C, though the sequence finishes slightly earlier as the 20th band is now ignored. The bandwidths of the gaps being forced here will still be perceptible. However, the benefit is a very rapid measurement of the optimized frequency region, especially if gaps are forced into multiple frequency bands at once.

Figure 24:
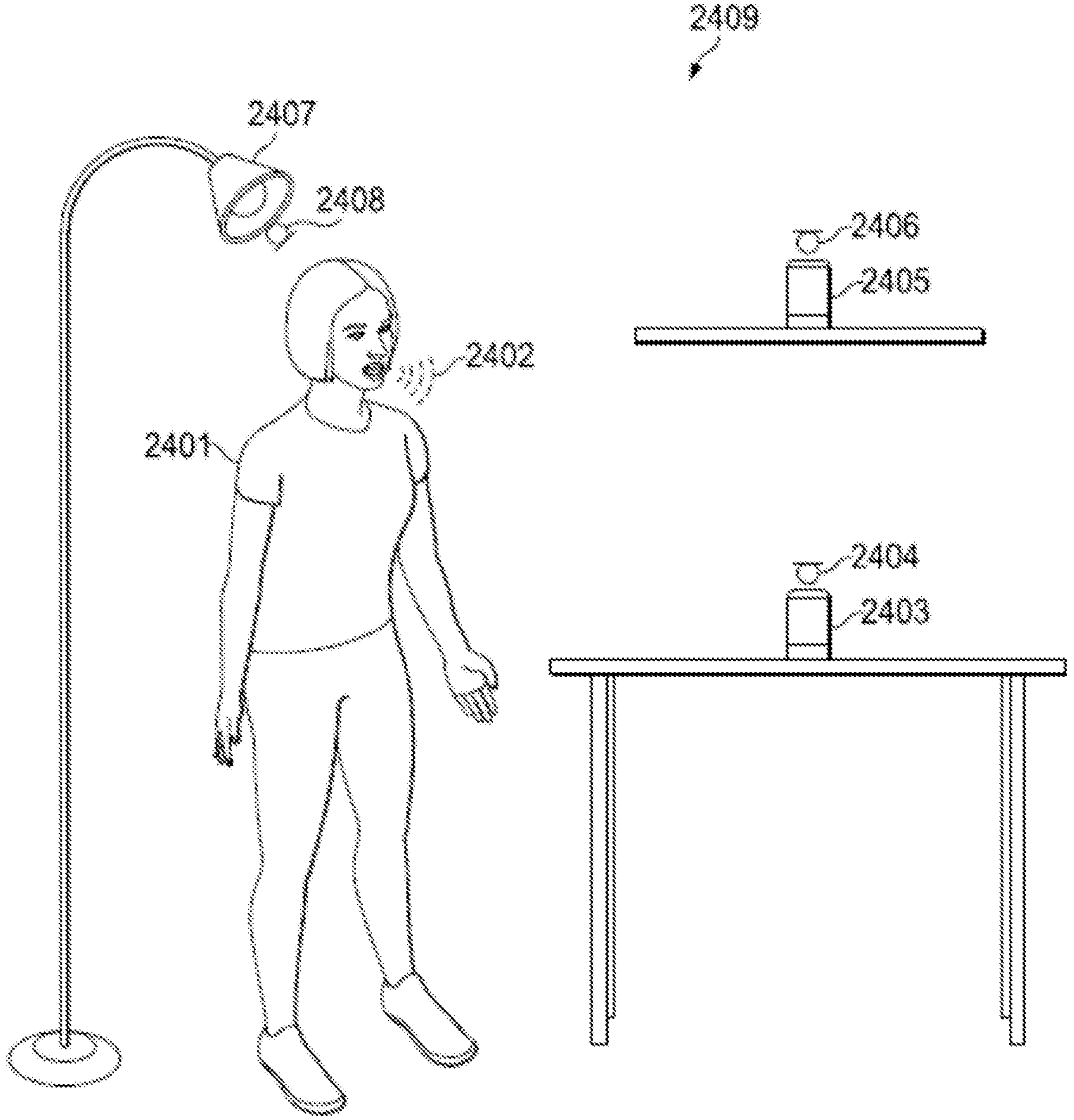
FIG. 24 shows another example of an audio environment.

FIG. 24 shows another example of an audio environment. In FIG. 24, the environment 2409 (an acoustic space) includes a user (2401) who utters direct speech 2402, and an example of a system including a set of smart audio devices (2403 and 2405), speakers for audio output, and microphones. The system may be configured in accordance with an embodiment of the present disclosure. The speech uttered by user 2401 (sometimes referred to herein as a talker) may be recognized by element(s) of the system in the orchestrated time-frequency gaps.

More specifically, elements of the FIG. 24 system include:

2402: direct local voice (produced by the user 2401);

2403: voice assistant device (coupled to one or more loudspeakers). Device 2403 is positioned nearer to the user 2401 than is device 2405, and thus device 2403 is sometimes referred to as a "near" device, and device 2405 is referred to as a "distant" device;

2404: plurality of microphones in (or coupled to) the near device 2403;

2405: voice assistant device (coupled to one or more loudspeakers);

2406: plurality of microphones in (or coupled to) the distant device 2405;

2407: Household appliance (e.g. a lamp); and

2408: Plurality of microphones in (or coupled to) household appliance 2407. In some examples, each of the microphones 2408 may be configured for communication with a device configured for implementing a classifier, which may in some instances be at least one of devices 2403 or 2405.

The FIG. 24 system may also include at least one classifier. For example, device 2403 (and/or device 2405) may include a classifier. Alternatively, or additionally, the classifier may be implemented by another device that may be configured for communication with devices 2403 and/or 2405. In some examples, a classifier may be implemented by another local device (e.g., a device within the environment 2409), whereas in other examples a classifier may be implemented by a remote device that is located outside of the environment 2409 (e.g., a server).

In some implementations, a control system (e.g., the control system 160 of FIG. 1B) may be configured for implementing a classifier, e.g., such as those disclosed herein. Alternatively, or additionally, the control system 160 may be configured for determining, based at least in part on output from the classifier, an estimate of a user zone in which a user is currently located.

Figure 25A:
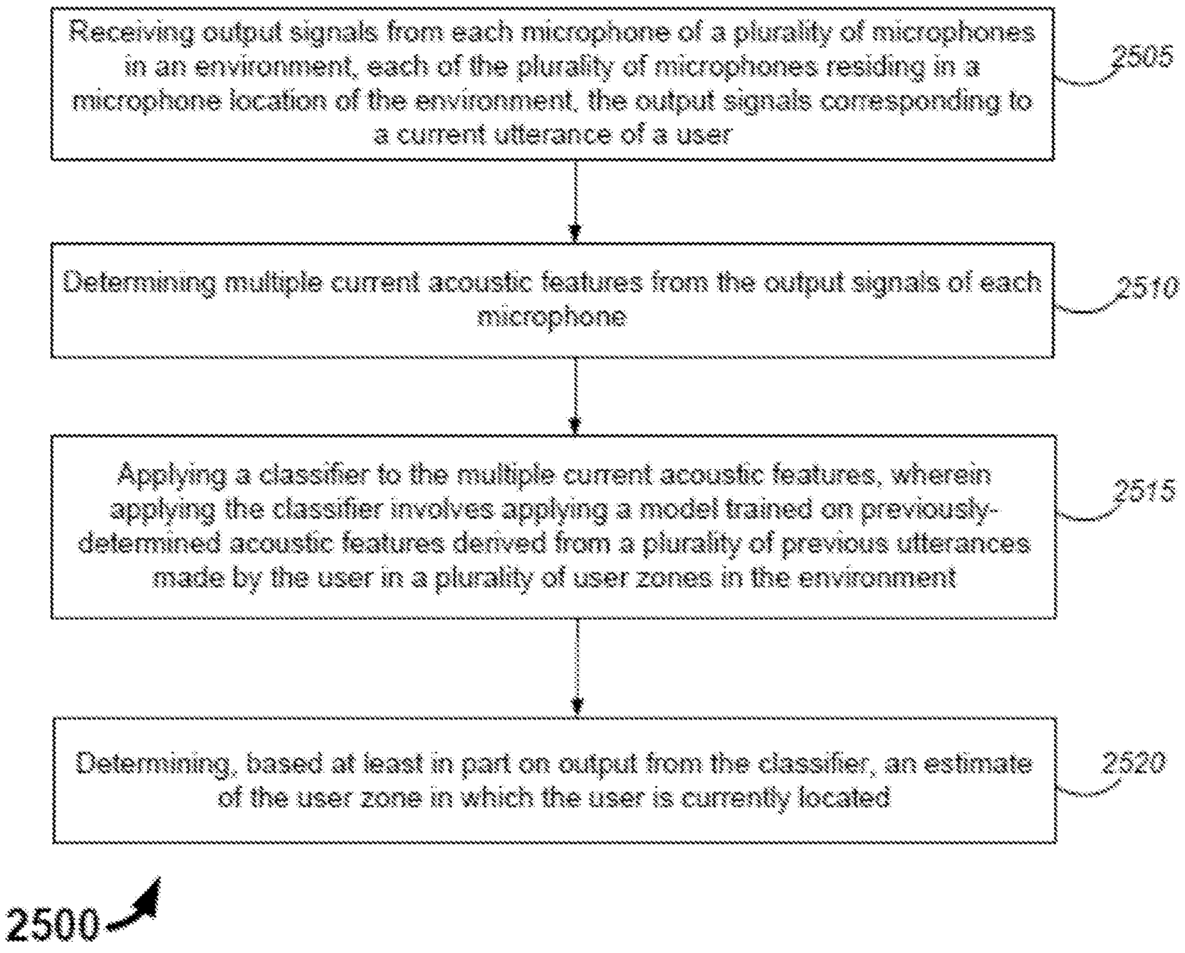
FIG. 25A is a flow diagram that outlines one example of a method that may be performed by an apparatus such as that shown in FIG. 1B.

FIG. 25A is a flow diagram that outlines one example of a method that may be performed by an apparatus such as that shown in FIG. 1B. The blocks of method 2500, like other methods described herein, are not necessarily performed in the order indicated. Moreover, such methods may include more or fewer blocks than shown and/or described. In this implementation, method 2500 involves estimating a user's location in an environment.

In this example, block 2505 involves receiving output signals from each microphone of a plurality of microphones in the environment. In this instance, each of the plurality of microphones resides in a microphone location of the environment. According to this example, the output signals correspond to a current utterance of a user measured during orchestrated gaps in the playback content. Block 2505 may, for example, involve a control system (such as the control system 160 of FIG. 1B) receiving output signals from each microphone of a plurality of microphones in the environment via an interface system (such as the interface system 155 of FIG. 1*i*).

In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock. In some instances, at least one of the microphones in the environment may be included, in or configured for communication with, a smart audio device.

According to this example, block 2510 involves determining multiple current acoustic features from the output signals of each microphone. In this example, the "current acoustic features" are acoustic features derived from the "current utterance" of block 2505. In some implementations, block 2510 may involve receiving the multiple current acoustic features from one or more other devices. For example, block 2510 may involve receiving at least some of the multiple current acoustic features from one or more speech detectors implemented by one or more other devices. Alternatively, or additionally, in some implementations block 2510 may involve determining the multiple current acoustic features from the output signals.

Whether the acoustic features are determined by a single device or multiple devices, the acoustic features may be determined asynchronously. If the acoustic features are determined by multiple devices, the acoustic features would generally be determined asynchronously unless the devices were configured to coordinate the process of determining acoustic features. If the acoustic features are determined by a single device, in some implementations the acoustic features may nonetheless be determined asynchronously because the single device may receive the output signals of each microphone at different times. In some examples, the acoustic features may be determined asynchronously because at least some of the microphones in the environment may provide output signals that are asynchronous with respect to the output signals provided by one or more other microphones.

In some examples, the acoustic features may include a speech confidence metric, corresponding to speech measured during orchestrated gaps in the output playback signal.

Alternatively, or additionally, the acoustic features may include one or more of the following:

- Band powers in frequency bands weighted for human speech. For example, acoustic features may be based upon only a particular frequency band (for example, 400 Hz-1.5 kHz). Higher and lower frequencies may, in this example, be disregarded.
- Per-band or per-bin voice activity detector confidence in frequency bands or bins corresponding to gaps orchestrated in the playback content.
- Acoustic features may be based, at least in part, on a long-term noise estimate so as to ignore microphones that have a poor signal-to-noise ratio.
- Kurtosis as a measure of speech peakiness. Kurtosis can be an indicator of smearing by a long reverberation tail.

According to this example, block 2515 involves applying a classifier to the multiple current acoustic features. In some such examples, applying the classifier may involve applying a model trained on previously-determined acoustic features derived from a plurality of previous utterances made by the user in a plurality of user zones in the environment. Various examples are provided herein.

In some examples, the user zones may include a sink area, a food preparation area, a refrigerator area, a dining area, a couch area, a television area, a bedroom area and/or a doorway area. According to some examples, one or more of the user zones may be a predetermined user zone. In some such examples, one or more predetermined user zones may have been selectable by a user during a training process.

In some implementations, applying the classifier may involve applying a Gaussian Mixture Model trained on the previous utterances. According to some such implementations, applying the classifier may involve applying a Gaussian Mixture Model trained on one or more of normalized speech confidence, normalized mean received level, or maximum received level of the previous utterances. However, in alternative implementations applying the classifier may be based on a different model, such as one of the other models disclosed herein. In some instances, the model may be trained using training data that is labelled with user zones. However, in some examples applying the classifier involves applying a model trained using unlabelled training data that is not labelled with user zones.

In some examples, the previous utterances may have been, or may have included, speech utterances. According to some such examples, the previous utterances and the current utterance may have been utterances of the same speech.

In this example, block 2520 involves determining, based at least in part on output from the classifier, an estimate of the user zone in which the user is currently located. In some such examples, the estimate may be determined without reference to geometric locations of the plurality of microphones. For example, the estimate may be determined without reference to the coordinates of individual microphones. In some examples, the estimate may be determined without estimating a geometric location of the user. However, in alternative implementations, a location estimate may involve estimating a geometric location of one or more people and/or one or more audio devices in the audio environment, e.g., with reference to a coordinate system.

Some implementations of the method 2500 may involve selecting at least one speaker according to the estimated user zone. Some such implementations may involve controlling at least one selected speaker to provide sound to the estimated user zone. Alternatively, or additionally, some implementations of the method 2500 may involve selecting at least one microphone according to the estimated user zone. Some such implementations may involve providing signals output by at least one selected microphone to a smart audio device.

Figure 25B:
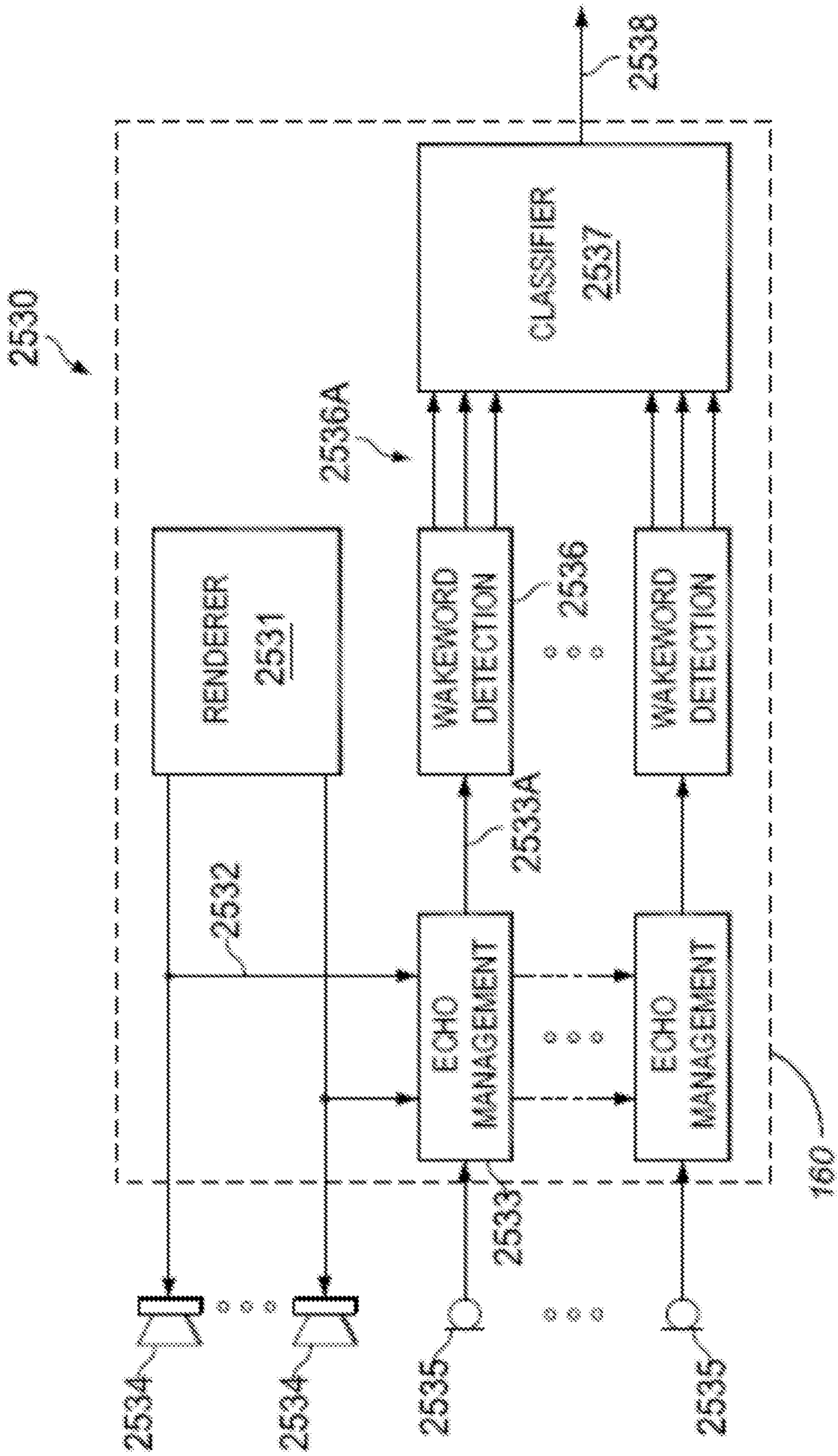
FIG. 25B is a block diagram of elements of one example of an embodiment that is configured to implement a zone classifier.

FIG. 25B is a block diagram of elements of one example of an embodiment that is configured to implement a zone classifier. According to this example, system 2530 includes a plurality of loudspeakers 2534 distributed in at least a portion of an environment (e.g., an environment such as that illustrated in FIG. 21 or FIG. 24). In this example, the system 2530 includes a multichannel loudspeaker renderer 2531. According to this implementation, the outputs of the multichannel loudspeaker renderer 2531 serve as both loudspeaker driving signals (speaker feeds for driving speakers 2534) and echo references. In this implementation, the echo references are provided to echo management subsystems 2533 via a plurality of loudspeaker reference channels 2532, which include at least some of the speaker feed signals output from renderer 2531.

In this implementation, the system 2530 includes a plurality of echo management subsystems 2533. In this example, the renderer 2531, the echo management subsystems 2533, the wakeword detectors 2536 and the classifier 2537 are implemented via an instance of the control system 160 that is described above with reference to FIG. 1B. According to this example, the echo management subsystems 2533 are configured to implement one or more echo suppression processes and/or one or more echo cancellation processes. In this example, each of the echo management subsystems 2533 provides a corresponding echo management output 2533A to one of the wakeword detectors 2536. The echo management output 2533A has attenuated echo relative to the input to the relevant one of the echo management subsystems 2533.

According to this implementation, the system 2530 includes N microphones 2535 (N being an integer) distributed in at least a portion of the audio environment (e.g., the audio environment illustrated in FIG. 21 or FIG. 24). The microphones may include array microphones and/or spot microphones. For example, one or more smart audio devices located in the environment may include an array of microphones. In this example, the outputs of microphones 2535 are provided as input to the echo management subsystems 2533. According to this implementation, each of echo management subsystems 2533 captures the output of an individual microphone 2535 or an individual group or subset of the microphones 2535).

In this example, the system 2530 includes a plurality of wakeword detectors 2536. According to this example, each of the wakeword detectors 2536 receives the audio output from one of the echo management subsystems 2533 and outputs a plurality of acoustic features 2536A. The acoustic features 2536A output from each echo management subsystem 2533 may include (but are not limited to): wakeword confidence, wakeword duration and measures of received level. Although three arrows, depicting three acoustic features 2536A, are shown as being output from each echo management subsystem 2533, more or fewer acoustic features 2536A may be output in alternative implementations. Moreover, although these three arrows are impinging on the classifier 2537 along a more or less vertical line, this does not indicate that the classifier 2537 necessarily receives the acoustic features 2536A from all of the wakeword detectors 2536 at the same time. As noted elsewhere herein, the acoustic features 2536A may, in some instances, be determined and/or provided to the classifier asynchronously.

According to this implementation, the system 2530 includes a zone classifier 2537, which may also be referred to as a classifier 2537. In this example, the classifier receives the plurality of features 2536A from the plurality of wakeword detectors 2536 for a plurality of (e.g., all of) the microphones 2535 in the environment. According to this example, the output 2538 of the zone classifier 2537 corresponds to an estimate of the user zone in which the user is currently located. According to some such examples, the output 2538 may correspond to one or more posterior probabilities. An estimate of the user zone in which the user is currently located may be, or may correspond to, a maximum a posteriori probability according to Bayesian statistics.

We next describe example implementations of a classifier, which may in some examples correspond with the zone classifier 2537 of FIG. 25B. Let $x_i(n)$ be the ith microphone signal, i={1 . . . N}, at discrete time n (i.e., the microphone signals $x_i(n)$ are the outputs of the N microphones 2535). Processing of the N signals $x_i(n)$ in echo management subsystems 2533 generates 'clean' microphone signals $e_i(n)$, where i={1 . . . N}, each at a discrete time n. Clean signals $e_i(n)$, referred to as 2533A in FIG. 25B, are fed to wakeword detectors 2536 in this example. Here, each wakeword detector 2536 produces a vector of features $w_i(j)$, referred to as 2536A in FIG. 25B, where j={1 . . . J} is an index corresponding to the jth wakeword utterance. In this example, the classifier 2537 takes as input an aggregate feature set $W(j)=[w_1^T(j) \ldots w_N^T(j)]^T$.

According to some implementations, a set of zone labels $C_k$, for k={1 . . . K}, may correspond to a number, K, of different user zones in an environment. For example, the user zones may include a couch zone, a kitchen zone, a reading chair zone, etc. Some examples may define more than one zone within a kitchen or other room. For example, a kitchen area may include a sink zone, a food preparation zone, a refrigerator zone and a dining zone. Similarly, a living room area may include a couch zone, a television zone, a reading chair zone, one or more doorway zones, etc. The zone labels for these zones may be selectable by a user, e.g., during a training phase.

In some implementations, classifier 2537 estimates posterior probabilities $p(C_k|W(j))$ of the feature set W(j), for example by using a Bayesian classifier. Probabilities $p(C_k|W(j))$ indicate a probability (for the "j"th utterance and the "k"th zone, for each of the zones $C_k$, and each of the utterances) that the user is in each of the zones $C_k$, and are an example of output 2538 of classifier 2537.

According to some examples, training data may be gathered (e.g., for each user zone) by prompting a user to select or define a zone, e.g., a couch zone. The training process may involve prompting the user make a training utterance, such as a wakeword, in the vicinity of a selected or defined zone. In a couch zone example, the training process may involve prompting the user to make the training utterance at the center and extreme edges of a couch. The training process may involve prompting the user to repeat the training utterance several times at each location within the user zone. The user may then be prompted to move to another user zone and to continue until all designated user zones have been covered.

Figure 26:
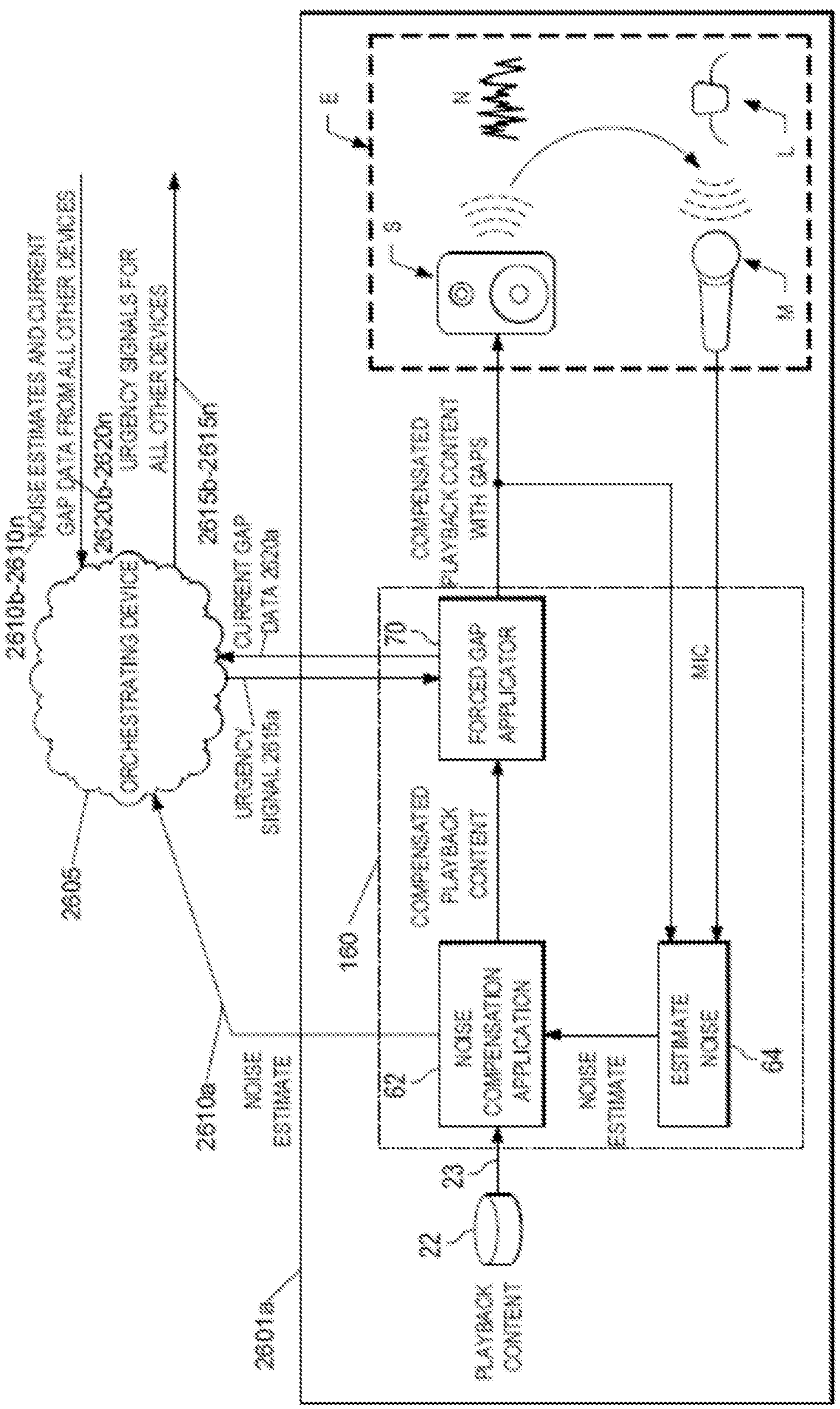
FIG. 26 presents a block diagram of one example of a system for orchestrated gap insertion.

FIG. 26 presents a block diagram of one example of a system for orchestrated gap insertion. The system of FIG. 26 includes an audio device 2601*a*, which is an instance of the apparatus 150 of FIG. 1B and which includes a control system 160 that is configured to implement a noise estimation subsystem (noise estimator) 64, noise compensation gain application subsystem (noise compensation subsystem) 62, and forced gap application subsystem (forced gap applicator) 70. In this example, audio devices 2601*b*-2601*n* are also present in the playback environment E. In this implementation, each of the audio devices 2601*b*-2601*n* is an instance of the apparatus 150 of FIG. 1B and each includes a control system that is configured to implement an instance of the noise estimation subsystem 64, the noise compensation subsystem 62 and the forced gap application subsystem 70.

According to this example, the FIG. 26 system also includes an orchestrating device 2605, which is also an instance of the apparatus 150 of FIG. 1B. In some examples, the orchestrating device 2605 may be an audio device of the playback environment, such as a smart audio device. In some such examples, the orchestrating device 2605 may be implemented via one of the audio devices 2601*a*-2601*n*. In other examples, the orchestrating device 2605 may be another type of device, such as what is referred to herein as a smart home hub. According to this example, the orchestrating device 2605 includes a control system that is configured to receive noise estimates 2610*a*-2610*n* from the audio devices 2601*a*-2601*n* and to provide urgency signals 2615*a*-2615*n* to the audio devices 2601*a*-2601*n* for controlling each respective instance of the forced gap applicator 70. In this implementation, each instance of the forced gap applicator 70 is configured to determine whether to insert a gap, and if so what type of gap to insert, based on the urgency signals 2615*a*-2615*n*.

According to this example, the audio devices 2601*a*-2601*n* are also configured to provide current gap data 2620*a*-2620*n* to the orchestrating device 2605, indicating what gap, if any, each of the audio devices 2601*a*-2601*n* is implementing. In some examples, the current gap data 2620*a*-2620*n* may indicate a sequence of gaps that an audio device is in the process of applying and corresponding times (e.g., a starting time and a time interval for each gaps or all gaps). In some implementations, the control system of the orchestrating device 2605 may be configured to maintain a data structure indicating, e.g., recent gap data, which audio devices have received recent urgency signals, etc. In the FIG. 26 system, each instance of the forced gap application subsystem 70 operates in response to urgency signals 2615*a*-2615*n*, so that the orchestrating device 2605 has control over forced gap insertion based on the need for gaps in the playback signal.

According to some examples, the urgency signals 2615*a*-2615*n* may indicate a sequence of urgency value sets $[U_0, U_1, \ldots U_N]$, where N is a predetermined number of frequency bands (of the full frequency range of the playback signal) in which subsystem 70 may insert forced gaps (e.g., with one forced gap inserted in each of the bands), and $U_i$ is an urgency value for the "i"th band in which subsystem 70 may insert a forced gap. The urgency values of each urgency value set (corresponding to a time) may be generated in accordance with any disclosed embodiment for determining urgency, and may indicate the urgency for insertion (by subsystem 70) of forced gaps (at the time) in the N bands.

In some implementations, the urgency signals 2615*a*-2615*n* may indicate a fixed (time invariant) urgency value set $[U_0, U_1, \ldots U_N]$ determined by a probability distribution defining a probability of gap insertion for each of the N frequency bands. According to some examples, the probability distribution is implemented with a pseudo-random mechanism so that the outcome (the response of each instance of subsystem 70) is deterministic (e.g., the same) across all of the recipient audio devices 2601*a*-2601*n*. Thus, in response to such a fixed urgency value set, subsystem 70 may be configured to insert fewer forced gaps (on the average) in those bands which have lower urgency values (i.e., lower probability values determined by the pseudo-random probability distribution), and to insert more forced gaps (on the average) in those bands which have higher urgency values (i.e., higher probability values). In some implementations, urgency signals 2615*a*-2615*n* may indicate a sequence of urgency value sets $[U_0, U_1, \ldots U_N]$, e.g., a different urgency value set for each different time in the sequence. Each such different urgency value set may be determined by a different pseudo-random probability distribution for each of the different times.

We next describe methods (which may be implemented in various embodiments of the disclosed pervasive listening method) for determining urgency values or a signal (U) indicative of urgency values.

An urgency value for a frequency band indicates the need for a gap to be forced in the band. We present three strategies for determining urgency values, $U_k$, where $U_k$ denotes urgency for forced gap insertion in band k, and U denotes a vector containing the urgency values for all bands of a set of $B_{count}$ frequency bands:

$$U = [U_0, U_1, U_2, \ldots].$$

The first strategy (sometimes referred to herein as Method 1) determines fixed urgency values. This method is the simplest, simply allowing the urgency vector U to be a predetermined, fixed quantity. When used with a fixed perceptual freedom metric, this can be used to implement a system that randomly inserts forced gaps over time. Some such methods do not require time-dependent urgency values supplied by a pervasive listening application. Thus:

$$U = [u_0, u_1, u_2, \ldots, u_X]$$

where $X = B_{count}$, and each value $u_k$ (for k in the range from k=1 to $k = B_{count}$) represents a predetermined, fixed urgency value for the "k" band. Setting all $u_k$ to 1.0 would express an equal degree of urgency in all frequency bands.

The second strategy (sometimes referred to herein as Method 2) determines urgency values which depend on elapsed time since occurrence of a previous gap. In some implementations, urgency gradually increases over time, and returns to a low value once either a forced or existing gap causes an update in a pervasive listening result (e.g., a background noise estimate update).

Thus, the urgency value $U_k$ in each frequency band (band k) may correspond with a duration of time (e.g., the number of seconds) since a gap was perceived (by a pervasive listener) in band k. In some examples, the urgency value $U_k$ in each frequency band may be determined as follows:

$$U_k(t) = \min(t - t_g, U_{max})$$

where $t_g$ represents the time at which the last gap was seen for band k, and $U_{max}$ represents a tuning parameter which limits urgency to a maximum size. It should be noted that $t_g$ may update based on the presence of gaps originally present in the playback content. For example, in noise compensation, the current noise conditions in the playback environment may determine what is considered a gap in the output playback signal. That is, the playback signal must be quieter when the environment is quiet for a gap to occur, than in the case that the environment is noisier. Likewise, the urgency for frequency bands typically occupied by human speech will typically be of more importance when implementing a pervasive listening method which depends on occurrence or non-occurrence of speech utterances by a user in the playback environment.

The third strategy (sometimes referred to herein as Method 3) determines urgency values which are event based. In this context, "event based" denotes dependent on some event or activity (or need for information) external to the playback environment, or detected or inferred to have occurred in the playback environment. Urgency determined by a pervasive listening subsystem may vary suddenly with the onset of new user behavior or changes in playback environment conditions. For example, such a change may cause one or more devices configured for pervasive listening to have an urgent need to observe background activity in order to make a decision, or to rapidly tailor the playback experience to new conditions, or to implement a change in the general urgency or desired density and time between gaps in each band. Table 3, below, provides a number of examples of contexts and scenarios and corresponding event-based changes in urgency:

TABLE 3

| CONTEXT | Conditions | Change in Urgency | Examples |
|---|---|---|---|
| User Interface | Some played out audio or other modality has requested verbal or auditory response from the user, without pausing or ducking the played out audio | Increase | Incoming message tone waiting for user to "answer" the question "Is this the song you wanted?" by uttering a response |
| Environment Scanning | Occasional deeper probe of background noise and what may be going on in the playback environment | Increase | When the pervasive listener has not detected any user speech or button presses for a while, it may listen closely to see if the user is still present. |
| Request or Metadata Indicating Quality is a Priority | Something from the user, or data available to the pervasive listener, suggests that playback audio should not have forced gaps inserted therein | Decrease | "Dolby" signature voice user says "Play this bit loud and clear" |
| Predictive Behaviour | Points of content that either heuristically or from population data line up with the times that users want to talk or be heard. | Increase or Decrease | 5 s into playback of a new track, expect a "skip" or "turn it up" utterance, or in response to occurrence of offensive language in content look for a parent uttering "stop" |

A fourth strategy (sometimes referred to herein as Method 4) determines urgency values using a combination of two or more of Methods 1, 2, and 3. For example, each of Methods 1, 2, and 3 may be combined into a joint strategy, represented by a generic formulation of the following type:

$$U_k(t) = u_k * \min(t - t_g, U_{max}) * V_k$$

where $u_k$ represents a fixed unitless weighting factor that controls the relative importance of each frequency band, $V_k$ represents a scalar value that is modulated in response to changes in context or user behaviour that require a rapid alteration of urgency, and $t_g$ and $U_{max}$ are defined above. In some examples, the values $V_k$ are expected to remain at a value of 1.0 under normal operation.

In some examples of a multiple-device context, the forced gap applicators of the smart audio devices of an audio environment may co-operate in an orchestrated manner to achieve an accurate estimation of the environmental noise N. In some such implementations, the determination of where forced gaps are introduced in time and frequency may be made by an orchestrating device 2605 implemented by a separate orchestrating device (such as what is referred to elsewhere herein as a smart home hub). In some alternative implementations, the determination of where forced gaps are introduced in time and frequency may be made by one of the smart audio devices acting as a leader (e.g., a smart audio device acting as an orchestrating device 2605).

In some implementations, the orchestrating device 2605 may include a control system that is configured to receive the noise estimates 2610*a*-2610*n* and to provide gap commands to the audio devices 2601*a*-2601*n* which may be based, at least in part, on the noise estimates 2610*a*-2610*n*. In some such examples, the orchestrating device 2605 may provide the gap commands instead of urgency signals. According to some such implementations, the forced gap applicator 70 does not need to determine whether to insert a gap, and if so what type of gap to insert, based on urgency signals, but may instead simply act in accordance with the gap commands.

In some such implementations, the gap commands may indicate the characteristics (e.g., frequency range or $B_{count}$, Z, t1, t2 and/or t3) of one or more specific gaps to be inserted and the time(s) for insertion of the one or more specific gaps. For example, the gap commands may indicate a sequence of gaps and corresponding time intervals such as one of those shown in FIGS. 23B-23E and described above. In some examples, the gap commands may indicate a data structure from which a receiving audio device may access characteristics of a sequence of gaps to be inserted and corresponding time intervals. The data structure may, for example, have been previously provided to the receiving audio device. In some such examples, the orchestrating device 2605 may include a control system that is configured to make urgency calculations for determining when to send the gaps commands and what type of gap commands to send.

According to some examples, an urgency signal may be estimated, at least in part, by the noise estimation element 64 of one or more of the audio devices 2601*a*-2601*n* and may be transmitted to the orchestrating device 2605. The decision to orchestrate a forced gap in a particular frequency region and place in time may, in some examples, be determined at least in part by an aggregate of these urgency signals from one or more of the audio devices 2601*a*-2601*n*. For example, the disclosed algorithms that make a choice informed by urgency may instead use the maximum urgency as computed across the urgency signal of multiple audio devices, e.g., Urgency=maximum(UrgencyA, UrgencyB, UrgencyC, . . . ) where UrgencyA/B/C are understood as the urgency signals of three separate example devices implementing noise compensation.

Noise compensation systems (e.g., that of FIG. 26) can function with weak or non-existent echo cancellation (e.g., when implemented as described in U.S. Provisional Patent Application No. 62/663,302, which is hereby incorporated by reference), but may suffer from content-dependent response times especially in the case of music, TV, and movie content. The time taken by a noise compensation system to respond to changes in the profile of background noise in the playback environment can be very important to the user experience, sometimes more so than the accuracy of the actual noise estimate. When the playback content provides few or no gaps in which to glimpse the background noise, the noise estimates may remain fixed even when noise conditions change. While interpolating and imputing missing values in a noise estimate spectrum is typically helpful, it is still possible for large regions of the noise estimate spectrum to become locked up and stale.

Some embodiments of the FIG. 26 system may be operable to provide forced gaps (in the playback signal) which occur sufficiently often (e.g., in each frequency band of interest of the output of forced gap applicator 70) that background noise estimates (by noise estimator 64) can be updated sufficiently often to respond to typical changes in profile of background noise N in playback environment E. In some examples, subsystem 70 may be configured to introduce forced gaps in the compensated audio playback signal (having K channels, where K is a positive integer) which is output from noise compensation subsystem 62. Here, noise estimator 64 may be configured to search for gaps (including forced gaps inserted by subsystem 70) in each channel of the compensated audio playback signal, and to generate noise estimates for the frequency bands (and in the time intervals) in which the gaps occur. In this example, the noise estimator 64 of audio device 2601*a* is configured to provide a noise estimate 2610*a* to the noise compensation subsystem 62. According to some examples, the noise estimator 64 of audio device 2601*a* may also be configured to use the resulting information regarding detected gaps to generate (and provide to the orchestrating device 2605) an estimated urgency signal, whose urgency values track the urgency for inserting forced gaps in frequency bands of the compensated audio playback signal.

In this example, the noise estimator 64 is configured to accept both microphone feed Mic (the output of microphone M in playback environment E) and a reference of the compensated audio playback signal (the input to speaker system S in playback environment E). According to this example, the noise estimates generated in subsystem 64 are provided to noise compensation subsystem 62, which applies compensation gains to input playback signal 23 (from content source 22) to level each frequency band thereof to the desired playback level. In this example, the noise compensated audio playback signal (output from subsystem 62) and an urgency metric per band (indicated by the urgency signal output from the orchestrating device 2605) are provided to forced gap applicator 70, which forces gaps in the compensated playback signal (preferably in accordance with an optimization process). Speaker feed(s), each indicative of the content of a different channel of the noise compensated playback signal (output from forced gap applicator 70), are (is) provided to each speaker of speaker system S.

Although some implementations of the FIG. 26 system may perform echo cancellation as an element of the noise estimation that it performs, other implementations of the FIG. 26 system do not perform echo cancellation. Accordingly, elements for implementing echo cancellation are not specifically shown in FIG. 26.

In FIG. 26, the time domain-to-frequency domain (and/or frequency domain-to-time domain) transformations of signals are not shown, but the application of noise compensation gains (in subsystem 62), analysis of content for gap forcing (in orchestrating device 2605, noise estimator 64 and/or forced gap applicator 70) and insertion of forced gaps (by forced gap applicator 70) may be implemented in the same transform domain for convenience, with the resulting output audio resynthesised to pulse code modulated (PCM) audio in the time domain before playback or further encoding for transmission. According to some examples, each participating device co-ordinates the forcing of such gaps using methods described elsewhere herein. In some such examples, the gaps introduced may be identical. In some examples the gaps introduced may be synchronized.

By use of forced gap applicator 70, present on each participating device, inserting gaps, the number of gaps in each channel of the compensated playback signal (output from noise compensation subsystem 62 of the FIG. 26 system) may be increased (relative to the number of gaps which would occur without use of forced gap applicator 70), so as to significantly reduce the requirements on any echo canceller implemented by the FIG. 26 system, and in some cases even to eliminate the need for echo cancellation entirely.

In some disclosed implementations, it is possible for simple post-processing circuitry such as time-domain peak limiting or speaker protection to be implemented between the forced gap applicator 70 and speaker system S. However post-processing with the ability to boost and compress the speaker feeds has the potential to undo or lower the quality of the forced gaps inserted by the forced gap applicator, and thus these types of post-processing are preferably implemented at a point in the signal processing path before forced gap applicator 70.

Figure 27A:
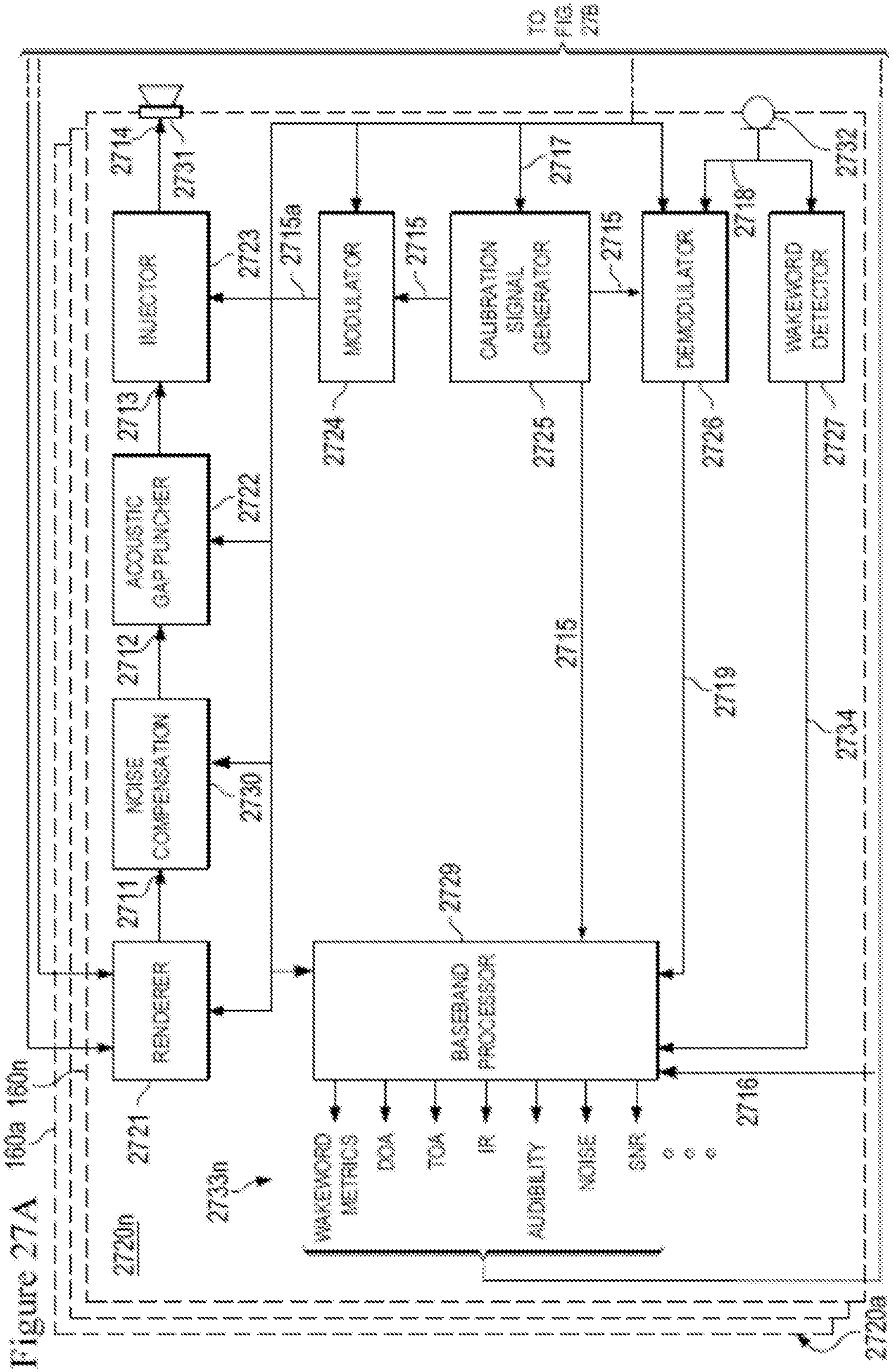
FIGS. 27A and 27B illustrate a system block diagram that shows examples of elements of an orchestrating device and elements of orchestrated audio devices according to some disclosed implementations.
Figure 27B:
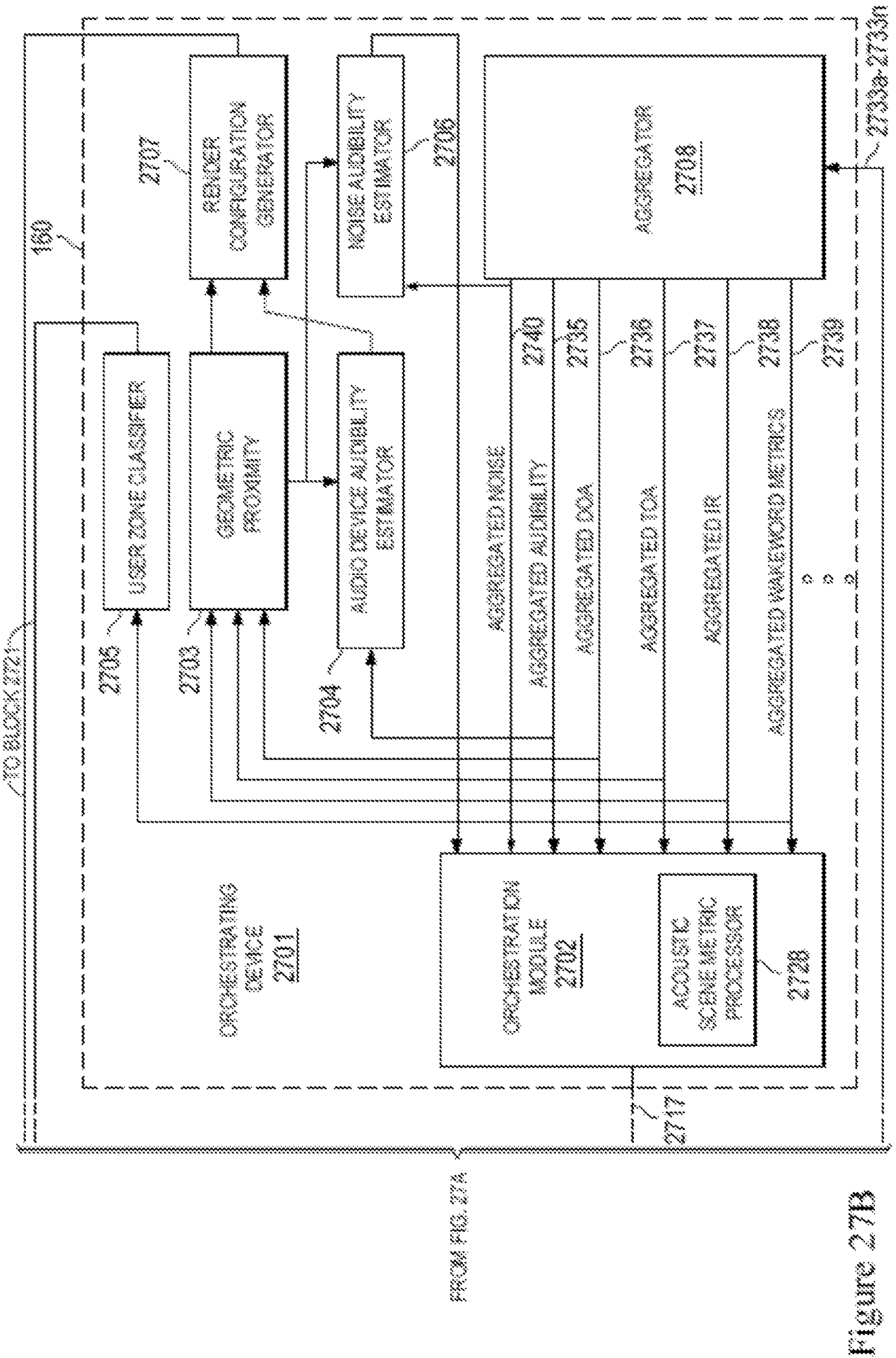

FIGS. 27A and 27B illustrate a system block diagram that shows examples of elements of an orchestrating device and elements of orchestrated audio devices according to some disclosed implementations. As with other figures provided herein, the types and numbers of elements shown in FIGS. 27A and 27B are merely provided by way of example. Other implementations may include more, fewer, different types and/or different numbers of elements. In this example, the orchestrated audio devices 2720*a*-2720*n* and the orchestrating device 2701 of FIGS. 27A and 27B are instances of the apparatus 150 that is described above with reference to FIG. 1B.

According to this implementation, each of the orchestrated audio devices 2720*a*-2720*n* includes the following elements:

2731: An instance of the loudspeaker system 110 of FIG. 1B, which includes one or more loudspeakers;

2732: An instance of the microphone system 111 of FIG. 1B, which includes one or more microphones;

2711: Audio playback signals output by the rendering module 2721, which is an instance of the rendering module 210A of FIG. 2 in this example. According to this example, the rendering module 2721 is controlled according to instructions from the orchestration module 2702 and may also receive information and/or instructions from the user zone classifier 2705 and/or the rendering configuration module 2707;

2712: Noise-compensated audio playback signals output by the noise compensation module 2721, which is an instance of the noise compensation subsystem 62 of FIG. 26 in this example;

2713: Noise-compensated audio playback signals including one or more gaps, output by the acoustic gap puncher 2722, which is an instance of the forced gap applicator 70 of FIG. 26 in this example. In this example, the acoustic gap puncher 2722 is controlled according to instructions from the orchestration module 2702;

2714: Modified audio playback signals output by the calibration signal injector 2723, which is an instance of the calibration signal injector 211A of FIG. 2 in this example;

2715: Calibration signals output by the calibration signal generator 2725, which is an instance of the calibration signal generator 212A of FIG. 2 in this example;

2716: Calibration signal replicas corresponding to calibration signals generated by other audio devices of the audio environment (in this example, by one or more of the audio devices audio devices 2720*b*-2720*n*). The calibration signal replicas 2716 may, for example, be instances of the calibration signal replicas 204A that are described above with reference to FIG. 2. In some examples, the calibration signal replicas 2716 may be received (e.g., via a wireless communication protocol such as Wi-Fi or Bluetooth™) from the orchestrating device 2701;

2717: control information pertaining to and/or used by one or more of the audio devices in the audio environment. In this example, the control information 2717 is provided by the orchestrating device 2701 that is described below with reference to FIG. 27B (e.g., by the orchestration module 2702). The control information 2717 may, for example, include instances of the calibration information 205A that is described above with reference to FIG. 2, or instances of the calibration signal parameters that are disclosed elsewhere herein. The control information 2717 may include parameters to be used by the control system 160*n* to generate calibration signals, to modulate calibration signals, to demodulate the calibration signals, etc. The control information 2717 may, in some examples, include one or more DSSS spreading code parameters and one or more DSSS carrier wave parameters. The control information 2717 may, in some examples, include information for controlling the rendering module 2721, the noise compensation module 2711, the acoustic gap puncher 2712 and/or the baseband processor 2729;

2718: Microphone signals received by the microphone(s) 2732;

2719: Demodulated coherent baseband signals, which may be instances of the demodulated coherent baseband signals 208 and 208A that are described above with reference to FIGS. 2-4 and 17;

2721: A rendering module that is configured to render audio signals of a content stream such as music, audio data for movies and TV programs, etc., to produce audio playback signals;

2723: A calibration signal injector configured to insert calibration signals 2715*a* modulated by the calibration signal modulator 2724 (or, in some instances in which the calibration signals do not require modulation, calibration signals 2715 generated by the calibration signal generator 2725) into the audio playback signals produced by the rendering module 2721 (which, in this example, have been modified by the noise compensation module 2730 and the acoustic gap puncher 2722) to generate modified audio playback signals 2714. The insertion process may, for example, be a mixing process wherein calibration signals 2715 or 2715*a* are mixed with the audio playback signals produced by the rendering module 210A (which, in this example, have been modified by the noise compensation module 2730 and the acoustic gap puncher 2722), to generate the modified audio playback signals 2714;

2724: An optional calibration signal modulator configured to modulate calibration signals 2715 generated by the calibration signal generator 2725, to produce the modulated calibration signals 2715*a;*

2725: A calibration signal generator configured to generate the calibration signals 2715 and, in this example, to provide the calibration signals 2715 to the calibration signal modulator 2724 and to the baseband processor 2729. In some examples, the calibration signal generator 2725 may be an instance of the calibration signal generator 212A that is described above with reference to FIG. 2. According to some examples, the calibration signal generator 2725 may include a spreading code generator and a carrier wave generator, e.g., as described above with reference to FIG. 17. In this example, the calibration signal generator 2725 provides the calibration signal replicas 2715 to the baseband processor and to the calibration signal demodulator 2726;

2726: A calibration signal demodulator configured to demodulate microphone signals 2718 received by the microphone(s) 2732. In some examples, the calibration signal demodulator 2726 may be an instance of the calibration signal demodulator 212A that is described above with reference to FIG. 2. In this example the calibration signal demodulator 2726 outputs the demodulated coherent baseband signals 2719. Demodulation of the microphone signals 2718 may, for example, be performed using standard correlation techniques including integrate and dump style matched filtering correlator banks. Some detailed examples are provided herein. In order to improve the performance of these demodulation techniques, in some implementations the microphone signals 2718 may be filtered before demodulation in order to remove unwanted content/phenomena. According to some implementations, the demodulated coherent baseband signals 2719 may be filtered before or after being provided to the baseband processor 2729. The signal-to-noise ratio (SNR) is generally improved as the integration time increases (e.g., as the length of the spreading code used to generate the calibration signal increases);

2729: A baseband processor configured for baseband processing of the demodulated coherent baseband signals 2719. In some examples, the baseband processor 2729 may be configured to implement techniques such as incoherent averaging in order to improve the SNR by reducing the variance of the squared waveform to produce the delay waveform. Some detailed examples are provided herein. In this example, the baseband processor 218A is configured to output one or more estimated acoustic scene metrics 2733;

2730: A noise compensation module configured for compensating for noise in the audio environment. In this example, the noise compensation module 2730 compensates for noise in the audio playback signals 2711 output by the rendering module 2721 based, at least in part, on control information 2717 from the orchestration module 2702. In some implementations, the noise compensation module 2730 may be configured to compensate for noise in the audio playback signals 2711 based, at least in part, on one or more acoustic scene metrics 2733 (e.g., noise information) provided by the baseband processor 2729; and

2733*n*: One or more observations derived by the audio device 2720*n*, e.g., from calibration signals extracted from microphone signals (e.g., from the demodulated coherent baseband signals 2719) and/or from wakeword information 2734 provided by the wakeword detector 2727. These observations are also referred to herein as acoustic scene metrics. The acoustic scene metric(s) 2733 may include, or may be, wakeword metrics, data corresponding to a time of flight, a time of arrival, a range, an audio device audibility, an audio device impulse response, an angle between audio devices, an audio device location, audio environment noise and/or a signal-to-noise ratio. In this example, the orchestrated audio devices 2720*a*-2720*n* are determining the acoustic scene metrics 2733*a*-2733*n*, respectively, and are providing the acoustic scene metrics 2733*a*-2733*n* to the orchestrating device 2701.

According to this implementation, the orchestrating device 2701 includes the following elements:

2702: An orchestration module configured to control various functionalities of the orchestrated audio devices 2720*a*-2720*n*, including but not limited to gap insertion and calibration signal generation in this example. The orchestration module 2702 may, in some implementations, provide one or more of the various functionalities of an orchestrating device that are disclosed herein. Accordingly, the orchestration module 2702 may provide information for controlling one or more aspects of audio processing and/or audio device playback. For example, the orchestration module 2702 may provide calibration signal parameters to the calibration signal generators 2725 (and in this example to the modulators 2724 and the demodulators 2726) of the orchestrated audio devices 2720*a*-2720*n*. The orchestration module 2702 may provide gap insertion information to the acoustic gap punchers 2722 of the orchestrated audio devices 2720*a*-2720*n*. The orchestration module 2702 may provide instructions for coordinating gap insertion and calibration signal generation. The orchestration module 2702 (and in some examples other modules of the orchestrating device 2701, such as the user zone classifier 2705 and the render configuration generator 2707 in this example) may provide instructions for controlling the rendering module 2721;

2703: A geometric proximity estimator, which is configured to estimate the current locations, and in some examples the current orientations, of audio devices in the audio environment. In some examples, the geometric proximity estimator 2703 may be configured to estimate a current location (and in some instances a current orientation) of one or more people in the audio environment. Some examples of geometric proximity estimator functionality are described below with reference to FIG. 41 et seq.;

2704: A audio device audibility estimator, which may be configured for estimating the audibility of one or more loudspeakers in or near the audio environment at an arbitrary location, such as the audibility at a current estimated location of a listener. Some examples of audio device audibility estimator functionality are described below with reference to FIG. 31 et seq. (see, e.g., FIG. 32 and the corresponding description);

2705: A user zone classifier that is configured to estimate a zone of an audio environment (e.g., a couch zone, a kitchen table zone, a refrigerator zone, a reading chair zone, etc.) in which a person is currently located. In some examples, the user zone classifier 2705 may be an instance of the zone classifier 2537, the functionality of which is described above with reference to FIGS. 25A and 25B;

2706: A noise audibility estimator that is configured to estimate noise audibility at an arbitrary location, such as the audibility at a current estimated location of a listener in the audio environment. Some examples of audio device audibility estimator functionality are described below with reference to FIG. 31 et seq. (see, e.g., FIGS. 33 and 34, and the corresponding descriptions). The noise audibility estimator 2706 may, in some examples, estimate noise audibility by interpolating aggregated noise data 2740 from the aggregator 2708. The aggregated noise data 2740 may, for example, be obtained from multiple audio devices of the audio environment (e.g., by multiple baseband processors 2729 and/or other modules implemented by control systems of the audio devices), e.g., by "listening through" gaps that have been inserted in played-back audio data to evaluate noise conditions in the audio environment, e.g., as described above with reference to FIG. 21 et seq.;

2707: A render configuration generator that is configured for generating rendering configurations responsive to the relative positions (and, in this example, the relative audibility) of audio devices and one or more listeners in the audio environment. The render configuration generator 2707 may, for example, provide functionality such as that described below with reference to FIG. 51 et seq.;

2708: An aggregator that is configured to aggregate the acoustic scene metrics 2733*a*-2733*n* received from the orchestrated audio devices 2720*a*-2720*n* and to provide aggregated acoustic scene metrics (in this example, aggregated acoustic scene metrics 2735-2740) to the acoustic scene metric processing module 2728 and other modules of the orchestrating device 2701. Estimates of acoustic scene metrics from baseband processor modules of the orchestrated audio devices 2720*a*-2720*n* will generally arrive asynchronously, so the aggregator 2708 is configured to collect acoustic scene metric data over time, store the acoustic scene metric data in a memory (e.g., a buffer) and pass it to subsequent processing blocks at appropriate times (e.g., after acoustic scene metric data has been received from all orchestrated audio devices). In this example, the aggregator 2708 is configured to provide aggregated audibility data 2735 to the orchestration module 2702 and to the audio device audibility estimator 2704. In this implementation, the aggregator 2708 is configured to provide aggregated noise data 2740 to the orchestration module 2702 and to the noise audibility estimator 2706. According to this implementation, the aggregator 2708 provides aggregated direction-of-arrival (DOA) data 2736, aggregated time-of-arrival (TOA) data 2737 aggregated impulse response (IR) data 2738 to the orchestration module 2702 and to the geometric proximity estimator 2703. In this example, the aggregator 2708 provides aggregated wakeword metrics 2739 to the orchestration module 2702 and to the user zone classifier 2705; and

2728: An acoustic scene metric processing module, which is configured to receive and apply aggregated acoustic scene metrics 2735-2739. According to this example, the acoustic scene metric processing module 2728 is a component of the orchestration module 2702, whereas in alternative examples, the acoustic scene metric processing module 2728 may not be a component of the orchestration module 2702. In this example, the acoustic scene metric processing module 2728 is configured to generate information and/or commands based, at least in part, on at least one of the aggregated acoustic scene metrics 2735-2739 and/or at least one audio device characteristic. The audio device characteristic(s) may be one or more characteristics of one or more of the orchestrated audio devices 2720*a*-2720*n*. The audio device characteristic(s) may, for example, be stored in a memory of, or accessible to, the control system 160 of the orchestrating device 2701.

In some implementations, the orchestrating device 2701 may be implemented in an audio device, such as a smart audio device. In such implementations, the orchestrating device 2701 may include one or more microphones and one or more loudspeakers.

Cloud Processing

In some implementations, the orchestrated audio devices 2720*a*-2720*n* mainly include real-time processing blocks that run locally due to high data bandwidth and requirements for low processing latency. In some examples, however, the baseband processor 2729 may reside in the cloud (e.g., may be implemented via one or more servers) as the output of the baseband processor 2729 may, in some examples, be calculated asynchronously. According to some implementations, the blocks of the orchestrating device 2701 may all reside in the cloud. In some alternative implementations blocks 2702, 2703, 2708 and 2705 may be implemented on a local device (e.g., a device that is in the same audio environment as the orchestrated audio devices 2720*a*-2720*n*), because these blocks preferably operate in a real-time or near-real-time manner. However, in some such implementations, blocks 2703, 2704 and 2707 may operate via a cloud service.

Figure 28:
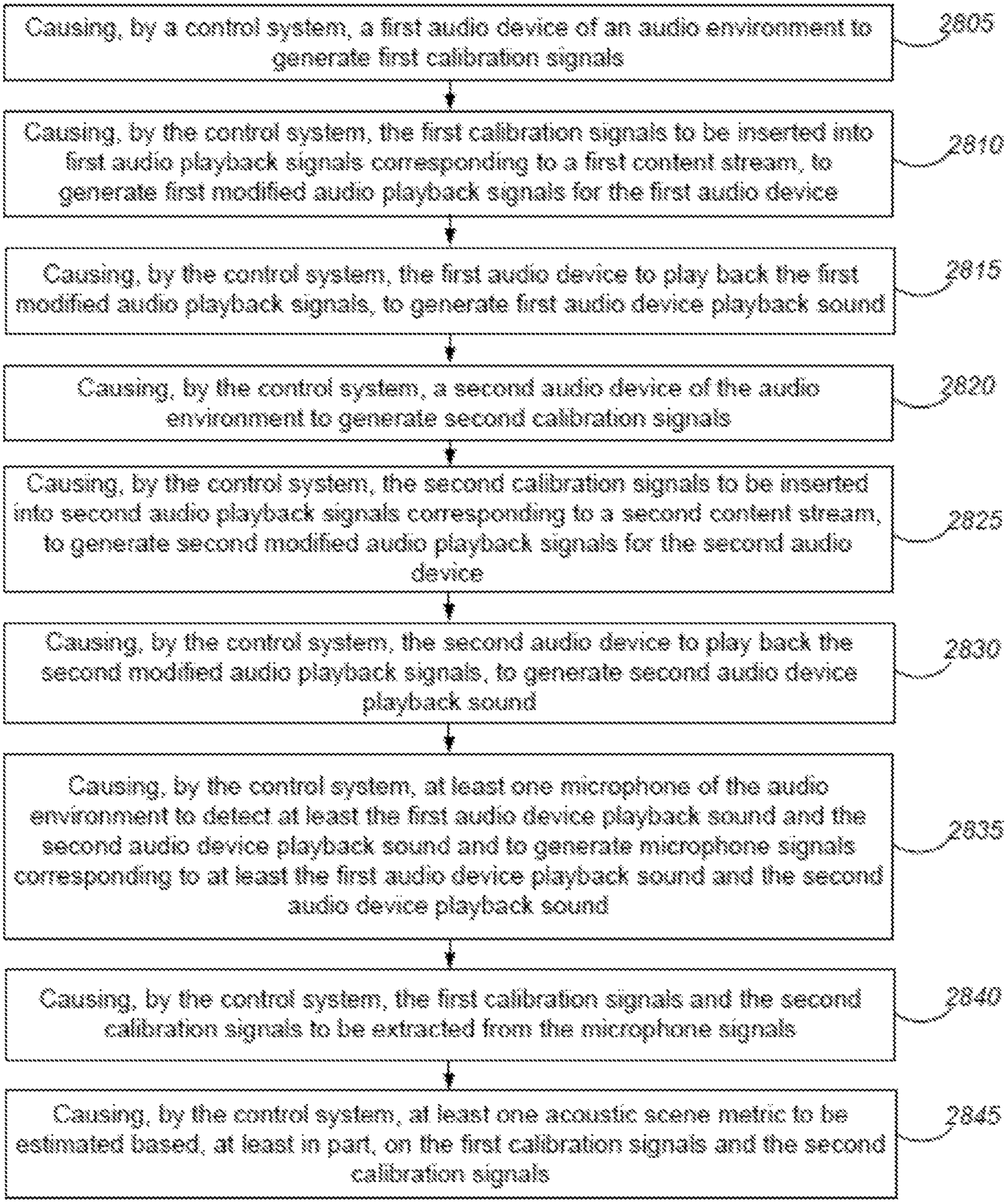
FIG. 28 is a flow diagram that outlines another example of a disclosed audio device orchestration method.

FIG. 28 is a flow diagram that outlines another example of a disclosed audio device orchestration method. The blocks of method 2800, like other methods described herein, are not necessarily performed in the order indicated. Moreover, such methods may include more or fewer blocks than shown and/or described. The method 2800 may be performed by an orchestrating device, such as the orchestrating device 2701 described above with reference to FIG. 27B. The method 2800 involves controlling orchestrated audio devices, such as some or all of the orchestrated audio devices 2720*a*-2720*n* described above with reference to FIG. 27A.

According to this example, block 2805 involves causing, by a control system, a first audio device of an audio environment to generate first calibration signals. For example, a control system of an orchestrating device, such as the orchestrating device 2701 may be configured to cause a first orchestrated audio device of an audio environment (e.g., the orchestrated audio device 2720*a*) to generate first calibration signals in block 2805.

In this example, block 2810 involves causing, by the control system, the first calibration signals to be inserted into first audio playback signals corresponding to a first content stream, to generate first modified audio playback signals for the first audio device. For example, the orchestrating device 2701 may be configured to cause the orchestrated audio device 2720*a* to insert the first calibration signals into first audio playback signals corresponding to a first content stream, to generate first modified audio playback signals for the orchestrated audio device 2720*a*.

According to this example, block 2815 involves causing, by the control system, the first audio device to play back the first modified audio playback signals, to generate first audio device playback sound. For example, the orchestrating device 2701 may be configured to cause the orchestrated audio device 2720*a* to play back the first modified audio playback signals on the loudspeaker(s) 2731, to generate the first orchestrated audio device playback sound.

In this example, block 2820 involves causing, by the control system, a second audio device of the audio environment to generate second calibration signals. For example, the orchestrating device 2701 may be configured to cause the orchestrated audio device 2720*b* to generate second calibration signals.

According to this example, block 2825 involves causing, by the control system, the second calibration signals to be inserted into a second content stream to generate second modified audio playback signals for the second audio device. For example, the orchestrating device 2701 may be configured to cause the orchestrated audio device 2720*b* to insert second calibration signals into a second content stream, to generate second modified audio playback signals for the orchestrated audio device 2720*b*.

In this example, block 2830 involves causing, by the control system, the second audio device to play back the second modified audio playback signals, to generate second audio device playback sound. For example, the orchestrating device 2701 may be configured to cause the orchestrated audio device 2720*b* to play back the second modified audio playback signals on the loudspeaker(s) 2731, to generate second orchestrated audio device playback sound.

According to this example, block 2835 involves causing, by the control system, at least one microphone of the audio environment to detect at least the first audio device playback sound and the second audio device playback sound and to generate microphone signals corresponding to at least the first audio device playback sound and the second audio device playback sound. In some examples, the microphone may be a microphone of the orchestrating device. In other examples, the microphone may be a microphone of an orchestrated audio device. For example, the orchestrating device 2701 may be configured to cause one or more of the orchestrated audio devices 2720*a*-2720*n* to use at least one microphone to detect at least the first orchestrated audio device playback sound and the second orchestrated audio device playback sound and to generate microphone signals corresponding to at least the first orchestrated audio device playback sound and the second orchestrated audio device playback sound.

In this example, block 2840 involves causing, by the control system, the first calibration signals and the second calibration signals to be extracted from the microphone signals. For example, the orchestrating device 2701 may be configured to cause one or more of the orchestrated audio devices 2720*a*-2720*n* to extract the first calibration signals and the second calibration signals from the microphone signals.

According to this example, block 2845 involves causing, by the control system, at least one acoustic scene metric to be estimated based, at least in part, on the first calibration signals and the second calibration signals. For example, the orchestrating device 2701 may be configured to cause one or more of the orchestrated audio devices 2720*a*-2720*n* to estimate at least one acoustic scene metric, based at least in part on the first calibration signals and the second calibration signals. Alternatively, or additionally, in some examples the orchestrating device 2701 may be configured to estimate the acoustic scene metric(s), based at least in part on the first calibration signals and the second calibration signals.

The particular acoustic scene metric(s) that are estimated in method 2800 may vary according to the particular implementation. In some examples, the acoustic scene metric(s) may include one or more of a time of flight, a time of arrival, a direction of arrival, a range, an audio device audibility, an audio device impulse response, an angle between audio devices, an audio device location, audio environment noise or a signal-to-noise ratio.

In some examples, the first calibration signals may correspond to first sub-audible components of the first audio device playback sound and the second calibration signals may correspond to second sub-audible components of the second audio device playback sound.

In some instances, the first calibration signals may be, or may include, first DSSS signals and the second calibration signals may be, or may include, second DSSS signals. However, the first and second calibration signals may be any suitable types of calibration signals, including but not limited to the specific examples disclosed herein.

According to some examples, a first content stream component of the first orchestrated audio device playback sound may cause perceptual masking of a first calibration signal component of the first orchestrated audio device playback sound and a second content stream component of the second orchestrated audio device playback sound may cause perceptual masking of a second calibration signal component of the second orchestrated audio device playback sound.

In some implementations, method 2800 may involve causing, by the control system, a first gap to be inserted into a first frequency range of the first audio playback signals or the first modified audio playback signals during a first time interval of the first content stream, such that the first modified audio playback signals and the first audio device playback sound include the first gap. The first gap may correspond with an attenuation of the first audio playback signals in the first frequency range. For example, the orchestrating device 2701 may be configured to cause the orchestrated audio device 2720*a* to insert a first gap into a first frequency range of the first audio playback signals or the first modified audio playback signals during the first time interval.

According to some implementations, method 2800 may involve causing, by the control system, the first gap to be inserted into the first frequency range of the second audio playback signals or the second modified audio playback signals during the first time interval, such that the second modified audio playback signals and the second audio device playback sound include the first gap. For example, the orchestrating device 2701 may be configured to cause the orchestrated audio device 2720*b* to insert the first gap into the first frequency range of the second audio playback signals or the second modified audio playback signals during the first time interval.

In some implementations, method 2800 may involve causing, by the control system, audio data from the microphone signals in at least the first frequency range to be extracted, to produce extracted audio data. For example, the orchestrating device 2701 may cause one or more of the orchestrated audio devices 2720*a*-2720*n* to extract audio data from the microphone signals in at least the first frequency range, to produce the extracted audio data.

According to some implementations, method 2800 may involve causing, by the control system, at least one acoustic scene metric to be estimated based, at least in part, on the extracted audio data. For example, the orchestrating device 2701 may cause one or more of the orchestrated audio devices 2720a-2720n to estimate at least one acoustic scene metric based, at least in part, on the extracted audio data. Alternatively, or additionally, in some examples the orchestrating device 2701 may be configured to estimate the acoustic scene metric(s), based at least in part on the extracted audio data.

Method 2800 may involve controlling both gap insertion and calibration signal generation. In some examples, method 2800 may involve controlling gap insertion and/or calibration signal generation such that the perceived level of reproduced audio content at a user location is maintained, in some instances under varying noise conditions (e.g., varying noise spectra). According to some examples, method 2800 may involve controlling calibration signal generation such that the signal-to-noise ratio of calibration signals is maximized. Method 2800 may involve controlling calibration signal generation in order to ensure that the calibration signals are inaudible to the user even under conditions of varying audio content and noise.

In some examples, method 2800 may involve controlling gap insertion for vacating time-frequency tiles so that neither content nor calibration signals are present during the inserted gaps, thereby allowing background noise to be estimated. Accordingly, in some examples method 2800 may involve controlling gap insertion and calibration signal generation such that calibration signals correspond with neither gap time intervals nor gap frequency ranges. For example, the orchestrating device 2701 may be configured to control gap insertion and calibration signal generation such that calibration signals correspond with neither gap time intervals nor gap frequency ranges.

According to some examples, method 2800 may involve controlling gap insertion and calibration signal generation based, at least in part, on a time since noise was estimated in at least one frequency band. For example, the orchestrating device 2701 may be configured to control gap insertion and calibration signal generation based, at least in part, on a time since noise was estimated in at least one frequency band.

In some examples, method 2800 may involve controlling gap insertion and calibration signal generation based, at least in part, on a signal-to-noise ratio of a calibration signal of at least one audio device in at least one frequency band. For example, the orchestrating device 2701 may be configured to control gap insertion and calibration signal generation based, at least in part, on a signal-to-noise ratio of a calibration signal of at least one orchestrated audio device in at least one frequency band.

According to some implementations, method 2800 may involve causing a target audio device to play back unmodified audio playback signals of a target device content stream, to generate target audio device playback sound. In some such examples, method 2800 may involve causing at least one of a target audio device audibility or a target audio device position to be estimated based, at least in part, on the extracted audio data. In some such implementations, the unmodified audio playback signals do not include the first gap. In some such examples, the microphone signals also correspond to the target audio device playback sound. According to some such examples, the unmodified audio playback signals do not include a gap inserted into any frequency range.

For example, the orchestrating device 2701 may be configured to cause a target orchestrated audio device of the orchestrated audio devices 2720a-2720n to play back unmodified audio playback signals of a target device content stream, to generate target orchestrated audio device playback sound. In one example, if the target audio device were the orchestrated audio device 2720a, the orchestrating device 2701 would cause the orchestrated audio device 2720a to play back unmodified audio playback signals of a target device content stream, to generate the target orchestrated audio device playback sound. The orchestrating device 2701 may be configured to cause at least one of a target orchestrated audio device audibility or a target orchestrated audio device position to be estimated by at least one of the other orchestrated audio devices (in the foregoing examples, one or more of the orchestrated audio devices 2720b-2720n) based, at least in part, on the extracted audio data. Alternatively, or additionally, in some examples the orchestrating device 2701 may be configured to estimate a target orchestrated audio device audibility and/or a target orchestrated audio device position, based at least in part on the extracted audio data.

In some examples, method 2800 may involve controlling one or more aspects of audio device playback based, at least in part, on the acoustic scene metric(s). For example, the orchestrating device 2701 may be configured to control the rendering module 2721 of one or more of the orchestrated audio devices 2720b-2720n based, at least in part, on the acoustic scene metric(s). In some implementations, the orchestrating device 2701 may be configured to control the noise compensation module 2730 of one or more of the orchestrated audio devices 2720b-2720n based, at least in part, on the acoustic scene metric(s).

According to some implementations, method 2800 may involve causing, by a control system, third through $N^{th}$ audio devices of the audio environment to generate third through $N^{th}$ calibration signals and causing, by the control system, the third through $N^{th}$ calibration signals to be inserted into third through $N^{th}$ content streams, to generate third through $N^{th}$ modified audio playback signals for the third through $N^{th}$ audio devices. In some examples, method 2800 may involve causing, by the control system, the third through $N^{th}$ audio devices to play back a corresponding instance of the third through $N^{th}$ modified audio playback signals, to generate third through $N^{th}$ instances of audio device playback sound. For example, the orchestrating device 2701 may be configured to cause the orchestrated audio devices 2720c-2720n to generate third through $N^{th}$ calibration signals and to insert the third through $N^{th}$ calibration signals into third through $N^{th}$ content streams, to generate third through $N^{th}$ modified audio playback signals for the orchestrated audio devices 2720c-2720n. The orchestrating device 2701 may be configured to cause the orchestrated audio devices 2720c-2720n to play back a corresponding instance of the third through $N^{th}$ modified audio playback signals, to generate third through $N^{th}$ instances of audio device playback sound.

In some examples, method 2800 may involve causing, by the control system, at least one microphone of each of the first through $N^{th}$ audio devices to detect first through $N^{th}$ instances of audio device playback sound and to generate microphone signals corresponding to the first through $N^{th}$ instances of audio device playback sound. In some instances, the first through $N^{th}$ instances of audio device playback sound may include the first audio device playback sound, the second audio device playback sound and the third through $N^{th}$ instances of audio device playback sound. According to some examples, method 2800 may involve causing, by the control system, the first through $N^{th}$ calibration signals to be extracted from the microphone signals. The acoustic scene metric(s) may be estimated based, at least in part, on first through $N^{th}$ calibration signals.

For example, the orchestrating device 2701 may be configured to cause at least one microphone of some or all of the orchestrated audio devices 2720*a*-2720*n* to detect the first through $N^{th}$ instances of audio device playback sound and to generate the microphone signals corresponding to the first through $N^{th}$ instances of audio device playback sound. The orchestrating device 2701 may be configured to cause some or all of the orchestrated audio devices 2720*a*-2720*n* to extract the first through $N^{th}$ calibration signals from the microphone signals. Some or all of the orchestrated audio devices 2720*a*-2720*n* may be configured to estimate the acoustic scene metric(s) based, at least in part, on first through $N^{th}$ calibration signals. Alternatively, or additionally, the orchestrating device 2701 may be configured to estimate the acoustic scene metric(s) based, at least in part, on first through $N^{th}$ calibration signals.

According to some implementations, method 2800 may involve determining one or more calibration signal parameters for a plurality of audio devices in the audio environment. The one or more calibration signal parameters being useable for generation of calibration signals. Method 2800 may involve providing the one or more calibration signal parameters to one or more orchestrated audio device of the audio environment. For example, the orchestrating device 2701 (in some instances the orchestration module 2702 of the orchestrating device 2701) may be configured to determine one or more calibration signal parameters for one or more of the orchestrated audio devices 2720*a*-2720*n* and to provide the one or more calibration signal parameters to the orchestrated audio device(s).

In some examples, determining the one or more calibration signal parameters may involve scheduling a time slot for each audio device of the plurality of audio devices to play back modified audio playback signals. In some instances, a first time slot for a first audio device may be different from a second time slot for a second audio device.

According to some implementations, determining the one or more calibration signal parameters may involve determining a frequency band for each audio device of the plurality of audio devices to play back modified audio playback signals. In some examples, a first frequency band for a first audio device may be different from a second frequency band for a second audio device.

In some examples, determining the one or more calibration signal parameters may involve determining a DSSS spreading code for each audio device of the plurality of audio devices. According to some examples, a first spreading code for a first audio device may be different from a second spreading code for a second audio device. According to some implementations, method 2800 may involve determining at least one spreading code length that is based, at least in part, on an audibility of a corresponding audio device.

In some implementations, determining the one or more calibration signal parameters may involve applying an acoustic model that is based, at least in part, on mutual audibility of each of a plurality of audio devices in the audio environment.

In some examples, method 2800 may involve causing each of a plurality of audio devices in the audio environment to simultaneously play back modified audio playback signals.

According to some implementations, at least a portion of the first audio playback signals, at least a portion of the second audio playback signals, or at least portions of each of the first audio playback signals and the second audio playback signals, may correspond to silence.

Figure 29:
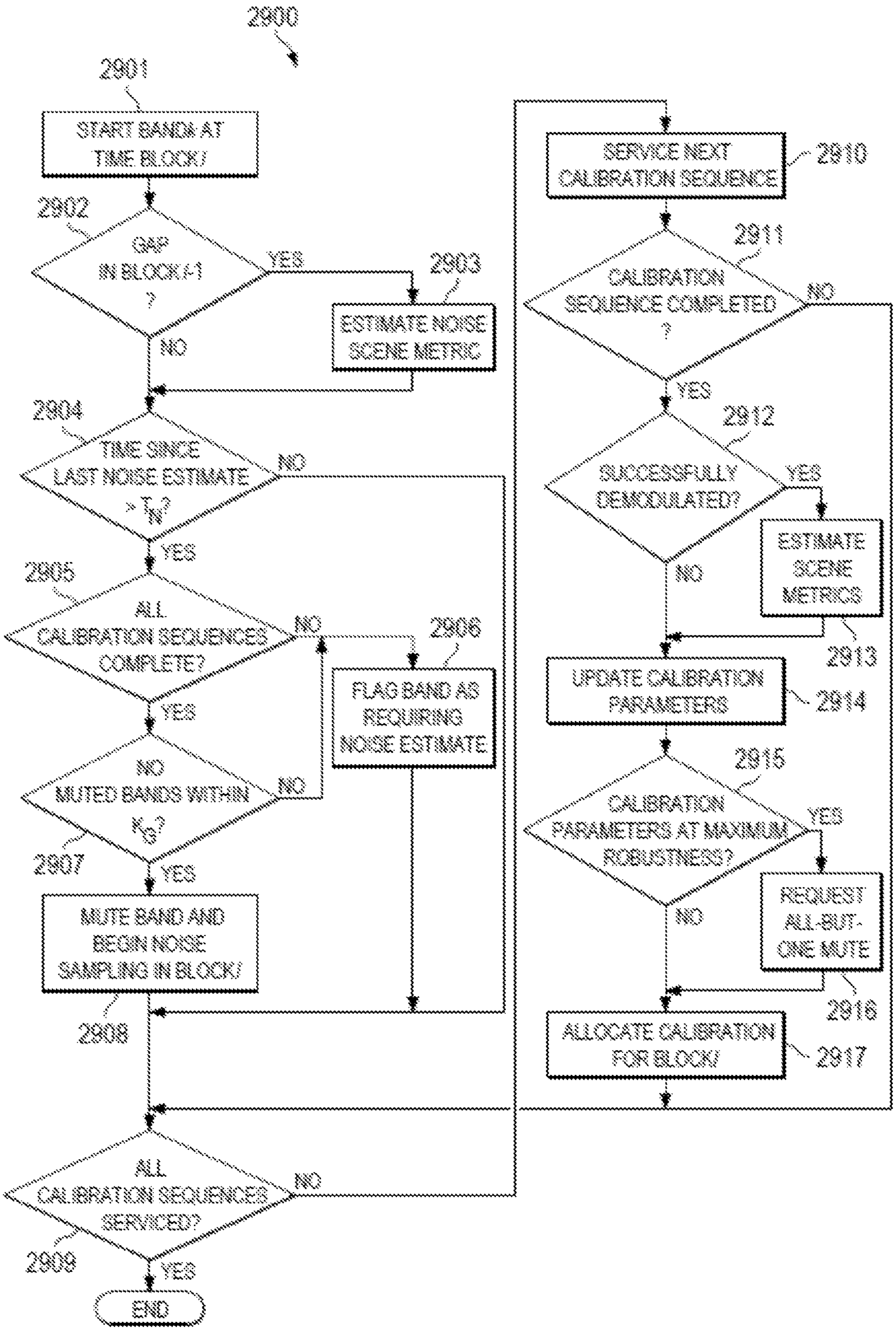
FIG. 29 is a flow diagram that outlines another example of a disclosed audio device orchestration method.

FIG. 29 is a flow diagram that outlines another example of a disclosed audio device orchestration method. The blocks of method 2900, like other methods described herein, are not necessarily performed in the order indicated. Moreover, such methods may include more or fewer blocks than shown and/or described. The method 2900 may be performed by an orchestrating device, such as the orchestrating device 2701 described above with reference to FIG. 27B. The method 2900 involves controlling orchestrated audio devices, such as some or all of the orchestrated audio devices 2720*a*-2720*n* described above with reference to FIG. 27A.

The following table defines notation that is used in FIG. 29 and in the following description:

TABLE 4

| | |
|---|---|
| Device index | i |
| Total devices | N |
| Spectral band index | k |
| Total spectral bands | K |
| Minimum Spectral Gap Interval | $K_G$ |
| Time block index | l |
| Sample index | n |
| Calibration Signal Parameter | $\zeta_{i,k}$ |
| Time interval between noise estimates | $T_N$ |

In this example, FIG. 29 shows blocks of a method for the allocation of a spectral band k at time block 1. According to this example, the blocks shown in FIG. 29 would be repeated for each spectral band and for each time block. The length of the time block may vary according to the particular implementation but may, for example, be on the order of several seconds (e.g., in the range of 1 second to 5 seconds), or on the order of hundreds of milliseconds. The spectrum occupied by a single frequency band may also vary according to the particular implementation. In some implementations, the spectrum occupied by a single band is based on perceptual intervals such as Mel or critical bands.

As used herein, the term "time-frequency tile" refers to a single time block in a single frequency band. At any given time, a time-frequency tile may be occupied by a combination of program content (e.g. movie audio content, music, etc.) and one or more calibration signals. When it is necessary to sample only the background noise, neither program content nor calibration signals should be present. Corresponding time-frequency tiles are referred to herein as "gaps."

The left column of FIG. 29 (blocks 2902-2908) involves the estimation of background noise in an audio environment when neither content nor calibration signals are present in a time-frequency tile (in other words, when the time-frequency tile corresponds to a gap). This is a simplified example of an orchestrated gaps method, such as those described above with reference to FIG. 21 et seq., with additional logic to deal with calibration sequences that may in some instances occupy the same band.

In this example, the process for spectral band k at time block l is initiated in block 2901. Block 2902 involves determining whether the previous block (block l−1) had a gap in spectral band k. If so, then this time-frequency tile corresponds only to background noise that can be estimated in block 2903.

In this example, noise is assumed to be pseudo-stationary such that noise needs to be sampled at regular intervals defined by time $T_N$. Accordingly, block 2904 involves determining whether $T_N$ has elapsed since the last noise measurement.

If it is determined in block 2904 that $T_N$ has elapsed since the last measurement, the process continues to block 2905, which involves determining whether the calibration signals in the current time-frequency tile are complete. Block 2905 is desirable because in some implementations calibration signals may occupy more than one time block and it may be necessary (or at least desirable) to wait until the calibration signals in the current time-frequency tile are complete before a gap is inserted. In this example, if it is determined in block 2905 that a calibration signal is incomplete the method proceeds to block 2906, which involves flagging the current time-frequency tile as requiring a noise estimate in a future block.

In this example, if it is determined in block 2905 that a calibration signal is complete the method proceeds to block 2907, which involves determining whether there are any muted (gapped) frequency bands within a minimum spectral gap interval, which is denoted $K_G$ in this example. Care should be taken not to mute (insert gaps in) frequency bands within the interval $K_G$, so as not to create perceptible artifacts in the reproduced audio data. If it is determined in block 2907 that there are gapped frequency bands within the minimum spectral gap interval, the process continues to block 2906 and the band is flagged as requiring a future noise estimate. However, if it is determined in block 2907 that there are no gapped frequency bands within the minimum spectral gap interval, the process continues to block 2908, which involves causing a gap to be inserted in the band by all orchestrated audio devices. In this example, block 2908 also involves sampling the noise in the current time-frequency tile.

The right column (blocks 2909-2917) of FIG. 29 involves the servicing of any calibration signals (also referred to herein as calibration sequences) that may have been running in the previous time block. In some examples, each time-frequency tile may contain multiple orthogonal calibration signals (such as the DSSS sequences described herein), e.g., one set of calibration signals having been inserted into/mixed with audio content and played back by each of a plurality of orchestrated audio devices. Therefore, in this example block 2909 involves iterating through all calibration sequences present in the current time-frequency tile to determine whether all calibration sequences have been serviced. If not, the next calibration sequence is serviced beginning with block 2910.

Block 2911 involves determining whether a calibration sequence has been completed. In some examples, a calibration sequence may span multiple time blocks, so a calibration sequence that began prior to the current time block is not necessarily complete at the time of the current time block. If it is determined in block 2911 that a calibration sequence is complete, the process continues to block 2912.

In this example, block 2912 involves determining whether the calibration sequence that is currently being evaluated has been successfully demodulated. Block 2912 may, for example, be based on information obtained from one or more orchestrated audio devices that are attempting to demodulate the calibration sequence that is currently being evaluated. Failure in demodulation may occur due to one or more of the following:

1. A high level of background noise;
2. A high level of program content;
3. A high level of calibration signal from a nearby device (in particular the near/far problem that is discussed elsewhere herein); and
4. Device asynchrony.

If it is determined in block 2912 that the calibration sequence has been successfully demodulated, the process continues to block 2913. According to this example, block 2913 involves estimating one or more acoustic scene metrics, such as DOA, TOA and/or audibility in the current frequency band. Block 2913 may be performed by one or more orchestrated devices and/or by an orchestrating device.

In this example, if it is determined in block 2912 that the calibration sequence has not been successfully demodulated, the process continues directly to block 2914. According to this example, block 2914 involves monitoring the demodulated calibration signals and updating the calibration signal parameters, as needed, to ensure that all orchestrated devices can hear each other well enough (have a sufficiently high mutual audibility). Robustness of the calibration signal parameters may be improved by a combination of parameters for the ith device in the kth band ($\zeta_{i,k}$. In one example in which the calibration signals are DSSS signals, robustness may include modifying parameters, e.g., by doing one or more of the following:

1. Increasing the amplitude of the calibration signal;
2. Reducing the chipping rate of the calibration signal;
3. Increasing the coherent integration time;
4. Increasing the incoherent integration time; and/or
5. Reducing the number of concurrent signals in the same time-frequency tile.

Calibration parameters 2 and 3 may lead to a calibration sequence occupying an increased number of time blocks.

According to this example, block 2915 involves determining whether the calibration parameters have reached one or more limits. For example, block 2915 may involve determining whether the amplitude of the calibration signal has reached a limit such that exceeding that limit would result in the calibration signal being audible over played-back audio content. In some examples, block 2915 may involve determining that the coherent integration time or the incoherent integration time have reached predetermined limits.

If it is determined in block 2915 that the calibration parameters have not reached one or more limits, the process continues directly to block 2917. However, if it is determined in block 2915 that the calibration parameters have reached one or more in block 2915, the process continues to block 2916. In some alternative examples, block 2916 may involve scheduling (e.g., for the next time block) an orchestrated gap in which no content is played back by any of the orchestrated audio devices and only one orchestrated audio device plays back acoustic calibration signals. In some alternative examples, block 2916 may involve playing back content and acoustic calibration signals by only one orchestrated audio device. In other examples, block 2916 may involve playing back content by all orchestrated audio devices and playing back acoustic calibration signals by only one orchestrated audio device.

In this example block 2917 involves allocating calibration sequences for the next block in the current band. Block 2917 may, in some instances, involve increasing or decreasing the number of acoustic calibration signals that are simultaneously played back during the next time block in the current frequency band. Block 2917 may, for example, involve determining when the last acoustic calibration signal was successfully demodulated in the current frequency band as part of the process of determining whether to increase or decrease the number of acoustic calibration signals that are simultaneously played back during the next time block in the current frequency band.

Figure 30:
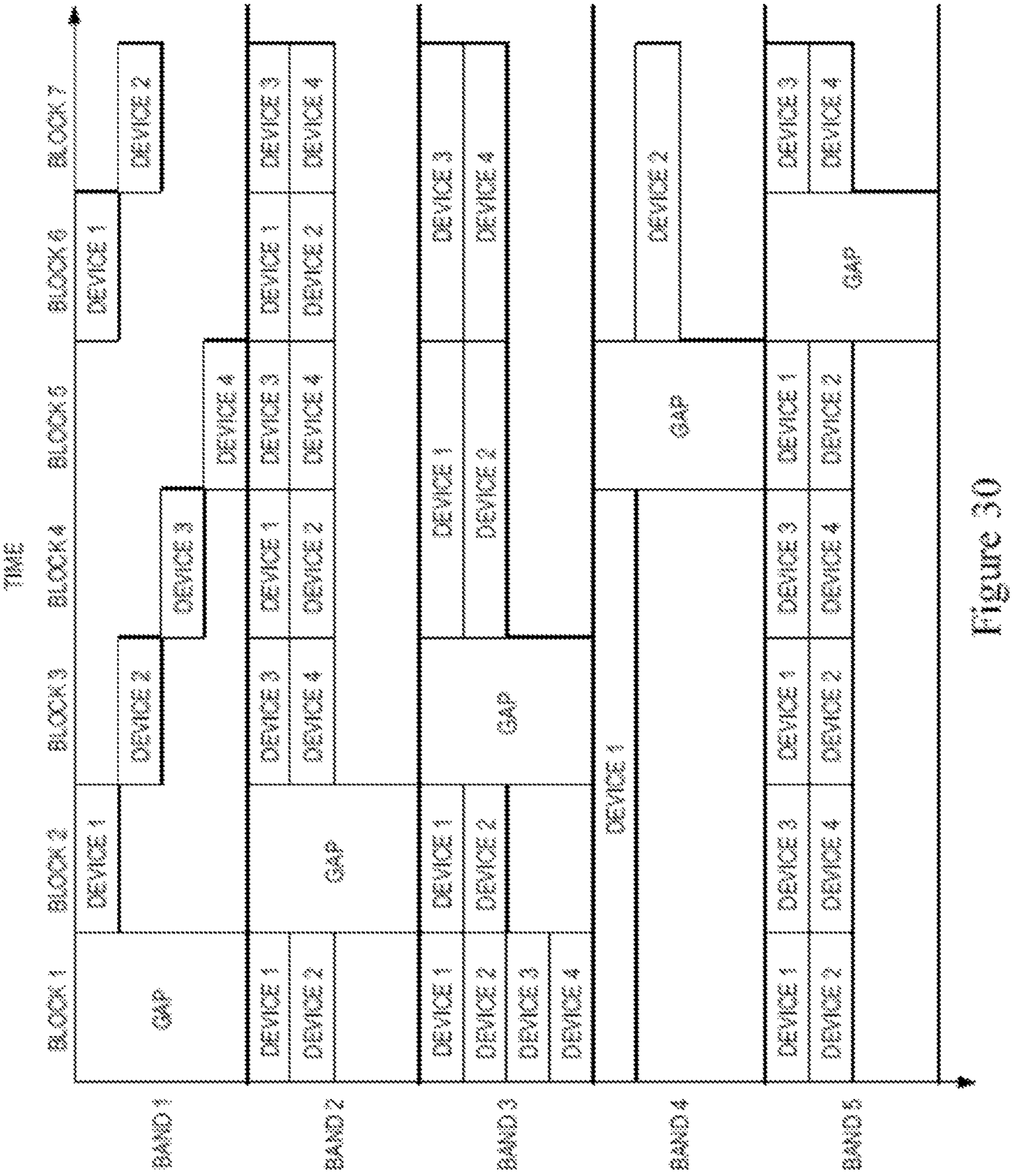
FIG. 30 shows examples of time-frequency allocation of calibration signals, gaps for noise estimation, and gaps for hearing a single audio device.

FIG. 30 shows examples of time-frequency allocation of calibration signals, gaps for noise estimation, and gaps for hearing a single audio device. FIG. 30 is intended to represent a snapshot in time of a continuous process with differing channel conditions existing in each frequency band prior to time block 1. As with other disclosed examples, in FIG. 30 time is represented as a series of blocks represented along a horizontal axis and frequency bands are represented along a vertical axis. The rectangles in FIG. 30 indicating "Device 1," "Device 2," etc., correspond to calibration signals for orchestrated audio device 1, orchestrated audio device 2, etc., in a particular frequency band and during one or more time blocks.

The calibration signals in Band 1 (frequency band 1) essentially represent a repeated one-shot measurement for one time block. The calibration signals for only one orchestrated audio device are present in Band 1 during each time block except time block 1, in which an orchestrated gap is being punched.

In Band 2, the calibration signals for two orchestrated audio devices are present during each time block. In this example, the calibration signals have been assigned orthogonal codes. This arrangement allows all orchestrated audio devices to play back their acoustic calibration signals in half the time required for the arrangement shown in of Band 1. The calibration sequence for Devices 1 and 2 is complete by the end of Block 1, allowing a scheduled gap to play in block 2, which delays the playback of acoustic calibration signals by Devices 3 and 4 until time block 3.

In Band 3, four orchestrated audio devices attempt to play back their acoustic calibration signals in the first block, possibly following good conditions prior to time block 1. However, this causes a poor demodulation result so the concurrency is reduced to two devices (e.g., in block 2917 of FIG. 29) in time block 2. However, a poor demodulation result is still returned. After a forced gap in time block 3, instead of further reducing concurrency to a single device, a longer code is assigned to Devices 1 and 2 starting with time block 4, in an attempt to improve robustness.

Band 4 begins with only Device 1 playing back its acoustic calibration signals during time blocks 1-4 (e.g., via a 4-block code sequence), possibly following poor conditions prior to time block 1. The code sequence is incomplete in block 4 when a gap is scheduled, causing the implementation of the forced gap to be delayed by one time block.

The scenario depicted for Band 5 proceeds much the same as that of Band 2, with two orchestrated audio devices simultaneously playing back their acoustic calibration signals during a single time block. In this example, a gap that was scheduled for time block 5 is delayed to time block 6 due to the delayed gap in band 4, because in this example two neighboring spectral blocks not permitted to have simultaneous forced gaps due to the minimum spectral interval $K_G$.

Figure 31:
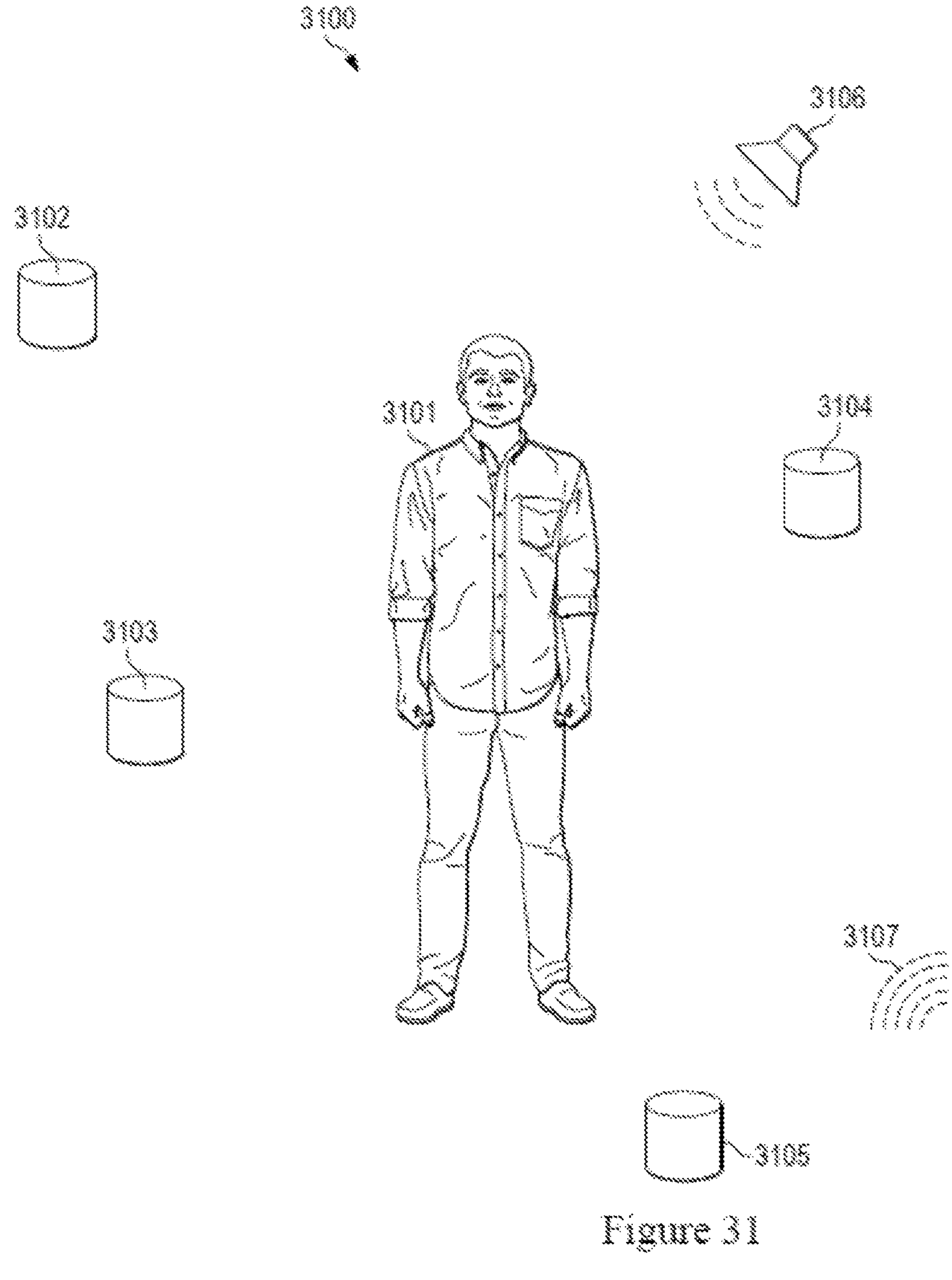
FIG. 31 depicts an audio environment, which is a living space in this example.

FIG. 31 depicts an audio environment, which is a living space in this example. As with other figures provided herein, the types, numbers and arrangements of elements shown in FIG. 31 are merely provided by way of example. Other implementations may include more, fewer and/or different types, numbers and/or arrangements of elements. In other examples, the audio environment may be another type of environment, such as an office environment, a vehicle environment, a park or other outdoor environment, etc. In this example, the elements of FIG. 31 include the following:

- 3101: A person, who also may be referred to as a "user" or a "listener";
- 3102: A smart speaker including one or more loudspeakers and one or more microphones;
- 3103: A smart speaker including one or more loudspeakers and one or more microphones;
- 3104: A smart speaker including one or more loudspeakers and one or more microphones;
- 3105: A smart speaker including one or more loudspeakers and one or more microphones;
- 3106: A sound source, which may be a noise source, which is located in the same room of the audio environment in which the person 3101 and the smart speakers 3102-3106 are located and which has a known location. In some examples, the sound source 3106 may be a legacy device, such as a radio, that is not part of an audio system that includes the smart speakers 3102-3106. In some instances, the volume of the sound source 3106 may not be continuously adjustable by the person 3101 and may not be adjustable by an orchestrating device. For example, the volume of the sound source 3106 may be adjustable only by a manual process, e.g., via an on/off switch or by choosing a power or speed level (e.g., a power or speed level of a fan or an air conditioner); and
- 3107: A sound source, which may be a noise source, which is not located in the same room of the audio environment in which the person 3101 and the smart speakers 3102-3106 are located. In some examples, the sound source 3107 may not have a known location. In some instances, the sound source 3107 may be diffuse.

The following discussion involves a few underlying assumptions. For example, it is assumed that estimates of the locations of audio devices (such as the smart devices 102-105 of FIG. 31) and an estimate of a listener location (such as the location of the person 101) are available. Additionally, it is assumed that a measure of mutual audibility between audio devices is known. This measure of mutual audibility may, in some examples, be in the form of the received level in multiple frequency bands. Some examples are described below. In other examples, the measure of mutual audibility may be a broadband measure, such as a measure that includes only one frequency band.

The reader may question whether the microphones in consumer devices provide uniform responses, because unmatched microphone gains would add a layer of ambiguity. However, the majority of smart speakers include Micro-Electro-Mechanical Systems (MEMS) microphones, which are exceptionally well matched (at worst ±3 dB but typically within ±1 dB) and have a finite set of acoustic overload points, such that the absolute mapping from digital dBFS (decibels relative to full scale) to dBSPL (decibels of sound pressure level) can be determined by the model number and/or a device descriptor. As such, MEMS microphones can be assumed to provide a well-calibrated acoustic reference for mutual audibility measurements.

Figure 32:
FIGS. 32, 33 and 34 are block diagrams that represent three types of disclosed implementations.
Figure 33:
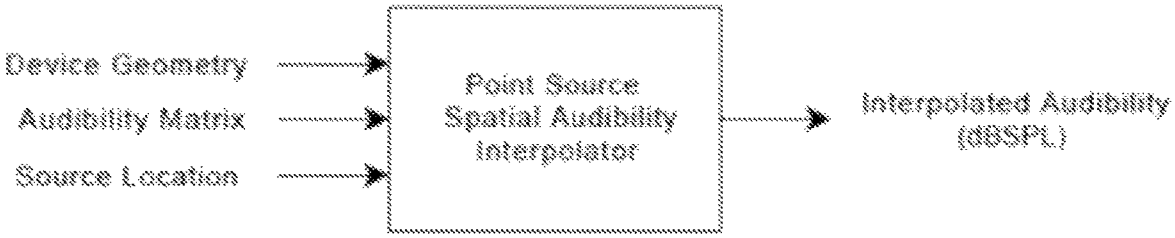
Figure 34:
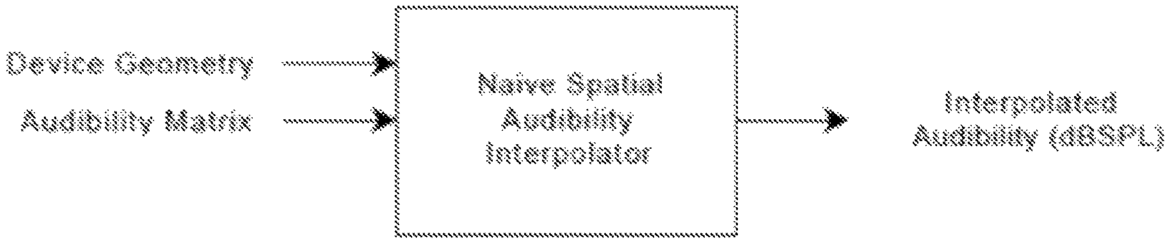

FIGS. 32, 33 and 34 are block diagrams that represent three types of disclosed implementations. FIG. 32 represents an implementation that involves estimating the audibility (in this example, in dBSPL) at a user location (e.g., the location of the person 3101 of FIG. 31) of all audio devices in an audio environment (e.g., the locations of the smart speakers 3102-3105), based upon mutual audibility between the audio devices, their physical locations, and the location of the user. Such implementations do not require the use of a reference microphone at the user location. In some such examples, audibility may be normalized by the digital level (in this example, in dBFS) of the loudspeaker driving signal to yield transfer functions between each audio device and the user. According to some examples, the implementation represented by FIG. 32 is essentially a sparse interpolation problem: given banded levels measured between a set of audio devices at known locations, apply a model to estimate the levels received at the listener location.

In the example shown in FIG. 32, a full matrix spatial audibility interpolator is shown receiving device geometry information (audio device location information) a mutual audibility matrix (an example of which is described below) and user location information, and outputting interpolated transfer functions. In this example the interpolated transfer functions are from dBFS to dBSPL, which may be useful for leveling and equalizing audio devices, such as smart devices. In some examples, there may be some null rows or columns in the audibility matrix corresponding to input-only or output-only devices. Implementation details corresponding to the example of FIG. 32 are set forth below in the "Full Matrix Mutual Audibility Implementations" discussion below.

FIG. 33 represents an implementation that involves estimating the audibility (in this example, in dBSPL) at a user location of an uncontrolled point source (such as the sound source 3106 of FIG. 31), based upon the audibility of the uncontrolled point source at the audio devices, the physical locations of the audio devices, the location of the uncontrolled point source and the location of the user. In some examples, the uncontrolled point source may be a noise source located in the same room as the audio devices and the person. In the example shown in FIG. 33, a point source spatial audibility interpolator is shown receiving device geometry information (audio device location information) an audibility matrix (an example of which is described below) and sound source location information, and outputting interpolated audibility information.

FIG. 34 represents an implementation that involves estimating the audibility (in this example, in dBSPL) at a user location of a diffuse and/or unlocated and uncontrolled source (such as the sound source 3107 of FIG. 31), based upon the audibility of the sound source at each of the audio devices, the physical locations of the audio devices and the location of the user. In this implementation, the location of the sound source is assumed to be unknown. In the example shown in FIG. 34, a naïve spatial audibility interpolator is shown receiving device geometry information (audio device location information) and an audibility matrix (an example of which is described below), and outputting interpolated audibility information. In some examples, the interpolated audibility information referenced in FIGS. 3B and 3C may indicate interpolated audibility in dBSPL, which may be useful for estimating the received level from sound sources (e.g., from noise sources). By interpolating received levels of noise sources, noise compensation (e.g., a process of increasing the gain of content in the bands where noise is present) may be applied more accurately than can be achieved with reference to noise detected by a single microphone.

Full Matrix Mutual Audibility Implementations

Table 5 indicates what the terms of the equations in the following discussion represent.

TABLE 5

| | |
|---|---|
| Total devices | L |
| Total spectral bands | K |
| Band index | k |
| Total microphones in device i | $M_i$ |
| Rotation scalar | $\phi$ |
| Mutual audibility transfer function matrix | $H \in \mathbb{R}^{K \times L \times L}$ |

TABLE 5-continued

| | |
|---|---|
| Noise audibility level matrix | $A \in \mathbb{R}^{K \times L}$ |
| Elements of noise audibility level matrix | $A_i^{(k)}$ |
| $i^{th}$ device location vector | $x_i = [x_i\ y_i]^T$ |
| User location vector | $x_u = [x_u\ y_u]^T$ |
| Noise location vector | $x_n = [x_n\ y_n]^T$ |
| Geometry vector | $\mathbf{X} \in \mathbb{R}^{L \times 2}$ |
| Output sensitivity | $g_i^{(k)}$ |
| Decay law | $\alpha_i^{(k)}$ |
| Critical distance | $d_c^{\,i}$ |
| Interpolated transfer function matrix | $B \in \mathbb{R}^{K \times L}$ |
| Interpolated noise level vector | $b \in \mathbb{R}^{K \times L}$ |
| EQ and compensation gains matrix | $G \in \mathbb{R}^{K \times L}$ |
| Delay compensation vector | $\tau \in \mathbb{R}^{L \times 1}$ |
| Noise compensation gains | $q \in \mathbb{R}^{K \times L}$ |

Let L be the total number of audio devices, each containing $M_i$ microphones, and let K be the total number of spectral bands reported by the audio devices. According to this example, a mutual audibility matrix $H \in \mathbb{R}^{K \times L \times L}$, containing measured transfer functions between all devices in all bands in linear units, is determined.

Several examples exist for determining H. However, the disclosed implementations are agnostic to the method used to determine H.

Some examples of determining H may involve multiple iterations of "one shot" calibration played back by each of the audio devices in turn, with controlled acoustic calibration signals such as swept sines, noise (e.g., white or pink noise), acoustic DSSS signals or curated program material. In some such examples, determining H may involve a sequential process of causing a single smart audio device to emit a sound while the other smart audio devices "listen" for the sound.

For example, referring to FIG. 31, one such process may involve: (a) causing the audio device 3102 to emit a sound and receiving microphone data corresponding to the emitted sound from microphone arrays of the audio devices 3103-3105; then (b) causing the audio device 3103 to emit a sound and receiving microphone data corresponding to the emitted sound from microphone arrays of the audio devices 3102, 3104 and 3105; then (c) causing the audio device 3104 to emit a sound and receiving microphone data corresponding to the emitted sound from microphone arrays of the audio devices 3102, 3103 and 3105; then (d) causing the audio device 3105 to emit a sound and receiving microphone data corresponding to the emitted sound from microphone arrays of the audio devices 3102, 3103 and 3104. The emitted sounds may or may not be the same, depending on the particular implementation.

Some pervasive and/or ongoing methods involving acoustic calibration signals that are described in detail herein involve the simultaneous playback of acoustic calibration signals by multiple audio devices in an audio environment. In some such examples, the acoustic calibration signals are mixed into played-back audio content. According to the some implementations, the acoustic calibration signals are sub-audible. Some such examples also involve spectral hole punching (also referred to herein as forming "gaps").

According to some implementations, audio devices including multiple microphones may estimate multiple audibility matrices (e.g., one for each microphone) that are averaged to yield a single audibility matrix for each device. In some examples anomalous data, which may be due to malfunctioning microphones, may be detected and removed.

As noted above, the spatial locations $x_i$ of the audio devices in 2D or 3D coordinates are also assumed available.

Some examples for determining device locations based upon time of arrival (TOA), direction of arrival (DOA) and combinations of DOA and TOA are described below. In other examples, the spatial locations $x_i$ of the audio devices may be determined by manual measurements, e.g., with a measuring tape.

Moreover, the location of the user $x_u$ is also assumed known, and in some cases both the location and the orientation of the user also may be known. Some methods for determining a listener location and a listener orientation are described in detail below. According to some examples, the device locations $X=[x_1 x_2 \ldots x_L]^T$ may have been translated so that $x_u$ lies at the origin of a coordinate system.

According to some implementations, the aim is to estimate an interpolated mutual audibility matrix B by applying a suitable interpolant to the measured data. In one example, a decay law model of the following form may be chosen:

$$\frac{g_i^{(k)}}{\|x_i - x_j\|^{\alpha_i^{(k)}}}$$

In this example, $x_i$ represents the location of the transmitting device, $x_j$ represents the location of the receiving device, $g_i^{(k)})$ represents an unknown linear output gain in band k, and $\alpha_i^{(k)}$ represents a distance decay constant. The least squares solution $$\{\hat{g}_i^{(k)}, \hat{\alpha}_i^{(k)}\} = \text{argmin} \sum_{j=0, j\neq i}^{L} \left| H_{ij}^{(k)} - \frac{g_i^{(k)}}{\|x_i - x_j\|^{\alpha_i^{(k)}}} \right|_2^2$$

yields estimated parameters $\{\ddot{\hat{g}}_i^{(k)}, \hat{\alpha}_i^{(k)}\}$ for the ith transmitting device. The estimated audibility in linear units at the user location may therefore be represented as follows:

$$B_i^{(k)} = \frac{\hat{g}_i^{(k)}}{\|x_i - x_u\|^{\hat{\alpha}_i^{(k)}}}.$$

In some embodiments, $\hat{\alpha}_i^{(k)}$ may be constrained to a global room parameter $\hat{\alpha}^{(k)}$, and may, in some examples, be additionally constrained to lie within a specific range of values.

Figure 35:
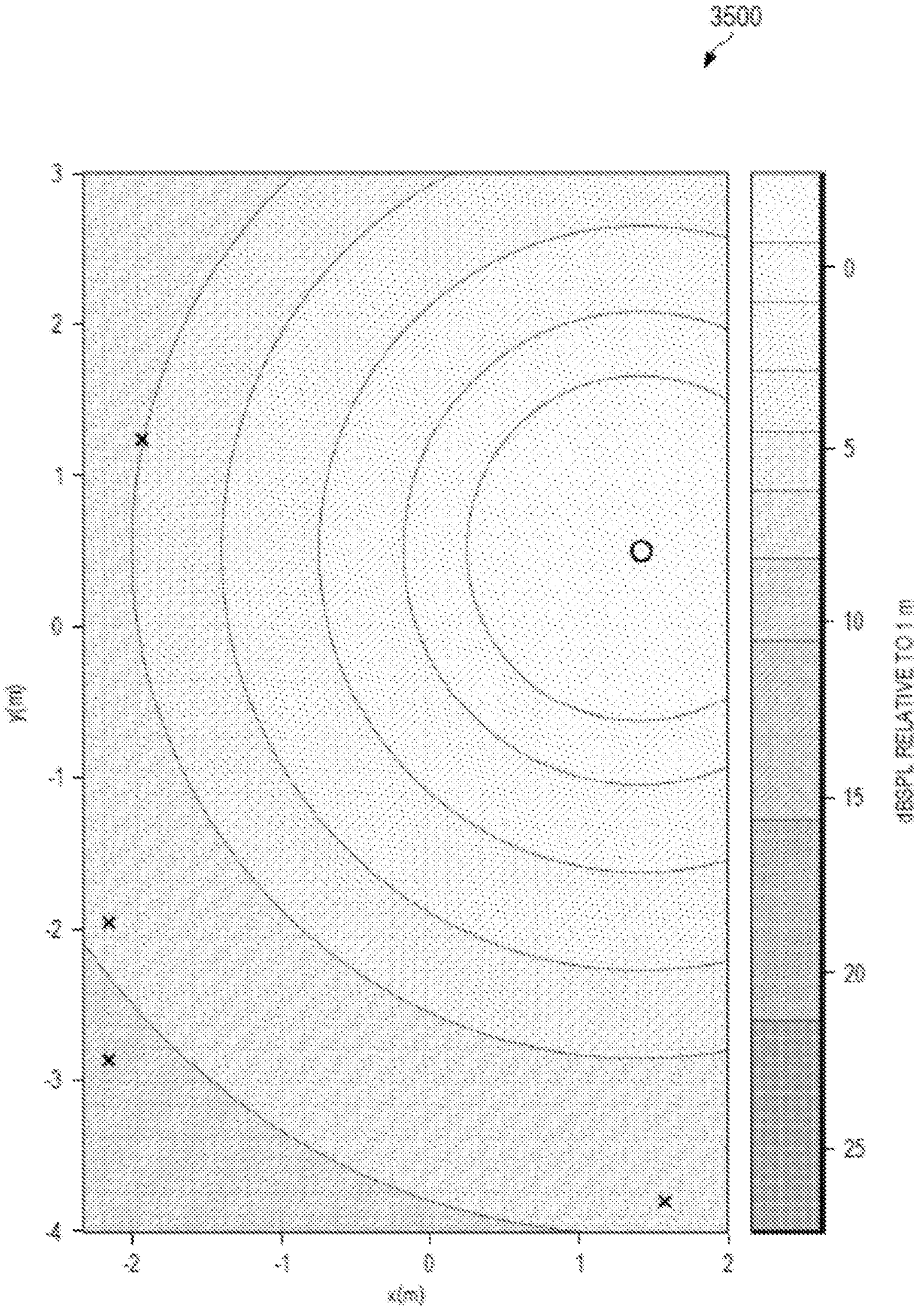
FIG. 35 shows an example of a heat map.

FIG. 35 shows an example of a heat map. In this example, the heat map 3500 represents an estimated transfer function for one frequency band from a sound source (o) to any point in a room having the x and y dimensions indicated in FIG. 35. The estimated transfer function is based on the interpolation of measurements of the sound source by 4 receivers (x). The interpolated level is depicted by the heatmap 3500 for any user location $x_u$ within the room.

In another example, the distance decay model may include a critical distance parameter such that the interpolant takes the following form:

$$g_i^{(k)} \sqrt{\frac{1}{\|x_i - x_j\|_2^2} + \frac{1}{(d_c^i)^2}}$$

In this example, $d_c^i$ represents a critical distance that may, in some examples, be solved as a global room parameter de and/or may be constrained to lie within a fixed range of values.

Figure 36:
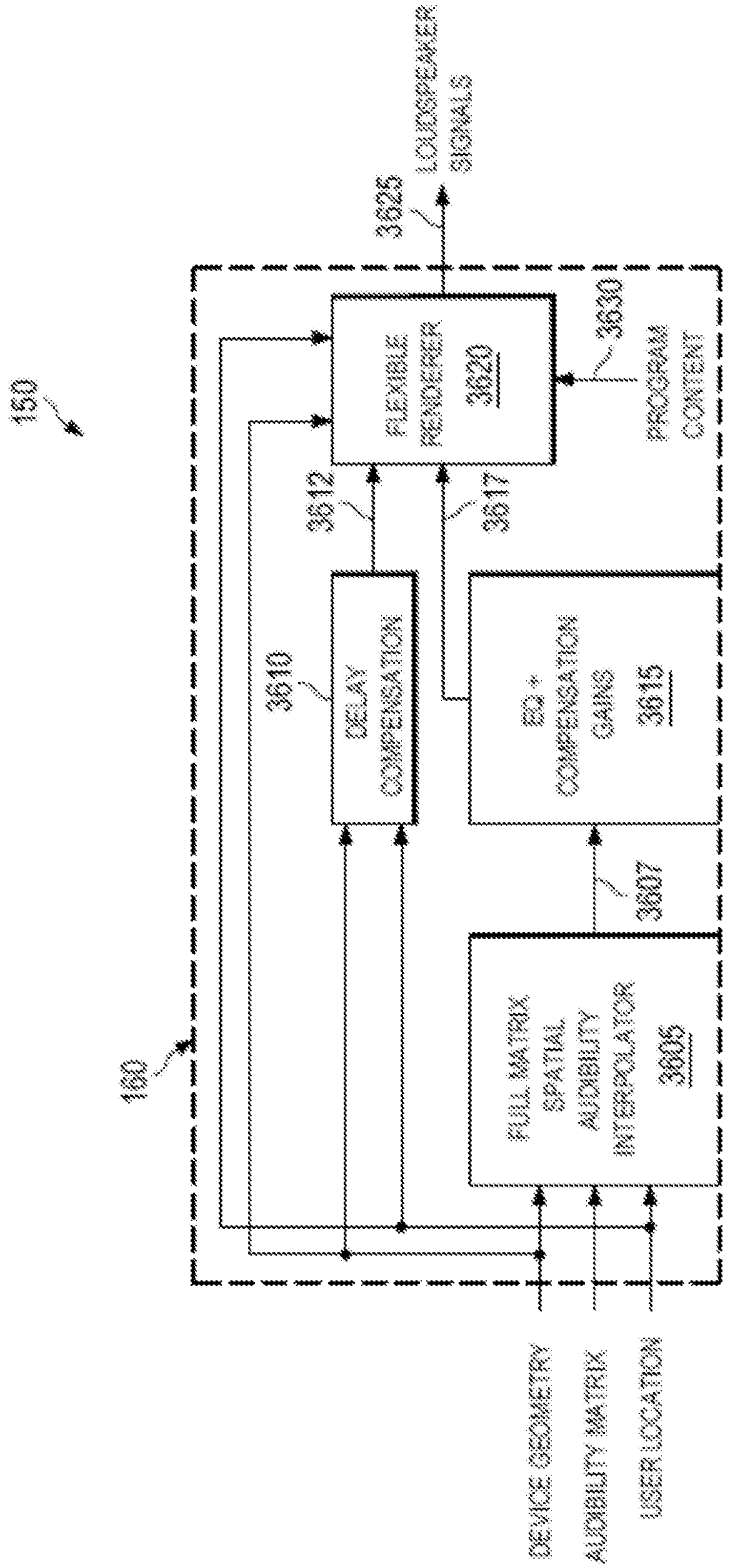
FIG. 36 is a block diagram that shows an example of another implementation.

FIG. 36 is a block diagram that shows an example of another implementation. As with other figures provided herein, the types, numbers and arrangements of elements shown in FIG. 36 are merely provided by way of example. Other implementations may include more, fewer and/or different types, numbers and/or arrangements of elements. In this example, a full matrix spatial audibility interpolator 3605, a delay compensation block 3610, an equalization and gain compensation block 3615 and a flexible renderer block 3620 are implemented by an instance of the control system 160 of the apparatus 150 that is described above with reference to FIG. 1B. In some implementations, the apparatus 150 may be an orchestrating device for the audio environment. According to some examples, the apparatus 150 may be one of the audio devices of the audio environment. In some instances, the full matrix spatial audibility interpolator 3605, the delay compensation block 3610, the equalization and gain compensation block 3615 and the flexible renderer block 3620 may be implemented via instructions (e.g., software) stored on one or more non-transitory media.

In some examples, the full matrix spatial audibility interpolator 3605 may be configured to calculate an estimated audibility at a lister's location as described above. According to this example, the equalization and gain compensation block 3615 is configured to determine an equalization and compensation gain matrix 3617 (shown as $G \in \mathbb{R}^{K \times L}$ in Table 5) based on the frequency bands of the interpolated audibility $B^k$ 3607 received from the full matrix spatial audibility interpolator 3605. The equalization and compensation gain matrix 3617 may, in some instances, be determined using standardized techniques. For example, the estimated levels at the user location may be smoothed across frequency bands and equalization (EQ) gains may be calculated such that the result matches a target curve. In some implementations, a target curve may be spectrally flat. In other examples, a target curve may roll off gently towards high frequencies to avoid over-compensation. In some instances, the EQ frequency bands may then be mapped into a different set of frequency bands corresponding to the capabilities of a particular parametric equalizer. In some examples, the different set of frequency bands may be the 77 CQMF bands mentioned elsewhere herein. In other examples, the different set of frequency bands may include a different number of frequency bands, e.g., 20 critical bands or as few as two frequency bands (high and low). Some implementations of a flexible renderer may use 20 critical bands.

In this example, the processes of applying compensation gains and EQ are split out so that compensation gains provide rough overall level matching and EQ provides finer control in multiple bands. According to some alternative implementations, compensation gains and EQ may be implemented as a single process.

In this example, the flexible renderer block 3620 is configured to render the audio data of the program content 3630 according to corresponding spatial information (e.g., positional metadata) of the program content 3630. The flexible renderer block 3620 may be configured to implement CMAP, FV, a combination of CMAP and FV, or another type of flexible rendering, depending on the particular implementation. According to this example, the flexible renderer block 3620 is configured to use the equalization and compensation gain matrix 3617 in order to ensure that each loudspeaker is heard by the user at the same level with the same equalization. The loudspeaker signals 3625 output by the flexible renderer block 3620 may be provided to audio devices of an audio system.

According to this implementation, the delay compensation block 3610 is configured to determine a delay compensation information 3612 (which may in some examples be, or include, the delay compensation vector shown as $\tau \in \mathbb{R}^{L\times 1}$ in Table 1) according to audio device geometry information and user location information. The delay compensation information 3612 is based on the time required for sound to travel the distances between the user location and the locations of each of the loudspeakers. According to this example, the flexible renderer block 3620 is configured to apply the delay compensation information 3612 to ensure that the time of arrival to the user of corresponding sounds played back from all loudspeakers is constant.

Figure 37:
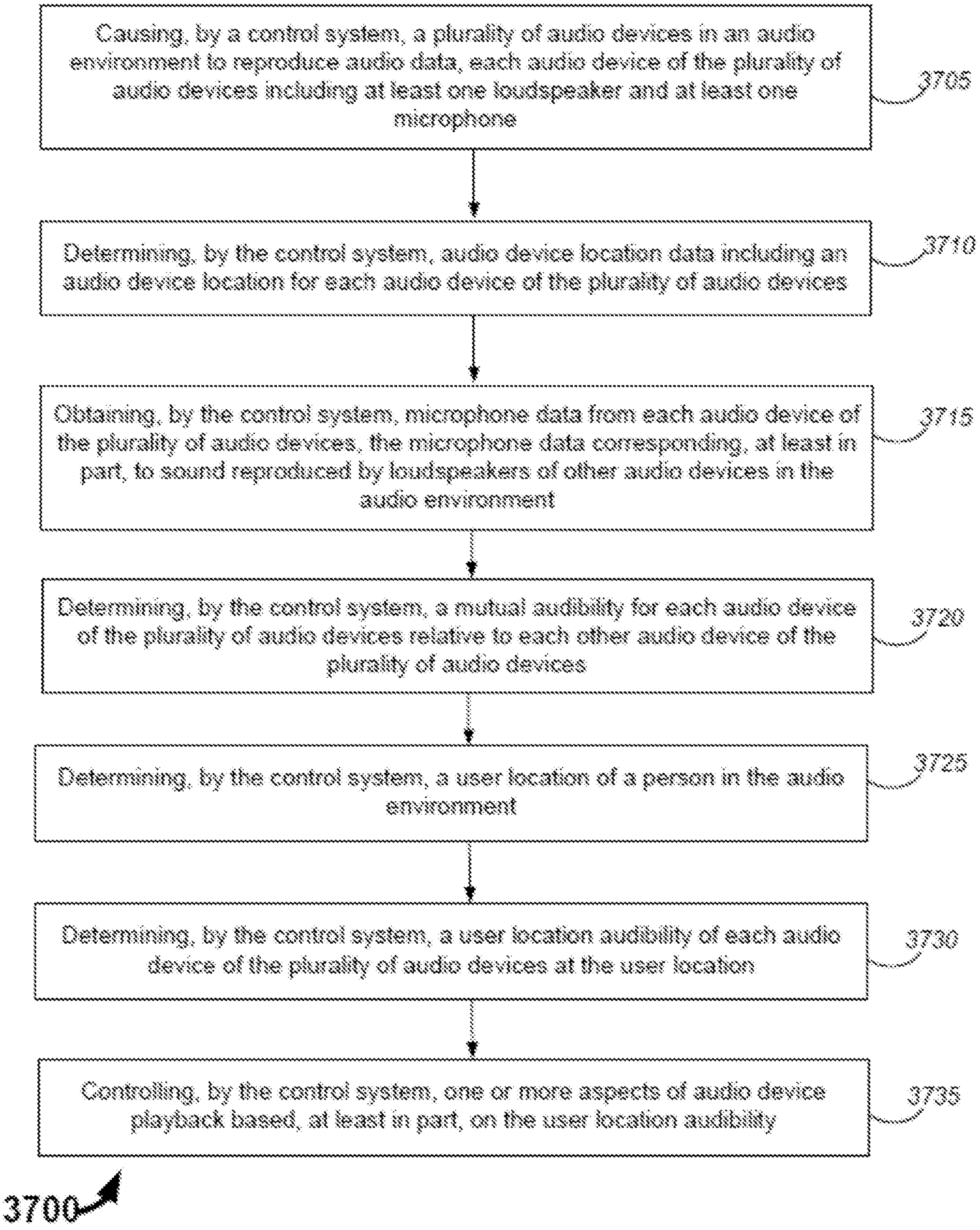
FIG. 37 is a flow diagram that outlines one example of another method that may be performed by an apparatus or system such as those disclosed herein.

FIG. 37 is a flow diagram that outlines one example of another method that may be performed by an apparatus or system such as those disclosed herein. The blocks of method 3700, like other methods described herein, are not necessarily performed in the order indicated. Moreover, such methods may include more or fewer blocks than shown and/or described. The blocks of method 3700 may be performed by one or more devices, which may be (or may include) a control system such as the control system 160 shown in FIG. 1B and described above, or one of the other disclosed control system examples. According to some examples, the blocks of method 3700 may be implemented by one or more devices according to instructions (e.g., software) stored on one or more non-transitory media.

In this implementation, block 3705 involves causing, by a control system, a plurality of audio devices in an audio environment to reproduce audio data. In this example, each audio device of the plurality of audio devices includes at least one loudspeaker and at least one microphone. However, in some such examples the audio environment may include at least one output-only audio device having at least one loudspeaker but no microphone. Alternatively, or additionally, in some such examples the audio environment may include one or more input-only audio devices having at least one microphone but no loudspeaker. Some examples of method 3700 in such contexts are described below.

According to this example, block 3710 involves determining, by the control system, audio device location data including an audio device location for each audio device of the plurality of audio devices. In some examples, block 3710 may involve determining the audio device location data by reference to previously-obtained audio device location data that is stored in a memory (e.g., in the memory system 165 of FIG. 1). In some instances, block 3710 may involve determining the audio device location data via an audio device auto-location process. The audio device auto-location process may involve performing one or more audio device auto-location methods, such as the DOA-based and/or TOA-based audio device auto-location methods referenced elsewhere herein.

According to this implementation, block 3715 involves obtaining, by the control system, microphone data from each audio device of the plurality of audio devices. In this example, the microphone data corresponds, at least in part, to sound reproduced by loudspeakers of other audio devices in the audio environment.

In some examples, causing the plurality of audio devices to reproduce audio data may involve causing each audio device of the plurality of audio devices to play back audio when all other audio devices in the audio environment are not playing back audio. For example, referring to FIG. 31, one such process may involve: (a) causing the audio device 3102 to emit a sound and receiving microphone data corresponding to the emitted sound from microphone arrays of the audio devices 3103-3105; then (b) causing the audio device 3103 to emit a sound and receiving microphone data corresponding to the emitted sound from microphone arrays of the audio devices 3102, 3104 and 3105; then (c) causing the audio device 3104 to emit a sound and receiving microphone data corresponding to the emitted sound from microphone arrays of the audio devices 3102, 3103 and 3105; then (d) causing the audio device 3105 to emit a sound and receiving microphone data corresponding to the emitted sound from microphone arrays of the audio devices 3102, 3103 and 3104. The emitted sounds may or may not be the same, depending on the particular implementation.

Other examples of block 3715 may involve obtaining the microphone data while content is being played back by each of the audio devices. Some such examples may involve spectral hole punching (also referred to herein as forming "gaps"). Accordingly, some such examples may involve causing, by the control system, each audio device of the plurality of audio devices to insert one or more frequency range gaps into audio data being reproduced by one or more loudspeakers of each audio device.

In this example, block 3720 involves determining, by the control system, a mutual audibility for each audio device of the plurality of audio devices relative to each other audio device of the plurality of audio devices. In some implementations, block 3720 may involve determining a mutual audibility matrix, e.g., as described above. In some examples, determining the mutual audibility matrix may involve a process of mapping decibels relative to full scale to decibels of sound pressure level. In some implementations, the mutual audibility matrix may include measured transfer functions between each audio device of the plurality of audio devices. In some examples, the mutual audibility matrix may include values for each frequency band of a plurality of frequency bands.

According to this implementation, block 3725 involves determining, by the control system, a user location of a person in the audio environment. In some examples, determining the user location may be based, at least in part, on at least one of direction of arrival data or time of arrival data corresponding to one or more utterances of the person. Some detailed examples of determining a user location of a person in an audio environment are described below.

In this example, block 3730 involves determining, by the control system, a user location audibility of each audio device of the plurality of audio devices at the user location. According to this implementation, block 3735 involves controlling one or more aspects of audio device playback based, at least in part, on the user location audibility. In some examples, the one or more aspects of audio device playback may include leveling and/or equalization, e.g., as described above with reference to FIG. 36.

According to some examples, block 3720 (or another block of method 3700) may involve determining an interpolated mutual audibility matrix by applying an interpolant to measured audibility data. In some examples, determining the interpolated mutual audibility matrix may involve applying a decay law model that is based in part on a distance decay constant. In some examples, the distance decay constant may include a per-device parameter and/or an audio environment parameter. In some instances, the decay law model may be frequency band based. According to some examples, the decay law model may include a critical distance parameter.

In some examples, method 3700 may involve estimating an output gain for each audio device of the plurality of audio devices according to values of the mutual audibility matrix and the decay law model. In some instances, estimating the output gain for each audio device may involve determining a least squares solution to a function of values of the mutual audibility matrix and the decay law model. In some examples, method 3700 may involve determining values for the interpolated mutual audibility matrix according to a function of the output gain for each audio device, the user location and each audio device location. In some examples, the values for the interpolated mutual audibility matrix may correspond to the user location audibility of each audio device.

According to some examples, method 3700 may involve equalizing frequency band values of the interpolated mutual audibility matrix. In some examples, method 3700 may involve applying a delay compensation vector to the interpolated mutual audibility matrix.

As noted above, in some implementations the audio environment may include at least one output-only audio device having at least one loudspeaker but no microphone. In some such examples, method 3700 may involve determining the audibility of the at least one output-only audio device at the audio device location of each audio device of the plurality of audio devices.

As noted above, in some implementations the audio environment may include one or more input-only audio devices having at least one microphone but no loudspeaker. In some such examples, method 3700 may involve determining an audibility of each loudspeaker-equipped audio device in the audio environment at a location of each of the one or more input-only audio devices.

Point Noise Source Case Implementations

This section discloses implementations that correspond with FIG. 33. As used in this section, a "point noise source" refers to a noise source for which the location $x_n$ is available but the source signal is not, one example of which is when the sound source 3106 of FIG. 31 is a noise source. Instead of (or in addition to) determining a mutual audibility matrix that corresponds to the mutual audibility of each of a plurality of audio devices in the audio environment, implementations of the "point noise source case" involve determining the audibility of such a point source at each of a plurality of audio device locations. Some such examples involve determining a noise audibility matrix $A \in \mathbb{R}^{K \times L}$ that measures the received level of such a point source at each of a plurality of audio device locations, not a transfer function as in the full matrix spatial audibility examples described above.

In some embodiments, the estimation of A may be made in real time, e.g., during a time at which audio is being played back in an audio environment. According to some implementations, the estimation of A may be part of a process of compensation for the noise of the point source (or other sound source of known location).

Figure 38:
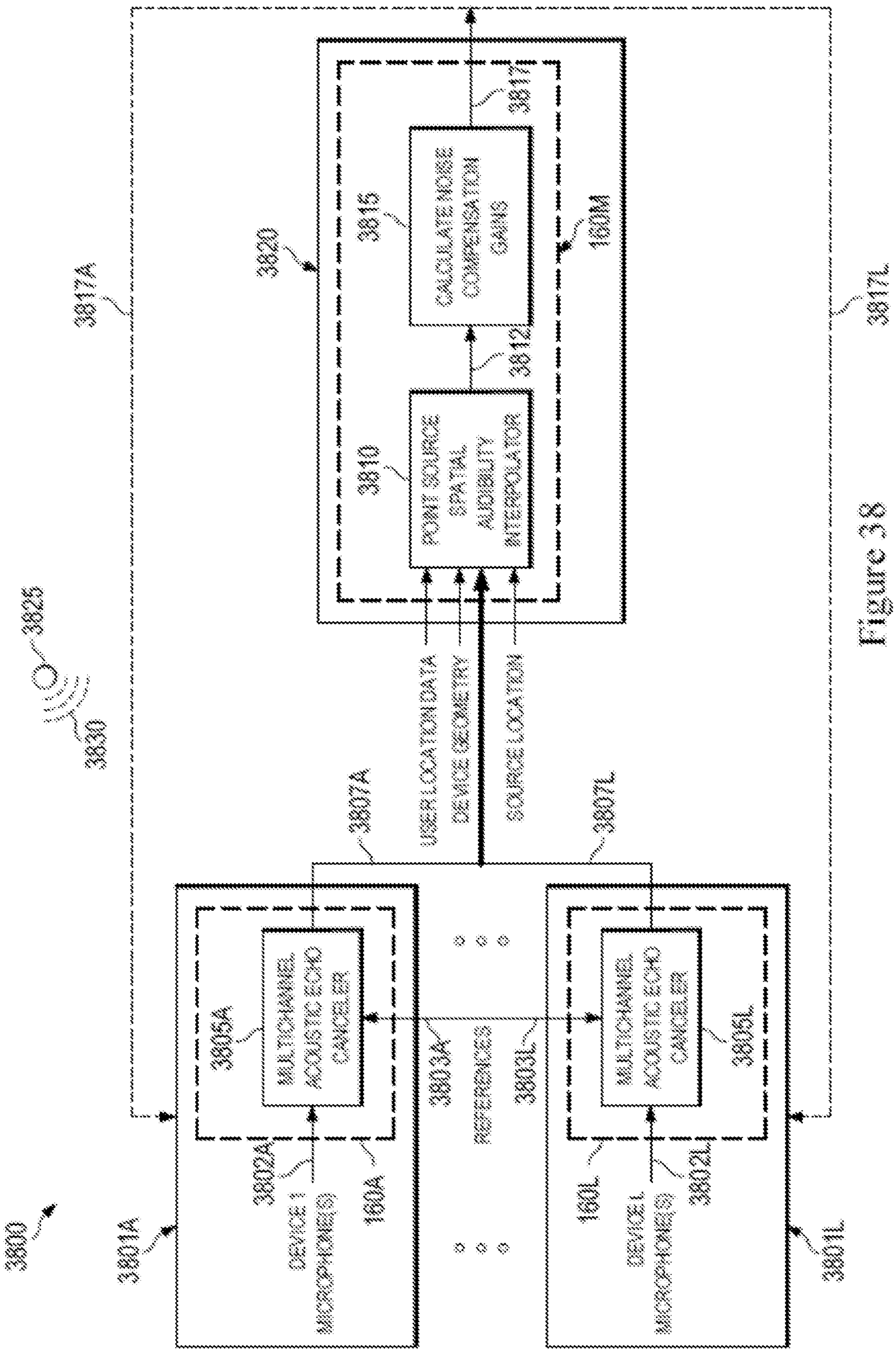
FIG. 38 is a block diagram that shows an example of a system according to another implementation.

FIG. 38 is a block diagram that shows an example of a system according to another implementation. As with other figures provided herein, the types, numbers and arrangements of elements shown in FIG. 38 are merely provided by way of example. Other implementations may include more, fewer and/or different types, numbers and/or arrangements of elements. According to this example, control systems 160A-160L correspond to audio devices 3801A-3801L (where L is two or more) and are instances of the control system 160 of the apparatus 150 that is described above with reference to FIG. 1B. Here, the control systems 160A-160L are implementing multichannel acoustic echo cancellers 3805A-3805L.

In this example, a point source spatial audibility interpolator 3810 and a noise compensation block 3815 are implemented by the control system 160M of the apparatus 3820, which is another instance of the apparatus 150 that is described above with reference to FIG. 1B. In some examples, the apparatus 3820 may be what is referred to herein as an orchestrating device or a smart home hub. However, in alternative examples the apparatus 3820 may be an audio device. In some instances, the functionality of the apparatus 3820 may be implemented by one of the audio devices 3801A-3801L. In some instances, the multichannel acoustic echo cancellers 3805A-3805L, the point source spatial audibility interpolator 3810 and/or the noise compensation block 3815 may be implemented via instructions (e.g., software) stored on one or more non-transitory media.

In this example, a sound source 3825 is producing sound 3830 in the audio environment. According to this example, the sound 3830 will be regarded as noise. In this instance, the sound source 3825 is not operating under the control of any of the control systems 160A-160M. In this example, the location of the sound source 3825 is known by (in other words, provided to and/or stored in a memory accessible by) the control system 160M.

According to this example, the multichannel acoustic echo canceller 3805A receives microphone signals 3802A from one or more microphones of the audio device 3801A and a local echo reference 3803A that corresponds with audio being played back by the audio device 3801A. Here, the multichannel acoustic echo canceller 3805A is configured to produce the residual microphone signal 3807A (which also may be referred to as an echo-canceled microphone signal) and to provide the residual microphone signal 3807A to the apparatus 3820. In this example, it is assumed that the residual microphone signal 3807A corresponds mainly to the sound 3830 received at the location of the audio device 3801A.

Similarly, the multichannel acoustic echo canceller 3805L receives microphone signals 3802L from one or more microphones of the audio device 3801L and a local echo reference 3803L that corresponds with audio being played back by the audio device 3801L. The multichannel acoustic echo canceller 3805L is configured to output the residual microphone signal 3807L to the apparatus 3820. In this example, it is assumed that the residual microphone signal 3807L corresponds mainly to the sound 3830 received at the location of the audio device 3801L. In some examples, the multichannel acoustic echo cancellers 3805A-3805L may be configured for echo cancellation in each of K frequency bands.

In this example, the point source spatial audibility interpolator 3810 receives the residual microphone signals 3807A-3807L, as well as audio device geometry (location data for each of the audio devices 3801A-3801L) and source location data. According to this example, the point source spatial audibility interpolator 3810 is configured for determining noise audibility information that indicates the received level of the sound 3830 at each of the locations of the audio devices 3801A-3801L. In some examples, the noise audibility information may include noise audibility data for each of K frequency bands and may, in some instances, be the noise audibility matrix $A \in \mathbb{R}^{K \times L}$ that is referenced above.

In some implementations, the point source spatial audibility interpolator 3810 (or another block of the control system 160M) may be configured to estimate, based on user location data and the received level of the sound 3830 at each of the locations of the audio devices 3801A-3801L, a noise audibility information 3812 that indicates the level of the sound 3830 at a user location in the audio environment. In some instances, estimating the noise audibility information 3812 may involve an interpolation process such as those described above, e.g., by applying a distance attenuation model to estimate the noise level vector b∈ $\mathbb{R}^{K\times 1}$ at the user location.

According to this example, the noise compensation block 3815 is configured to determine noise compensation gains 3817 based on the estimated noise level 3812 at the user location. In this example, the noise compensation gains 3817 are multi-band noise compensation gains (e.g., the noise compensation gains q∈ $\mathbb{R}^{K\times 1}$ that are referenced above), which may differ according to frequency band. For example, the noise compensation gains may be higher in frequency bands corresponding to higher estimated levels of the sound 3830 at the user position. In some examples, the noise compensation gains 3817 are provided to the audio devices 3801A-3801L, so that the audio devices 3801A-3801L may control playback of audio data in accordance with the noise compensation gains 3817. As suggested by the dashed lines 3817A and 3817L, in some instances the noise compensation block 3815 may configured to determine noise compensation gains that are specific to each of the audio devices 3801A-3801L.

Figure 39:
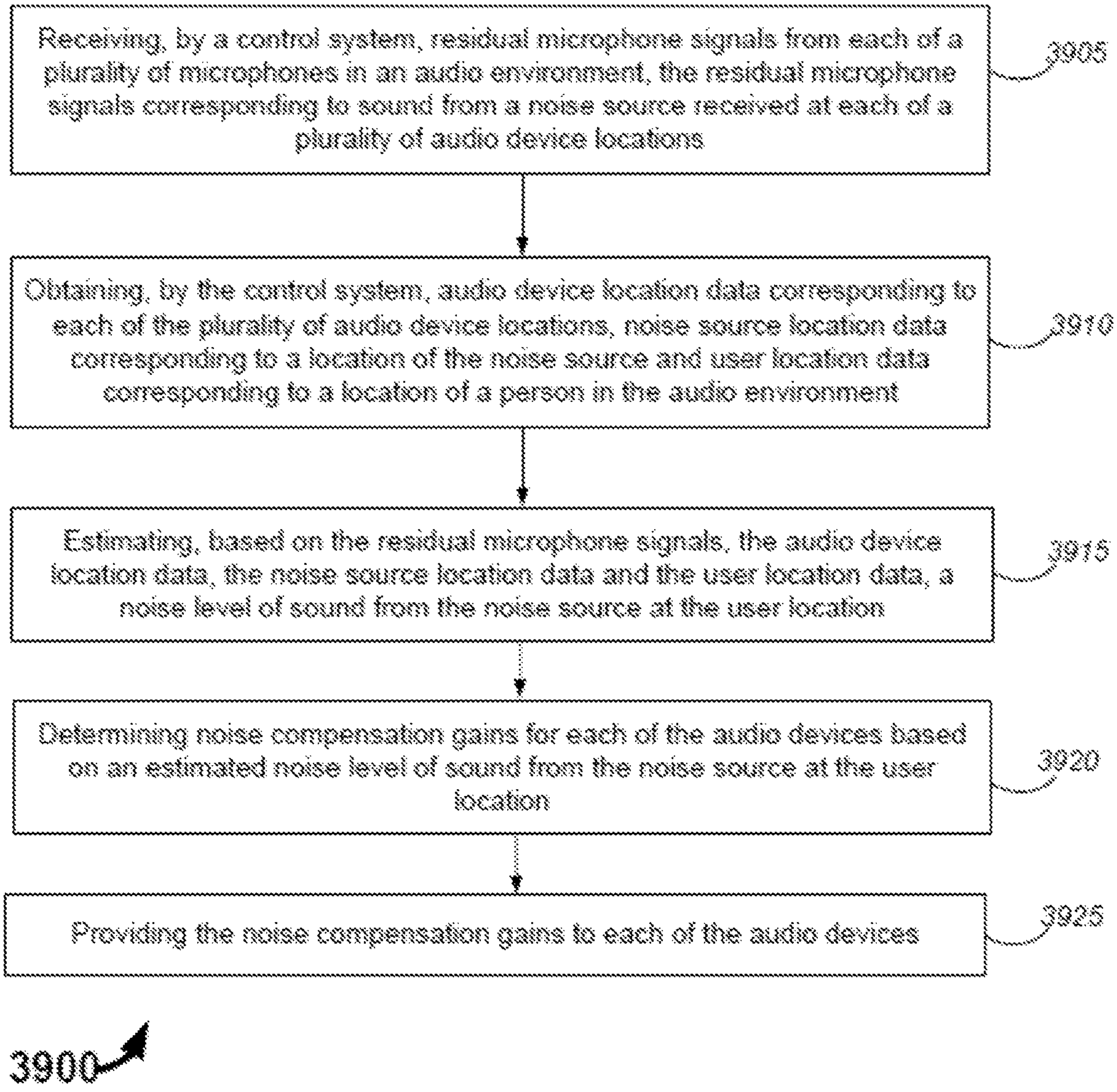
FIG. 39 is a flow diagram that outlines one example of another method that may be performed by an apparatus or system such as those disclosed herein.

FIG. 39 is a flow diagram that outlines one example of another method that may be performed by an apparatus or system such as those disclosed herein. The blocks of method 3900, like other methods described herein, are not necessarily performed in the order indicated. Moreover, such methods may include more or fewer blocks than shown and/or described. The blocks of method 3900 may be performed by one or more devices, which may be (or may include) a control system such as that shown in FIG. 1B and described above, or one of the other disclosed control system examples. According to some examples, the blocks of method 3900 may be implemented by one or more devices according to instructions (e.g., software) stored on one or more non-transitory media.

In this implementation, block 3905 involves receiving, by a control system, residual microphone signals from each of a plurality of microphones in an audio environment. In this example, the residual microphone signals correspond to sound from a noise source received at each of a plurality of audio device locations. In the example described above with reference to FIG. 38, block 3905 involves the control system 160M receiving the residual microphone signals 3807A-3807L from the multichannel acoustic echo cancelers 3805A-3805L. However, in some alternative implementations, one or more of blocks 3905-3925 (and in some instances, all of blocks 3905-3925) may be performed by another control system, such as one of the audio device control systems.

According to this example, block 3910 involves obtaining, by the control system, audio device location data corresponding to each of the plurality of audio device locations, noise source location data corresponding to a location of the noise source and user location data corresponding to a location of a person in the audio environment. In some examples, block 3910 may involve determining the audio device location data, the noise source location data and/or the user location data by reference to previously-obtained audio device location data that is stored in a memory (e.g., in the memory system 115 of FIG. 1). In some instances, block 3910 may involve determining the audio device location data, the noise source location data and/or the user location data via an auto-location process. The auto-location process may involve performing one or more auto-location methods, such as the auto-location methods referenced elsewhere herein.

According to this implementation, block 3915 involves estimating, based on the residual microphone signals, the audio device location data, the noise source location data and the user location data, a noise level of sound from the noise source at the user location. In the example described above with reference to FIG. 38, block 3915 may involve the point source spatial audibility interpolator 3810 (or another block of the control system 160M) estimating, based on user location data and the received level of the sound 3830 at each of the locations of the audio devices 3801A-3801L, a noise level 3812 of the sound 3830 at a user location in the audio environment. In some instances, block 3915 may involve an interpolation process such as those described above, e.g., by applying a distance attenuation model to estimate the noise level vector b∈ $\mathbb{R}^{K\times 1}$ at the user location.

In this example, block 3920 involves determining noise compensation gains for each of the audio devices based on the estimated noise level of sound from the noise source at the user location. In the example described above with reference to FIG. 38, block 3920 may involve the noise compensation block 3815 determining the noise compensation gains 3817 based on the estimated noise level 3812 at the user location. In some examples, the noise compensation gains may be multi-band noise compensation gains (e.g., the noise compensation gains q∈ $\mathbb{R}^{K\times 1}$ that are referenced above), which may differ according to the frequency band.

According to this implementation, block 3925 involves providing the noise compensation gains to each of the audio devices. In the example described above with reference to FIG. 38, block 3925 may involve the apparatus 3820 providing the noise compensation gains 3817A-3817L to each of the audio devices 3801A-3801L.

Diffuse or Unlocated Noise Source Implementations

Locating a sound source, such as a noise source, may not always be possible, in particular when the sound source is not located in the same room or the sound source is highly occluded to the microphone array(s) detecting the sound. In such instances, estimating the noise level at a user location may be regarded as a sparse interpolation problem with a few known noise level values (e.g., one at each microphone or microphone array of each of a plurality of audio devices in the audio environment).

Such an interpolation may be expressed as a general function $f:\mathbb{R}^2 \rightarrow \mathbb{R}$, which represents interpolating known points in 2D space (represented by the $\mathbb{R}^2$ term) to an $\mathbb{R}^2$ interpolated scalar value (represented by $\mathbb{R}$). One example involves selection of subsets of three nodes (corresponding to microphones or microphone arrays of three audio devices in the audio environment) to form a triangle of nodes and solving for audibility within the triangle by bivariate linear interpolation. For any given node i, one can represent the received level in the kth band as $A_i^{(k)}=ax_i+by_i+c$. Solving for the unknowns, $$\begin{bmatrix} a \\ b \\ c \end{bmatrix} = \begin{bmatrix} x_1 & y_1 & 1 \\ x_2 & y_2 & 1 \\ x_3 & y_3 & 1 \end{bmatrix}^{-1} \begin{bmatrix} A_1^{(k)} \\ A_2^{(k)} \\ A_3^{(k)} \end{bmatrix}.$$

The interpolated audibility at any arbitrary point within the triangle becomes $$\hat{A}_i^{(k)} = ax + by + c.$$

Other examples may involve barycentric interpolation or cubic triangular interpolation, e.g., as described in Amidror, Isaac, "Scattered data interpolation methods for electronic imaging systems: a survey," in *Journal of Electronic Imaging* Vol. 11, No. 2, April 2002, pp. 157-176, which is hereby incorporated by reference. Such interpolation methods are applicable to the noise compensation methods described above with reference to FIGS. 38 and 39, e.g., by replacing the point source spatial audibility interpolator 3810 of FIG. 38 with a naïve spatial interpolator implemented according to any of the interpolation methods described in this section and by omitting the process of obtaining noise source location data in block 3910 of FIG. 39. The interpolation methods described in this section do not yield a spherical distance decay, but do provide plausible level interpolation within a listening area.

Figure 40:
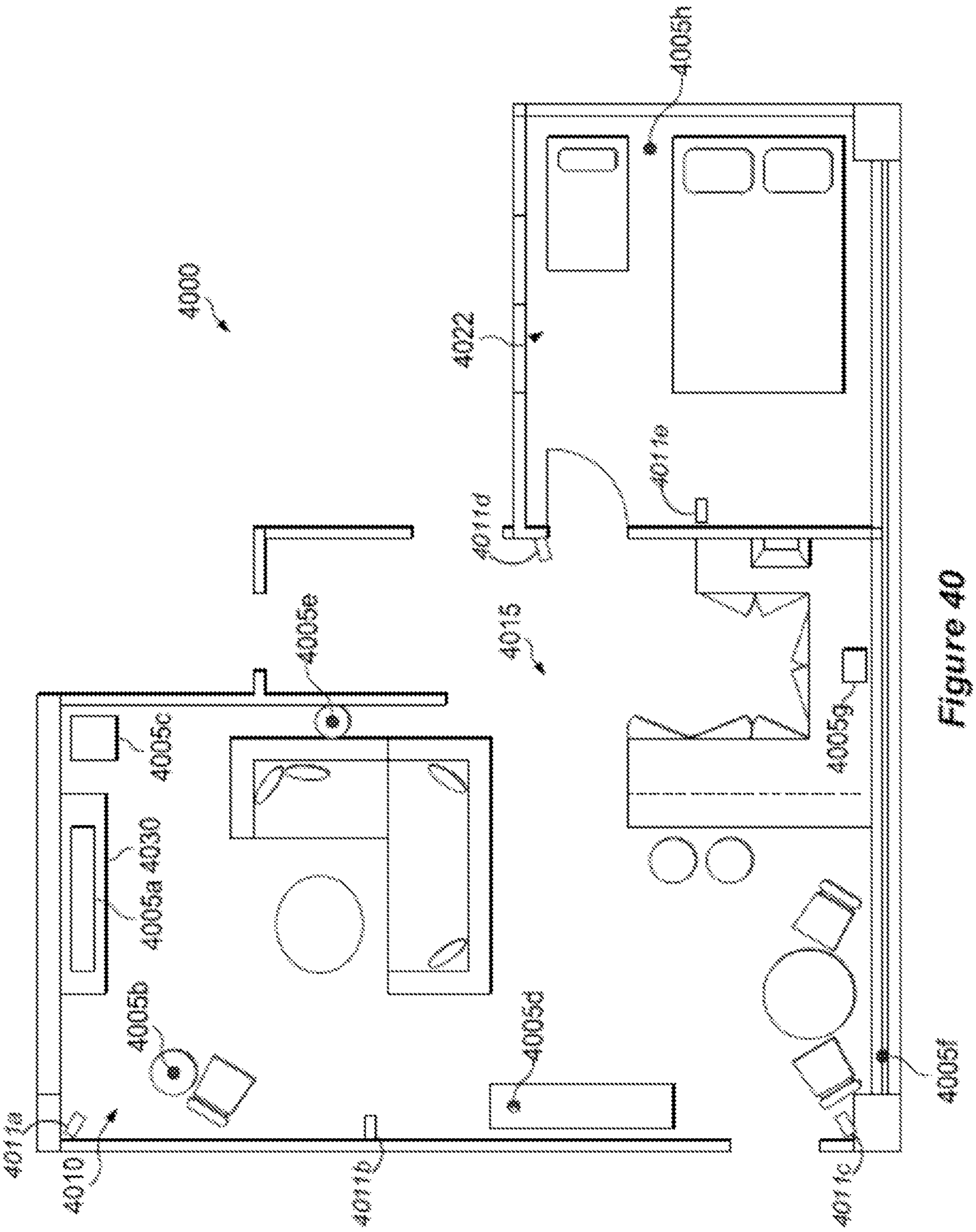
FIG. 40 shows an example of a floor plan of another audio environment, which is a living space in this instance.

FIG. 40 shows an example of a floor plan of another audio environment, which is a living space in this instance. As with other figures provided herein, the types and numbers of elements shown in FIG. 40 are merely provided by way of example. Other implementations may include more, fewer and/or different types and numbers of elements.

According to this example, the environment 4000 includes a living room 4010 at the upper left, a kitchen 4015 at the lower center, and a bedroom 4022 at the lower right. Boxes and circles distributed across the living space represent a set of loudspeakers 4005*a*-4005*h*, at least some of which may be smart speakers in some implementations, placed in locations convenient to the space, but not adhering to any standard prescribed layout (arbitrarily placed). In some examples, the television 4030 may be configured to implement one or more disclosed embodiments, at least in part. In this example, the environment 4000 includes cameras 4011*a*-4011*e*, which are distributed throughout the environment. In some implementations, one or more smart audio devices in the environment 4000 also may include one or more cameras. The one or more smart audio devices may be single purpose audio devices or virtual assistants. In some such examples, one or more cameras of the optional sensor system 180 (see FIG. 1B) may reside in or on the television 4030, in a mobile phone or in a smart speaker, such as one or more of the loudspeakers 4005*b*, 4005*d*, 4005*e* or 4005*h*. Although cameras 4011*a*-4011*e* are not shown in every depiction of the environment 4000 presented in this disclosure, each of the environments 4000 may nonetheless include one or more cameras in some implementations.

Automatic Localization of Audio Devices

The present assignee has produced several speaker localization techniques for cinema and home that are excellent solutions in the use cases for which they were designed. Some such methods are based on time-of-flight derived from impulse responses between a sound source and microphone(s) that are approximately co-located with each loudspeaker. While system latencies in the record and playback chains may also be estimated, sample synchrony between clocks is required along with the need for a known test stimulus from which to estimate impulse responses.

Recent examples of source localization in this context have relaxed constraints by requiring intra-device microphone synchrony but not requiring inter-device synchrony. Additionally, some such methods relinquish the need for passing audio between sensors by low-bandwidth message passing such as via detection of the time of arrival (TOA, also referred to as "time of flight") of a direct (non-reflected) sound or via detection of the dominant direction of arrival (DOA) of a direct sound. Each approach has some potential advantages and potential drawbacks. For example, some previously-deployed TOA methods can determine device geometry up to an unknown translation, rotation, and reflection about one of three axes. Rotations of individual devices are also unknown if there is just one microphone per device. Some previously-deployed DOA methods can determine device geometry up to an unknown translation, rotation, and scale. While some such methods may produce satisfactory results under ideal conditions, the robustness of such methods to measurement error has not been demonstrated.

Some of the embodiments disclosed in this application allow for the localization of a collection of smart audio devices based on 1) the DOA between each pair of audio devices in an audio environment, and 2) the minimization of a non-linear optimization problem designed for input of data type 1). Other embodiments disclosed in the application allow for the localization of a collection of smart audio devices based on 1) the DOA between each pair of audio devices in the system, 2) the TOA between each pair of devices, and 3) the minimization of a non-linear optimization problem designed for input of data types 1) and 2).

Figure 41:
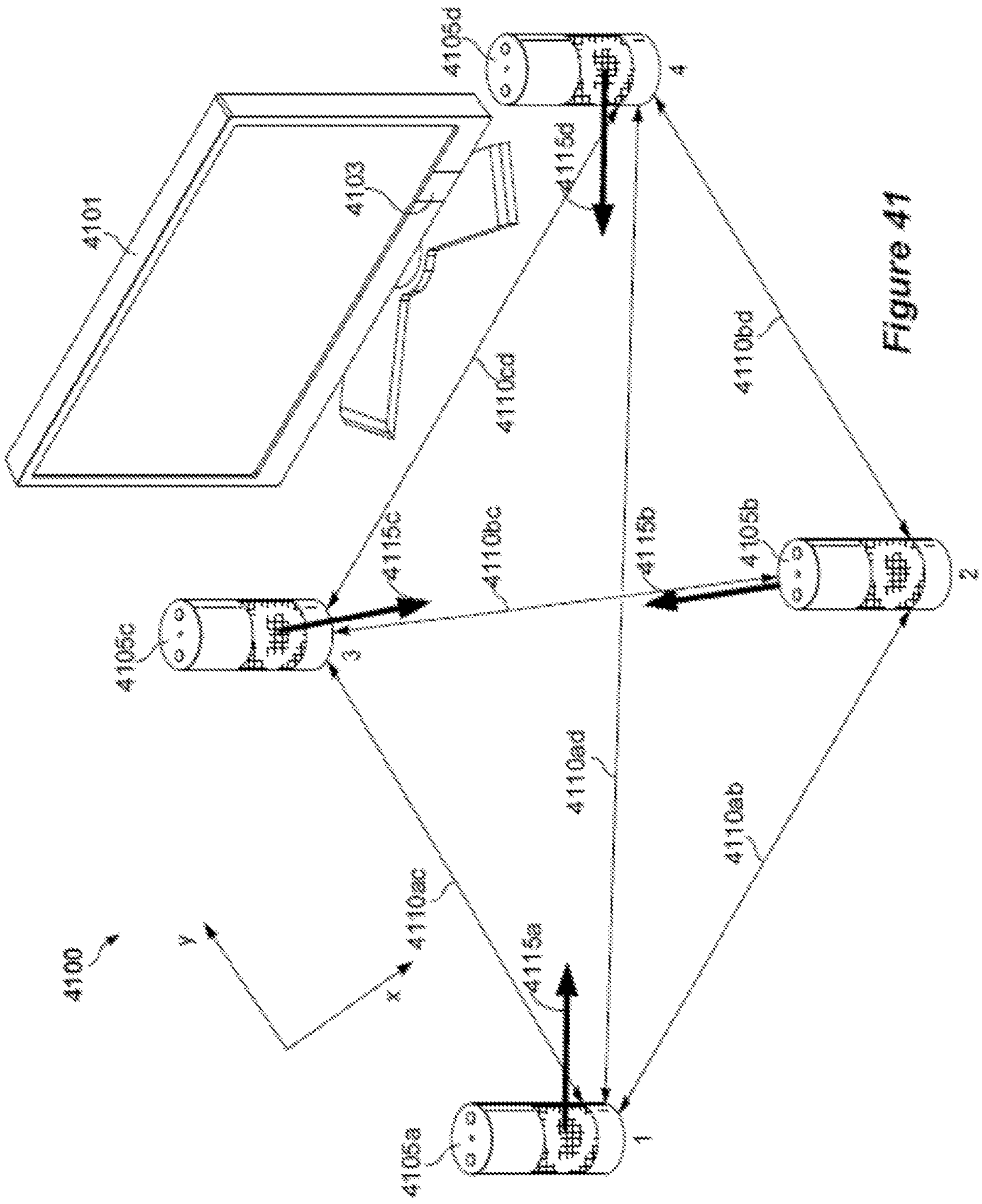
FIG. 41 shows an example of geometric relationships between four audio devices in an environment.

FIG. 41 shows an example of geometric relationships between four audio devices in an environment. In this example, the audio environment 4100 is a room that includes a television 4101 and audio devices 4105*a*, 4105*b*, 4105*c* and 4105*d*. According to this example, the audio devices 4105*a*-4105*d* are in locations 1 through 4, respectively, of the audio environment 4100. As with other examples disclosed herein, the types, numbers, locations and orientations of elements shown in FIG. 41 are merely made by way of example. Other implementations may have different types, numbers and arrangements of elements, e.g., more or fewer audio devices, audio devices in different locations, audio devices having different capabilities, etc.

In this implementation, each of the audio devices 4105*a*-4105*d* is a smart speaker that includes a microphone system and a speaker system that includes at least one speaker. In some implementations, each microphone system includes an array of at least three microphones. According to some implementations, the television 4101 may include a speaker system and/or a microphone system. In some such implementations, an automatic localization method may be used to automatically localize the television 4101, or a portion of the television 4101 (e.g., a television loudspeaker, a television transceiver, etc.), e.g., as described below with reference to the audio devices 4105*a*-4105*d*.

Some of the embodiments described in this disclosure allow for the automatic localization of a set of audio devices, such as the audio devices 4105*a*-4105*d* shown in FIG. 41, based on either the direction of arrival (DOA) between each pair of audio devices, the time of arrival (TOA) of the audio signals between each pair of devices, or both the DOA and the TOA of the audio signals between each pair of devices. In some instances, as in the example shown in FIG. 41, each of the audio devices is enabled with at least one driving unit and one microphone array, the microphone array being capable of providing the direction of arrival of an incoming sound. According to this example, the two-headed arrow 4110*ab* represents sound transmitted by the audio device 4105*a* and received by the audio device 4105*b*, as well as sound transmitted by the audio device 4105*b* and received by the audio device 4105*a*. Similarly, the two-headed arrows 4110*ac*, 4110*ad*, 4110*bc*, 4110*bd*, and 4110*cd* represent sounds transmitted and received by audio devices 4105*a* and audio device 4105*c*, sounds transmitted and received by audio devices 4105*a* and audio device 4105*d*, sounds transmitted and received by audio devices 4105*b* and audio device 4105*c*, sounds transmitted and received by audio devices 4105*b* and audio device 4105*d*, and sounds transmitted and received by audio devices 4105*c* and audio device 4105*d*, respectively.

In this example, each of the audio devices 4105*a*-4105*d* has an orientation, represented by the arrows 4115*a*-4115*d*, which may be defined in various ways. For example, the orientation of an audio device having a single loudspeaker may correspond to a direction in which the single loudspeaker is facing. In some examples, the orientation of an audio device having multiple loudspeakers facing in different directions may be indicated by a direction in which one of the loudspeakers is facing. In other examples, the orientation of an audio device having multiple loudspeakers facing in different directions may be indicated by the direction of a vector corresponding to the sum of audio output in the different directions in which each of the multiple loudspeakers is facing. In the example shown in FIG. 41, the orientations of the arrows 4115*a*-4115*d* are defined with reference to a Cartesian coordinate system. In other examples, the orientations of the arrows 4115*a*-4115*d* may be defined with reference to another type of coordinate system, such as a spherical or cylindrical coordinate system.

In this example, the television 4101 includes an electromagnetic interface 4103 that is configured to receive electromagnetic waves. In some examples, the electromagnetic interface 4103 may be configured to transmit and receive electromagnetic waves. According to some implementations, at least two of the audio devices 4105*a*-4105*d* may include an antenna system configured as a transceiver. The antenna system may be configured to transmit and receive electromagnetic waves. In some examples, the antenna system includes an antenna array having at least three antennas. Some of the embodiments described in this disclosure allow for the automatic localization of a set of devices, such as the audio devices 4105*a*-4105*d* and/or the television 4101 shown in FIG. 41, based at least in part on the DOA of electromagnetic waves transmitted between devices. Accordingly, the two-headed arrows 4110*ab*, 4110*ac*, 4110*ad*, 4110*bc*, 4110*bd*, and 4110*cd* also may represent electromagnetic waves transmitted between the audio devices 4105*a*-4105*d*.

According to some examples, the antenna system of a device (such as an audio device) may be co-located with a loudspeaker of the device, e.g., adjacent to the loudspeaker. In some such examples, an antenna system orientation may correspond with a loudspeaker orientation. Alternatively, or additionally, the antenna system of a device may have a known or predetermined orientation with respect to one or more loudspeakers of the device.

In this example, the audio devices 4105*a*-4105*d* are configured for wireless communication with one another and with other devices. In some examples, the audio devices 4105*a*-4105*d* may include network interfaces that are configured for communication between the audio devices 4105*a*-4105*d* and other devices via the Internet. In some implementations, the automatic localization processes disclosed herein may be performed by a control system of one of the audio devices 4105*a*-4105*d*. In other examples, the automatic localization processes may be performed by another device of the audio environment 4100, such as what may sometimes be referred to as a smart home hub, that is configured for wireless communication with the audio devices 4105*a*-4105*d*. In other examples, the automatic localization processes may be performed, at least in part, by a device outside of the audio environment 4100, such as a server, e.g., based on information received from one or more of the audio devices 4105*a*-4105*d* and/or a smart home hub.

Figure 42:
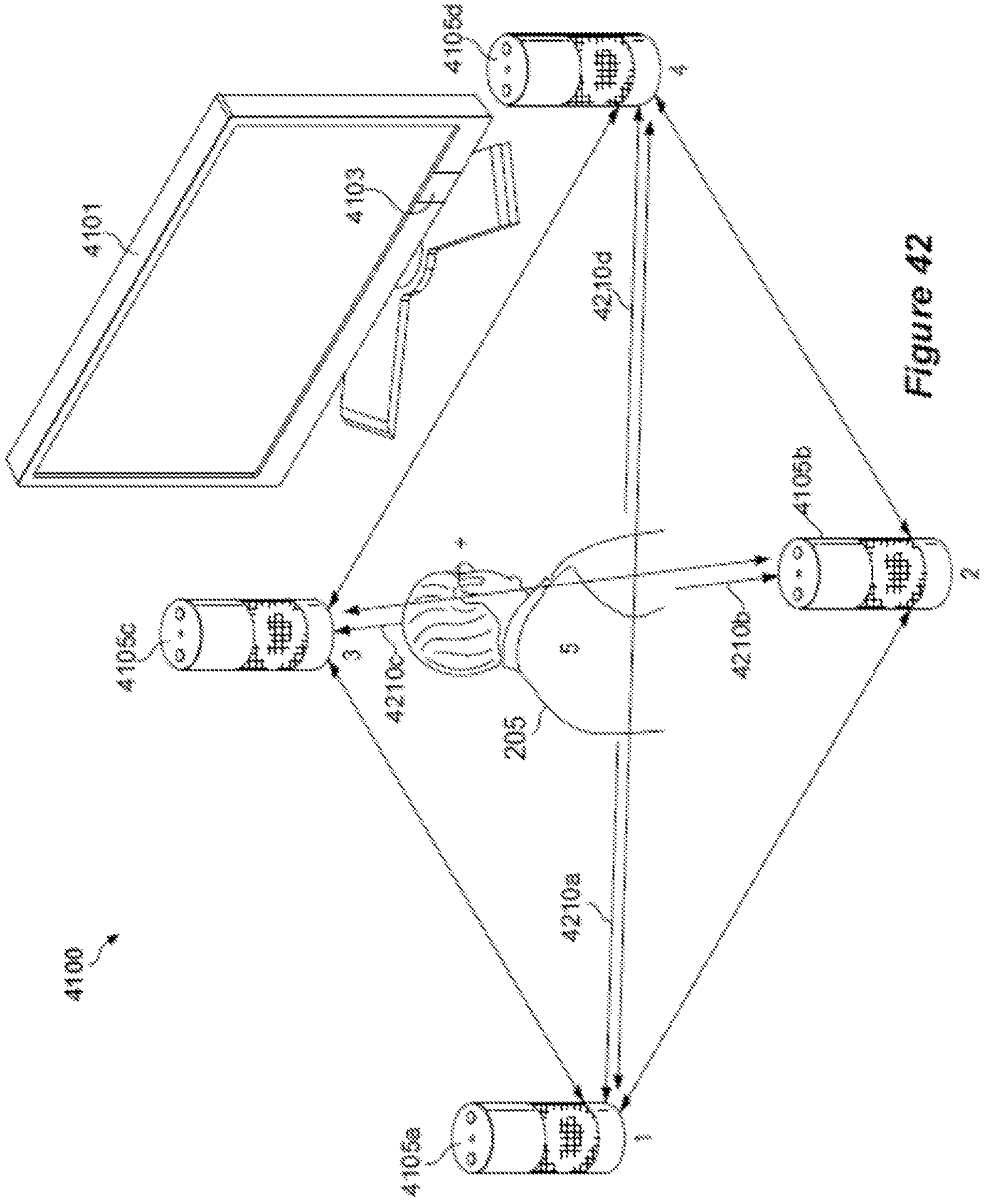
FIG. 42 shows an audio emitter located within the audio environment of FIG. 41.

FIG. 42 shows an audio emitter located within the audio environment of FIG. 41. Some implementations provide automatic localization of one or more audio emitters, such as the person 4205 of FIG. 42. In this example, the person 4205 is at location 5. Here, sound emitted by the person 4205 and received by the audio device 4105*a* is represented by the single-headed arrow 4210*a*. Similarly, sounds emitted by the person 4205 and received by the audio devices 4105*b*, 4105*c* and 4105*d* are represented by the single-headed arrows 4210*b*, 4210*c* and 4210*d*. Audio emitters can be localized based on either the DOA of the audio emitter sound as captured by the audio devices 4105*a*-4105*d* and/or the television 4101, based on the differences in TOA of the audio emitter sound as measured by the audio devices 4105*a*-4105*d* and/or the television 4101, or based on both the DOA and the differences in TOA.

Alternatively, or additionally, some implementations may provide automatic localization of one or more electromagnetic wave emitters. Some of the embodiments described in this disclosure allow for the automatic localization of one or more electromagnetic wave emitters, based at least in part on the DOA of electromagnetic waves transmitted by the one or more electromagnetic wave emitters. If an electromagnetic wave emitter were at location 5, electromagnetic waves emitted by the electromagnetic wave emitter and received by the audio devices 4105*a*, 4105*b*, 4105*c* and 4105*d* also may be represented by the single-headed arrows 4210*a*, 4210*b*, 4210*c* and 4210*c*.

Figure 43:
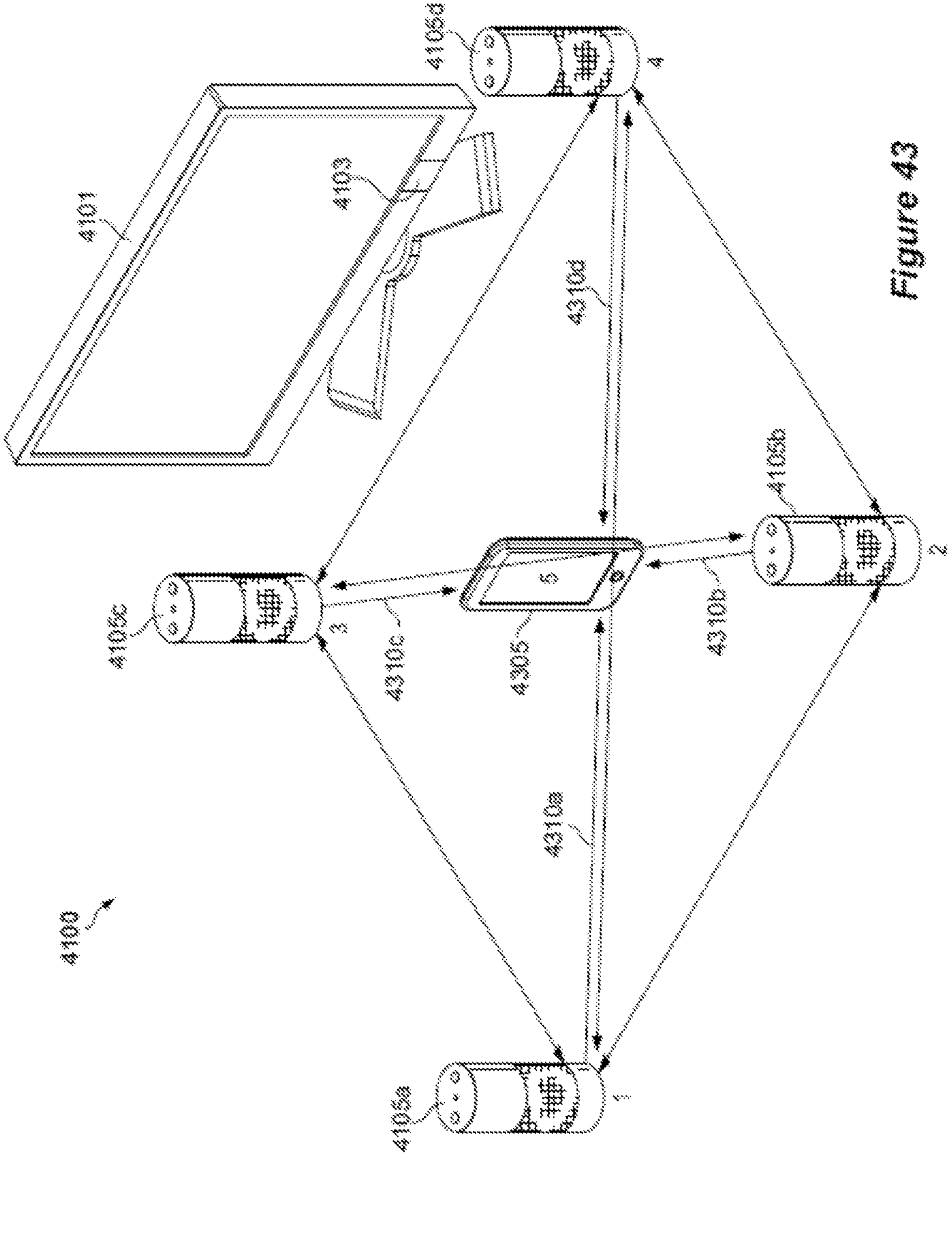
FIG. 43 shows an audio receiver located within the audio environment of FIG. 41.

FIG. 43 shows an audio receiver located within the audio environment of FIG. 41. In this example, the microphones of a smartphone 4305 are enabled, but the speakers of the smartphone 4305 are not currently emitting sound. Some embodiments provide automatic localization one or more passive audio receivers, such as the smartphone 4305 of FIG. 43 when the smartphone 4305 is not emitting sound. Here, sound emitted by the audio device 4105*a* and received by the smartphone 4305 is represented by the single-headed arrow 4310*a*. Similarly, sounds emitted by the audio devices 4105*b*, 4105*c* and 4105*d* and received by the smartphone 4305 are represented by the single-headed arrows 4310*b*, 4310*c* and 4310*d*.

If the audio receiver is equipped with a microphone array and is configured to determine the DOA of received sound, the audio receiver may be localized based, at least in part, on the DOA of sounds emitted by the audio devices 4105*a*-4105*d* and captured by the audio receiver. In some examples, the audio receiver may be localized based, at least in part, on the difference in TOA of the smart audio devices as captured by the audio receiver, regardless of whether the audio receiver is equipped with a microphone array. Yet other embodiments may allow for the automatic localization of a set of smart audio devices, one or more audio emitters, and one or more receivers, based on DOA only or DOA and TOA, by combining the methods described above.

Direction of Arrival Localization

Figure 44:
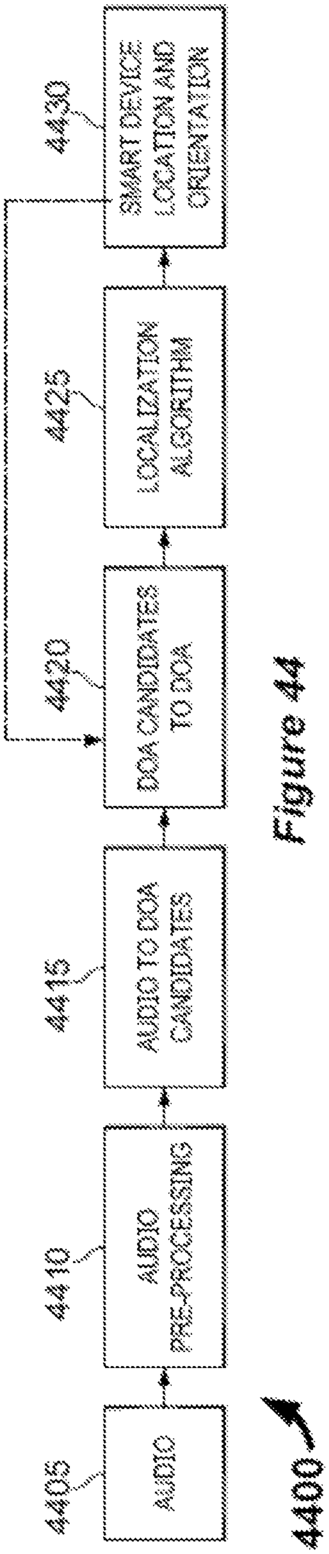
FIG. 44 is a flow diagram that outlines another example of a method that may be performed by a control system of an apparatus such as that shown in FIG. 1B.

FIG. 44 is a flow diagram that outlines another example of a method that may be performed by a control system of an apparatus such as that shown in FIG. 1B. The blocks of method 4400, like other methods described herein, are not necessarily performed in the order indicated. Moreover, such methods may include more or fewer blocks than shown and/or described.

Method 4400 is an example of an audio device localization process. In this example, method 4400 involves determining the location and orientation of two or more smart audio devices, each of which includes a loudspeaker system and an array of microphones. According to this example, method 4400 involves determining the location and orientation of the smart audio devices based at least in part on the audio emitted by every smart audio device and captured by every other smart audio device, according to DOA estimation. In this example, the initial blocks of method 4400 rely on the control system of each smart audio device to be able to extract the DOA from the input audio obtained by that smart audio device's microphone array, e.g., by using the time differences of arrival between individual microphone capsules of the microphone array.

In this example, block 4405 involves obtaining the audio emitted by every smart audio device of an audio environment and captured by every other smart audio device of the audio environment. In some such examples, block 4405 may involve causing each smart audio device to emit a sound, which in some instances may be a sound having a predetermined duration, frequency content, etc. This predetermined type of sound may be referred to herein as a structured source signal. In some implementations, the smart audio devices may be, or may include, the audio devices 4105*a*-4105*d* of FIG. 41.

In some such examples, block 4405 may involve a sequential process of causing a single smart audio device to emit a sound while the other smart audio devices "listen" for the sound. For example, referring to FIG. 41, block 4405 may involve: (a) causing the audio device 4105*a* to emit a sound and receiving microphone data corresponding to the emitted sound from microphone arrays of the audio devices 4105*b*-4105*d*; then (b) causing the audio device 4105*b* to emit a sound and receiving microphone data corresponding to the emitted sound from microphone arrays of the audio devices 4105*a*, 4105*c* and 4105*d*; then (c) causing the audio device 4105*c* to emit a sound and receiving microphone data corresponding to the emitted sound from microphone arrays of the audio devices 4105*a*, 4105*b* and 4105*d*; then (d) causing the audio device 4105*d* to emit a sound and receiving microphone data corresponding to the emitted sound from microphone arrays of the audio devices 4105*a*, 4105*b* and 4105*c*. The emitted sounds may or may not be the same, depending on the particular implementation.

In other examples, block 4405 may involve a simultaneous process of causing all smart audio devices to emit a sound while the other smart audio devices "listen" for the sound. For example, block 4405 may involve performing the following steps simultaneously: (1) causing the audio device 4105*a* to emit a first sound and receiving microphone data corresponding to the emitted first sound from microphone arrays of the audio devices 4105*b*-4105*d*; (2) causing the audio device 4105*b* to emit a second sound different from the first sound and receiving microphone data corresponding to the emitted second sound from microphone arrays of the audio devices 4105*a*, 4105*c* and 4105*d*; (3) causing the audio device 4105*c* to emit a third sound different from the first sound and the second sound, and receiving microphone data corresponding to the emitted third sound from microphone arrays of the audio devices 4105*a*, 4105*b* and 4105*d*; (4) causing the audio device 4105*d* to emit a fourth sound different from the first sound, the second sound and the third sound, and receiving microphone data corresponding to the emitted fourth sound from microphone arrays of the audio devices 4105*a*, 4105*b* and 4105*c*.

In some examples, block 4405 may be used to determine the mutual audibility of the audio devices in an audio environment. Some detailed examples are disclosed herein.

In this example, block 4410 involves a process of pre-processing the audio signals obtained via the microphones. Block 4410 may, for example, involve applying one or more filters, a noise or echo suppression process, etc. Some additional pre-processing examples are described below.

According to this example, block 4415 involves determining DOA candidates from the pre-processed audio signals resulting from block 4410. For example, if block 4405 involved emitting and receiving structured source signals, block 4415 may involve one or more deconvolution methods to yield impulse responses and/or "pseudo ranges," from which the time difference of arrival of dominant peaks can be used, in conjunction with the known microphone array geometry of the smart audio devices, to estimate DOA candidates.

However, not all implementations of method 4400 involve obtaining microphone signals based on the emission of predetermined sounds. Accordingly, some examples of block 4415 include "blind" methods that are applied to arbitrary audio signals, such as steered response power, receiver-side beamforming, or other similar methods, from which one or more DOAs may be extracted by peak-picking. Some examples are described below. It will be appreciated that while DOA data may be determined via blind methods or using structured source signals, in most instances TOA data may only be determined using structured source signals. Moreover, more accurate DOA information may generally be obtained using structured source signals.

According to this example, block 4420 involves selecting one DOA corresponding to the sound emitted by each of the other smart audio devices. In many instances, a microphone array may detect both direct arrivals and reflected sound that was transmitted by the same audio device. Block 4420 may involve selecting the audio signals that are most likely to correspond to directly transmitted sound. Some additional examples of determining DOA candidates and of selecting a DOA from two or more candidate DOAs are described below.

In this example, block 4425 involves receiving DOA information resulting from each smart audio device's implementation of block 4420 (in other words, receiving a set of DOAs corresponding to sound transmitted from every smart audio device to every other smart audio device in the audio environment) and performing a localization method (e.g., implementing a localization algorithm via a control system) based on the DOA information. In some disclosed implementations, block 4425 involves minimizing a cost function, possibly subject to some constraints and/or weights, e.g., as described below with reference to FIG. 45. In some such examples, the cost function receives as input data the DOA values from every smart audio device to every other smart device and returns as outputs the estimated location and the estimated orientation of each of the smart audio devices. In the example shown in FIG. 44, block 4430 represents the estimated smart audio device locations and the estimated smart audio device orientations produced in block 4425.

Figure 45:
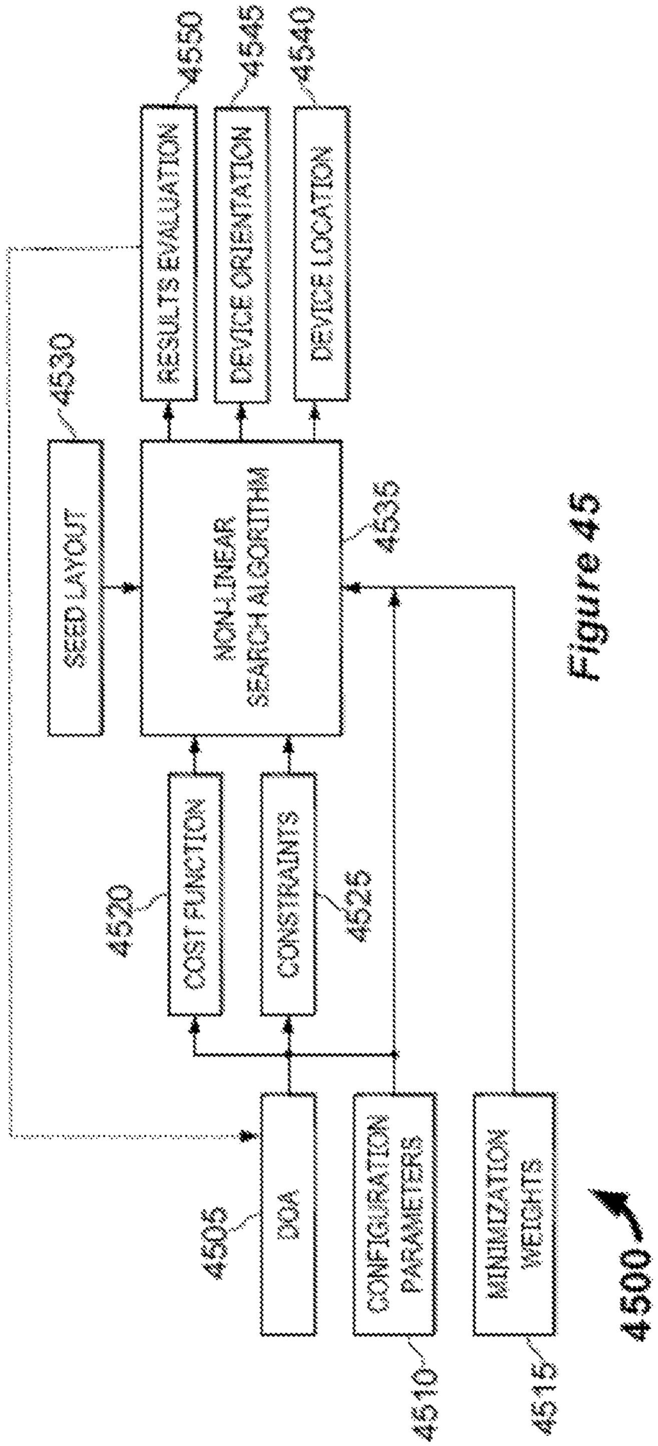
FIG. 45 is a flow diagram that outlines an example of a method for automatically estimating device locations and orientations based on direction of arrival (DOA) data.

FIG. 45 is a flow diagram that outlines another example of a method for automatically estimating device locations and orientations based on DOA data. Method 4500 may, for example, be performed by implementing a localization algorithm via a control system of an apparatus such as that shown in FIG. 1B. The blocks of method 4500, like other methods described herein, are not necessarily performed in the order indicated. Moreover, such methods may include more or fewer blocks than shown and/or described.

According to this example, DOA data are obtained in block 4505. According to some implementations, block 4505 may involve obtaining acoustic DOA data, e.g., as described above with reference to blocks 4405-4420 of FIG. 44. Alternatively, or additionally, block 4505 may involve obtaining DOA data corresponding to electromagnetic waves that are transmitted by, and received by, each of a plurality of devices in an environment.

In this example, the localization algorithm receives as input the DOA data obtained in block 4505 from every smart device to every other smart device in an audio environment, along with any configuration parameters 4510 specified for the audio environment. In some examples, optional constraints 4525 may be applied to the DOA data. The configuration parameters 4510, minimization weights 4515, the optional constraints 4525 and the seed layout 4530 may, for example, be obtained from a memory by a control system that is executing software for implementing the cost function 4520 and the non-linear search algorithm 4535. The configuration parameters 4510 may, for example, include data corresponding to maximum room dimensions, loudspeaker layout constraints, external input to set a global translation (e.g., 2 parameters), a global rotation (1 parameter), and a global scale (1 parameter), etc.

According to this example, the configuration parameters 4510 are provided to the cost function 4520 and to the non-linear search algorithm 4535. In some examples, the configuration parameters 4510 are provided to optional constraints 4525. In this example, the cost function 4520 takes into account the differences between the measured DOAs and the DOAs estimated by an optimizer's localization solution.

In some embodiments, the optional constraints 4525 impose restrictions on the possible audio device location and/or orientation, such as imposing a condition that audio devices are a minimum distance from each other. Alternatively, or additionally, the optional constraints 4525 may impose restrictions on dummy minimization variables introduced by convenience, e.g., as described below.

In this example, minimization weights 4515 are also provided to the non-linear search algorithm 4535. Some examples are described below.

According to some implementations, the non-linear search algorithm 4535 is an algorithm that can find local solutions to a continuous optimization problem of the form:

$$\min C(x)$$

$$x \in C^n \text{ such that } g_L \le g(x) \le g_U \text{ and } x_L \le x \le x_U$$

In the foregoing expressions, C(x): $R^n \rightarrow R$ represent the cost function 4520, and g(x): $R^n \rightarrow R^m$ represent constraint functions corresponding to the optional constraints 4525. In these examples, the vectors $g_L$ and $g_U$ represent the lower and upper bounds on the constraints, and the vectors $x_L$ and $x_U$ represent the bounds on the variables x.

The non-linear search algorithm 4535 may vary according to the particular implementation. Examples of the non-linear search algorithm 4535 include gradient descent methods, the Broyden-Fletcher-Goldfarb-Shanno (BFGS) method, interior point optimization (IPOPT) methods, etc. While some of the non-linear search algorithms require only the values of the cost functions and the constraints, some other methods also may require the first derivatives (gradients, Jacobians) of the cost function and constraints, and some other methods also may require the second derivatives (Hessians) of the same functions. If the derivatives are required, they can be provided explicitly, or they can be computed automatically using automatic or numerical differentiation techniques.

Some non-linear search algorithms need seed point information to start the minimization, as suggested by the seed layout 4530 that is provided to the non-linear search algorithm 4535 in FIG. 45. In some examples, the seed point information may be provided as a layout consisting of the same number of smart audio devices (in other words, the same number as the actual number of smart audio devices for which DOA data are obtained) with corresponding locations and orientations. The locations and orientations may be arbitrary, and need not be the actual or approximate locations and orientations of the smart audio devices. In some examples, the seed point information may indicate smart audio device locations that are along an axis or another arbitrary line of the audio environment, smart audio device locations that are along a circle, a rectangle or other geometric shape within the audio environment, etc. In some examples, the seed point information may indicate arbitrary smart audio device orientations, which may be predetermined smart audio device orientations or random smart audio device orientations.

In some embodiments, the cost function 4520 can be formulated in terms of complex plane variables as follows:

$$C_{DOA}(x, z) = \sum_{n=1}^{N} \sum_{\substack{m=1 \\ m \neq n}}^{N} w_{nm}^{DOA} \left| Z_{nm} - z_n^* \left( \frac{x_m - x_n}{|x_m - x_n|} \right) \right|^2,$$

wherein the star indicates complex conjugation, the bar indicates absolute value, and where:

- $Z_{nm}$=exp(i $DOA_{nm}$) represents the complex plane value giving the direction of arrival of smart device m as measured from device n, with i representing the imaginary unit;
- $x_n = x_{nx} + ix_{ny}$ represents the complex plane value encoding the x and y positions of the smart device n;
- $z_n$=exp(i$a_n$) represents the complex value encoding the angle an of orientation of the smart device n;
- $w_{nm}^{DOA}$ represents the weight given to the $DOA_{nm}$ measurement;
- N represents the number of smart audio devices for which DOA data are obtained; and
- x=($x_1$, . . . , $x_N$) and z ($z_1$, . . . , $z_N$) represent vectors of the complex positions and complex orientations, respectively, of all N smart audio devices.

According to this example, the outcomes of the minimization are device location data 4540 indicating the 2D position of the smart devices, $x_k$ (representing 2 real unknowns per device) and device orientation data 4545 indicating the orientation vector of the smart devices $z_k$ (representing 2 additional real variables per device). From the orientation vector, only the angle of orientation of the smart device $a_k$ is relevant for the problem (1 real unknown per device). Therefore, in this example there are 3 relevant unknowns per smart device.

In some examples, results evaluation block 4550 involves computing the residual of the cost function at the outcome position and orientations. A relatively lower residual indicates relatively more precise device localization values.

According to some implementations, the results evaluation block 4550 may involve a feedback process. For example, some such examples may implement a feedback process that involves comparing the residual of a given DOA candidate combination with another DOA candidate combination, e.g., as explained in the DOA robustness measures discussion below.

As noted above, in some implementations block 4505 may involve obtaining acoustic DOA data as described above with reference to blocks 4405-4420 of FIG. 44, which involve determining DOA candidates and selecting DOA candidates. Accordingly, FIG. 45 includes a dashed line from the results evaluation block 4550 to block 4505, to represent one flow of an optional feedback process. Moreover, FIG. 44 includes a dashed line from block 4430 (which may involve results evaluation in some examples) to DOA candidate selection block 4420, to represent a flow of another optional feedback process.

In some embodiments, the non-linear search algorithm 4535 may not accept complex-valued variables. In such cases, every complex-valued variable can be replaced by a pair of real variables.

In some implementations, there may be additional prior information regarding the availability or reliability of each DOA measurement. In some such examples, loudspeakers may be localized using only a subset of all the possible DOA elements. The missing DOA elements may, for example, be masked with a corresponding zero weight in the cost function. In some such examples, the weights $w_{nm}$ may be either be zero or one, e.g., zero for those measurements which are either missing or considered not sufficiently reliable and one for the reliable measurements. In some other embodiments, the weights $w_{nm}$ may have a continuous value from zero to one, as a function of the reliability of the DOA measurement. In those embodiments in which no prior information is available, the weights $w_{nm}$ may simply be set to one.

In some implementations, the conditions $|z_k|=1$ (one condition for every smart audio device) may be added as constraints to ensure the normalization of the vector indicating the orientation of the smart audio device. In other examples, these additional constraints may not be needed, and the vector indicating the orientation of the smart audio device may be left unnormalized. Other implementations may add as constraints conditions on the proximity of the smart audio devices, e.g., indicating that $|x_n-x_m|\geq D$, where D is the minimum distance between smart audio devices.

The minimization of the cost function above does not fully determine the absolute position and orientation of the smart audio devices. According to this example, the cost function remains invariant under a global rotation (1 independent parameter), a global translation (2 independent parameters), and a global rescaling (1 independent parameter), affecting simultaneously all the smart devices locations and orientations. This global rotation, translation, and rescaling cannot be determined from the minimization of the cost function. Different layouts related by the symmetry transformations are totally indistinguishable in this framework and are said to belong to the same equivalence class. Therefore, the configuration parameters should provide criteria to allow uniquely defining a smart audio device layout representing an entire equivalence class. In some embodiments, it may be advantageous to select criteria so that this smart audio device layout defines a reference frame that is close to the reference frame of a listener near a reference listening position. Examples of such criteria are provided below. In some other examples, the criteria may be purely mathematical and disconnected from a realistic reference frame.

The symmetry disambiguation criteria may include a reference position, fixing the global translation symmetry (e.g., smart audio device 1 should be at the origin of coordinates); a reference orientation, fixing the two-dimensional rotation symmetry (e.g., smart device 1 should be oriented toward an area of the audio environment designated as the front, such as where the television 4101 is located in FIGS. 41-43); and a reference distance, fixing the global scaling symmetry (e.g., smart device 2 should be at a unit distance from smart device 1). In total, there are 4 parameters that cannot be determined from the minimization problem in this example and that should be provided as an external input. Therefore, in this example there are 3N−4 unknowns that can be determined from the minimization problem.

As described above, in some examples, in addition to the set of smart audio devices, there may be one or more passive audio receivers, equipped with a microphone array, and/or one or more audio emitters. In such cases the localization process may use a technique to determine the smart audio device location and orientation, emitter location, and passive receiver location and orientation, from the audio emitted by every smart audio device and every emitter and captured by every other smart audio device and every passive receiver, based on DOA estimation.

In some such examples, the localization process may proceed in a similar manner as described above. In some instances, the localization process may be based on the same cost function described above, which is shown below for the reader's convenience:

$$C_{DOA}(x,z)=\sum_{n=1}^{N}\sum_{\substack{m=1\\m\neq n}}^{N}w_{nm}^{DOA}\left|Z_{nm}-z_n^*\left(\frac{x_m-x_n}{|x_m-x_n|}\right)\right|^2$$

However, if the localization process involves passive audio receivers and/or audio emitters that are not audio receivers, the variables of the foregoing equation need to be interpreted in a slightly different way. Now N represents the total number of devices, including $N_{smart}$ smart audio devices, $N_{rec}$ passive audio receivers and $N_{emit}$ emitters, so that $N=N_{smart}+N_{rec}+N_{emit}$. In some examples, the weights $w_{nm}^{DOA}$ may have a sparse structure to mask out missing data due to passive receivers or emitter-only devices (or other audio sources without receivers, such as human beings), so that $w_{nm}^{DOA}=0$ for all m if device n is an audio emitter without a receiver, and $w_{nm}^{DOA}=0$ for all n if device m is an audio receiver. For both smart audio devices and passive receivers both the position and angle can be determined, whereas for audio emitters only the position can be obtained. The total number of unknowns is $3N_{smart}+3N_{rec}+2N_{emit}-4$.

Combined Time of Arrival and Direction of Arrival Localization

In the following discussion, the differences between the above-described DOA-based localization processes and the combined DOA and TOA localization of this section will be emphasized. Those details that are not explicitly given may be assumed to be the same as those in the above-described DOA-based localization processes.

Figure 46:
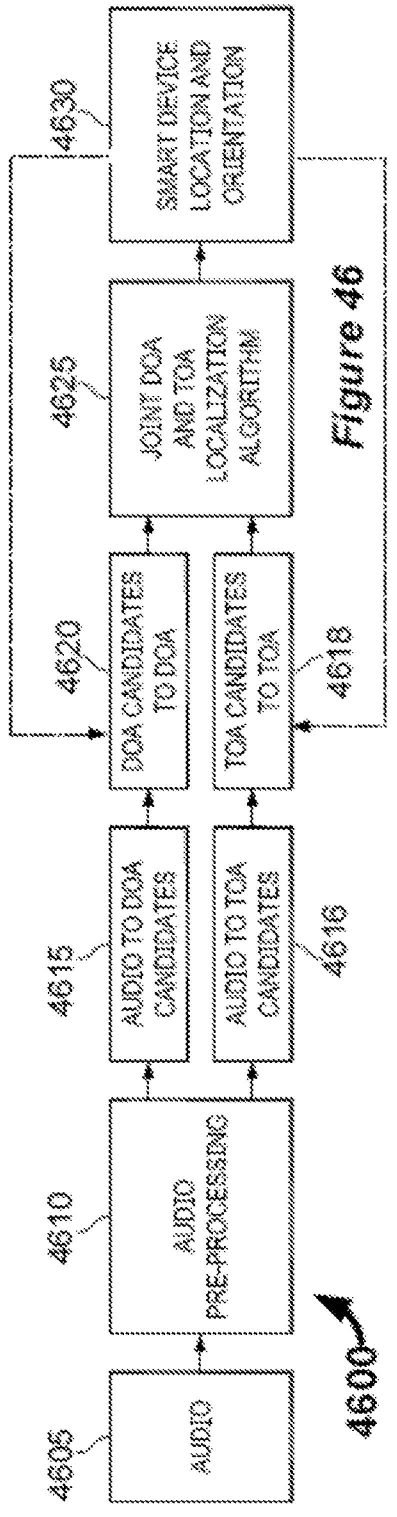
FIG. 46 is a flow diagram that outlines an example of a method for automatically estimating device locations and orientations based on DOA data and time of arrival (TOA) data.

FIG. 46 is a flow diagram that outlines one example of a method for automatically estimating device locations and orientations based on DOA data and TOA data. Method 4600 may, for example, be performed by implementing a localization algorithm via a control system of an apparatus such as that shown in FIG. 1B. The blocks of method 4600, like other methods described herein, are not necessarily performed in the order indicated. Moreover, such methods may include more or fewer blocks than shown and/or described.

According to this example, DOA data are obtained in blocks 4605-4620. According to some implementations, blocks 4605-4620 may involve obtaining acoustic DOA data from a plurality of smart audio devices, e.g., as described above with reference to blocks 4405-4420 of FIG. 44. In some alternative implementations, blocks 4605-4620 may involve obtaining DOA data corresponding to electromagnetic waves that are transmitted by, and received by, each of a plurality of devices in an environment.

In this example, however, block 4605 also involves obtaining TOA data. According to this example, the TOA data includes the measured TOA of audio emitted by, and received by, every smart audio device in the audio environment (e.g., every pair of smart audio devices in the audio environment). In some embodiments that involve emitting structured source signals, the audio used to extract the TOA data may be the same as was used to extract the DOA data. In other embodiments, the audio used to extract the TOA data may be different from that used to extract the DOA data.

According to this example, block 4616 involves detecting TOA candidates in the audio data and block 4618 involves selecting a single TOA for each smart audio device pair from among the TOA candidates. Some examples are described below.

Various techniques may be used to obtain the TOA data. One method is to use a room calibration audio sequence, such as a sweep (e.g., a logarithmic sine tone) or a Maximum Length Sequence (MLS). Optionally, either aforementioned sequence may be used with band-limiting to the close ultrasonic audio frequency range (e.g., 18 kHz to 24 kHz). In this audio frequency range most standard audio equipment is able to emit and record sound, but such a signal cannot be perceived by humans because it lies beyond the normal human hearing capabilities. Some alternative implementations may involve recovering TOA elements from a hidden signal in a primary audio signal, such as a Direct Sequence Spread Spectrum signal.

Given a set of DOA data from every smart audio device to every other smart audio device, and the set of TOA data from every pair of smart audio devices, the localization method 4625 of FIG. 46 may be based on minimizing a certain cost function, possibly subject to some constraints. In this example, the localization method 4625 of FIG. 46 receives as input data the above-described DOA and TOA values, and outputs the estimated location data and orientation data 630 corresponding to the smart audio devices. In some examples, the localization method 4625 also may output the playback and recording latencies of the smart audio devices, e.g., up to some global symmetries that cannot be determined from the minimization problem. Some examples are described below.

Figure 47:
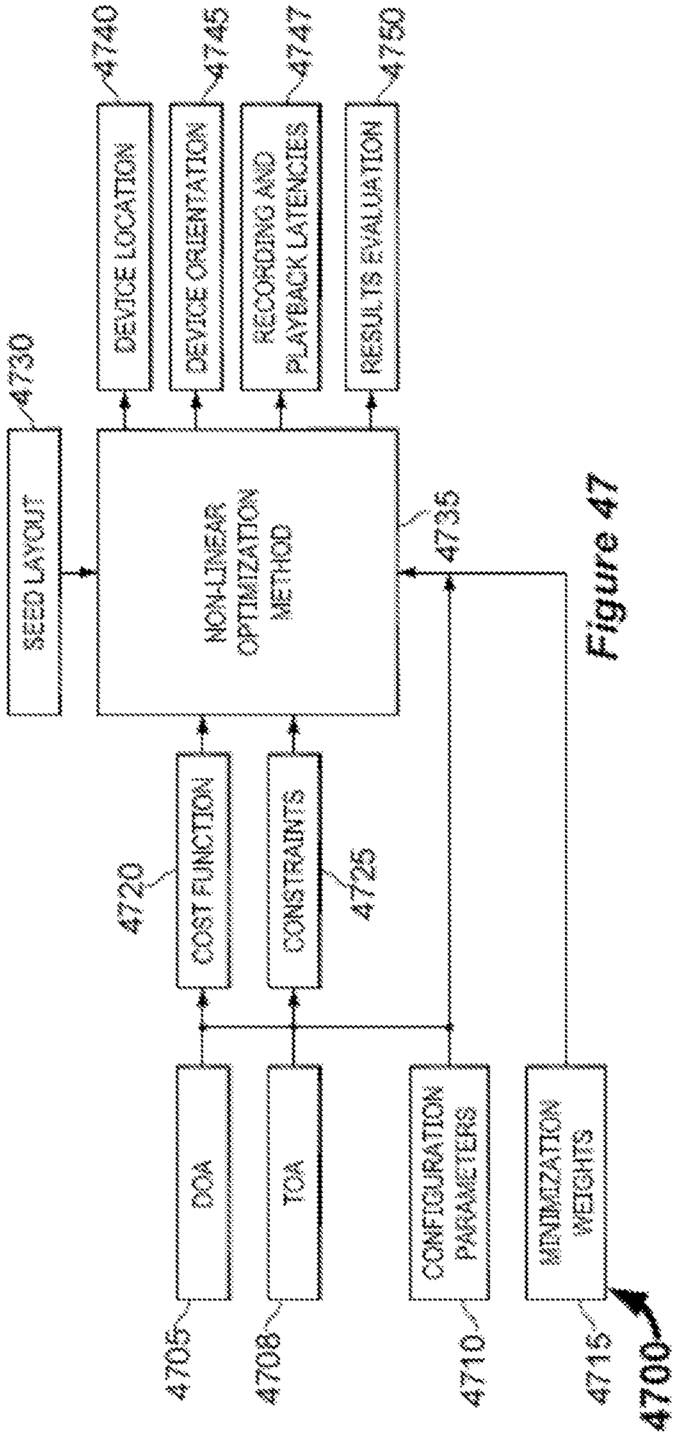
FIG. 47 is a flow diagram that outlines another example of a method for automatically estimating device locations and orientations based on DOA data and TOA data.

FIG. 47 is a flow diagram that outlines another example of a method for automatically estimating device locations and orientations based on DOA data and TOA data. Method 4700 may, for example, be performed by implementing a localization algorithm via a control system of an apparatus such as that shown in FIG. 1B. The blocks of method 4700, like other methods described herein, are not necessarily performed in the order indicated. Moreover, such methods may include more or fewer blocks than shown and/or described.

Except as described below, in some examples blocks 4705, 4710, 4715, 4720, 4725, 4730, 4735, 4740, 4745 and 4750 may be as described above with reference to blocks 4505, 4510, 4515, 4520, 4525, 4530, 4535, 4540, 4545 and 4550 of FIG. 45. However, in this example the cost function 4720 and the non-linear optimization method 4735 are modified, with respect to the cost function 4520 and the non-linear optimization method 4535 of FIG. 45, so as to operate on both DOA data and TOA data. The TOA data of block 4708 may, in some examples, be obtained as described above with reference to FIG. 46. Another difference, as compared to the process of FIG. 45, is that in this example the non-linear optimization method 4735 also outputs recording and playback latency data 4747 corresponding to the smart audio devices, e.g., as described below. Accordingly, in some implementations, the results evaluation block 4750 may involve evaluating both DOA data and/or TOA data. In some such examples, the operations of block 4750 may include a feedback process involving the DOA data and/or TOA data. For example, some such examples may implement a feedback process that involves comparing the residual of a given TOA/DOA candidate combination with another TOA/DOA candidate combination, e.g., as explained in the TOA/DOA robustness measures discussion below.

In some examples, results evaluation block 4750 involves computing the residual of the cost function at the outcome position and orientations. A relatively lower residual normally indicates relatively more precise device localization values. According to some implementations, the results evaluation block 4750 may involve a feedback process. For example, some such examples may implement a feedback process that involves comparing the residual of a given TOA/DOA candidate combination with another TOA/DOA candidate combination, e.g., as explained in the TOA and DOA robustness measures discussion below.

Accordingly, FIG. 46 includes dashed lines from block 4630 (which may involve results evaluation in some examples) to DOA candidate selection block 4620 and TOA candidate selection block 4618, to represent a flow of an optional feedback process. In some implementations block 4705 may involve obtaining acoustic DOA data as described above with reference to blocks 4605-4620 of FIG. 46, which involve determining DOA candidates and selecting DOA candidates. In some examples block 4708 may involve obtaining acoustic TOA data as described above with reference to blocks 4605-4618 of FIG. 46, which involve determining TOA candidates and selecting TOA candidates. Although not shown in FIG. 47, some optional feedback processes may involve reverting from the results evaluation block 4750 to block 4705 and/or block 4708.

According to this example, the localization algorithm proceeds by minimizing a cost function, possibly subject to some constraints, and can be described as follows. In this example, the localization algorithm receives as input the DOA data 4705 and the TOA data 4708, along with configuration parameters 4710 specified for the listening environment and possibly some optional constraints 4725. In this example, the cost function takes into account the differences between the measured DOA and the estimated DOA, and the differences between the measured TOA and the estimated TOA. In some embodiments, the constraints 4725 impose restrictions on the possible device location, orientation, and/or latencies, such as imposing a condition that audio devices are a minimum distance from each other and/or imposing a condition that some device latencies should be zero.

In some implementations, the cost function can be formulated as follows:

$$C(x, z, \ell, k) = W_{DOA}C_{DOA}(x, z) + W_{TOA}C_{TOA}(x, \ell, k)$$

In the foregoing equation, $\boldsymbol{\ell} = (\ell_1, \ldots, \ell_N)$ and $k = (k_1, \ldots, k_N)$ are represent vectors of playback and recording devices for every device, respectively, and where $W_{DOA}$ and $W_{TOA}$ represent the global weights (also known as prefactors) of the DOA and TOA minimization parts, respectively, reflecting the relative importance of each one of the two terms. In some such examples, the TOA cost function can be formulated as:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|)^2,$$

where $TOA_{nm}$ represents the measured time of arrival of signal travelling from smart device m to smart device n;

$w_{nm}^{TOA}$ represents the weight given to the $TOA_{nm}$ measurement; and c represents the speed of sound.

There are up to 5 real unknowns per every smart audio device: the device positions $x_n$ (2 real unknowns per device), the device orientations an (1 real unknown per device) and the recording and playback latencies $\ell_n$, and $k_n$ (2 additional unknowns per device). From these, only device positions and latencies are relevant for the TOA part of the cost function. The number of effective unknowns can be reduced in some implementations if there are a priori known restrictions or links between the latencies.

In some examples, there may be additional prior information, e.g., regarding the availability or reliability of each TOA measurement. In some of these examples, the weights $w_{nm}^{TOA}$ can either be zero or one, e.g., zero for those measurements which are not available (or considered not sufficiently reliable) and one for the reliable measurements. This way, device localization may be estimated with only a subset of all possible DOA and/or TOA elements. In some other implementations, the weights may have a continuous value from zero to one, e.g., as a function of the reliability of the TOA measurement. In some examples, in which no prior reliability information is available, the weights may simply be set to one.

According to some implementations, one or more additional constraints may be placed on the possible values of the latencies and/or the relation of the different latencies among themselves.

In some examples, the position of the audio devices may be measured in standard units of length, such as meters, and the latencies and times of arrival may be indicated in standard units of time, such as seconds. However, it is often the case that non-linear optimization methods work better when the scale of variation of the different variables used in the minimization process is of the same order. Therefore, some implementations may involve rescaling the position measurements so that the range of variation of the smart device positions ranges between −1 and 1, and rescaling the latencies and times of arrival so that these values range between −1 and 1 as well.

The minimization of the cost function above does not fully determine the absolute position and orientation of the smart audio devices or the latencies. The TOA information gives an absolute distance scale, meaning that the cost function is no longer invariant under a scale transformation, but still remains invariant under a global rotation and a global translation. Additionally, the latencies are subject to an additional global symmetry: the cost function remains invariant if the same global quantity is added simultaneously to all the playback and recording latencies. These global transformations cannot be determined from the minimization of the cost function. Similarly, the configuration parameters should provide a criterion to allowing to uniquely define a device layout representing an entire equivalence class.

In some examples, the symmetry disambiguation criteria may include the following: a reference position, fixing the global translation symmetry (e.g., smart device 1 should be at the origin of coordinates); a reference orientation, fixing the two-dimensional rotation symmetry (e.g., smart device 1 should be oriented toward the front); and a reference latency (e.g., recording latency for device 1 should be zero). In total, in this example there are 4 parameters that cannot be determined from the minimization problem and that should be provided as an external input. Therefore, there are 5N–4 unknowns that can be determined from the minimization problem.

In some implementations, besides the set of smart audio devices, there may be one or more passive audio receivers, which may not be equipped with a functioning microphone array, and/or one or more audio emitters. The inclusion of latencies as minimization variables allows some disclosed methods to localize receivers and emitters for which emission and reception times are not precisely known. In some such implementations, the TOA cost function described above may be implemented. This cost function is shown again below for the reader's convenience:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|)^2$$

As described above with reference to the DOA cost function, the cost function variables need to be interpreted in a slightly different way if the cost function is used for localization estimates involving passive receivers and/or emitters. Now N represents the total number of devices, including $N_{smart}$ smart audio devices, $N_{rec}$ passive audio receivers and $N_{emit}$ emitters, so that $N = N_{smart} + N_{rec} + N_{emit}$. The weights $w_{nm}^{DOA}$ may have a sparse structure to mask out missing data due to passive receivers or emitters-only, e.g., so that $w_{nm}^{DOA} = 0$ for all m if device n is an audio emitter, and $w_{nm}^{DOA} = 0$ for all n if device m is an audio receiver. According to some implementations, for smart audio devices positions, orientations, and recording and playback latencies must be determined; for passive receivers, positions, orientations, and recording latencies must be determined; and for audio emitters, positions and playback latencies must be determined. According to some such examples, the total number of unknowns is therefore $5N_{smart} + 4N_{rec} + 3N_{emit} - 4$.

Disambiguation of Global Translation and Rotation

Solutions to both DOA-only and combined TOA and DOA problems are subject to a global translation and rotation ambiguity. In some examples, the translation ambiguity can be resolved by treating an emitter-only source as a listener and translating all devices such that the listener lies at the origin.

Rotation ambiguities can be resolved by placing additional constraints on the solution. For example, some multi-loudspeaker environments may include television (TV) loudspeakers and a couch positioned for TV viewing. After locating the loudspeakers in the environment, some methods may involve finding a vector joining the listener to the TV viewing direction. Some such methods may then involve having the TV emit a sound from its loudspeakers and/or prompting the user to walk up to the TV and locating the user's speech. Some implementations may involve rendering an audio object that pans around the environment. A user may provide user input (e.g., saying "Stop") indicating when the audio object is in one or more predetermined positions within the environment, such as the front of the environment, at a TV location of the environment, etc. Some implementations involve a cellphone app equipped with an inertial measurement unit that prompts the user to point the cellphone in two defined directions: the first in the direction of a particular device, for example the device with lit LEDs, the second in the user's desired viewing direction, such as the front of the environment, at a TV location of the environment, etc. Some detailed disambiguation examples will now be described with reference to FIGS. 48A-48D.

Figure 48A:
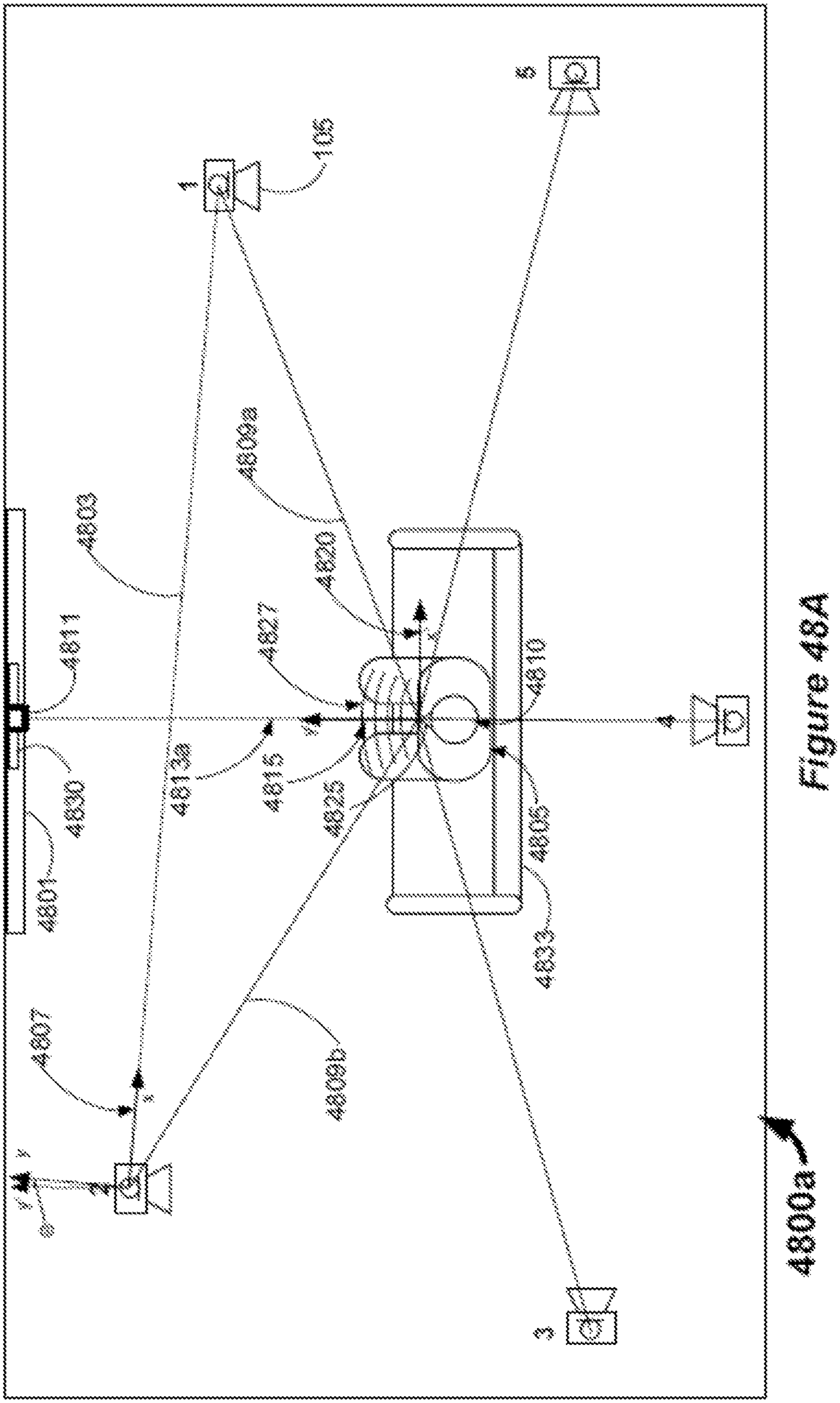
FIG. 48A shows another example of an audio environment.

FIG. 48A shows another example of an audio environment. According to some examples, the audio device location data output by one of the disclosed localization methods may include an estimate of an audio device location for each of audio devices 1-5, with reference to the audio device coordinate system 4807. In this implementation, the audio device coordinate system 4807 is a Cartesian coordinate system having the location of the microphone of audio device 2 as its origin. Here, the x axis of the audio device coordinate system 4807 corresponds with a line 4803 between the location of the microphone of audio device 2 and the location of the microphone of audio device 1.

In this example, this example, the listener location is determined by prompting the listener 4805 who is shown seated on the couch 4833 (e.g., via an audio prompt from one or more loudspeakers in the environment 4800*a*) to make one or more utterances 4827 and estimating the listener location according to time-of-arrival (TOA) data. The TOA data corresponds to microphone data obtained by a plurality of microphones in the environment. In this example, the microphone data corresponds with detections of the one or more utterances 4827 by the microphones of at least some (e.g., 3, 4 or all 5) of the audio devices 1-5.

Alternatively, or additionally, the listener location may be estimated according to DOA data provided by the microphones of at least some (e.g., 2, 3, 4 or all 5) of the audio devices 1-5. According to some such examples, the listener location may be determined according to the intersection of lines 4809*a*, 4809*b*, etc., corresponding to the DOA data.

According to this example, the listener location corresponds with the origin of the listener coordinate system 4820. In this example, the listener angular orientation data is indicated by the y' axis of the listener coordinate system 4820, which corresponds with a line 4813*a* between the listener's head 4810 (and/or the listener's nose 4825) and the sound bar 4830 of the television 4801. In the example shown in FIG. 48A, the line 4813*a* is parallel to the y' axis. Therefore, the angle Θ represents the angle between the y axis and the y' axis. Accordingly, although the origin of the audio device coordinate system 4807 is shown to correspond with audio device 2 in FIG. 48A, some implementations involve co-locating the origin of the audio device coordinate system 4807 with the origin of the listener coordinate system 4820 prior to the rotation by the angle Θ of audio device coordinates around the origin of the listener coordinate system 4820. This co-location may be performed by a coordinate transformation from the audio device coordinate system 4807 to the listener coordinate system 4820.

The location of the sound bar 4830 and/or the television 4801 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 4830 and/or the television 4801 may be determined by prompting the user to walk up to the TV and locating the user's speech by DOA and/or TOA data, which may correspond detections of the sound by the microphones of at least some (e.g., 3, 4 or all 5) of the audio devices 1-5. Some such methods may involve applying a cost function, e.g., as described above. Some such methods may involve triangulation. Such examples may be beneficial in situations wherein the sound bar 4830 and/or the television 4801 has no associated microphone.

In some other examples wherein the sound bar 4830 and/or the television 4801 does have an associated microphone, the location of the sound bar 4830 and/or the television 4801 may be determined according to TOA and/or DOA methods, such as the methods disclosed herein. According to some such methods, the microphone may be co-located with the sound bar 4830.

According to some implementations, the sound bar 4830 and/or the television 4801 may have an associated camera 4811. A control system may be configured to capture an image of the listener's head 4810 (and/or the listener's nose 4825). In some such examples, the control system may be configured to determine a line 4813*a* between the listener's head 4810 (and/or the listener's nose 4825) and the camera 4811. The listener angular orientation data may correspond with the line 4813*a*. Alternatively, or additionally, the control system may be configured to determine an angle Θ between the line 4813*a* and the y axis of the audio device coordinate system.

Figure 48B:
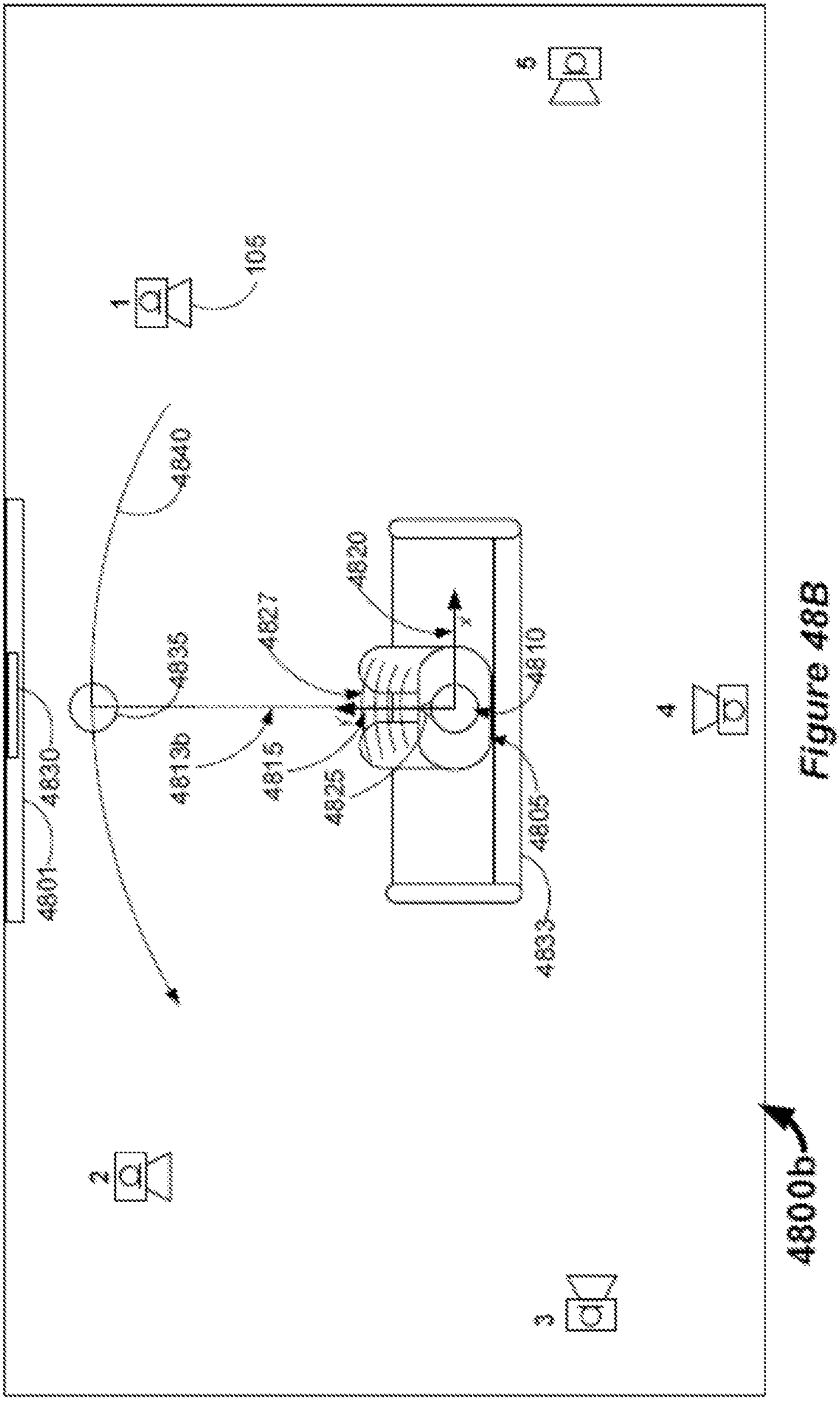
FIG. 48B shows an example of determining listener angular orientation data.

FIG. 48B shows an additional example of determining listener angular orientation data. According to this example, the listener location has already been determined. Here, a control system is controlling loudspeakers of the environment 4800*b* to render the audio object 4835 to a variety of locations within the environment 4800*b*. In some such examples, the control system may cause the loudspeakers to render the audio object 4835 such that the audio object 4835 seems to rotate around the listener 4805, e.g., by rendering the audio object 4835 such that the audio object 4835 seems to rotate around the origin of the listener coordinate system 4820. In this example, the curved arrow 4840 shows a portion of the trajectory of the audio object 4835 as it rotates around the listener 4805.

According to some such examples, the listener 4805 may provide user input (e.g., saying "Stop") indicating when the audio object 4835 is in the direction that the listener 4805 is facing. In some such examples, the control system may be configured to determine a line 4813*b* between the listener location and the location of the audio object 4835. In this example, the line 4813*b* corresponds with the y' axis of the listener coordinate system, which indicates the direction that the listener 4805 is facing. In alternative implementations, the listener 4805 may provide user input indicating when the audio object 4835 is in the front of the environment, at a TV location of the environment, at an audio device location, etc.

Figure 48C:
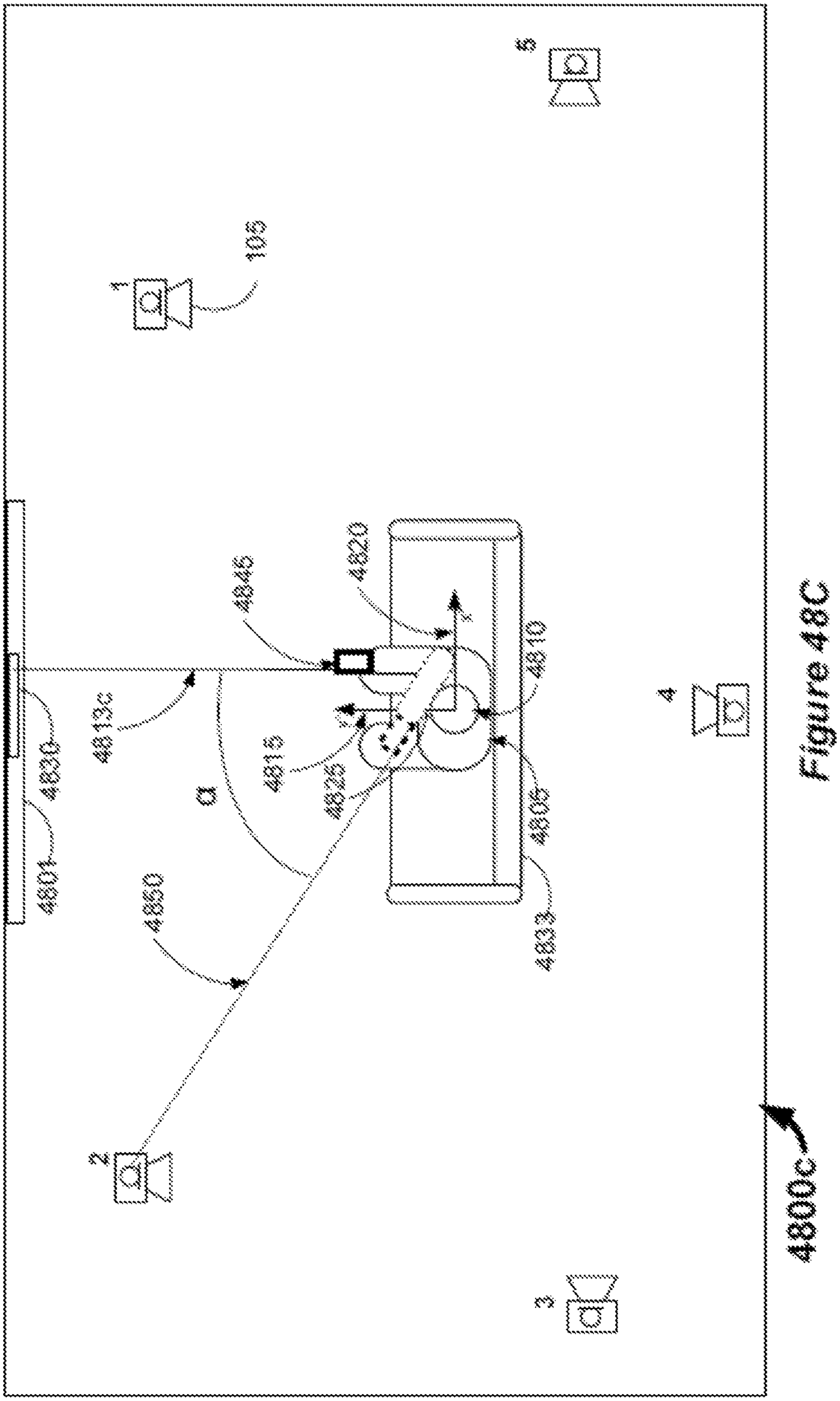
FIG. 48C shows an additional example of determining listener angular orientation data.

FIG. 48C shows an additional example of determining listener angular orientation data. According to this example, the listener location has already been determined. Here, the listener 4805 is using a handheld device 4845 to provide input regarding a viewing direction of the listener 4805, by pointing the handheld device 4845 towards the television 4801 or the soundbar 4830. The dashed outline of the handheld device 4845 and the listener's arm indicate that at a time prior to the time at which the listener 4805 was pointing the handheld device 4845 towards the television 4801 or the soundbar 4830, the listener 4805 was pointing the handheld device 4845 towards audio device 2 in this example. In other examples, the listener 4805 may have pointed the handheld device 4845 towards another audio device, such as audio device 1. According to this example, the handheld device 4845 is configured to determine an angle α between audio device 2 and the television 4801 or the soundbar 4830, which approximates the angle between audio device 2 and the viewing direction of the listener 4805.

The handheld device 4845 may, in some examples, be a cellular telephone that includes an inertial sensor system and a wireless interface configured for communicating with a control system that is controlling the audio devices of the environment 4800*c*. In some examples, the handheld device 4845 may be running an application or "app" that is configured to control the handheld device 4845 to perform the necessary functionality, e.g., by providing user prompts (e.g., via a graphical user interface), by receiving input indicating that the handheld device 4845 is pointing in a desired direction, by saving the corresponding inertial sensor data and/or transmitting the corresponding inertial sensor data to the control system that is controlling the audio devices of the environment 4800*c*, etc.

According to this example, a control system (which may be a control system of the handheld device 4845, a control system of a smart audio device of the environment 4800*c* or a control system that is controlling the audio devices of the environment 4800*c*) is configured to determine the orientation of lines 4813*c* and 4850 according to the inertial sensor data, e.g., according to gyroscope data. In this example, the line 4813*c* is parallel to the axis y' and may be used to determine the listener angular orientation. According to some examples, a control system may determine an appropriate rotation for the audio device coordinates around the origin of the listener coordinate system 4820 according to the angle α between audio device 2 and the viewing direction of the listener 4805.

Figure 48D:
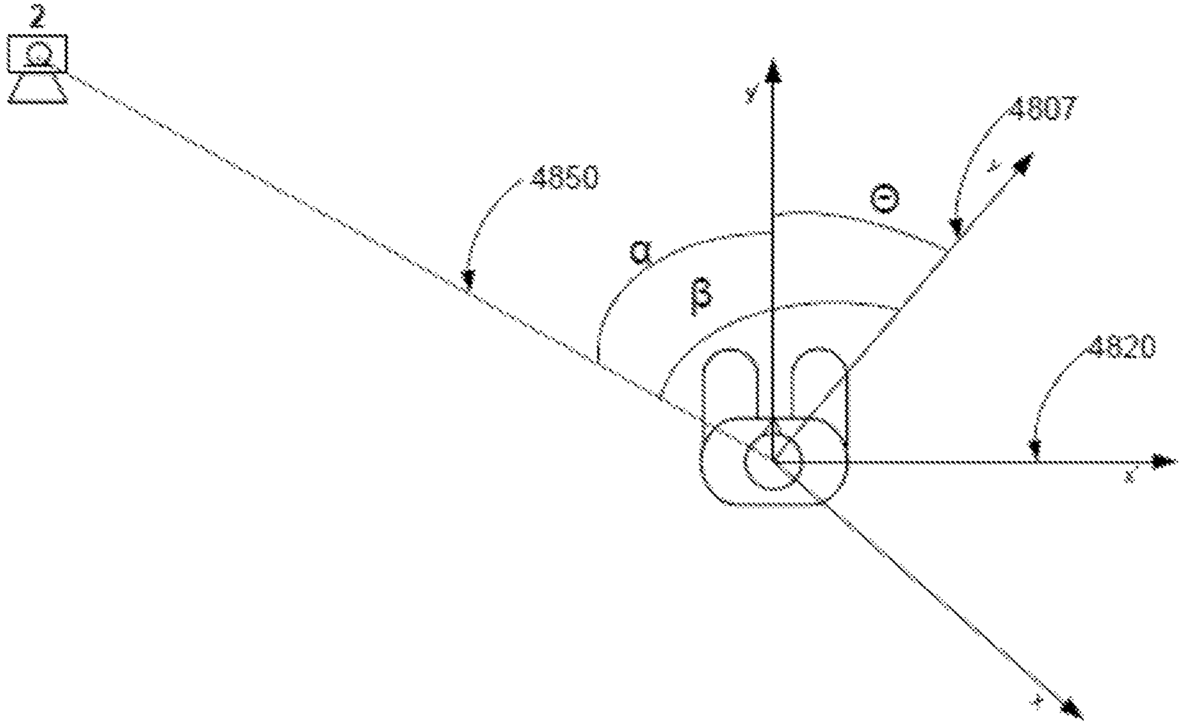
FIG. 48D shows one example of determine an appropriate rotation for the audio device coordinates in accordance with the method described with reference to FIG. 48C.

FIG. 48D shows one example of determine an appropriate rotation for the audio device coordinates in accordance with the method described with reference to FIG. 48C. In this example, the origin of the audio device coordinate system 4807 is co-located with the origin of the listener coordinate system 4820. Co-locating the origins of the audio device coordinate system 4807 and the listener coordinate system 4820 is made possible after the listener location is determined. Co-locating the origins of the audio device coordinate system 4807 and the listener coordinate system 4820 may involve transforming the audio device locations from the audio device coordinate system 4807 to the listener coordinate system 4820. The angle α has been determined as described above with reference to FIG. 48C. Accordingly, the angle α corresponds with the desired orientation of the audio device 2 in the listener coordinate system 4820. In this example, the angle R corresponds with the orientation of the audio device 2 in the audio device coordinate system 4807. The angle Θ, which is β-α in this example, indicates the necessary rotation to align the y axis of the of the audio device coordinate system 4807 with the y' axis of the listener coordinate system 4820.

Doa Robustness Measures

As noted above with reference to FIG. 44, in some examples using "blind" methods that are applied to arbitrary signals including steered response power, beamforming, or other similar methods, robustness measures may be added to improve accuracy and stability. Some implementations include time integration of beamformer steered response to filter out transients and detect only the persistent peaks, as well as to average out random errors and fluctuations in those persistent DOAs. Other examples may use only limited frequency bands as input, which can be tuned to room or signal types for better performance.

For examples using 'supervised' methods that involve the use of structured source signals and deconvolution methods to yield impulse responses, preprocessing measures can be implemented to enhance the accuracy and prominence of DOA peaks. In some examples, such preprocessing may include truncation with an amplitude window of some temporal width starting at the onset of the impulse response on each microphone channel. Such examples may incorporate an impulse response onset detector such that each channel onset can be found independently.

In some examples based on either 'blind' or 'supervised' methods as described above, still further processing may be added to improve DOA accuracy. It is important to note that DOA selection based on peak detection (e.g., during Steered-Response Power (SRP) or impulse response analysis) is sensitive to environmental acoustics that can give rise to the capture of non-primary path signals due to reflections and device occlusions that will dampen both receive and transmit energy. These occurrences can degrade the accuracy of device pair DOAs and introduce errors in the optimizer's localization solution. It is therefore prudent to regard all peaks within predetermined thresholds as candidates for ground truth DOAs. One example of a predetermined threshold is a requirement that a peak be larger than the mean Steered-Response Power (SRP). For all detected peaks, prominence thresholding and removing candidates below the mean signal level have proven to be simple yet effective initial filtering techniques. As used herein, "prominence" is a measure of how large a local peak is compared to its adjacent local minima, which is different from thresholding only based on power. One example of a prominence threshold is a requirement that the difference in power between a peak and its adjacent local minima be at or above a threshold value. Retention of viable candidates improves the chances that a device pair will contain a usable DOA in their set (within an acceptable error tolerance from the ground truth), though there is the chance that it will not contain a usable DOA in cases where the signal is corrupted by strong reflections/occlusions. In some examples, a selection algorithm may be implemented in order to do one of the following: 1) select the best usable DOA candidate per device pair; 2) make a determination that none of the candidates are usable and therefore null that pair's optimization contribution with the cost function weighting matrix; or 3) select a best inferred candidate but apply a non-binary weighting to the DOA contribution in cases where it is difficult to disambiguate the amount of error the best candidate carries.

After an initial optimization with the best inferred candidates, in some examples the localization solution may be used to compute the residual cost contribution of each DOA. An outlier analysis of the residual costs can provide evidence of DOA pairs that are most heavily impacting the localization solution, with extreme outliers flagging those DOAs to be potentially incorrect or sub-optimal. A recursive run of optimizations for outlying DOA pairs based on the residual cost contributions with the remaining candidates and with a weighting applied to that device pair's contribution may then be used for candidate handling according to one of the aforementioned three options. This is one example of a feedback process such as described above with reference to FIGS. 44-47. According to some implementations, repeated optimizations and handling decisions may be carried out until all detected candidates are evaluated and the residual cost contributions of the selected DOAs are balanced.

A drawback of candidate selection based on optimizer evaluations is that it is computationally intensive and sensitive to candidate traversal order. An alternative technique with less computational weight involves determining all permutations of candidates in the set and running a triangle alignment method for device localization on these candidates. Relevant triangle alignment methods are disclosed in U.S. Provisional Patent Application No. 62/992,068, filed on Mar. 19, 2020 and entitled "Audio Device Auto-Location," which is hereby incorporated by reference for all purposes. The localization results can then be evaluated by computing the total and residual costs the results yield with respect to the DOA candidates used in the triangulation. Decision logic to parse these metrics can be used to determine the best candidates and their respective weighting to be supplied to the non-linear optimization problem. In cases where the list of candidates is large, therefore yielding high permutation counts, filtering and intelligent traversal through the permutation list may be applied.

Toa Robustness Measures

As described above with reference to FIG. 46, the use of multiple candidate TOA solutions adds robustness over systems that utilize single or minimal TOA values, and ensures that errors have a minimal impact on finding the optimal speaker layout. Having obtained an impulse response of the system, in some examples each one of the TOA matrix elements can be recovered by searching for the peak corresponding to the direct sound. In ideal conditions (e.g., no noise, no obstructions in the direct path between source and receiver and speakers pointing directly to the microphones) this peak can be easily identified as the largest peak in the impulse response. However, in presence of noise, obstructions, or misalignment of speakers and microphones, the peak corresponding to the direct sound does not necessarily correspond to the largest value. Moreover, in such conditions the peak corresponding to the direct sound can be difficult to isolate from other reflections and/or noise. The direct sound identification can, in some instances, be a challenging process. An incorrect identification of the direct sound will degrade (and in some instances may completely spoil) the automatic localization process. Thus, in cases wherein there is the potential for error in the direct sound identification process, it can be effective to consider multiple candidates for the direct sound. In some such instances, the peak selection process may include two parts: (1) a direct sound search algorithm, which looks for suitable peak candidates, and (2) a peak candidate evaluation process to increase the probability to pick the correct TOA matrix elements.

In some implementations, the process of searching for direct sound candidate peaks may include a method to identify relevant candidates for the direct sound. Some such methods may be based on the following steps: (1) identify one first reference peak (e.g., the maximum of the absolute value of the impulse response (IR)), the "first peak;" (2) evaluate the level of noise around (before and after) this first peak; (3) search for alternative peaks before (and in some cases after) the first peak that are above the noise level; (4) rank the peaks found according to their probability of corresponding the correct TOA; and optionally (5) group close peaks (to reduce the number of candidates).

Once direct sound candidate peaks are identified, some implementations may involve a multiple peak evaluation step. As a result of the direct sound candidate peak search, in some examples there will be one or more candidate values for each TOA matrix element ranked according their estimated probability. Multiple TOA matrices can be formed by selecting among the different candidate values. In order to assess the likelihood of a given TOA matrix, a minimization process (such as the minimization process described above) may be implemented. This process can generate the residuals of the minimization, which are a good estimates of the internal coherence of the TOA and DOA matrices. A perfect noiseless TOA matrix will lead to zero residuals, whereas a TOA matrix with incorrect matrix elements will lead to large residuals. In some implementations, the method will look for the set of candidate TOA matrix elements that creates the TOA matrix with the smallest residuals. This is one example of an evaluation process described above with reference to FIGS. 46 and 47, which may involve results evaluation block 4750. In one example, the evaluation process may involve performing the following steps: (1) choose an initial TOA matrix; (2) evaluate the initial matrix with the residuals of the minimization process; (3) change one matrix element of the TOA matrix from the list of TOA candidates; (4) re-evaluate the matrix with the residuals of the minimization process; (5) if the residuals are smaller accept the change, otherwise do not accept it; and (6) iterate over steps 3 to 5. In some examples, the evaluation process may stop when all TOA candidates have been evaluated or when a predefined maximum number of iterations has been reached.

Localization Method Example

Figure 49:
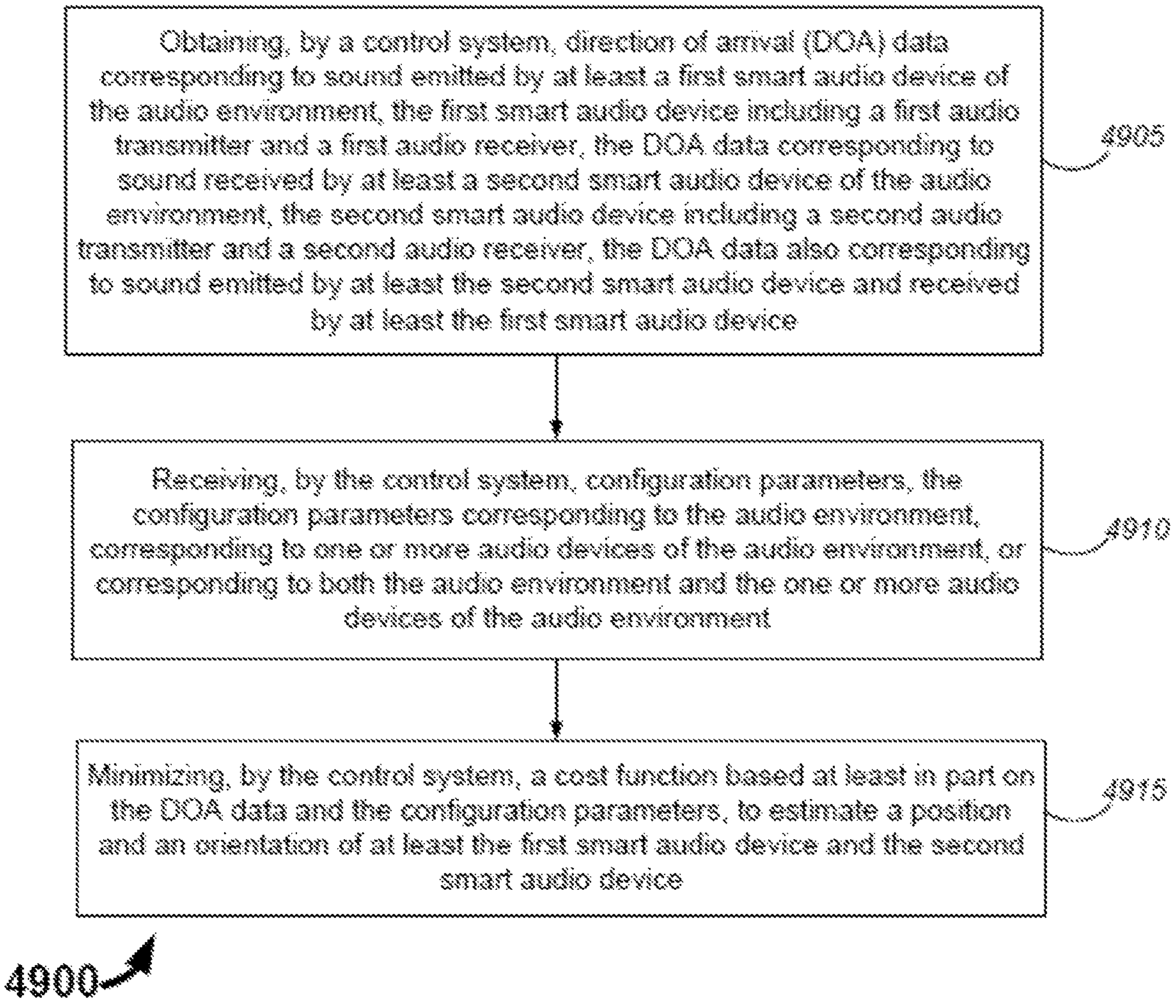
FIG. 49 is a flow diagram that outlines another example of a localization method.

FIG. 49 is a flow diagram that outlines another example of a localization method. The blocks of method 4900, like other methods described herein, are not necessarily performed in the order indicated. Moreover, such methods may include more or fewer blocks than shown and/or described. In this implementation, method 4900 involves estimating the locations and orientations of audio devices in an environment. The blocks of method 4900 may be performed by one or more devices, which may be (or may include) the apparatus 150 shown in FIG. 1B.

In this example, block 4905 obtaining, by a control system, direction of arrival (DOA) data corresponding to sound emitted by at least a first smart audio device of the audio environment. The control system may, for example, be the control system 160 that is described above with reference to FIG. 1B. According to this example, the first smart audio device includes a first audio transmitter and a first audio receiver and the DOA data corresponds to sound received by at least a second smart audio device of the audio environment. Here, the second smart audio device includes a second audio transmitter and a second audio receiver. In this example, the DOA data also corresponds to sound emitted by at least the second smart audio device and received by at least the first smart audio device. In some examples, the first and second smart audio devices may be two of the audio devices 4105*a*-4105*d* shown in FIG. 41.

The DOA data may be obtained in various ways, depending on the particular implementation. In some instances, determining the DOA data may involve one or more of the DOA-related methods that are described above with reference to FIG. 44 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 4910 involves receiving, by the control system, configuration parameters. In this implementation, the configuration parameters correspond to the audio environment itself, to one or more audio devices of the audio environment, or to both the audio environment and the one or more audio devices of the audio environment. According to some examples, the configuration parameters may indicate a number of audio devices in the audio environment, one or more dimensions of the audio environment, one or more constraints on audio device location or orientation and/or disambiguation data for at least one of rotation, translation or scaling. In some examples, the configuration parameters may include playback latency data, recording latency data and/or data for disambiguating latency symmetry.

In this example, block 4915 involves minimizing, by the control system, a cost function based at least in part on the DOA data and the configuration parameters, to estimate a position and an orientation of at least the first smart audio device and the second smart audio device.

According to some examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through N smart audio devices from all other smart audio devices of the audio environment. In such instances, minimizing the cost function may involve estimating a position and an orientation of the third through $N^{h}$ smart audio devices.

In some examples, the DOA data also may correspond to sound received by one or more passive audio receivers of the audio environment. Each of the one or more passive audio receivers may include a microphone array, but may lack an audio emitter. Minimizing the cost function may also provide an estimated location and orientation of each of the one or more passive audio receivers. According to some examples, the DOA data also may correspond to sound emitted by one or more audio emitters of the audio environment. Each of the one or more audio emitters may include at least one sound-emitting transducer but may lack a microphone array. Minimizing the cost function also may provide an estimated location of each of the one or more audio emitters.

In some examples, method 4900 may involve receiving, by the control system, a seed layout for the cost function. The seed layout may, for example, specify a correct number of audio transmitters and receivers in the audio environment and an arbitrary location and orientation for each of the audio transmitters and receivers in the audio environment.

According to some examples, method 4900 may involve receiving, by the control system, a weight factor associated with one or more elements of the DOA data. The weight factor may, for example, indicate the availability and/or the reliability of the one or more elements of the DOA data.

In some examples, method 4900 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 50:
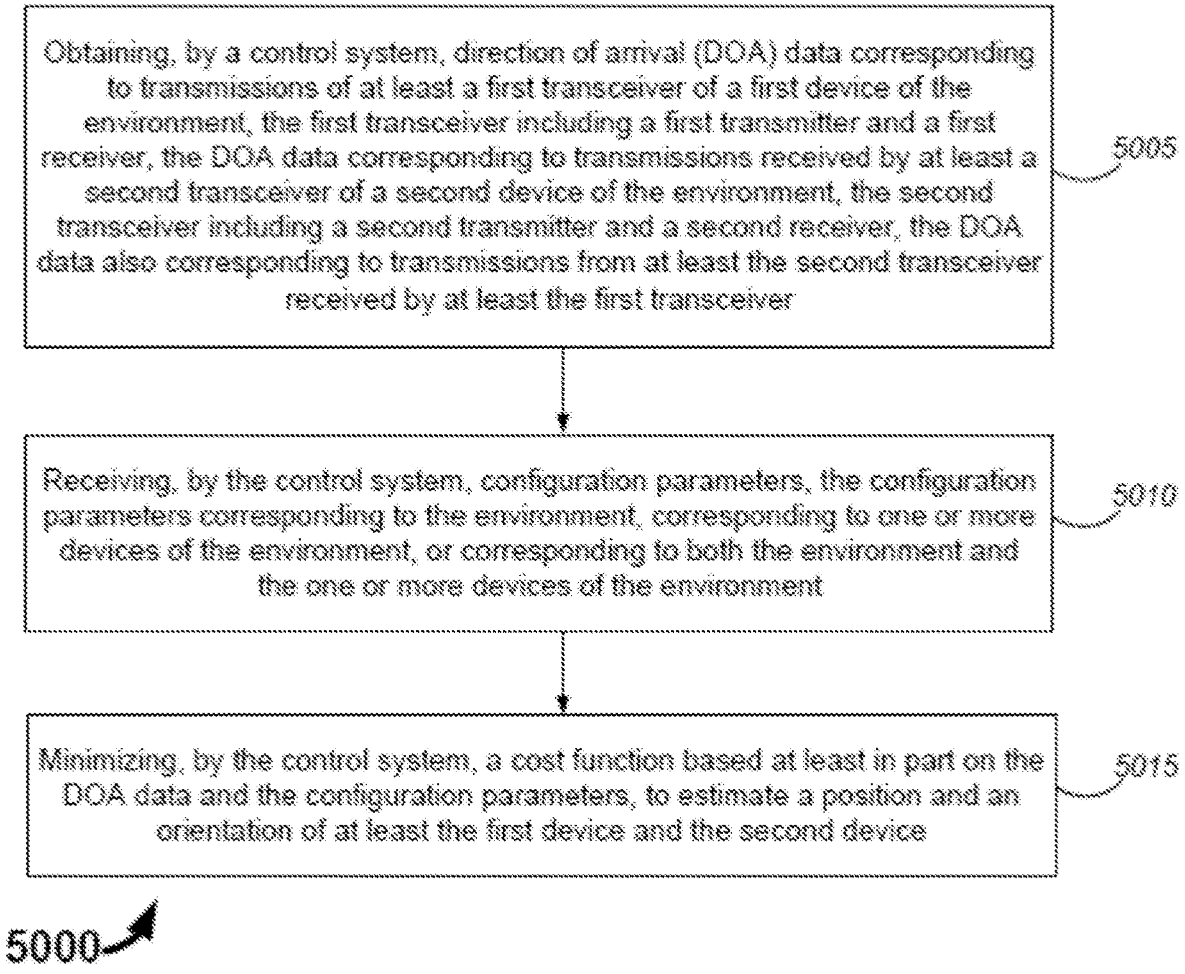
FIG. 50 is a flow diagram that outlines another example of a localization method.

FIG. 50 is a flow diagram that outlines another example of a localization method. The blocks of method 5000, like other methods described herein, are not necessarily performed in the order indicated. Moreover, such methods may include more or fewer blocks than shown and/or described. In this implementation, method 5000 involves estimating the locations and orientations of devices in an environment. The blocks of method 5000 may be performed by one or more devices, which may be (or may include) the apparatus 150 shown in FIG. 1B.

In this example, block 5005 obtaining, by a control system, direction of arrival (DOA) data corresponding to transmissions of at least a first transceiver of a first device of the environment. The control system may, for example, be the control system 160 that is described above with reference to FIG. 1B. According to this example, the first transceiver includes a first transmitter and a first receiver and the DOA data corresponds to transmissions received by at least a second transceiver of a second device of the environment, the second transceiver also including a second transmitter and a second receiver. In this example, the DOA data also corresponds to transmissions from at least the second transceiver received by at least the first transceiver. According to some examples, the first transceiver and the second transceiver may be configured for transmitting and receiving electromagnetic waves. In some examples, the first and second smart audio devices may be two of the audio devices 4105*a*-4105*d* shown in FIG. 41.

The DOA data may be obtained in various ways, depending on the particular implementation. In some instances, determining the DOA data may involve one or more of the DOA-related methods that are described above with reference to FIG. 44 and/or in the "DOA Robustness Measures" section. Some implementations may involve obtaining, by the control system, one or more elements of the DOA data using a beamforming method, a steered powered response method, a time difference of arrival method and/or a structured signal method. According to some examples, determining the DOA data may involve using acoustic calibration signals, e.g., according to one or more of the methods disclosed herein. As disclosed in more detail elsewhere herein, some such methods may involve orchestrating acoustic calibration signals played back by a plurality of audio devices in an audio environment.

According to this example, block 5010 involves receiving, by the control system, configuration parameters. In this implementation, the configuration parameters correspond to the environment itself, to one or more devices of the audio environment, or to both the environment and the one or more devices of the audio environment. According to some examples, the configuration parameters may indicate a number of audio devices in the environment, one or more dimensions of the environment, one or more constraints on device location or orientation and/or disambiguation data for at least one of rotation, translation or scaling. In some examples, the configuration parameters may include playback latency data, recording latency data and/or data for disambiguating latency symmetry.

In this example, block 5015 involves minimizing, by the control system, a cost function based at least in part on the DOA data and the configuration parameters, to estimate a position and an orientation of at least the first device and the second device.

According to some implementations, the DOA data also may correspond to transmissions emitted by third through $N^{th}$ transceivers of third through $N^{th}$ devices of the environment, where N corresponds to a total number of transceivers of the environment and where the DOA data also corresponds to transmissions received by each of the first through N transceivers from all other transceivers of the environment. In some such implementations, minimizing the cost function also may involve estimating a position and an orientation of the third through $N^{th}$ transceivers.

In some examples, the first device and the second device may be smart audio devices and the environment may be an audio environment. In some such examples, the first transmitter and the second transmitter may be audio transmitters. In some such examples, the first receiver and the second receiver may be audio receivers. According to some such examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices. Alternatively, or additionally, in some examples the DOA data may correspond to electromagnetic waves emitted and received by devices in the environment.

In some examples, the DOA data also may correspond to sound received by one or more passive receivers of the environment. Each of the one or more passive receivers may include a receiver array, but may lack a transmitter. Minimizing the cost function may also provide an estimated location and orientation of each of the one or more passive receivers. According to some examples, the DOA data also may correspond to transmissions from one or more transmitters of the environment. In some such examples, each of the one or more transmitters may lack a receiver array. Minimizing the cost function also may provide an estimated location of each of the one or more transmitters.

In some examples, method 5000 may involve receiving, by the control system, a seed layout for the cost function. The seed layout may, for example, specify a correct number of transmitters and receivers in the audio environment and an arbitrary location and orientation for each of the transmitters and receivers in the audio environment.

According to some examples, method 5000 may involve receiving, by the control system, a weight factor associated with one or more elements of the DOA data. The weight factor may, for example, indicate the availability and/or the reliability of the one or more elements of the DOA data.

In some examples, method 5000 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. According to some examples, determining the TOA data may involve using acoustic calibration signals, e.g., according to one or more of the methods disclosed herein. As disclosed in more detail elsewhere herein, some such methods may involve orchestrating acoustic calibration signals played back by a plurality of audio devices in an audio environment. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 51:
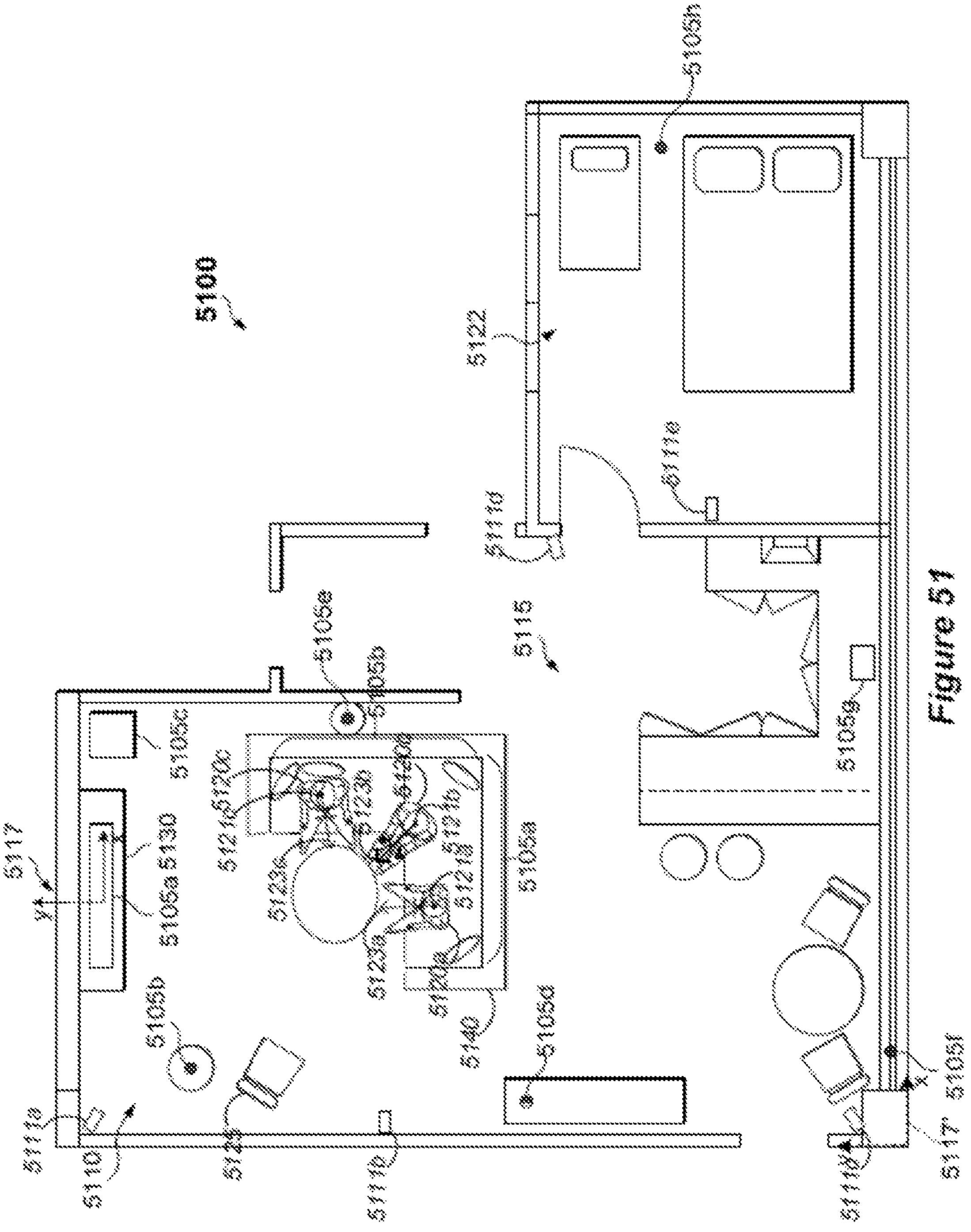
FIG. 51 depicts a floor plan of another listening environment, which is a living space in this example.

FIG. 51 depicts a floor plan of another listening environment, which is a living space in this example. As with other figures provided herein, the types, numbers and arrangements of elements shown in FIG. 51 are merely provided by way of example. Other implementations may include more, fewer and/or different types, numbers and/or arrangements of elements. In other examples, the audio environment may be another type of environment, such as an office environment, a vehicle environment, a park or other outdoor environment, etc. Some detailed examples involving vehicle environments are described below.

According to this example, the audio environment 5100 includes a living room 5110 at the upper left, a kitchen 5115 at the lower center, and a bedroom 5122 at the lower right. In the example of FIG. 51, boxes and circles distributed throughout the living space represent a set of loudspeakers 5105*a*, 5105*b*, 5105*c*, 5105*d*, 5105*e*, 5105*f*, 5105*g* and 5105*h*, at least some of which may be smart speakers in some implementations. In this example, the loudspeakers 5105*a*-5105*h* have been placed in locations convenient to the living space, but the loudspeakers 5105*a*-5105*h* are not in positions corresponding to any standard "canonical" loudspeaker layout such as Dolby 5.1, Dolby 7.1, etc. In some examples, the loudspeakers 5105*a*-5105*h* may be coordinated to implement one or more disclosed embodiments.

Flexible rendering is a technique for rendering spatial audio over an arbitrary number of arbitrarily-placed loudspeakers, such as the loudspeakers represented in FIG. 51. With the widespread deployment of smart audio devices (e.g., smart speakers) in the home, as well as other audio devices that are not located according to any standard "canonical" loudspeaker layout, it can be advantageous to implement flexible rendering of audio data and playback of the so-rendered audio data.

Several technologies have been developed to implement flexible rendering, including Center of Mass Amplitude Panning (CMAP) and Flexible Virtualization (FV). Both of these technologies cast the rendering problem as one of cost function minimization, where the cost function includes at least a first term that models the desired spatial impression that the renderer is trying to achieve and a second term that assigns a cost to activating speakers. Detailed examples of CMAP, FV and combinations thereof are described in International Publication No. WO 2021/021707 A1, published on 4 Feb. 2021 and entitled "MANAGING PLAYBACK OF MULTIPLE STREAMS OF AUDIO OVER MULTIPLE SPEAKERS," on page 25, line 8 through page 31, line 27, which are hereby incorporated by reference.

However, the methods involving flexible rendering that are disclosed herein are not limited to CMAP and/or FV-based flexible rendering. Such methods may be implemented by any suitable type of flexible rendering, such as vector base amplitude panning (VBAP). Relevant VBAP methods are disclosed in Pulkki, Ville, "Virtual Sound Source Positioning Using Vector Base Amplitude Panning," in J. Audio Eng. Soc. Vol. 45, No. 6 (June 1997), which is hereby incorporated by reference. Other suitable types of flexible rendering include, but are not limited to, dual-balance panning and Ambisonics-based flexible rendering methods such as those described in D. Arteaga, "An Ambisonics Decoder for Irregular 3-D Loudspeaker Arrays," Paper 8918, (2013 May), which is hereby incorporated by reference.

In some instances, flexible rendering may be performed relative to a coordinate system, such as the audio environment coordinate system 5117 that is shown in FIG. 51. According to this example, the audio environment coordinate system 5117 is a two-dimensional Cartesian coordinate system. In this example, the origin of the audio environment coordinate system 5117 is within the loudspeaker 5105*a* and the x axis corresponds to a long axis of the loudspeaker 5105*a*. In other implementations, the audio environment coordinate system 5117 may be a three-dimensional coordinate system, which may or may not be a Cartesian coordinate system.

Moreover, the origin of the coordinate system is not necessarily associated with a loudspeaker or a loudspeaker system. In some implementations, the origin of the coordinate system may be in another location of the audio environment 5100. The location of the alternative audio environment coordinate system 5117' provides one such example. In this example, the origin of the alternative audio environment coordinate system 5117' has been selected such that the values of x and y are positive for all locations within the audio environment 5100. In some instances, the origin and orientation of a coordinate system may be selected to correspond with the location and orientation of the head of a person within the audio environment 5100. In some such implementations, the viewing direction of a person may be along an axis of the coordinate system (, e.g., along the positive y axis).

In some implementations, a control system may control a flexible rendering process based, at least in part, on the location (and, in some examples, the orientation) of each participating loudspeaker (e.g., each active loudspeaker and/or each loudspeaker for which audio data will be rendered) in an audio environment. According to some such implementations, the control system may have previously determined the location (and, in some examples, the orientation) of each participating loudspeaker according to a coordinate system, such as the audio environment coordinate system 5117, and may have stored corresponding loudspeaker position data in a data structure. Some methods for determining audio device positions are disclosed herein.

According to some such implementations, a control system for an orchestrating device (which may, in some instances, be one of the loudspeakers 5105*a*-5105*h*) may render audio data such that a particular element or area of the audio environment 5100, such as the television 5130, represents the front and center of the audio environment. Such implementations may be advantageous for some use cases, such as playback of audio for a movie, television program or other content being displayed on the television 5130.

However, for other use cases, such as playback of music that is not associated with content being displayed on the television 5130, such a rendering method may not be optimal. In such alternative use cases, it may be desirable to render audio data for playback such that the front and center of the rendered sound field correspond with the position and orientation of a person within the audio environment 5100.

For example, referring to person 5120*a*, it may be desirable to render audio data for playback such that the front and center of the rendered sound field correspond with the viewing direction of the person 5120*a*, which is indicated by the direction of the arrow 5123*a* from the location of the person 5120*a*. In this example, the location of the person 5120*a* is indicated by the point 5121*a* at the center of the person 5120*a*'s head. In some examples, the "sweet spot" of audio data rendered for playback for the person 5120*a* may correspond with the point 5121*a*. Some methods for determining the position and orientation of a person in an audio environment are described below. In some such examples, the position and orientation of a person may be determined according to the position and orientation of a piece of furniture, such as those of the chair 5125.

According to this example, the positions of the persons 5120*b* and 5120*c* are represented by the points 5121*b* and 5121*c*, respectively. Here, the fronts of the persons 5120*b* and 5120*c* are represented by the arrows 5123*b* and 5123*c*, respectively. The locations of the points 5121*a*, 5121*b* and 5121*c*, as well as the orientations of the arrows 5123*a*, 5123*b* and 5123*c*, may be determined relative to a coordinate system, such as the audio environment coordinate system 5117. As noted above, in some examples the origin and orientation of a coordinate system may be selected to correspond with the location and orientation of the head of a person within the audio environment 5100.

In some examples, the "sweet spot" of audio data rendered for playback for the person 5120*b* may correspond with the point 5121*b*. Similarly, the "sweet spot" of audio data rendered for playback for the person 5120*c* may correspond with the point 5121*c*. One may observe that if the "sweet spot" of audio data rendered for playback for the person 5120*a* corresponds with the point 5121*a*, this sweet spot will not correspond with the point 5121*b* or the point 5121*c*.

Moreover, the front and center area of a sound field rendered for the person 5120*b* should ideally correspond with the direction of the arrow 5123*b*. Likewise, the front and center area of a sound field rendered for the person 5120*c* should ideally correspond with the direction of the arrow 5123*c*. One may observe that the front and center areas relative to persons 5120*a*, 5120*b* and 5120*c* are all different. Accordingly, audio data rendered via previously-disclosed methods and according to the position and orientation of any one of these people and will not be optimal for the positions and orientations of the other two people.

However, various disclosed implementations are capable of rendering audio data satisfactorily for multiple sweet spots, and in some instances for multiple orientations. Some such methods involve creating two or more different spatial renderings of the same audio content for different listening configurations over a set of common loudspeakers and combining the different spatial renderings by multiplexing the renderings across frequency. In some such examples, the frequency spectrum corresponding to the range of human hearing (e.g., 20 Hz to 20,000 Hz) may be divided into a plurality of frequency bands. According to some such examples, each of the different spatial renderings will be played back via a different set of frequency bands. In some such examples, the rendered audio data corresponding to each set of frequency bands may be combined into a single output set of loudspeaker feed signals. The result may provide spatial audio for each of a plurality of locations, and in some instances for each of a plurality of orientations.

In some implementations, the number of listeners and their positions (and, in some instances, their orientations) may be determined according to data from one or more cameras in an audio environment, such as the audio environment 5100 of FIG. 51. In this example, the audio environment 5100 includes cameras 5111*a*-5111*e*, which are distributed throughout the environment. In some implementations, one or more smart audio devices in the audio environment 5100 also may include one or more cameras. The one or more smart audio devices may be single purpose audio devices or virtual assistants. In some such examples, one or more cameras of the optional sensor system 180 (see FIG. 1B) may reside in or on the television 5130, in a mobile phone or in a smart speaker, such as one or more of the loudspeakers 5105*b*, 5105*d*, 5105*e* or 5105*h*. Although cameras 5111*a*-5111*e* are not shown in every depiction of an audio environment presented in this disclosure, each of the audio environments may nonetheless include one or more cameras in some implementations.

One of the practical considerations in implementing flexible rendering (in accordance with some embodiments) is complexity. In some cases it may not be feasible to perform accurate rendering for each frequency band for each audio object in real-time, given the processing power of a particular device. One challenge is that the audio object positions (which may in some instances be indicated by metadata) of at least some audio objects to be rendered may change many times per second. The complexity may be compounded for some disclosed implementations, because rendering may be performed for each of a plurality of listening configurations.

An alternative approach to reduce complexity at the expense of memory is to use one or more look-up tables (or other such data structures) that include samples (e.g., of speaker activations) in the three dimensional space for all possible object positions. The sampling may or may not be the same in all dimensions, depending on the particular implementation. In some such examples, one such data structure may be created for each of a plurality of listening configurations. Alternatively, or additionally, a single data structure may be created by summation of a plurality of data structures, each of which may correspond to a different one of a plurality of listening configurations.

Figure 52:
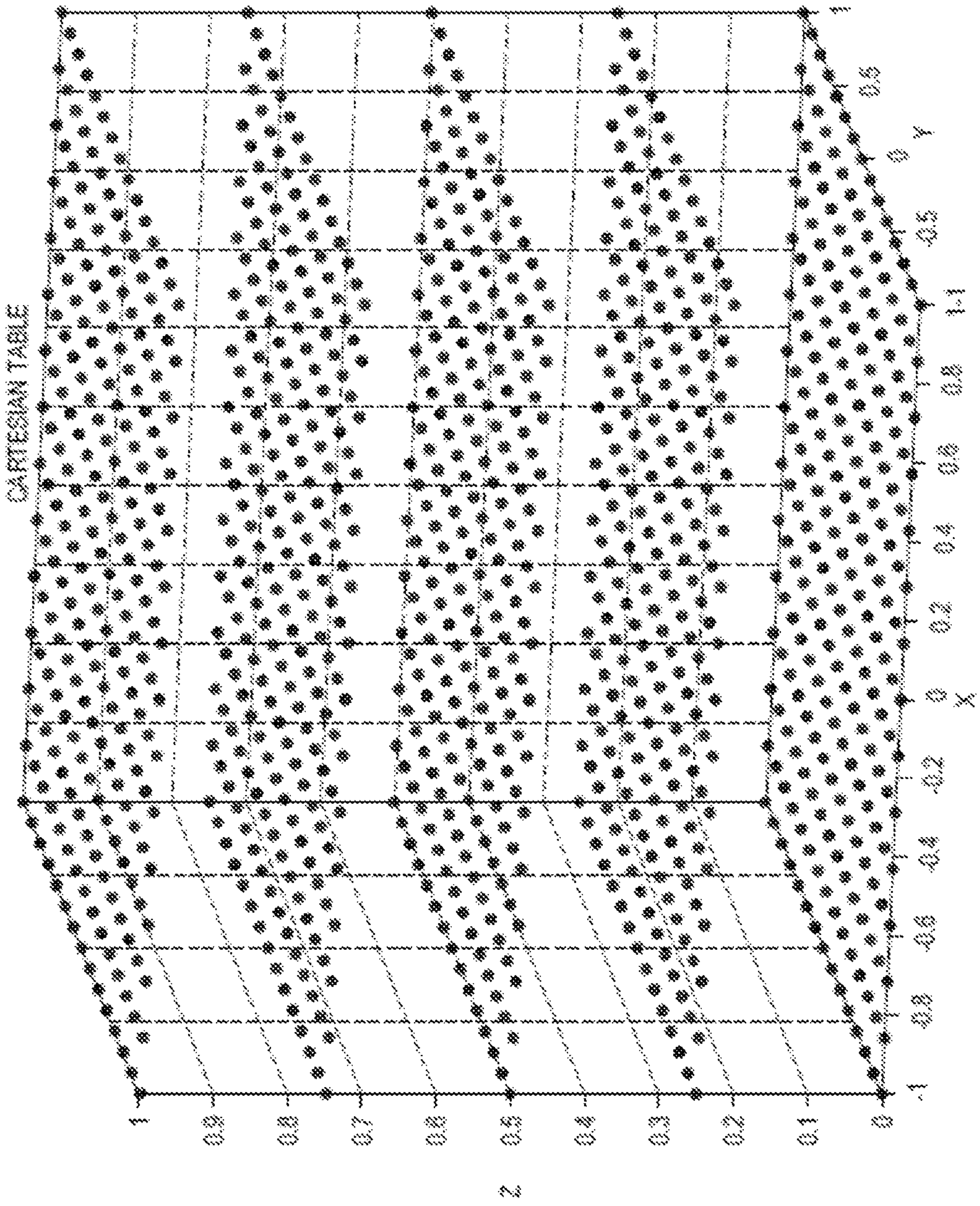
FIG. 52 is a graph of points indicative of speaker activations, in an example embodiment.

FIG. 52 is a graph of points indicative of speaker activations, in an example embodiment. In this example, the x and y dimensions are sampled with 15 points and the z dimension is sampled with 5 points. According to this example, each point represents M speaker activations, one speaker activation for each of M speakers in an audio environment. The speaker activations may, in some examples be gains or complex values for each of the N frequency bands associated with a filterbank analysis. In some examples, one such data structure may be created for a single listening configuration. According to some such examples, one such data structure may be created for each of a plurality of listening configurations. In some such examples, a single data structure may be created by multiplexing the data structures associated with the plurality of listening configurations across multiple frequency bands, such as the N frequency bands referenced above. In other words, for each band of the data structure, activations from one of the plurality of listening configurations may be selected. Once this single, multiplexed data structure is created, it may be associated with a single instance of a renderer to achieve functionality that is equivalent to that of multiple-renderer implementations such as those described below with reference to FIGS. 54 and 55. According to some examples, the points shown in FIG. 52 may correspond to speaker activation values for a single data structure that has been created by multiplexing a plurality of data structures, each of which corresponds to a different listening configuration.

Other implementations may include more samples or fewer samples. For example, in some implementations the spatial sampling for speaker activations may not be uniform. Some implementations may involve speaker activation samples in more or fewer x,y planes than are shown in FIG. 52. Some such implementations may determine speaker activation samples in only one x,y, plane. According to this example, each point represents the M speaker activations for the CMAP, FV, VBAP or other flexible rendering method. In some implementations, a set of speaker activations such as those shown in FIG. 52 may be stored in a data structure, which may be referred to herein as a "table" (or a "cartesian table," as indicated in FIG. 52).

A desired rendering location will not necessarily correspond with the location for which a speaker activation has been calculated. At runtime, to determine the actual activations for each speaker, some form of interpolation may be implemented. In some such examples, tri-linear interpolation between the speaker activations of the nearest 8 points to a desired rendering location may be used.

Figure 53:
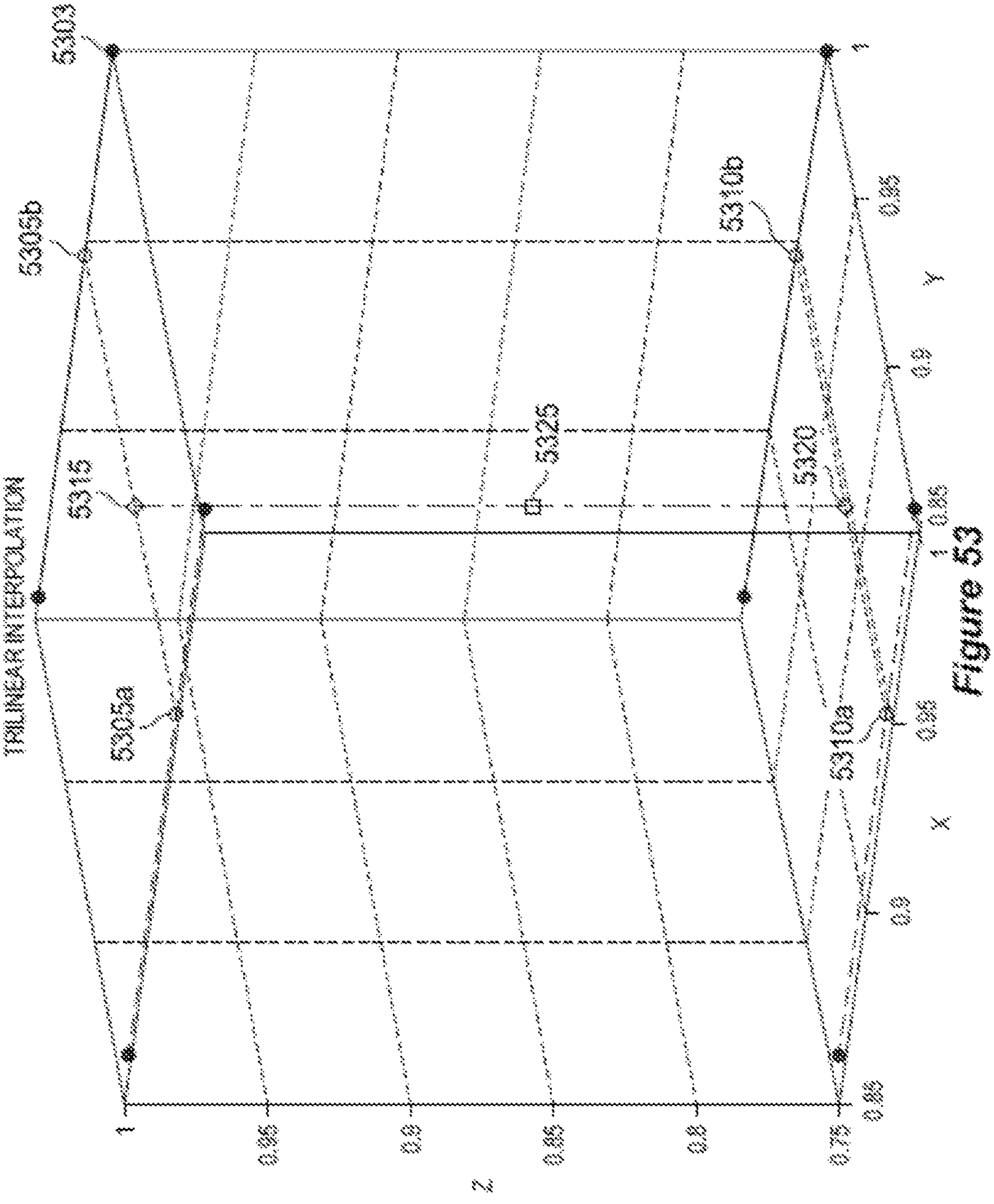
FIG. 53 is a graph of tri-linear interpolation between points indicative of speaker activations according to one example.

FIG. 53 is a graph of tri-linear interpolation between points indicative of speaker activations according to one example. According to this example, the solid circles 5303 at or near the vertices of the rectangular prism shown in FIG. 53 correspond to locations of the nearest 8 points to a desired rendering location for which speaker activations have been calculated. In this instance, the desired rendering location is a point within the rectangular prism that is presented in FIG. 53. In this example, the process of successive linear interpolation includes interpolation of each pair of points in the top plane to determine first and second interpolated points 5305*a* and 5305*b*, interpolation of each pair of points in the bottom plane to determine third and fourth interpolated points 5310*a* and 5310*b*, interpolation of the first and second interpolated points 5305*a* and 5305*b* to determine a fifth interpolated point 5315 in the top plane, interpolation of the third and fourth interpolated points 5310*a* and 5310*b* to determine a sixth interpolated point 5320 in the bottom plane, and interpolation of the fifth and sixth interpolated points 5315 and 5320 to determine a seventh interpolated point 5325 between the top and bottom planes.

Although tri-linear interpolation is an effective interpolation method, one of skill in the art will appreciate that tri-linear interpolation is just one possible interpolation method that may be used in implementing aspects of the present disclosure, and that other examples may include other interpolation methods. For example, some implementations may involve interpolation in more or fewer x,y, planes than are shown in FIG. 52. Some such implementations may involve interpolation in only one x,y, plane. In some implementations, a speaker activation for a desired rendering location will simply be set to the speaker activation of the nearest location to the desired rendering location for which a speaker activation has been calculated.

Figure 54:
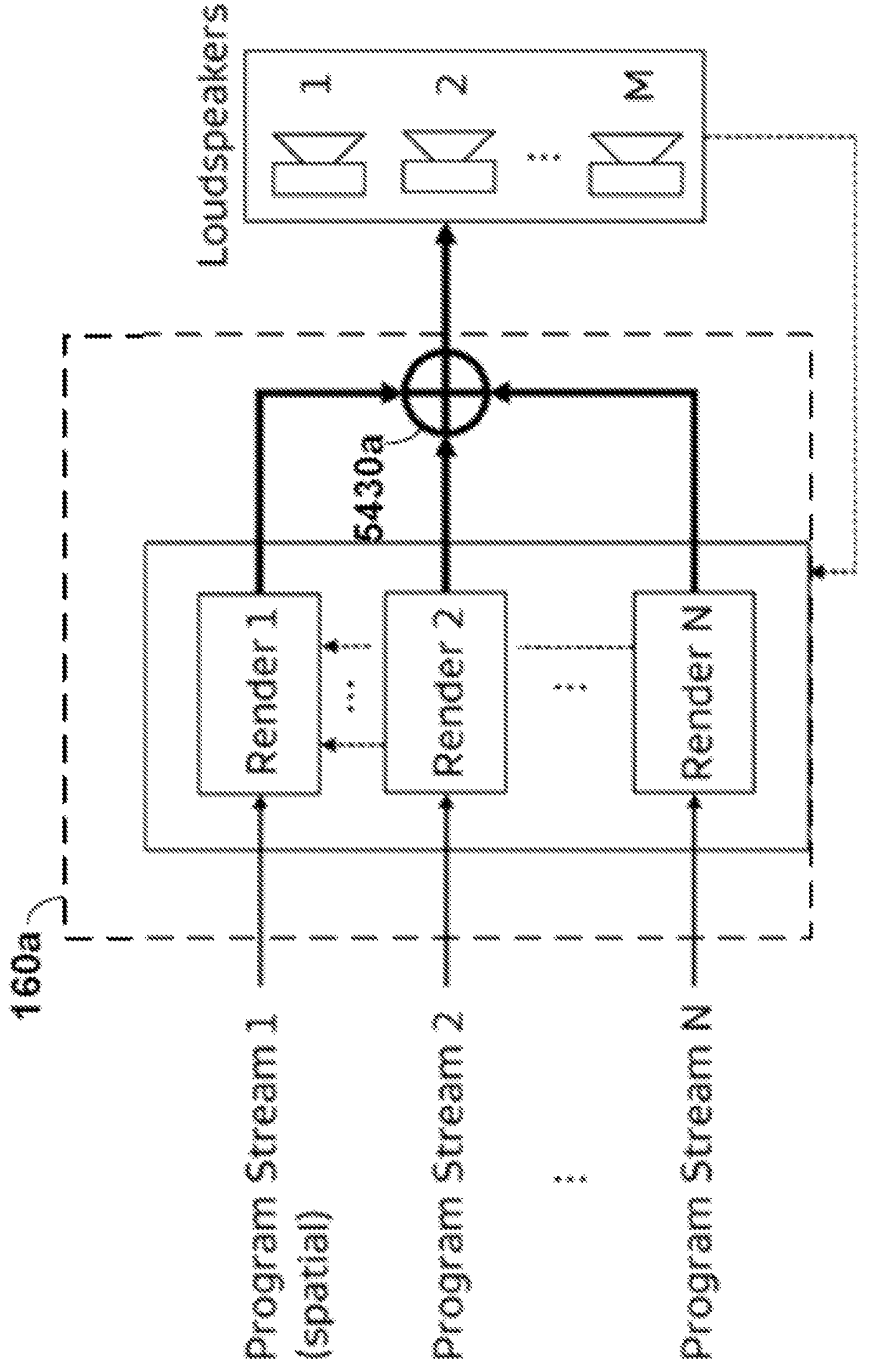
FIG. 54 is a block diagram of a minimal version of another embodiment.

FIG. 54 is a block diagram of a minimal version of another embodiment. Depicted are N program streams (N≥2), with the first explicitly labeled as being spatial, whose corresponding collection of audio signals feed through corresponding renderers that are each individually configured for playback of its corresponding program stream over a common set of M arbitrarily spaced loudspeakers (M≥2). The renderers also may be referred to herein as "rendering modules." The rendering modules and the mixer 5430*a* may be implemented via software, hardware, firmware or some combination thereof. In this example, the rendering modules and the mixer 5430*a* are implemented via control system 160*a*, which is an instance of the control system 160 that is described above with reference to FIG. 1B. Each of the N renderers output a set of M loudspeaker feeds which are summed across all N renderers for simultaneous playback over the M loudspeakers. According to this implementation, information about the layout of the M loudspeakers within the listening environment is provided to all the renderers, indicated by the dashed line feeding back from the loudspeaker block, so that the renderers may be properly configured for playback over the speakers. This layout information may or may not be sent from one or more of the speakers themselves, depending on the particular implementation. According to some examples, layout information may be provided by one or more smart speakers configured for determining the relative positions of each of the M loudspeakers in the listening environment. Some such auto-location methods may be based on direction of arrival (DOA) methods and/or time of arrival (TOA) methods, e.g., as disclosed herein. In other examples, this layout information may be determined by another device and/or input by a user. In some examples, loudspeaker specification information about the capabilities of at least some of the M loudspeakers within the listening environment may be provided to all the renderers. Such loudspeaker specification information may include impedance, frequency response, sensitivity, power rating, number and location of individual drivers, etc. According to this example, information from the rendering of one or more of the additional program streams is fed into the renderer of the primary spatial stream such that said rendering may be dynamically modified as a function of said information. This information is represented by the dashed lines passing from render blocks 2 through N back up to render block 1.

Figure 55:
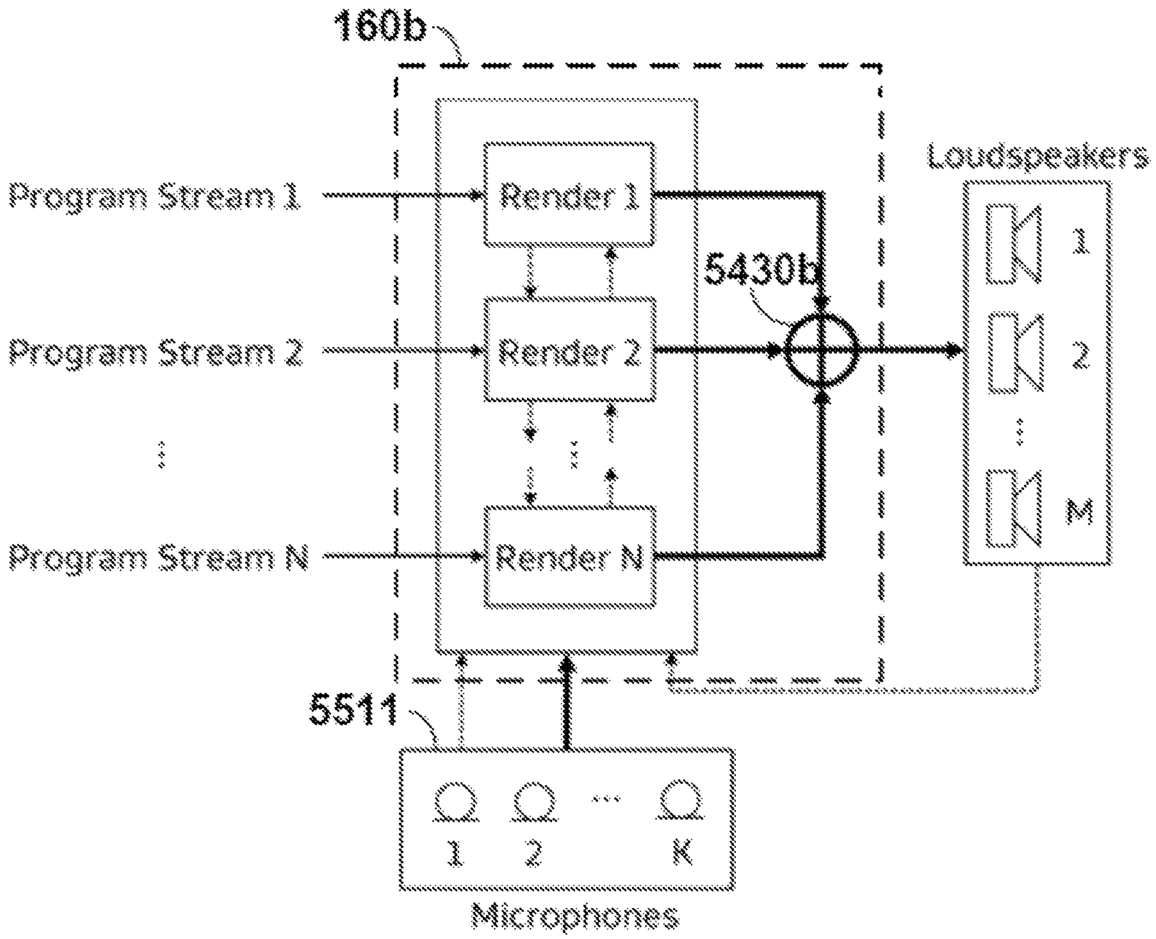
FIG. 55 depicts another (more capable) embodiment with additional features.

FIG. 55 depicts another (more capable) embodiment with additional features. In this example, the rendering modules and the mixer 5430*b* are implemented via control system 160*b*, which is an instance of the control system 160 that is described above with reference to FIG. 1B. In this version, dashed lines travelling up and down between all N renderers represent the idea that any one of the N renderers may contribute to the dynamic modification of any of the remaining N−1 renderers. In other words, the rendering of any one of the N program streams may be dynamically modified as a function of a combination of one or more renderings of any of the remaining N−1 program streams. Additionally, any one or more of the program streams may be a spatial mix, and the rendering of any program stream, regardless of whether it is spatial or not, may be dynamically modified as a function of any of the other program streams. Loudspeaker layout information may be provided to the N renderers, e.g. as noted above. In some examples, loudspeaker specification information may be provided to the N renderers. In some implementations, a microphone system 5511 may include a set of K microphones, (K≥1), within the listening environment. In some examples, the microphone(s) may be attached to, or associated with, the one or more of the loudspeakers. These microphones may feed both their captured audio signals, represented by the solid line, and additional configuration information (their location, for example), represented by the dashed line, back into the set of N renderers. Any of the N renderers may then be dynamically modified as a function of this additional microphone input. Various examples are provided in PCT Application US20/43696, filed on Jul. 27, 2020, which is hereby incorporated by reference.

Examples of information derived from the microphone inputs and subsequently used to dynamically modify any of the N renderers include but are not limited to:

- Detection of the utterance of a particular word or phrase by a user of the system.
- An estimate of the location of one or more users of the system.
- An estimate of the loudness of any of combination of the N programs streams at a particular location in the listening space.
- An estimate of the loudness of other environmental sounds, such as background noise, in the listening environment.

Figure 56:
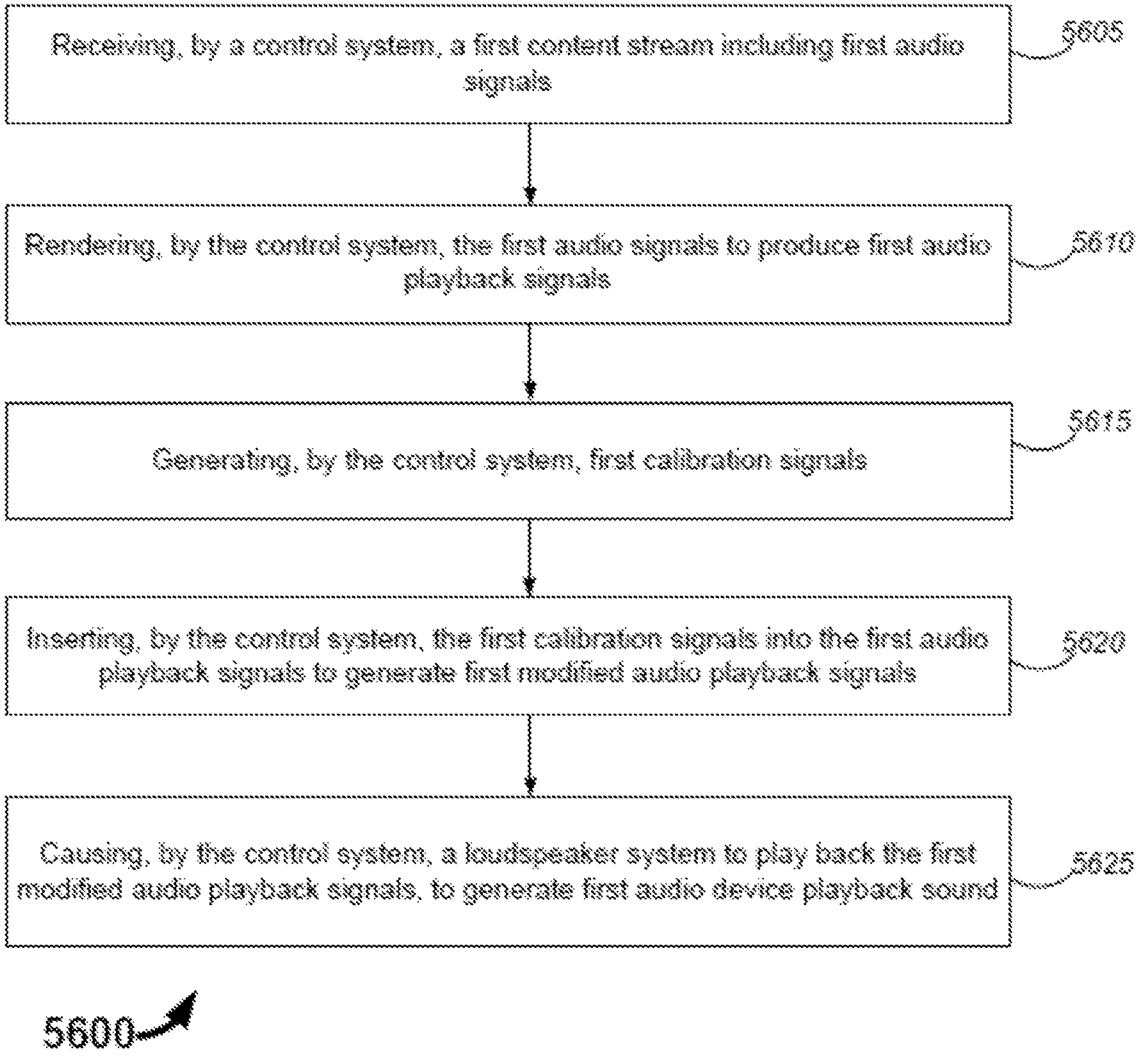
FIG. 56 is a flow diagram that outlines another example of a disclosed method.

FIG. 56 is a flow diagram that outlines another example of a disclosed method. The blocks of method 5600, like other methods described herein, are not necessarily performed in the order indicated. Moreover, such methods may include more or fewer blocks than shown and/or described. The method 5600 may be performed by an apparatus or system, such as the apparatus 150 that is shown in FIG. 1B and described above. In some examples, the method 5600 may be performed by one of the orchestrated audio devices 2720*a*-2720*n* that are described above with reference to FIG. 27A.

In this example, block 5605 involves receiving, by a control system, a first content stream including first audio signals. The content stream and the first audio signals may vary according to the particular implementation. In some instances, the content stream may correspond to a television program, a movie, to music, to a podcast, etc.

According to this example, block 5610 involves rendering, by the control system, the first audio signals to produce first audio playback signals. The first audio playback signals may be, or may include, loudspeaker feed signals for a loudspeaker system of an audio device.

In this example, block 5615 involves generating, by the control system, first calibration signals. According to this example, the first calibration signals correspond to the signals referred to herein as acoustic calibration signals. In some instances, the first calibration signals may be generated by one or more calibration signal generator modules, such as the calibration signal generator 2725 that is described above with reference to FIG. 27A.

According to this example, block 5620 involves inserting, by the control system, the first calibration signals into the first audio playback signals, to generate first modified audio playback signals. In some examples, block 5620 may be performed by the calibration signal injector 2723 that is described above with reference to FIG. 27A.

In this example, block 5625 involves causing, by the control system, a loudspeaker system to play back the first modified audio playback signals, to generate first audio device playback sound. In some examples, block 5620 may involve the control system controlling the loudspeaker system 2731 of FIG. 27A to play back the first modified audio playback signals, to generate the first audio device playback sound.

In some implementations, method 5600 may involve receiving, by the control system and from a microphone system, microphone signals corresponding to at least the first audio device playback sound and second audio device playback sound. The second audio device playback sound may correspond to second modified audio playback signals played back by a second audio device. In some examples, the second modified audio playback signals may include second calibration signals generated by the second audio device. In some such examples, method 5600 may involve extracting, by the control system, at least the second calibration signals from the microphone signals.

According to some implementations, method 5600 may involve receiving, by the control system and from the microphone system, microphone signals corresponding to at least the first audio device playback sound and to second through $N^{th}$ audio device playback sound. The second through $N^{th}$ audio device playback sound may correspond to second through $N^{th}$ modified audio playback signals played back by second through $N^{th}$ audio devices. In some instances, the second through $N^{th}$ modified audio playback signals may include second through $N^{th}$ calibration signals. In some such examples, method 5600 may involve extracting, by the control system, at least the second through $N^{th}$ calibration signals from the microphone signals.

In some implementations, method 5600 may involve estimating, by the control system, at least one acoustic scene metric based, at least in part, on the second through $N^{th}$ calibration signals. In some examples, the acoustic scene metric(s) may be, or may include, a time of flight, a time of arrival, a range, an audio device audibility, an audio device impulse response, an angle between audio devices, an audio device location, audio environment noise and/or a signal-to-noise ratio.

According to some examples, method 5600 may involve controlling one or more aspects of audio device playback (and/or having one or more aspects of audio device playback controlled) based, at least in part, on the at least one acoustic scene metric and/or at least one audio device characteristic. In some such examples, an orchestrating device may control one or more aspects of audio device playback by one or more orchestrated devices based, at least in part, on the at least one acoustic scene metric and/or at least one audio device characteristic. In some implementations, the control system of an orchestrated device may be configured to provide at least one acoustic scene metric to an orchestrating device. In some such implementations, the control system of an orchestrated device may be configured to receive instructions from the orchestrating device for controlling one or more aspects of audio device playback based, at least in part, on at least one acoustic scene metric.

According to some examples, a first content stream component of the first audio device playback sound may cause perceptual masking of a first calibration signal component of the first audio device playback sound. In some such examples, the first calibration signal component may not be audible to a human being.

In some examples, method 5600 may involve receiving, by the control system of an orchestrated audio device, one or more calibration signal parameters from an orchestrating device. The one or more calibration signal parameters may be useable by the control system of the orchestrated audio device for generation of calibration signals.

In some implementations, the one or more calibration signal parameters may include parameters for scheduling a time slot to play back modified audio playback signals. In some such examples, a first time slot for a first audio device may be different from a second time slot for a second audio device.

According to some examples, the one or more calibration signal parameters may include parameters for determining a frequency band for playback of modified audio playback signals that include calibration signals. In some such examples, a first frequency band for a first audio device may be different from a second frequency band for a second audio device.

In some instances, the one or more calibration signal parameters may include a spreading code for generating calibration signals. In some such examples, a first spreading code for a first audio device may be different from a second spreading code for a second audio device.

In some examples, method 5600 may involve processing received microphone signals to produce preprocessed microphone signals. Some such examples may involve extracting calibration signals from the preprocessed microphone signals. Processing the received microphone signals may, for example, involve beamforming, applying a bandpass filter and/or echo cancellation.

According to some implementations, extracting at least the second through $N^{th}$ calibration signals from the microphone signals may involve applying a matched filter to the microphone signals or to a preprocessed version of the microphone signals, to produce second through $N^{th}$ delay waveforms. The second through $N^{th}$ delay waveforms may, for example, correspond to each of the second through $N^{th}$ calibration signals. Some such examples may involve applying a low-pass filter to each of the second through $N^{th}$ delay waveforms.

In some examples, method 5600 may involve implementing, via the control system, a demodulator. Some such examples may involve applying the matched filter as part of a demodulation process performed by the demodulator. In some such examples, an output of the demodulation process may be a demodulated coherent baseband signal. Some examples may involve estimating, via the control system, a bulk delay and providing a bulk delay estimation to the demodulator.

In some examples, method 5600 may involve implementing, via the control system, a baseband processor configured for baseband processing of the demodulated coherent baseband signal. In some such examples, the baseband processor may be configured to output at least one estimated acoustic scene metric. In some examples, the baseband processing may involve producing an incoherently integrated delay waveform based on demodulated coherent baseband signals received during an incoherent integration period. In some such examples, producing the incoherently integrated delay waveform may involve squaring the demodulated coherent baseband signals received during the incoherent integration period, to produce squared demodulated baseband signals, and integrating the squared demodulated baseband signals. In some examples, the baseband processing may involve applying one or more of a leading edge estimating process, a steered response power estimating process or a signal-to-noise estimating process to the incoherently integrated delay waveform. Some examples may involve estimating, via the control system, a bulk delay and providing a bulk delay estimation to the baseband processor.

According to some examples, method 5600 may involve estimating, by the control system, second through $N^{th}$ noise power levels at second through $N^{th}$ audio device locations based on the second through $N^{th}$ delay waveforms. Some such examples may involve producing a distributed noise estimate for the audio environment based, at least in part, on the second through $N^{th}$ noise power levels.

In some examples, method 5600 may involve receiving gap instructions from an orchestrating device and inserting a first gap into a first frequency range of the first audio playback signals or the first modified audio playback signals during a first time interval of the first content stream according to the first gap instructions. The first gap may be an attenuation of the first audio playback signals in the first frequency range. In some examples, the first modified audio playback signals and the first audio device playback sound include the first gap.

According to some examples, the gap instructions may include instructions for controlling gap insertion and calibration signal generation such that calibration signals correspond with neither gap time intervals nor gap frequency ranges. In some examples, the gap instructions may include instructions for extracting target device audio data and/or audio environment noise data from received microphone data.

According to some examples, method 5600 may involve estimating, by the control system, at least one acoustic scene metric based, at least in part, on data extracted from received microphone data while playback sound produced by one or more audio devices of the audio environment includes one or more gaps. In some such examples, the acoustic scene metric(s) includes one or more of a time of flight, a time of arrival, a range, an audio device audibility, an audio device impulse response, an angle between audio devices, an audio device location, audio environment noise and/or a signal-to-noise ratio.

According to some implementations, the control system may be configured to implement a wakeword detector. In some such examples, method 5600 may involve detecting a wakeword in received microphone signals. According to some examples, method 5600 may involve determining one or more acoustic scene metrics based on wakeword detection data received from the wakeword detector.

In some such examples, method 5600 may involve implementing noise compensation functionality. According to some such examples, noise compensation functionality may be implemented in response to environmental noise detected by "listening through" forced gaps that have been inserted into played-back audio data.

According to some examples, the rendering may be performed by a rendering module implemented by the control system. In some such examples, the rendering module may be configured to perform the rendering based, at least in part, on rendering instructions received from an orchestrating device. According to some such examples, the rendering instructions may include instructions from a rendering configuration generator, a user zone classifier and/or an orchestration module of the orchestrating device.

Various features and aspects will be appreciated from the following enumerated example embodiments ("EEEs"):

EEE1. An apparatus, comprising:

an interface system; and a control system configured to implement an orchestration module, the orchestration module being configured to:

cause a first orchestrated audio device of an audio environment to generate first calibration signals;

cause the first orchestrated audio device to insert the first calibration signals into first audio playback signals corresponding to a first content stream, to generate first modified audio playback signals for the first orchestrated audio device;

cause the first orchestrated audio device to play back the first modified audio playback signals, to generate first orchestrated audio device playback sound;

cause a second orchestrated audio device of the audio environment to generate second calibration signals;

cause the second orchestrated audio device to insert second calibration signals into a second content stream to generate second modified audio playback signals for the second orchestrated audio device;

cause the second orchestrated audio device to play back the second modified audio playback signals, to generate second orchestrated audio device playback sound;

cause at least one microphone of at least one orchestrated audio device in the audio environment to detect at least the first orchestrated audio device playback sound and the second orchestrated audio device playback sound and to generate microphone signals corresponding to at least the first orchestrated audio device playback sound and the second orchestrated audio device playback sound;

cause the at least one orchestrated audio device to extract the first calibration signals and the second calibration signals from the microphone signals; and cause the at least one orchestrated audio device to estimate at least one acoustic scene metric, at least in part, on the first calibration signals and the second calibration signals.

EEE2. The apparatus of EEE1, wherein the first calibration signals correspond to first sub-audible components of the first orchestrated audio device playback sound and wherein the second calibration signals correspond to second sub-audible components of the second orchestrated audio device playback sound.

EEE3. The apparatus of EEE1 or EEE2, wherein the first calibration signals comprise first DSSS signals and wherein the second calibration signals comprise second DSSS signals.

EEE4. The apparatus of any one of EEEs 1-3, wherein the orchestration module is further configured to:

cause the first orchestrated audio device to insert a first gap into a first frequency range of the first audio playback signals or the first modified audio playback signals during a first time interval of the first content stream, the first gap comprising an attenuation of the first audio playback signals in the first frequency range, the first modified audio playback signals and the first orchestrated audio device playback sound including the first gap;

cause the second orchestrated audio device to insert the first gap into the first frequency range of the second audio playback signals or the second modified audio playback signals during the first time interval, the second modified audio playback signals and the second orchestrated audio device playback sound including the first gap;

cause audio data from the microphone signals in at least the first frequency range to be extracted, to produce extracted audio data; and cause the at least one acoustic scene metric to be determined based, at least in part, on the extracted audio data.

EEE5. The apparatus of EEE4, wherein the orchestration module is further configured to control gap insertion and calibration signal generation such that calibration signals correspond with neither gap time intervals nor gap frequency ranges.

EEE6. The apparatus of EEE4 or EEE5, wherein the orchestration module is further configured to control gap insertion and calibration signal generation based, at least in part, on a time since noise was estimated in at least one frequency band.

EEE7. The apparatus of any one of EEEs 4-6, wherein the orchestration module is further configured to control gap insertion and calibration signal generation based, at least in part, on a signal-to-noise ratio of a calibration signal of at least one orchestrated audio device in at least one frequency band.

EEE8. The apparatus of any one of EEEs 4-7, wherein the orchestration module is further configured to:

cause a target orchestrated audio device to play back unmodified audio playback signals of a target device content stream, to generate target orchestrated audio device playback sound; and cause at least one of a target orchestrated audio device audibility or a target orchestrated audio device position to be estimated by at least one orchestrated audio device based, at least in part, on the extracted audio data, wherein:

the unmodified audio playback signals do not include the first gap; and the microphone signals also correspond to the target orchestrated audio device playback sound.

EEE9. The apparatus of EEE8, wherein the unmodified audio playback signals do not include a gap inserted into any frequency range.

EEE10. The apparatus of any one of EEEs 1-9, wherein the at least one acoustic scene metric includes one or more of a time of flight, a time of arrival, a direction of arrival, a range, an audio device audibility, an audio device impulse response, an angle between audio devices, an audio device location, audio environment noise or a signal-to-noise ratio.

EEE11. The apparatus of any one of EEEs 1-10, further comprising an acoustic scene metric aggregator, wherein the orchestration module is further configured to cause a plurality of orchestrated audio devices in the audio environment to transmit at least one acoustic scene metric to the apparatus and wherein the acoustic scene metric aggregator is configured to aggregate acoustic scene metrics received from the plurality of orchestrated audio devices.

EEE12. The apparatus of EEE11, wherein the orchestration module is further configured to implement an acoustic scene metric processor configured to receive aggregated acoustic scene metrics from the acoustic scene metric aggregator.

EEE13. The apparatus of EEE12, wherein the orchestration module is further configured to control one or more aspects of audio device orchestration based, at least in part, on input from the acoustic scene metric processor.

EEE14. The apparatus of any one of EEEs 11-13, wherein the control system is further configured to implement a user zone classifier configured to receive one or more acoustic scene metrics and to estimate a zone of the audio environment in which a person is currently located, based at least in part on one or more received acoustic scene metrics.

EEE15. The apparatus of any one of EEEs 11-14, wherein the control system is further configured to implement a noise estimator configured to receive one or more acoustic scene metrics and to estimate noise in the audio environment based at least in part on one or more received acoustic scene metrics.

EEE16. The apparatus of any one of EEEs 11-15, wherein the control system is further configured to implement an acoustic proximity estimator configured to receive one or more acoustic scene metrics and to estimate an acoustic proximity of one or more sound sources in the audio environment based at least in part on one or more received acoustic scene metrics.

EEE17. The apparatus of any one of EEEs 11-16, wherein the control system is further configured to implement a geometric proximity estimator configured to receive one or more acoustic scene metrics and to estimate a geometric proximity of one or more sound sources in the audio environment based at least in part on one or more received acoustic scene metrics.

EEE18. The apparatus of EEE16 or EEE17, wherein the control system is further configured to implement a rendering configuration module configured determine a rendering configuration for an orchestrated audio device based, at least in part, on an estimated geometric proximity or an estimated acoustic proximity of one or more sound sources in the audio environment.

EEE19. The apparatus of any one of EEEs 1-18, wherein a first content stream component of the first orchestrated audio device playback sound causes perceptual masking of a first calibration signal component of the first orchestrated audio device playback sound and wherein a second content stream component of the second orchestrated audio device playback sound causes perceptual masking of a second calibration signal component of the second orchestrated audio device playback sound.

EEE20. The apparatus of any one of EEEs 1-19, wherein the orchestration module is further configured to:

cause third through $N^{th}$ orchestrated audio devices of the audio environment to generate third through $N^{th}$ calibration signals;

cause the third through $N^{th}$ orchestrated audio devices to insert the third through $N^{th}$ calibration signals into third through $N^{th}$ content streams, to generate third through $N^{th}$ modified audio playback signals for the third through $N^{th}$ orchestrated audio devices; and cause the third through $N^{th}$ orchestrated audio devices to play back a corresponding instance of the third through $N^{th}$ modified audio playback signals, to generate third through $N^{th}$ instances of audio device playback sound.

EEE21. The apparatus of EEE20, wherein the orchestration module is further configured to:

cause at least one microphone of each of the first through $N^{th}$ orchestrated audio devices to detect first through $N^{th}$ instances of audio device playback sound and to generate microphone signals corresponding to the first through $N^{th}$ instances of audio device playback sound, the first through $N^{th}$ instances of audio device playback sound including the first orchestrated audio device playback sound, the second orchestrated audio device playback sound and the third through $N^{th}$ instances of audio device playback sound; and cause the first through $N^{th}$ calibration signals to be extracted from the microphone signals, wherein the at least one acoustic scene metric is estimated based, at least in part, on first through $N^{th}$ calibration signals.

EEE22. The apparatus of any one of EEEs 1-21, wherein the orchestration module is further configured to:

determine one or more calibration signal parameters for a plurality of orchestrated audio devices in the audio environment, the one or more calibration signal parameters being useable for generation of calibration signals; and provide the one or more calibration signal parameters to each orchestrated audio device of the plurality of orchestrated audio devices.

EEE23. The apparatus of EEE22, wherein determining the one or more calibration signal parameters involves scheduling a time slot for each orchestrated audio device of the plurality of orchestrated audio devices to play back modified audio playback signals, wherein a first time slot for a first orchestrated audio device is different from a second time slot for a second orchestrated audio device.

EEE24. The apparatus of EEE22 or EEE23, wherein determining the one or more calibration signal parameters involves determining a frequency band for each orchestrated audio device of the plurality of orchestrated audio devices to play back modified audio playback signals.

EEE25. The apparatus of EEE24, wherein a first frequency band for a first orchestrated audio device is different from a second frequency band for a second orchestrated audio device.

EEE26. The apparatus of any one of EEEs 22-25, wherein determining the one or more calibration signal parameters involves determining a DSSS spreading code for each orchestrated audio device of the plurality of orchestrated audio devices.

EEE27. The apparatus of EEE26, wherein a first spreading code for a first orchestrated audio device is different from a second spreading code for a second orchestrated audio device.

EEE28. The apparatus of EEE26 or EEE27, further comprising determining at least one spreading code length that is based, at least in part, on an audibility of a corresponding orchestrated audio device.

EEE29. The apparatus of any one of EEEs 22-28, wherein determining the one or more calibration signal parameters involves applying an acoustic model that is based, at least in part, on mutual audibility of each of a plurality of orchestrated audio devices in the audio environment.

EEE30. The apparatus of any one of EEEs 22-29, wherein the orchestration module is further configured to: determine that calibration signal parameters for an orchestrated audio device are at a level of maximum robustness; determine that calibration signal from the orchestrated audio device cannot be successfully extracted from the microphone signals; and cause all other orchestrated audio devices to mute at least a portion of their corresponding orchestrated audio device playback sound.

EEE31. The apparatus of EEE30, wherein the portion comprises a calibration signal component.

EEE32. The apparatus of any one of EEEs 1-31, wherein the orchestration module is further configured to cause each of a plurality of orchestrated audio devices in the audio environment to simultaneously play back modified audio playback signals.

EEE33. The apparatus of any one of EEEs 1-32, wherein at least a portion of the first audio playback signals, at least a portion of the second audio playback signals, or at least portions of each of the first audio playback signals and the second audio playback signals, correspond to silence.

EEE34. An apparatus, comprising:

a loudspeaker system comprising at least one loudspeaker;

a microphone system comprising at least one microphone; and a control system configured to:

receive a first content stream, the first content stream including first audio signals;

render the first audio signals to produce first audio playback signals;

generate first calibration signals;

insert the first calibration signals into the first audio playback signals to generate first modified audio playback signals; and cause the loudspeaker system to play back the first modified audio playback signals, to generate first audio device playback sound.

EEE35. The apparatus of EEE34, wherein the control system comprises:

a calibration signal generator configured to generate calibration signals;

a calibration signal modulator configured to modulate calibration signals generated by the calibration signal generator, to produce the first calibration signals; and a calibration signal injector configured to insert the first calibration signals into the first audio playback signals to generate the first modified audio playback signals.

EEE36. The apparatus of EEE34 or EEE35, wherein the control system is further configured to:

receive, from the microphone system, microphone signals corresponding to at least the first audio device playback sound and second audio device playback sound, the second audio device playback sound corresponding to second modified audio playback signals played back by a second audio device, the second modified audio playback signals including second calibration signals; and extract at least the second calibration signals from the microphone signals.

EEE37. The apparatus of EEE34 or EEE35, wherein the control system is further configured to:

receive, from the microphone system, microphone signals corresponding to at least the first audio device playback sound and to second through $N^{th}$ audio device playback sound, the second through $N^{th}$ audio device playback sound corresponding to second through $N^{th}$ modified audio playback signals played back by second through $N^{th}$ audio devices, the second through $N^{th}$ modified audio playback signals including second through $N^{th}$ calibration signals; and extract at least the second through $N^{th}$ calibration signals from the microphone signals.

EEE38. The apparatus of EEE37, wherein the control system is further configured to estimate at least one acoustic scene metric based, at least in part, on the second through $N^{th}$ calibration signals.

EEE39. The apparatus of EEE38, wherein the at least one acoustic scene metric includes one or more of a time of flight, a time of arrival, a range, an audio device audibility, an audio device impulse response, an angle between audio devices, an audio device location, audio environment noise or a signal-to-noise ratio.

EEE40. The apparatus of EEE38 or EEE39, wherein the control system is further configured to provide at least one acoustic scene metric to an orchestrating device and to receive instructions from the orchestrating device for controlling one or more aspects of audio device playback based, at least in part, on the at least one acoustic scene metric.

EEE41. The apparatus of any one of EEEs 34-40, wherein a first content stream component of the first audio device playback sound causes perceptual masking of a first calibration signal component of the first audio device playback sound.

EEE42. The apparatus of any one of EEEs 34-41, wherein the control system is configured to receive one or more calibration signal parameters from an orchestrating device, the one or more calibration signal parameters being useable for generation of calibration signals.

EEE43. The apparatus of EEE42, wherein the one or more calibration signal parameters include parameters for scheduling a time slot to play back modified audio playback signals, wherein a first time slot for a first audio device is different from a second time slot for a second audio device.

EEE44. The apparatus of EEE42, wherein the one or more calibration signal parameters include parameters for determining a frequency band for calibration signals.

EEE45. The apparatus of EEE44, wherein a first frequency band for a first audio device is different from a second frequency band for a second audio device.

EEE46. The apparatus of any one of EEEs 42-45, wherein the one or more calibration signal parameters include a spreading code for generating calibration signals.

EEE47. The apparatus of EEE46, wherein a first spreading code for a first audio device is different from a second spreading code for a second audio device.

EEE48. The apparatus of any one of EEEs 35-47, wherein the control system is further configured to process received microphone signals to produce preprocessed microphone signals, wherein the control system is configured to extract calibration signals from the preprocessed microphone signals.

EEE49. The apparatus of EEE48, wherein processing the received microphone signals involves one or more of beamforming, applying a bandpass filter or echo cancellation.

EEE50. The apparatus of any one of EEEs 37-49, wherein extracting at least the second through $N^{th}$ calibration signals from the microphone signals involves applying a matched filter to the microphone signals or to a preprocessed version of the microphone signals, to produce second through $N^{th}$ delay waveforms, the second through $N^{th}$ delay waveforms corresponding to each of the second through $N^{th}$ calibration signals.

EEE51. The apparatus of EEE50, wherein the control system is further configured to apply a low-pass filter to each of the second through $N^{th}$ delay waveforms.

EEE52. The apparatus of EEE50 or EEE51, wherein:
- the control system is configured to implement a demodulator;
- applying the matched filter is part of a demodulation process performed by the demodulator; and
- an output of the demodulation process is a demodulated coherent baseband signal.

EEE53. The apparatus of EEE52, wherein the control system is further configured to estimate a bulk delay and to provide a bulk delay estimation to the demodulator.

EEE54. The apparatus of EEE52 or EEE53, wherein the control system is further configured to implement a baseband processor configured for baseband processing of the demodulated coherent baseband signal and wherein the baseband processor is configured to output at least one estimated acoustic scene metric.

EEE55. The apparatus of EEE54, wherein the baseband processing involves producing an incoherently integrated delay waveform based on demodulated coherent baseband signals received during an incoherent integration period.

EEE56. The apparatus of EEE55, wherein producing the incoherently integrated delay waveform involves squaring the demodulated coherent baseband signals received during the incoherent integration period, to produce squared demodulated baseband signals, and integrating the squared demodulated baseband signals.

EEE57. The apparatus of EEE55 or EEE56, wherein the baseband processing involves applying one or more of a leading edge estimating process, a steered response power estimating process or a signal-to-noise estimating process to the incoherently integrated delay waveform.

EEE58. The apparatus of any one of EEEs 54-57, wherein the control system is further configured to estimate a bulk delay and to provide a bulk delay estimation to the baseband processor.

EEE59. The apparatus of any one of EEEs 50-58, wherein the control system is further configured to estimate second through $N^{th}$ noise power levels at second through $N^{th}$ audio device locations based on the second through $N^{th}$ delay waveforms.

EEE60. The apparatus of EEE59, wherein the control system is further configured to produce a distributed noise estimate for the audio environment based, at least in part, on the second through $N^{th}$ noise power levels.

EEE61. The apparatus of any one of EEEs 34-60, wherein the control system is further configured to receive gap instructions from an orchestrating device and to insert a first gap into a first frequency range of the first audio playback signals or the first modified audio playback signals during a first time interval of the first content stream according to the first gap instructions, the first gap comprising an attenuation of the first audio playback signals in the first frequency range, the first modified audio playback signals and the first audio device playback sound including the first gap.

EEE62. The apparatus of EEE61, wherein the gap instructions include instructions for controlling gap insertion and calibration signal generation such that calibration signals correspond with neither gap time intervals nor gap frequency ranges.

EEE63. The apparatus of EEE61 or EEE62, wherein the gap instructions include instructions for extracting at least one of target device audio data or audio environment noise data from received microphone data.

EEE64. The apparatus of any one of EEEs 61-63, wherein the control system is further configured to estimate at least one acoustic scene metric based, at least in part, on data extracted from received microphone data while playback sound produced by one or more audio devices of the audio environment includes one or more gaps.

EEE65. The apparatus of EEE64, wherein the at least one acoustic scene metric includes one or more of a time of flight, a time of arrival, a range, an audio device audibility, an audio device impulse response, an angle between audio devices, an audio device location, audio environment noise or a signal-to-noise ratio.

EEE66. The apparatus of EEE64 or EEE65, wherein the control system is further configured to provide at least one acoustic scene metric to an orchestrating device and to receive instructions from the orchestrating device for controlling one or more aspects of audio device playback based, at least in part, on the at least one acoustic scene metric.

EEE67. The apparatus of any one of EEEs 34-66, wherein the control system is further configured to implement a wakeword detector configured to detect a wakeword in received microphone signals.

EEE68. The apparatus of any one of EEEs 34-67, wherein the control system is further configured to determine one or more acoustic scene metrics based on wakeword detection data received from the wakeword detector.

EEE69. The apparatus of any one of EEEs 34-68, wherein the control system is further configured to implement noise compensation functionality.

EEE70. The apparatus of any one of EEEs 34-69, wherein the rendering is performed by a rendering module implemented by the control system and wherein the rendering module is further configured to perform the rendering based, at least in part, on rendering instructions received from an orchestrating device.

EEE71. The apparatus of EEE70, wherein the rendering instructions include instructions from at least one of a rendering configuration generator, a user zone classifier or an orchestration module.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system may be implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. An audio processing method, comprising:

causing, by a control system, a first audio device of an audio environment to generate first calibration signals;

causing, by the control system, the first calibration signals to be inserted into first audio playback signals corresponding to a first content stream, to generate first modified audio playback signals for the first audio device;

causing, by the control system, the first audio device to play back the first modified audio playback signals, to generate first audio device playback sound;

causing, by the control system, a second audio device of the audio environment to generate second calibration signals;

causing, by the control system, the second calibration signals to be inserted into a second content stream to generate second modified audio playback signals for the second audio device;

causing, by the control system, the second audio device to play back the second modified audio playback signals, to generate second audio device playback sound;

causing, by the control system, at least one microphone of the audio environment to detect at least the first audio device playback sound and the second audio device playback sound and to generate microphone signals corresponding to at least the first audio device playback sound and the second audio device playback sound;

causing, by the control system, the first calibration signals and the second calibration signals to be extracted from the microphone signals;

causing, by the control system, at least one first acoustic scene metric to be estimated based, at least in part, on the first calibration signals and the second calibration signals;

causing, by the control system, a first gap to be inserted into a first frequency range of the first audio playback signals or the first modified audio playback signals during a first time interval of the first content stream, the first gap comprising an attenuation of the first audio playback signals in the first frequency range, the first modified audio playback signals and the first audio device playback sound including the first gap;

causing, by the control system, the first gap to be inserted into the first frequency range of the second audio playback signals or the second modified audio playback signals during the first time interval, the second modified audio playback signals and the second audio device playback sound including the first gap;

causing, by the control system, audio data from the microphone signals in at least the first frequency range to be extracted, to produce extracted audio data of non-playback sounds without the presence of audio content or calibration signals;

causing, by the control system, at least one second acoustic scene metric to be estimated based, at least in part, on the extracted audio data; and controlling gap insertion and calibration signal generation based, at least in part, on a signal-to-noise ratio of a calibration signal of at least one audio device in at least one frequency band.

2. The audio processing method of claim 1, wherein the first calibration signals correspond to first sub-audible components of the first audio device playback sound and wherein the second calibration signals correspond to second sub-audible components of the second audio device playback sound.

3. The audio processing method of claim 1, wherein the first calibration signals comprise first DSSS signals and wherein the second calibration signals comprise second DSSS signals.

4. The audio processing method of claim 1, further comprising controlling gap insertion and calibration signal generation such that calibration signals correspond with neither gap time intervals nor gap frequency ranges.

5. The audio processing method of claim 1, further comprising controlling gap insertion and calibration signal generation based, at least in part, on a time since noise was estimated in at least one frequency band.

6. The audio processing method of claim 1, further comprising:

causing a target audio device to play back unmodified audio playback signals of a target device content stream, to generate target audio device playback sound; and causing, by the control system, at least one of a target audio device audibility or a target audio device position to be estimated based, at least in part, on the extracted audio data, wherein:

the unmodified audio playback signals comprises audio content in the first gap; and the microphone signals also correspond to the target audio device playback sound.

7. The audio processing method of claim 6, wherein the unmodified audio playback signals do not include a gap inserted into any frequency range.

8. The audio processing method of claim 1, wherein the at least one first acoustic scene metric further includes one or more of a time of flight, a time of arrival, a direction of arrival, a range, an audio device audibility, an audio device impulse response, an angle between audio devices, an audio device location, audio environment noise.

9. The audio processing method of claim 1, wherein causing the at least one first or second acoustic scene metric to be estimated involves estimating the at least one first or second acoustic scene metric or causing another device to estimate at least one first or second acoustic scene metric.

10. The audio processing method of claim 1, further comprising controlling one or more aspects of audio device playback based, at least in part, on the at least one first or second acoustic scene metric.

11. The audio processing method of claim 1, wherein a first content stream component of the first audio device playback sound causes perceptual masking of a first calibration signal component of the first audio device playback sound and wherein a second content stream component of the second audio device playback sound causes perceptual masking of a second calibration signal component of the second audio device playback sound.

12. The audio processing method of claim 1, wherein the control system is an orchestrating device control system.

13. The audio processing method of claim 1, further comprising:

causing, by a control system, third through $N^{th}$ audio devices of the audio environment to generate third through $N^{th}$ calibration signals;

causing, by the control system, the third through $N^{th}$ calibration signals to be inserted into third through $N^{th}$ content streams, to generate third through $N^{th}$ modified audio playback signals for the third through $N^{th}$ audio devices; and causing, by the control system, the third through $N^{th}$ audio devices to play back a corresponding instance of the third through $N^{th}$ modified audio playback signals, to generate third through $N^{th}$ instances of audio device playback sound.

14. The audio processing method of claim 13, further comprising:

causing, by the control system, at least one microphone of each of the first through $N^{th}$ audio devices to detect first through $N^{th}$ instances of audio device playback sound and to generate microphone signals corresponding to the first through $N^{th}$ instances of audio device playback sound, the first through $N^{th}$ instances of audio device playback sound including the first audio device playback sound, the second audio device playback sound and the third through $N^{th}$ instances of audio device playback sound; and causing, by the control system, the first through $N^{th}$ calibration signals to be extracted from the microphone signals, wherein the at least one first acoustic scene metric is estimated based, at least in part, on first through $N^{th}$ calibration signals.

15. The audio processing method of claim 1, further comprising:

determining one or more calibration signal parameters for a plurality of audio devices in the audio environment, the one or more calibration signal parameters being useable for generation of calibration signals; and providing the one or more calibration signal parameters to each audio device of the plurality of audio devices.

16. The audio processing method of claim 15, wherein determining the one or more calibration signal parameters involves scheduling a time slot for each audio device of the plurality of audio devices to play back modified audio playback signals, wherein a first time slot for a first audio device is different from a second time slot for a second audio device.

17. The audio processing method of claim 15, wherein determining the one or more calibration signal parameters involves determining a frequency band for each audio device of the plurality of audio devices to play back modified audio playback signals.

18. The audio processing method of claim 17, wherein a first frequency band for a first audio device is different from a second frequency band for a second audio device.

19. The audio processing method of claim 15, wherein determining the one or more calibration signal parameters involves determining a DSSS spreading code for each audio device of the plurality of audio devices.

20. The audio processing method of claim 19, wherein a first spreading code for a first audio device is different from a second spreading code for a second audio device.

21. The audio processing method of claim 19, further comprising determining at least one spreading code length that is based, at least in part, on an audibility of a corresponding audio device.

22. The audio processing method of claim 15, wherein determining the one or more calibration signal parameters involves applying an acoustic model that is based, at least in part, on mutual audibility of each of a plurality of audio devices in the audio environment.

23. The audio processing method of claim 15, further comprising:

determining that calibration signal parameters for an audio device are at a level of maximum robustness;

determining that calibration signal from the audio device cannot be successfully extracted from the microphone signals; and causing all other audio devices to mute at least a portion of their corresponding audio device playback sound.

24. A system configured to perform the method of claim 1.

25. One or more non-transitory media having software stored thereon, the software including instructions for controlling one or more devices to perform the method of claim 1.

* * * * *